United States Patent
Furusho

(10) Patent No.: US 8,200,913 B2
(45) Date of Patent: Jun. 12, 2012

(54) DISTRIBUTED MEMORY TYPE INFORMATION PROCESSING SYSTEM

(75) Inventor: Shinji Furusho, Yokohama (JP)

(73) Assignee: Turbo Data Laboratories, Inc., Kanagawa (JP)

( * ) Notice: Subject to any disclaimer, the term of this patent is extended or adjusted under 35 U.S.C. 154(b) by 1034 days.

(21) Appl. No.: 10/597,589

(22) PCT Filed: Jan. 25, 2005

(86) PCT No.: PCT/JP2005/000886
§ 371 (c)(1),
(2), (4) Date: Sep. 4, 2008

(87) PCT Pub. No.: WO2005/073880
PCT Pub. Date: Aug. 11, 2005

(65) Prior Publication Data
US 2008/0313423 A1   Dec. 18, 2008

(30) Foreign Application Priority Data
Jan. 29, 2004 (JP) ................. 2004-020828

(51) Int. Cl.
*G06F 12/00* (2006.01)
*G06F 13/00* (2006.01)
*G06F 13/28* (2006.01)
*G06F 15/00* (2006.01)
*G06F 15/76* (2006.01)
*G06F 9/30* (2006.01)
*G06F 9/40* (2006.01)

(52) U.S. Cl. .......... 711/154; 711/148; 711/170; 712/22; 712/214

(58) Field of Classification Search .................. None
See application file for complete search history.

(56) References Cited

U.S. PATENT DOCUMENTS
6,886,082 B1 *   4/2005   Furusho ............... 711/154

FOREIGN PATENT DOCUMENTS
| JP | 00/10103 | 2/2000 |
| JP | 2001-092796 | 4/2001 |
| JP | 2001-147800 | 5/2001 |

OTHER PUBLICATIONS

International Search Report issued in corresponding application No. PCT/JP2005/000886 completed Feb. 14, 2005 and mailed Mar. 1, 2005.

* cited by examiner

*Primary Examiner* — Yaima Campos
(74) *Attorney, Agent, or Firm* — Griffin & Szipl, P.C.

(57) ABSTRACT

An information processing system includes a plurality of PMM and data transmission paths for connection between the PMM and transmitting a value of a PMM to another PMM. A memory of each PMM holds a list of values of first items arranged in the ascending order or descending order without overlap and/or a list of values of the second item to be shared. A memory module of each PMM transmits a value contained in the value list to another PMM, receives a value contained in the value list from the another PMM, references the value list of the first item and the value list of the second item of the another PMM, and generates a list of common values considering the values contained in the value lists of the first item and the second item of all the other PMM.

16 Claims, 104 Drawing Sheets

Fig.3

| | SEX | AGE | HEIGHT(cm) | WEIGHT(kg) |
|---|---|---|---|---|
| 0 | FEMALE | 18 | 168 | 55 |
| 1 | MALE | 21 | 172 | 64 |
| 2 | FEMALE | 24 | 159 | 48 |
| 3 | FEMALE | 16 | 172 | 48 |
| 4 | MALE | 28 | 181 | 78 |
| 5 | FEMALE | 20 | 166 | 55 |
| 6 | FEMALE | 16 | 168 | 52 |
| 7 | MALE | 33 | 174 | 65 |
| 8 | MALE | 24 | 177 | 64 |
| 9 | FEMALE | 18 | 170 | 55 |

OFFSET= 0

PMM-0

| | SEX | AGE | HEIGHT(cm) | WEIGHT(kg) |
|---|---|---|---|---|
| 0 | FEMALE | 18 | 168 | 55 |
| 1 | MALE | 21 | 172 | 64 |
| 2 | FEMALE | 24 | 159 | 48 |

OFFSET= 3

PMM-1

| | SEX | AGE | HEIGHT(cm) | WEIGHT(kg) |
|---|---|---|---|---|
| 0 | FEMALE | 16 | 172 | 48 |
| 1 | MALE | 28 | 181 | 78 |

OFFSET= 5

PMM-2

| | SEX | AGE | HEIGHT(cm) | WEIGHT(kg) |
|---|---|---|---|---|
| 0 | FEMALE | 20 | 166 | 55 |
| 1 | FEMALE | 16 | 168 | 52 |
| 2 | MALE | 33 | 174 | 65 |

OFFSET= 8

PMM-3

| | SEX | AGE | HEIGHT(cm) | WEIGHT(kg) |
|---|---|---|---|---|
| 0 | MALE | 24 | 177 | 64 |
| 1 | FEMALE | 18 | 170 | 55 |

STEP 1

| RECEIVED LIST | | | |
|---|---|---|---|
| PMM-0 | PMM-1 | PMM-2 | PMM-3 |
| [18, 24](ASCENDING ORDER) | [18, 21, 24](ASCENDING ORDER) | [16, 28](ASCENDING ORDER) | [16, 20, 33](ASCENDING ORDER) |

STEP 2

| RECEIVED LIST | | | |
|---|---|---|---|
| PMM-0 | PMM-1 | PMM-2 | PMM-3 |
| [18, 24](ASCENDING ORDER) | [18, 21, 24](ASCENDING ORDER) | [16, 28](ASCENDING ORDER) | [16, 20, 33](ASCENDING ORDER) |
| [16, 20, 33](ASCENDING ORDER) | [φ](ASCENDING ORDER) | [18, 21, 24](ASCENDING ORDER) | [28](ASCENDING ORDER) |

STEP 3

| RECEIVED LIST | | | |
|---|---|---|---|
| PMM-0 | PMM-1 | PMM-2 | PMM-3 |
| [18, 24](ASCENDING ORDER) | [18, 21, 24](ASCENDING ORDER) | [16, 28](ASCENDING ORDER) | [16, 20, 33](ASCENDING ORDER) |
| [16, 20, 33](ASCENDING ORDER) | [φ](ASCENDING ORDER) | [18, 21, 24](ASCENDING ORDER) | [28](ASCENDING ORDER) |
| [28](ASCENDING ORDER) | [16, 20, 33](ASCENDING ORDER) | [φ](ASCENDING ORDER) | [18, 21, 24](ASCENDING ORDER) |

STEP 4

| RECEIVED LIST | | | |
|---|---|---|---|
| PMM-0 | PMM-1 | PMM-2 | PMM-3 |
| [18, 24](ASCENDING ORDER) | [18, 21, 24](ASCENDING ORDER) | [16, 28](ASCENDING ORDER) | [16, 20, 33](ASCENDING ORDER) |
| [16, 20, 33](ASCENDING ORDER) | [φ](ASCENDING ORDER) | [18, 21, 24](ASCENDING ORDER) | [28](ASCENDING ORDER) |
| [28](ASCENDING ORDER) | [16, 20, 33](ASCENDING ORDER) | [φ](ASCENDING ORDER) | [18, 21, 24](ASCENDING ORDER) |
| [21](ASCENDING ORDER) | [28](ASCENDING ORDER) | [20, 33](ASCENDING ORDER) | [φ](ASCENDING ORDER) |

Fig.13A

|   | SEX | AGE | HEIGHT(cm) | WEIGHT(kg) |
|---|---|---|---|---|
| 0 | FEMALE | 18 | 168 | 55 |
| 1 | MALE | 21 | 172 | 64 |
| 2 | FEMALE | 24 | 159 | 48 |
| 3 | FEMALE | 16 | 172 | 48 |
| 4 | MALE | 28 | 181 | 78 |
| 5 | FEMALE | 20 | 166 | 55 |
| 6 | FEMALE | 16 | 168 | 52 |
| 7 | MALE | 33 | 174 | 65 |
| 8 | MALE | 24 | 177 | 64 |
| 9 | FEMALE | 18 | 170 | 55 |

Fig.13B

OrdSet
| | |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |

SEX

VNo
| | |
|---|---|
| 0 | 1 |
| 1 | 0 |
| 2 | 1 |
| 3 | 1 |
| 4 | 0 |
| 5 | 1 |
| 6 | 1 |
| 7 | 0 |
| 8 | 0 |
| 9 | 1 |

VL
| | |
|---|---|
| 0 | MALE |
| 1 | FEMALE |

ASCENDING ORDER

AGE

VNo
| | |
|---|---|
| 0 | 1 |
| 1 | 3 |
| 2 | 4 |
| 3 | 0 |
| 4 | 5 |
| 5 | 2 |
| 6 | 0 |
| 7 | 6 |
| 8 | 4 |
| 9 | 1 |

VL
| | |
|---|---|
| 0 | 16 |
| 1 | 18 |
| 2 | 20 |
| 3 | 21 |
| 4 | 24 |
| 5 | 28 |
| 6 | 33 |

ASCENDING ORDER

HEIGHT

VNo
| | |
|---|---|
| 0 | 2 |
| 1 | 4 |
| 2 | 0 |
| 3 | 4 |
| 4 | 7 |
| 5 | 1 |
| 6 | 2 |
| 7 | 5 |
| 8 | 6 |
| 9 | 3 |

VL
| | |
|---|---|
| 0 | 159 |
| 1 | 166 |
| 2 | 168 |
| 3 | 170 |
| 4 | 172 |
| 5 | 174 |
| 6 | 177 |
| 7 | 181 |

ASCENDING ORDER

WEIGHT

VNo
| | |
|---|---|
| 0 | 2 |
| 1 | 3 |
| 2 | 0 |
| 3 | 0 |
| 4 | 5 |
| 5 | 2 |
| 6 | 1 |
| 7 | 4 |
| 8 | 3 |
| 9 | 2 |

VL
| | |
|---|---|
| 0 | 48 |
| 1 | 52 |
| 2 | 55 |
| 3 | 64 |
| 4 | 65 |
| 5 | 78 |

ASCENDING ORDER

Fig.14

OFFSET= 0

PMM-0

| | SEX | AGE | HEIGHT(cm) | WEIGHT(kg) |
|---|---|---|---|---|
| 0 | FEMALE | 18 | 168 | 55 |
| 1 | MALE | 21 | 172 | 64 |
| 2 | FEMALE | 24 | 159 | 48 |

OFFSET= 3

PMM-1

| | SEX | AGE | HEIGHT(cm) | WEIGHT(kg) |
|---|---|---|---|---|
| 0 | FEMALE | 16 | 172 | 48 |
| 1 | MALE | 28 | 181 | 78 |

OFFSET= 5

PMM-2

| | SEX | AGE | HEIGHT(cm) | WEIGHT(kg) |
|---|---|---|---|---|
| 0 | FEMALE | 20 | 166 | 55 |
| 1 | FEMALE | 16 | 168 | 52 |
| 2 | MALE | 33 | 174 | 65 |

OFFSET= 8

PMM-3

| | SEX | AGE | HEIGHT(cm) | WEIGHT(kg) |
|---|---|---|---|---|
| 0 | MALE | 24 | 177 | 64 |
| 1 | FEMALE | 18 | 170 | 55 |

EVENT

| VNo | | VL | |
|---|---|---|---|
| 0 | 3 | 0 | A |
| 1 | 1 | 1 | C1 |
| 2 | 0 | 2 | C2 |
| 3 | 2 | 3 | H2 |
| 4 | 5 | 4 | M |
| 5 | 6 | 5 | P1 |
| 6 | 4 | 6 | P2 |
|   |   |   | ASCENDING ORDER |

E AGE

| VNo | | VL | |
|---|---|---|---|
| 0 | 0 | 0 | 18 |
| 1 | 0 | 1 | 20 |
| 2 | 1 | 2 | 22 |
| 3 | 2 | 3 | 27 |
| 4 | 2 | 4 | 33 |
| 5 | 3 |   | ASCENDING ORDER |
| 6 | 4 |   |   |

OrdSet

| 0 | 0 |
|---|---|
| 1 | 1 |
| 2 | 2 |
| 3 | 3 |
| 4 | 4 |
| 5 | 5 |
| 6 | 6 |

Fig.16A

| | E AGE | EVENT |
|---|---|---|
| 0 | 18 | H2 |
| 1 | 18 | C1 |
| 2 | 20 | A |
| 3 | 22 | C2 |
| 4 | 22 | P1 |
| 5 | 27 | P2 |
| 6 | 33 | M |

Fig.17

PMM-0  OFFSET = 0

| E AGE | EVENT |
|---|---|
| 18 | H2 |
| 18 | C1 |

PMM-1  OFFSET = 2

| E AGE | EVENT |
|---|---|
| 20 | A |
| 22 | C2 |

PMM-2  OFFSET = 4

| E AGE | EVENT |
|---|---|
| 22 | P1 |
| 27 | P2 |

PMM-3  OFFSET = 6

| E AGE | EVENT |
|---|---|
| 33 | M |

Fig.18

OFFSET= 0

| GOrd | OrdSet |
|---|---|
| 0 | 0 |
| 1 | 1 |

ASCENDING ORDER

E AGE (PMM-0)

| VNo | VL | GVNo |
|---|---|---|
| 0: 0 | 0: 18 | 0: 0 |
| 1: 0 | | |

ASCENDING ORDER / ASCENDING ORDER

EVENT (PMM-0)

| VNo | VL | GVNo |
|---|---|---|
| 0: 1 | 0: C1 | 0: 1 |
| 1: 0 | 1: H2 | 1: 3 |

ASCENDING ORDER / ASCENDING ORDER

OFFSET= 2

| GOrd | OrdSet |
|---|---|
| 0 | 2 | 0 |
| 1 | 3 | 1 |

ASCENDING ORDER

E AGE (PMM-1)

| VNo | VL | GVNo |
|---|---|---|
| 0: 0 | 0: 20 | 0: 1 |
| 1: 1 | 1: 22 | 1: 2 |

ASCENDING ORDER / ASCENDING ORDER

EVENT (PMM-1)

| VNo | VL | GVNo |
|---|---|---|
| 0: 0 | 0: A | 0: 0 |
| 1: 1 | 1: C2 | 1: 2 |

ASCENDING ORDER / ASCENDING ORDER

OFFSET= 4

| GOrd | OrdSet |
|---|---|
| 0 | 4 | 0 |
| 1 | 5 | 1 |

ASCENDING ORDER

E AGE (PMM-2)

| VNo | VL | GVNo |
|---|---|---|
| 0: 0 | 0: 22 | 0: 2 |
| 1: 1 | 1: 27 | 1: 3 |

ASCENDING ORDER / ASCENDING ORDER

EVENT (PMM-2)

| VNo | VL | GVNo |
|---|---|---|
| 0: 0 | 0: P1 | 0: 5 |
| 1: 1 | 1: P2 | 1: 6 |

ASCENDING ORDER / ASCENDING ORDER

OFFSET= 6

| GOrd | OrdSet |
|---|---|
| 0 | 6 | 0 |

ASCENDING ORDER

E AGE (PMM-3)

| VNo | VL | GVNo |
|---|---|---|
| 0: 0 | 0: 33 | 0: 4 |

ASCENDING ORDER / ASCENDING ORDER

EVENT (PMM-3)

| VNo | VL | GVNo |
|---|---|---|
| 0: 0 | 0: M | 0: 4 |

ASCENDING ORDER / ASCENDING ORDER

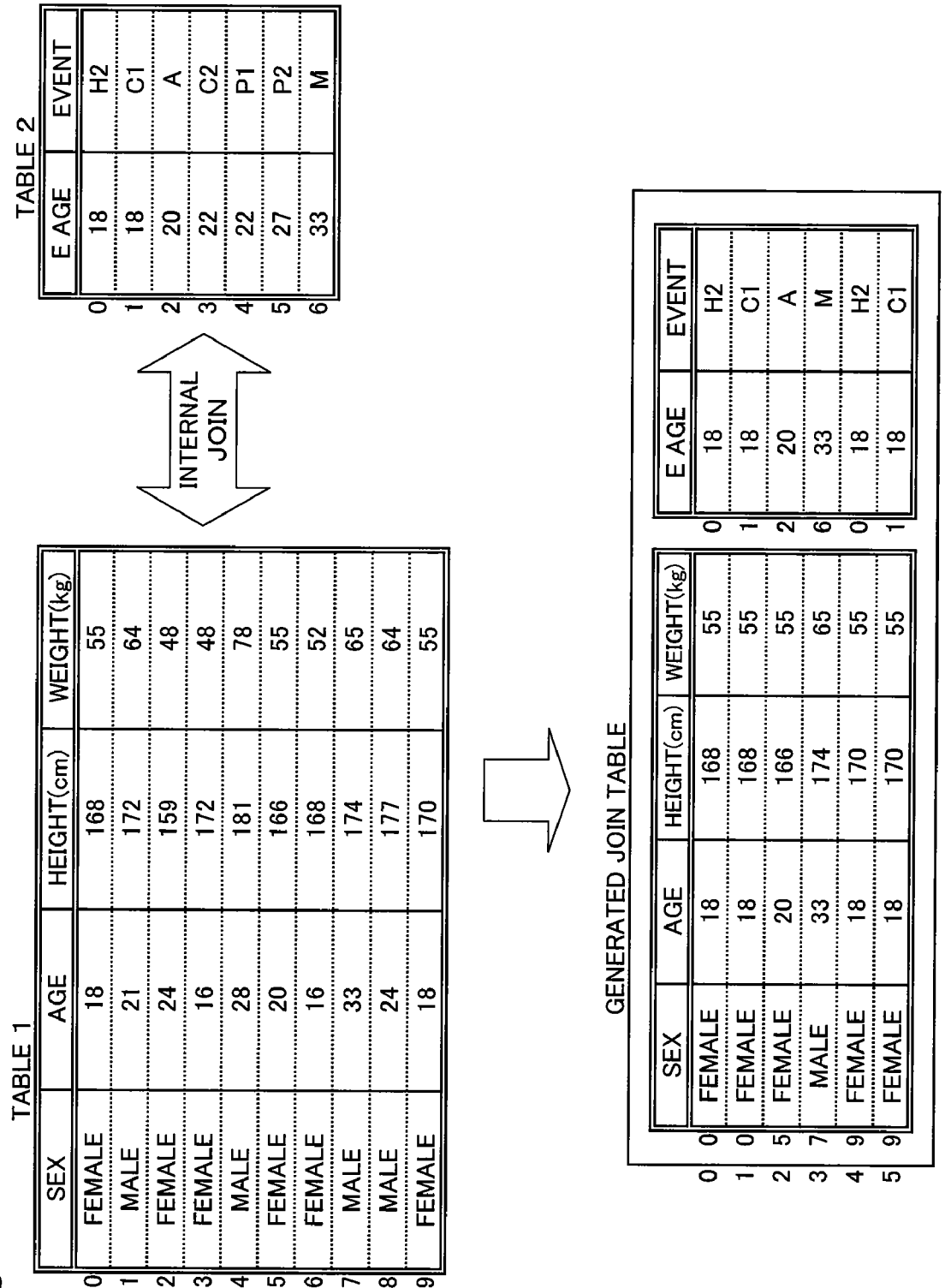

Fig.26

PMM-0 OFFSET= 0

| GOrd | OrdSet |
|---|---|
| 0 | 0 |
| 1 | 1 |

ASCENDING ORDER

E AGE

| VNo | | VL | | GVNo | | GVNo' | | Count | |
|---|---|---|---|---|---|---|---|---|---|
| 0 | 0 | 0 | 18 | 0 | 0 | 0 | 1 | 0 | 0 |
| 1 | 0 | | | 1 | | 1 | | | |

ASCENDING ORDER (VNo)
ASCENDING ORDER (VL)
ASCENDING ORDER (GVNo)
ASCENDING ORDER (GVNo')

---

PMM-1 OFFSET= 2

| GOrd | OrdSet |
|---|---|
| 2 | 0 |
| 3 | 1 |

ASCENDING ORDER

E AGE

| VNo | | VL | | GVNo | | GVNo' | | Count | |
|---|---|---|---|---|---|---|---|---|---|
| 0 | 0 | 0 | 20 | 0 | 1 | 0 | 2 | 0 | 0 |
| 1 | 1 | 1 | 22 | 1 | 2 | 1 | 4 | 1 | 0 |

ASCENDING ORDER

---

PMM-2 OFFSET= 4

| GOrd | OrdSet |
|---|---|
| 4 | 0 |
| 5 | 1 |

ASCENDING ORDER

E AGE

| VNo | | VL | | GVNo | | GVNo' | | Count | |
|---|---|---|---|---|---|---|---|---|---|
| 0 | 0 | 0 | 22 | 0 | 2 | 0 | 4 | 0 | 0 |
| 1 | 1 | 1 | 27 | 1 | 3 | 1 | 6 | 1 | 0 |

ASCENDING ORDER

---

PMM-3 OFFSET= 6

| GOrd | OrdSet |
|---|---|
| 6 | 0 |

ASCENDING ORDER

E AGE

| VNo | | VL | | GVNo | | GVNo' | | Count | |
|---|---|---|---|---|---|---|---|---|---|
| 0 | 0 | 0 | 33 | 0 | 4 | 0 | 8 | 0 | 0 |

ASCENDING ORDER

Fig.29A STEP 1 (SENDING)
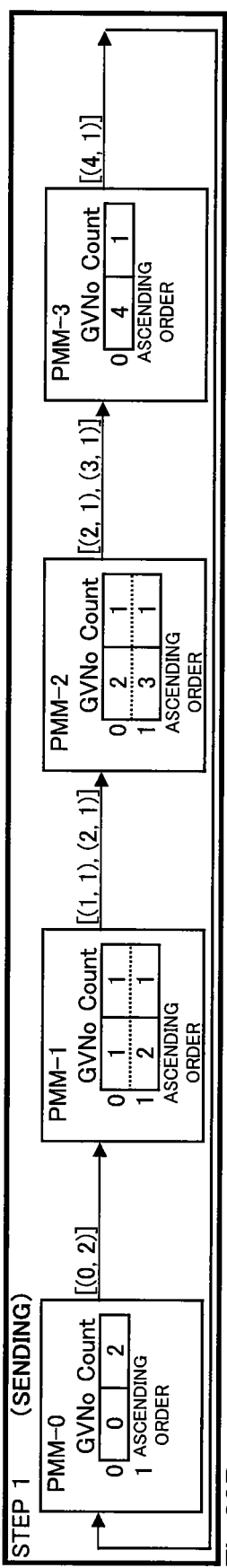
Fig.29B STEP 2 (ADDITION, TRANSMISSION)
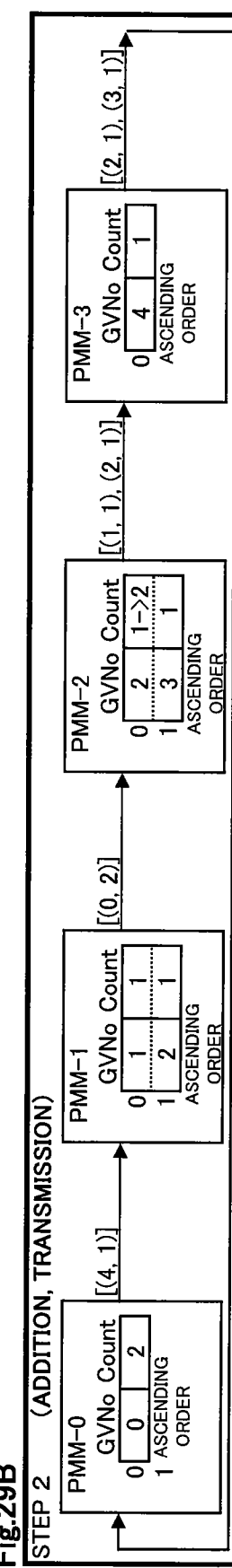
Fig.29C STEP 3 (ADDITION, TRANSMISSION)
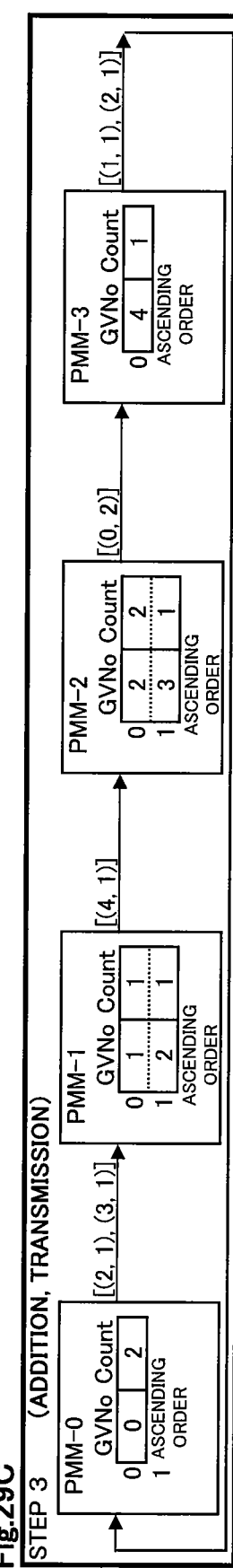
Fig.29D STEP 4 (ADDITION, TRANSMISSION)
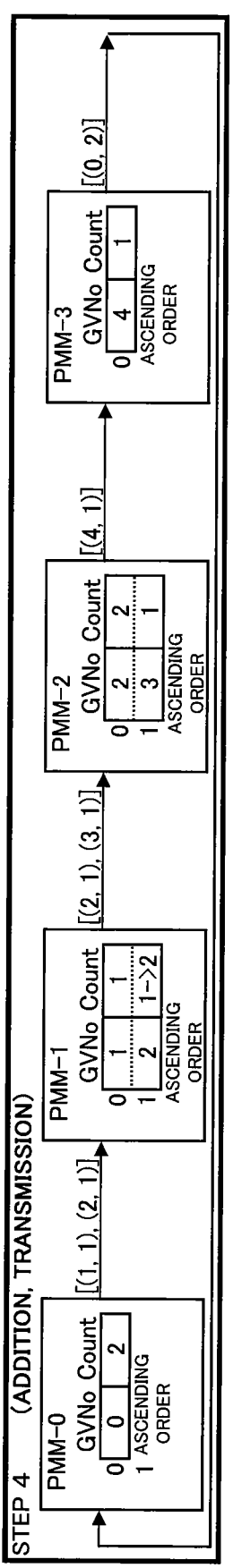

| PMM-0 | | | |
|---|---|---|---|
| SEX | AGE | HEIGHT | WEIGHT |
| 0 FEMALE | 18 | 168 | 55 |
| 1 MALE | 21 | 172 | 64 |
| 2 FEMALE | 24 | 159 | 48 |

| PMM-1 | | | |
|---|---|---|---|
| SEX | AGE | HEIGHT | WEIGHT |
| 0 FEMALE | 16 | 172 | 48 |
| 1 MALE | 28 | 181 | 78 |

| PMM-2 | | | |
|---|---|---|---|
| SEX | AGE | HEIGHT | WEIGHT |
| 0 FEMALE | 20 | 166 | 55 |
| 1 FEMALE | 16 | 168 | 52 |
| 2 MALE | 33 | 174 | 65 |

| PMM-3 | | | |
|---|---|---|---|
| SEX | AGE | HEIGHT | WEIGHT |
| 0 MALE | 24 | 177 | 64 |
| 1 FEMALE | 18 | 170 | 55 |

| PMM-0 | | OFFSET = 0 |
|---|---|---|

| | E AGE | EVENT |
|---|---|---|
| 0 | 18 | H2 |
| 1 | 18 | C1 |

| PMM-1 | | OFFSET = 2 |
|---|---|---|

| | E AGE | EVENT |
|---|---|---|
| 0 | 20 | A |
| 1 | 22 | C2 |

| PMM-2 | | OFFSET = 4 |
|---|---|---|

| | E AGE | EVENT |
|---|---|---|
| 0 | 22 | P1 |
| 1 | 27 | P2 |

| PMM-3 | | OFFSET = 6 |
|---|---|---|

| | E AGE | EVENT |
|---|---|---|
| 0 | 33 | M |

●RECORD OF JOIN TABLE = 0

TABLE 1
| | SEX | AGE | HEIGHT | WEIGHT |
|---|---|---|---|---|
| 0 | FEMALE | 18 | 168 | 55 |

TABLE 2
| | E AGE | EVENT |
|---|---|---|
| 0 | 18 | H2 |

Fig.51B

●RECORD OF JOIN TABLE = 1

TABLE 1
| | SEX | AGE | HEIGHT | WEIGHT |
|---|---|---|---|---|
| 0 | FEMALE | 18 | 168 | 55 |

TABLE 2
| | E AGE | EVENT |
|---|---|---|
| 1 | 18 | C1 |

Fig.51C

●RECORD OF JOIN TABLE = 2

TABLE 1
| | SEX | AGE | HEIGHT | WEIGHT |
|---|---|---|---|---|
| 5 | FEMALE | 20 | 166 | 55 |

TABLE 2
| | E AGE | EVENT |
|---|---|---|
| 2 | 20 | A |

Fig.51D

●RECORD OF JOIN TABLE = 3

TABLE 1
| | SEX | AGE | HEIGHT | WEIGHT |
|---|---|---|---|---|
| 7 | MALE | 33 | 174 | 65 |

TABLE 2
| | E AGE | EVENT |
|---|---|---|
| 6 | 33 | M |

Fig.51E

●RECORD OF JOIN TABLE = 4

TABLE 1
| | SEX | AGE | HEIGHT | WEIGHT |
|---|---|---|---|---|
| 9 | FEMALE | 18 | 170 | 55 |

TABLE 2
| | E AGE | EVENT |
|---|---|---|
| 0 | 18 | H2 |

Fig.51F

●RECORD OF JOIN TABLE = 5

TABLE 1
| | SEX | AGE | HEIGHT | WEIGHT |
|---|---|---|---|---|
| 9 | FEMALE | 18 | 170 | 55 |

TABLE 2
| | E AGE | EVENT |
|---|---|---|
| 1 | 18 | C1 |

Fig.54

PMM-0   OFFSET = 0

|   | E SEX | E AGE | EVENT |
|---|---|---|---|
| 0 | FEMALE | 18 | H2 |
| 1 | MALE | 18 | C1 |

PMM-1   OFFSET = 2

|   | E SEX | E AGE | EVENT |
|---|---|---|---|
| 0 | MALE | 20 | A |
| 1 | FEMALE | 22 | C2 |

PMM-2   OFFSET = 4

|   | E SEX | E AGE | EVENT |
|---|---|---|---|
| 0 | MALE | 22 | P1 |
| 1 | FEMALE | 27 | P2 |

PMM-3   OFFSET = 6

|   | E SEX | E AGE | EVENT |
|---|---|---|---|
| 0 | MALE | 33 | M |

TABLE 1

| | SEX | AGE | HEIGHT(cm) | WEIGHT(kg) |
|---|---|---|---|---|
| 0 | FEMALE | 18 | 168 | 55 |
| 1 | MALE | 21 | 172 | 64 |
| 2 | FEMALE | 24 | 159 | 48 |
| 3 | FEMALE | 16 | 172 | 48 |
| 4 | MALE | 28 | 181 | 78 |
| 5 | FEMALE | 20 | 166 | 55 |
| 6 | FEMALE | 16 | 168 | 52 |
| 7 | MALE | 33 | 174 | 65 |
| 8 | MALE | 24 | 177 | 64 |
| 9 | FEMALE | 18 | 170 | 55 |

TABLE 2

| | E SEX | E AGE | EVENT |
|---|---|---|---|
| 0 | FEMALE | 18 | H2 |
| 1 | MALE | 18 | C1 |
| 2 | MALE | 20 | A |
| 3 | FEMALE | 22 | C2 |
| 4 | MALE | 22 | P1 |
| 5 | FEMALE | 27 | P2 |
| 6 | MALE | 33 | M |

INTERNAL JOIN OF PLURAL ITEMS

SEX · AGE × E SEX · E AGE

GENERATED JOIN TABLE

| | SEX | AGE | HEIGHT(cm) | WEIGHT(kg) | E SEX | E AGE | EVENT |
|---|---|---|---|---|---|---|---|
| 0 | FEMALE | 18 | 168 | 55 | FEMALE | 18 | H2 |
| 1 | MALE | 33 | 174 | 65 | MALE | 33 | M |
| 2 | FEMALE | 18 | 170 | 55 | FEMALE | 18 | H2 |

(indices: 0, 7, 9 for left; 0, 6, 0 for right)

PMM-0
OFFSET = 0

| GOrd | OrdSet |
|---|---|
| 0 | 0 |
| 1 | 1 |
| 2 | 2 |

ASCENDING ORDER

SEX (PMM-0)

| VNo |
|---|
| 0 | 1 |
| 1 | 0 |
| 2 | 1 |

| VL | GVNo | GVNo' |
|---|---|---|
| 0 | MALE | 0 | 0 |
| 1 | FEMALE | 1 | 1 |

ASCENDING ORDER   ASCENDING ORDER

AGE (PMM-0)

| VNo |
|---|
| 0 | 0 |
| 1 | 1 |
| 2 | 2 |

| VL | GVNo | GVNo' |
|---|---|---|
| 0 | 18 | 0 | 1 | 1 |
| 1 | 21 | 1 | 3 | 3 |
| 2 | 24 | 2 | 4 | 5 |

ASCENDING ORDER   ASCENDING ORDER

PMM-1
OFFSET = 3

| GOrd | OrdSet |
|---|---|
| 0 | 3 | 0 |
| 1 | 4 | 1 |

ASCENDING ORDER

SEX (PMM-1)

| VNo |
|---|
| 0 | 1 |
| 1 | 0 |

| VL | GVNo | GVNo' |
|---|---|---|
| 0 | MALE | 0 | 0 |
| 1 | FEMALE | 1 | 1 |

ASCENDING ORDER   ASCENDING ORDER

AGE (PMM-1)

| VNo |
|---|
| 0 | 0 |
| 1 | 1 |

| VL | GVNo | GVNo' |
|---|---|---|
| 0 | 16 | 0 | 0 | 0 |
| 1 | 28 | 1 | 5 | 7 |

ASCENDING ORDER   ASCENDING ORDER

PMM-2
OFFSET = 5

| GOrd | OrdSet |
|---|---|
| 0 | 5 | 0 |
| 1 | 6 | 1 |
| 2 | 7 | 2 |

ASCENDING ORDER

SEX (PMM-2)

| VNo |
|---|
| 0 | 1 |
| 1 | 0 |
| 2 | 2 |

| VL | GVNo | GVNo' |
|---|---|---|
| 0 | MALE | 0 | 0 |
| 1 | FEMALE | 1 | 1 |

ASCENDING ORDER   ASCENDING ORDER

AGE (PMM-2)

| VNo |
|---|
| 0 | 1 |
| 1 | 0 |
| 2 | 2 |

| VL | GVNo | GVNo' |
|---|---|---|
| 0 | 16 | 0 | 0 | 0 |
| 1 | 20 | 1 | 2 | 2 |
| 2 | 33 | 2 | 6 | 8 |

ASCENDING ORDER   ASCENDING ORDER

PMM-3
OFFSET = 8

| GOrd | OrdSet |
|---|---|
| 0 | 8 | 0 |
| 1 | 9 | 1 |

ASCENDING ORDER

SEX (PMM-3)

| VNo |
|---|
| 0 | 0 |
| 1 | 1 |

| VL | GVNo | GVNo' |
|---|---|---|
| 0 | MALE | 0 | 0 |
| 1 | FEMALE | 1 | 1 |

ASCENDING ORDER   ASCENDING ORDER

AGE (PMM-3)

| VNo |
|---|
| 0 | 1 |
| 1 | 0 |

| VL | GVNo | GVNo' |
|---|---|---|
| 0 | 18 | 0 | 1 | 1 |
| 1 | 24 | 1 | 4 | 5 |

ASCENDING ORDER   ASCENDING ORDER

Fig.60

PMM-0
OFFSET= 0

| GOrd | OrdSet |
|---|---|
| 0 | 0 |
| 1 | 1 |

ASCENDING ORDER

E SEX (PMM-0)

| VNo |
|---|
| 0 | 1 |
| 1 | 0 |

| VL | GVNo | GVNo' |
|---|---|---|
| 0 | MALE | 0 | 0 |
| 1 | FEMALE | 1 | 1 |

ASCENDING ORDER / ASCENDING ORDER

E AGE (PMM-0)

| VNo |
|---|
| 0 | 0 |
| 1 | 0 |

| VL | GVNo | GVNo' |
|---|---|---|
| 0 | 18 | 0 | 1 |

ASCENDING ORDER / ASCENDING ORDER

PMM-1
OFFSET= 2

| GOrd | OrdSet |
|---|---|
| 0 | 2 | 0 |
| 1 | 3 | 1 |

ASCENDING ORDER

E SEX (PMM-1)

| VNo |
|---|
| 0 | 0 |
| 1 | 1 |

| VL | GVNo | GVNo' |
|---|---|---|
| 0 | MALE | 0 | 0 |
| 1 | FEMALE | 2 | 1 |

ASCENDING ORDER / ASCENDING ORDER

E AGE (PMM-1)

| VNo |
|---|
| 0 | 0 |
| 1 | 1 |

| VL | GVNo | GVNo' |
|---|---|---|
| 0 | 20 | 1 | 2 |
| 1 | 22 | 2 | 4 |

ASCENDING ORDER / ASCENDING ORDER

PMM-2
OFFSET= 4

| GOrd | OrdSet |
|---|---|
| 0 | 4 | 0 |
| 1 | 5 | 1 |

ASCENDING ORDER

E SEX (PMM-2)

| VNo |
|---|
| 0 | 0 |
| 1 | 1 |

| VL | GVNo | GVNo' |
|---|---|---|
| 0 | MALE | 0 | 0 |
| 1 | FEMALE | 2 | 1 |

ASCENDING ORDER / ASCENDING ORDER

E AGE (PMM-2)

| VNo |
|---|
| 0 | 0 |
| 1 | 1 |

| VL | GVNo | GVNo' |
|---|---|---|
| 0 | 22 | 2 | 4 |
| 1 | 27 | 3 | 6 |

ASCENDING ORDER / ASCENDING ORDER

PMM-3
OFFSET= 6

| GOrd | OrdSet |
|---|---|
| 0 | 6 | 0 |

ASCENDING ORDER

E SEX (PMM-3)

| VNo |
|---|
| 0 | 0 |

| VL | GVNo | GVNo' |
|---|---|---|
| 0 | MALE | 0 | 0 |

ASCENDING ORDER / ASCENDING ORDER

E AGE (PMM-3)

| VNo |
|---|
| 0 | 0 |

| VL | GVNo | GVNo' |
|---|---|---|
| 0 | 33 | 4 | 8 |

ASCENDING ORDER / ASCENDING ORDER

Fig.65

SEX x AGE (PMM-0)

| VNo | | VL | | GVNo |
|---|---|---|---|---|
| 0 | 1 | 0 | 0 | 3 | 0 | 0 |
| 1 | 0 | 1 | 1 | 1 | 1 | 5 |
| 2 | 2 | 2 | 1 | 5 | 2 | 7 |
| | | ASCENDING ORDER | ASCENDING ORDER | | ASCENDING ORDER | |

SEX x AGE (PMM-1)

| VNo | | VL | | GVNo |
|---|---|---|---|---|
| 0 | 1 | 0 | 0 | 7 | 0 | 2 |
| 1 | 0 | 1 | 1 | 0 | 1 | 4 |
| | | ASCENDING ORDER | ASCENDING ORDER | | ASCENDING ORDER | |

SEX x AGE (PMM-2)

| VNo | | VL | | GVNo |
|---|---|---|---|---|
| 0 | 2 | 0 | 0 | 8 | 0 | 3 |
| 1 | 1 | 1 | 1 | 0 | 1 | 4 |
| 2 | 0 | 2 | 1 | 2 | 2 | 6 |
| | | ASCENDING ORDER | ASCENDING ORDER | | ASCENDING ORDER | |

SEX x AGE (PMM-3)

| VNo | | VL | | GVNo |
|---|---|---|---|---|
| 0 | 0 | 0 | 0 | 5 | 0 | 1 |
| 1 | 1 | 1 | 1 | 1 | 1 | 5 |
| | | ASCENDING ORDER | ASCENDING ORDER | | ASCENDING ORDER | |

Fig.69

E SEX x E AGE (PMM-0)

| VNo | | VL | | | GVNo | |
|---|---|---|---|---|---|---|
| 0 | 1 | 0 | 0 | 1 | 0 | 0 |
| 1 | 0 | 1 | 1 | 1 | 1 | 4 |
| | | ASCENDING ORDER | ASCENDING ORDER | | ASCENDING ORDER | |

E SEX x E AGE (PMM-1)

| VNo | | VL | | | GVNo | |
|---|---|---|---|---|---|---|
| 0 | 1 | 0 | 0 | 2 | 0 | 1 |
| 1 | 0 | 1 | 1 | 4 | 1 | 5 |
| | | ASCENDING ORDER | ASCENDING ORDER | | ASCENDING ORDER | |

E SEX x E AGE (PMM-2)

| VNo | | VL | | | GVNo | |
|---|---|---|---|---|---|---|
| 0 | 1 | 0 | 0 | 4 | 0 | 2 |
| 1 | 0 | 1 | 1 | 6 | 1 | 6 |
| | | ASCENDING ORDER | ASCENDING ORDER | | ASCENDING ORDER | |

E SEX x E AGE (PMM-3)

| VNo | VL | | GVNo |
|---|---|---|---|
| 0 | 1 | 0 | 0 | 8 | 0 | 3 |
| | ASCENDING ORDER | ASCENDING ORDER | ASCENDING ORDER |

TABLE 2

| | E AGE | EVENT |
|---|---|---|
| 0 | 18 | H2 |
| 1 | 18 | C1 |
| 2 | 20 | A |
| 3 | 22 | C2 |
| 4 | 22 | P1 |
| 5 | 27 | P2 |
| 6 | 33 | M |

TABLE 1

| | SEX | AGE | HEIGHT(cm) | WEIGHT(kg) |
|---|---|---|---|---|
| 0 | FEMALE | 18 | 168 | 55 |
| 1 | MALE | 21 | 172 | 64 |
| 2 | FEMALE | 24 | 159 | 48 |
| 3 | FEMALE | 16 | 172 | 48 |
| 4 | MALE | 28 | 181 | 78 |
| 5 | FEMALE | 20 | 166 | 55 |
| 6 | FEMALE | 16 | 168 | 52 |
| 7 | MALE | 33 | 174 | 65 |
| 8 | MALE | 24 | 177 | 64 |
| 9 | FEMALE | 18 | 170 | 55 |

LEFT-JOIN    AGE × E AGE

GENERATED JOIN TABLE

| | SEX | AGE | HEIGHT(cm) | WEIGHT(kg) | | E AGE | EVENT |
|---|---|---|---|---|---|---|---|
| 0 | FEMALE | 18 | 168 | 55 | 0 | 18 | H2 |
| 0 | FEMALE | 18 | 168 | 55 | 1 | 18 | C1 |
| 1 | MALE | 21 | 172 | 64 | | - | - |
| 2 | FEMALE | 24 | 159 | 48 | | - | - |
| 3 | FEMALE | 16 | 172 | 48 | | - | - |
| 4 | MALE | 28 | 181 | 78 | | - | - |
| 5 | FEMALE | 20 | 166 | 55 | 2 | 20 | A |
| 6 | FEMALE | 16 | 168 | 52 | | - | - |
| 7 | MALE | 33 | 174 | 65 | 6 | 33 | M |
| 8 | MALE | 24 | 177 | 64 | | - | - |
| 9 | FEMALE | 18 | 170 | 55 | 0 | 18 | H2 |
| 9 | FEMALE | 18 | 170 | 55 | 1 | 18 | C1 |

PMM-0 OFFSET=0

| | SEX | AGE | HEIGHT | WEIGHT |
|---|---|---|---|---|
| 0 | FEMALE | 18 | 168 | 55 |
| 1 | MALE | 21 | 172 | 64 |
| 2 | FEMALE | 24 | 159 | 48 |

| | SetAggr | GOrd | OrdSet |
|---|---|---|---|
| 0 | 0 | 0 | 0 |
| 1 | 2 | 1 | 1 |
| 2 | 3 | 2 | 2 |

ASCENDING ASCENDING ORDER ORDER

AGE (PMM-0)

| | VNo | VL | GVNo | GVNo' | Count | Aggr |
|---|---|---|---|---|---|---|
| 0 | 0 | 18 | 1 | 1 | 2 | 0 |
| 1 | 1 | 21 | 3 | 3 | 1 | −1 |
| 2 | 2 | 24 | 4 | 5 | 1 | −1 |

ASCENDING ASCENDING ORDER ORDER

---

PMM-1 OFFSET=3

| | SEX | AGE | HEIGHT | WEIGHT |
|---|---|---|---|---|
| 0 | FEMALE | 16 | 172 | 48 |
| 1 | MALE | 28 | 181 | 78 |

| | SetAggr | GOrd | OrdSet |
|---|---|---|---|
| 0 | 4 | 3 | 0 |
| 1 | 5 | 4 | 1 |

ASCENDING ASCENDING ORDER ORDER

AGE (PMM-1)

| | VNo | VL | GVNo | GVNo' | Count | Aggr |
|---|---|---|---|---|---|---|
| 0 | 0 | 16 | 0 | 0 | 1 | −1 |
| 1 | 1 | 28 | 5 | 7 | 1 | −1 |

ASCENDING ASCENDING ORDER ORDER

---

PMM-2 OFFSET=5

| | SEX | AGE | HEIGHT | WEIGHT |
|---|---|---|---|---|
| 0 | FEMALE | 20 | 166 | 55 |
| 1 | FEMALE | 16 | 168 | 52 |
| 2 | MALE | 33 | 174 | 65 |

| | SetAggr | GOrd | OrdSet |
|---|---|---|---|
| 0 | 6 | 5 | 0 |
| 1 | 7 | 6 | 1 |
| 2 | 8 | 7 | 2 |

ASCENDING ASCENDING ORDER ORDER

AGE (PMM-2)

| | VNo | VL | GVNo | GVNo' | Count | Aggr |
|---|---|---|---|---|---|---|
| 0 | 1 | 16 | 0 | 0 | 1 | −1 |
| 1 | 0 | 20 | 2 | 2 | 1 | 2 |
| 2 | 2 | 33 | 6 | 8 | 1 | 6 |

ASCENDING ASCENDING ORDER ORDER

---

PMM-3 OFFSET=8

| | SEX | AGE | HEIGHT | WEIGHT |
|---|---|---|---|---|
| 0 | MALE | 24 | 177 | 64 |
| 1 | FEMALE | 18 | 170 | 55 |

| | SetAggr | GOrd | OrdSet |
|---|---|---|---|
| 0 | 9 | 8 | 0 |
| 1 | 10 | 9 | 1 |

ASCENDING ASCENDING ORDER ORDER

AGE (PMM-3)

| | VNo | VL | GVNo | GVNo' | Count | Aggr |
|---|---|---|---|---|---|---|
| 0 | 1 | 18 | 1 | 1 | 2 | 0 |
| 1 | 0 | 24 | 4 | 5 | 1 | −1 |

ASCENDING ASCENDING ORDER ORDER

Fig.73

| PMM-0 | OFFSET = 0 |
|---|---|
| E AGE | EVENT |
| 18 | H2 |
| 18 | C1 |

| GOrd | OrdSet |
|---|---|
| 0 | 0 |
| 1 | 1 |
ASCENDING ORDER

E AGE (PMM-0)

| VNo | VL | GVNo | GVNo' | Count |
|---|---|---|---|---|
| 0 | 18 | 0 | 0 | 2 |
| 1 | 18 | 1 | 1 | |
| | ASCENDING ORDER | | ASCENDING ORDER | |

| PMM-1 | OFFSET = 2 |
|---|---|
| E AGE | EVENT |
| 20 | A |
| 22 | C2 |

| GOrd | OrdSet |
|---|---|
| 0 | 2 |
| 1 | 3 |
ASCENDING ORDER

E AGE (PMM-1)

| VNo | VL | GVNo | GVNo' | Count |
|---|---|---|---|---|
| 0 | 20 | 0 | 1 | 2 |
| 1 | 22 | 1 | 2 | 4 |
| | ASCENDING ORDER | | ASCENDING ORDER | |

| PMM-2 | OFFSET = 4 |
|---|---|
| E AGE | EVENT |
| 22 | P1 |
| 27 | P2 |

| GOrd | OrdSet |
|---|---|
| 0 | 4 |
| 1 | 5 |
ASCENDING ORDER

E AGE (PMM-2)

| VNo | VL | GVNo | GVNo' | Count |
|---|---|---|---|---|
| 0 | 22 | 0 | 2 | 4 | 1 |
| 1 | 27 | 1 | 3 | 6 | 1 |
| | ASCENDING ORDER | | ASCENDING ORDER | |

| PMM-3 | OFFSET = 6 |
|---|---|
| E AGE | EVENT |
| 33 | M |

| GOrd | OrdSet |
|---|---|
| 0 | 6 | 0 |
ASCENDING ORDER

E AGE (PMM-3)

| VNo | VL | GVNo | GVNo' | Count |
|---|---|---|---|---|
| 0 | 33 | 0 | 4 | 8 | 1 |
| | ASCENDING ORDER | | ASCENDING ORDER | |

| Record | Table 1 idx | SEX | AGE | HEIGHT | WEIGHT | Table 2 idx | E AGE | EVENT |
|---|---|---|---|---|---|---|---|---|
| RECORD OF JOIN TABLE = 0 | 0 | FEMALE | 18 | 168 | 55 | 0 | 18 | H2 |
| RECORD OF JOIN TABLE = 1 | 0 | FEMALE | 18 | 168 | 55 | 1 | 18 | C1 |
| RECORD OF JOIN TABLE = 2 | 1 | MALE | 21 | 172 | 64 | -1 | - | - |
| RECORD OF JOIN TABLE = 3 | 2 | FEMALE | 24 | 159 | 48 | -1 | - | - |
| RECORD OF JOIN TABLE = 4 | 3 | FEMALE | 16 | 172 | 48 | -1 | - | - |
| RECORD OF JOIN TABLE = 5 | 4 | MALE | 28 | 181 | 78 | -1 | - | - |
| RECORD OF JOIN TABLE = 6 | 5 | FEMALE | 20 | 166 | 55 | 2 | 20 | A |
| RECORD OF JOIN TABLE = 7 | 6 | FEMALE | 16 | 168 | 52 | -1 | - | - |
| RECORD OF JOIN TABLE = 8 | 7 | MALE | 33 | 174 | 65 | 6 | 33 | M |
| RECORD OF JOIN TABLE = 9 | 8 | MALE | 24 | 177 | 64 | -1 | - | - |
| RECORD OF JOIN TABLE = 10 | 9 | FEMALE | 18 | 170 | 55 | 0 | 18 | H2 |
| RECORD OF JOIN TABLE = 11 | 9 | FEMALE | 18 | 170 | 55 | 1 | 18 | C1 |

Fig.82

| PMM-0 | | | |
|---|---|---|---|
| SEX | AGE | HEIGHT | WEIGHT |
| 0 FEMALE | 18 | 168 | 55 |
| 1 MALE | 21 | 172 | 64 |
| 2 FEMALE | 24 | 159 | 48 |

OFFSET=0

| | SetAggr | GOrd | OrdSet |
|---|---|---|---|
| 0 | 0 | 2 | 0 |
| 1 | 5 | 5 | 1 |
| 2 | 5 | 6 | 2 |

ASCENDING ORDER   ASCENDING ORDER

AGE (PMM-0)

| | VNo |
|---|---|
| 0 | 0 |
| 1 | 1 |
| 2 | 2 |

| | VL |
|---|---|
| 0 | 18 |
| 1 | 21 |
| 2 | 24 |

ASCENDING ORDER

| | GVNo | GVNo' | Count | Aggr |
|---|---|---|---|---|
| 0 | 1 | 1 | 2 | 0 |
| 1 | 3 | 3 | 0 | 3 |
| 2 | 4 | 5 | 0 | 5 |

ASCENDING ORDER

---

| PMM-1 | | | |
|---|---|---|---|
| SEX | AGE | HEIGHT | WEIGHT |
| 0 FEMALE | 16 | 172 | 48 |
| 1 MALE | 28 | 181 | 78 |

OFFSET=3

| | SetAggr | GOrd | OrdSet |
|---|---|---|---|
| 0 | 0 | 0 | 0 |
| 1 | 5 | 8 | 1 |

ASCENDING ORDER   ASCENDING ORDER

AGE (PMM-1)

| | VNo |
|---|---|
| 0 | 0 |
| 1 | 1 |

| | VL |
|---|---|
| 0 | 16 |
| 1 | 28 |

ASCENDING ORDER

| | GVNo | GVNo' | Count | Aggr |
|---|---|---|---|---|
| 0 | 0 | 0 | 0 | 0 |
| 1 | 5 | 7 | 0 | 6 |

ASCENDING ORDER

---

| PMM-2 | | | |
|---|---|---|---|
| SEX | AGE | HEIGHT | WEIGHT |
| 0 FEMALE | 20 | 166 | 55 |
| 1 FEMALE | 16 | 168 | 52 |
| 2 MALE | 33 | 174 | 65 |

OFFSET=5

| | SetAggr | GOrd | OrdSet |
|---|---|---|---|
| 0 | 0 | 1 | 1 |
| 1 | 4 | 4 | 0 |
| 2 | 5 | 9 | 2 |

ASCENDING ORDER   ASCENDING ORDER

AGE (PMM-2)

| | VNo |
|---|---|
| 0 | 1 |
| 1 | 0 |
| 2 | 2 |

| | VL |
|---|---|
| 0 | 16 |
| 1 | 20 |
| 2 | 33 |

ASCENDING ORDER

| | GVNo | GVNo' | Count | Aggr |
|---|---|---|---|---|
| 0 | 0 | 0 | 0 | 0 |
| 1 | 2 | 2 | 1 | 2 |
| 2 | 6 | 8 | 1 | 6 |

ASCENDING ORDER

---

| PMM-3 | | | |
|---|---|---|---|
| SEX | AGE | HEIGHT | WEIGHT |
| 0 MALE | 24 | 177 | 64 |
| 1 FEMALE | 18 | 170 | 55 |

OFFSET=8

| | SetAggr | GOrd | OrdSet |
|---|---|---|---|
| 0 | 2 | 3 | 1 |
| 1 | 5 | 7 | 0 |

ASCENDING ORDER   ASCENDING ORDER

AGE (PMM-3)

| | VNo |
|---|---|
| 0 | 1 |
| 1 | 0 |

| | VL |
|---|---|
| 0 | 18 |
| 1 | 24 |

ASCENDING ORDER

| | GVNo | GVNo' | Count | Aggr |
|---|---|---|---|---|
| 0 | 1 | 1 | 2 | 0 |
| 1 | 4 | 5 | 0 | 0 |

ASCENDING ORDER

Fig.83

Fig.95A
PMM-0
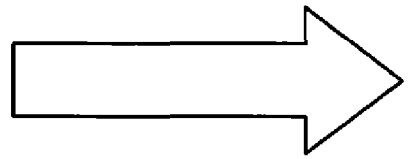
Fig.95B
PMM-1
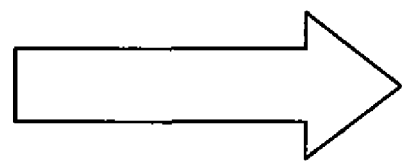
PMM-2
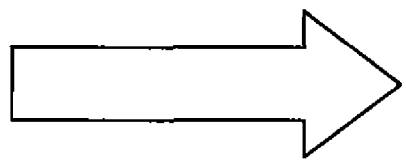
PMM-3
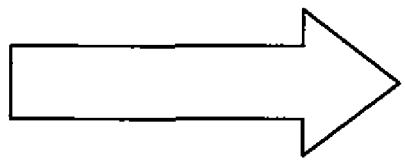

Fig.100

STEP 1

| RECEIVED LIST | | |
|---|---|---|
| PMM-0 | PMM-1 | PMM-2 | PMM-3 |
| [(8,0),(9,2)] | [(0,2),(1,0),(2,0)] | [(3,0),(4,0)] | [(5,1),(6,0),(7,1)] |

STEP 2

| RECEIVED LIST | | |
|---|---|---|
| PMM-0 | PMM-1 | PMM-2 | PMM-3 |
| [(8,0),(9,2)]<br>[(5,1),(6,0),(7,1)] | [(0,2),(1,0),(2,0)]<br>[(8,0),(9,2)] | [(3,0),(4,0)]<br>[(0,2),(1,0),(2,0)] | [(5,1),(6,0),(7,1)]<br>[(3,0),(4,0)] |

STEP 3

| RECEIVED LIST | | |
|---|---|---|
| PMM-0 | PMM-1 | PMM-2 | PMM-3 |
| [(8,0),(9,2)]<br>[(5,1),(6,0),(7,1)]<br>[(3,0),(4,0)] | [(0,2),(1,0),(2,0)]<br>[(8,0),(9,2)]<br>[(5,1),(6,0),(7,1)] | [(3,0),(4,0)]<br>[(0,2),(1,0),(2,0)]<br>[(8,0),(9,2)] | [(5,1),(6,0),(7,1)]<br>[(3,0),(4,0)]<br>[(0,2),(1,0),(2,0)] |

Fig.101
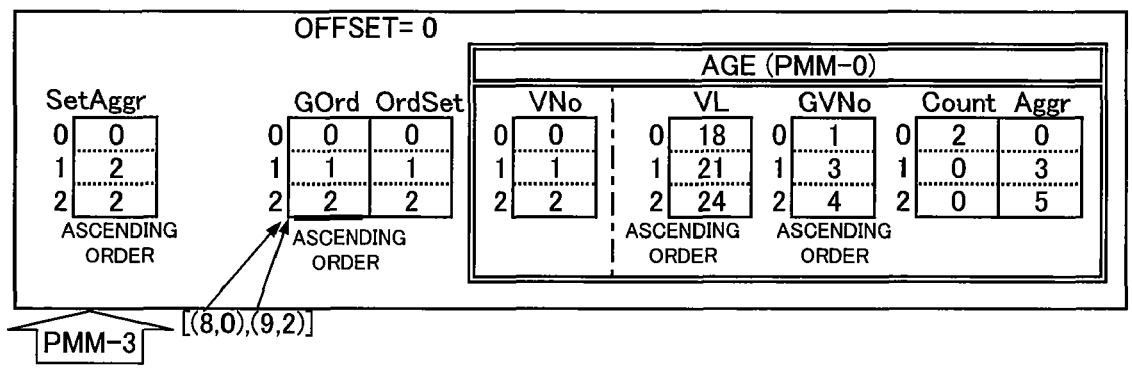
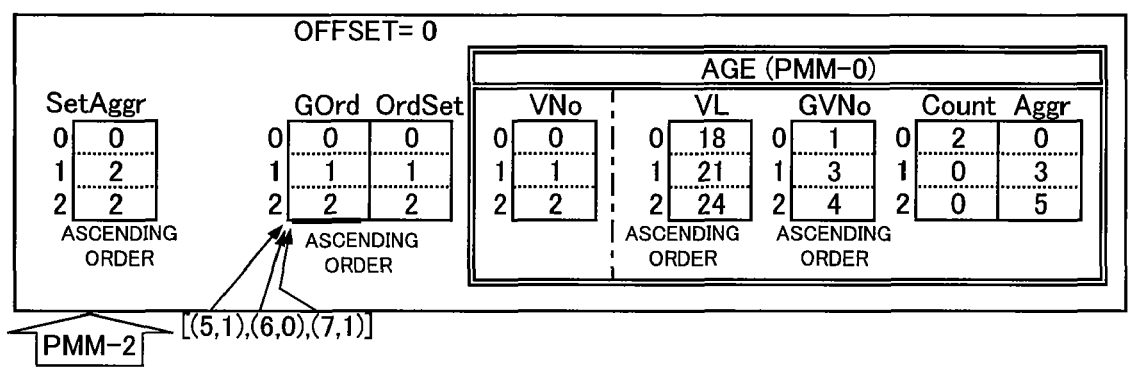
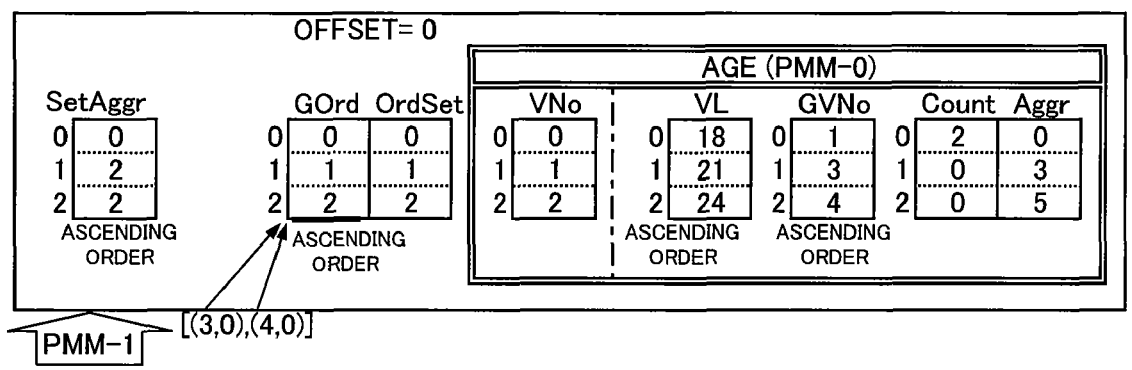
ABOVE PROCESS CAN BE EXECUTED PARALLELY
AFTER OVERLAYING
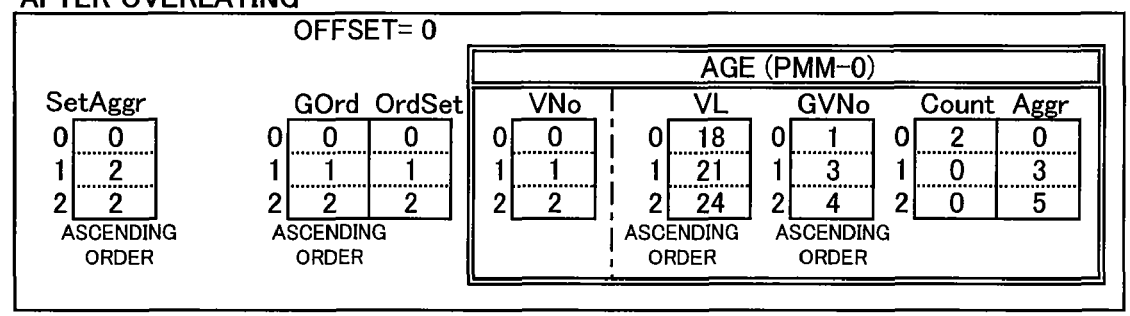

Fig.102
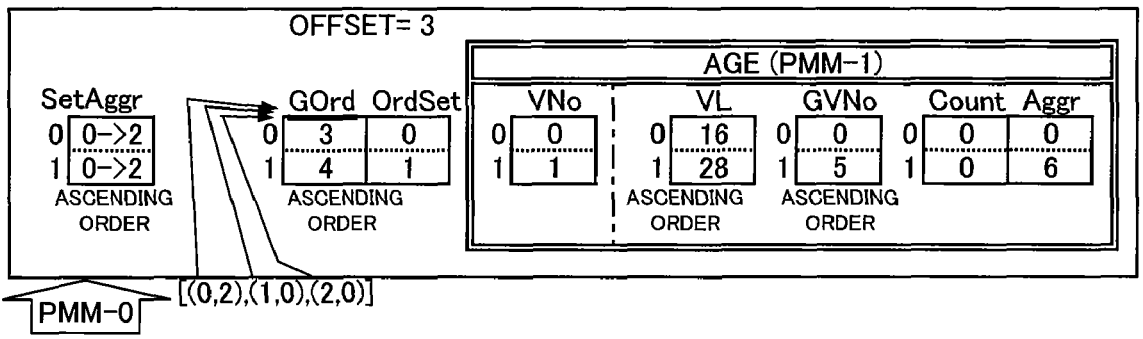
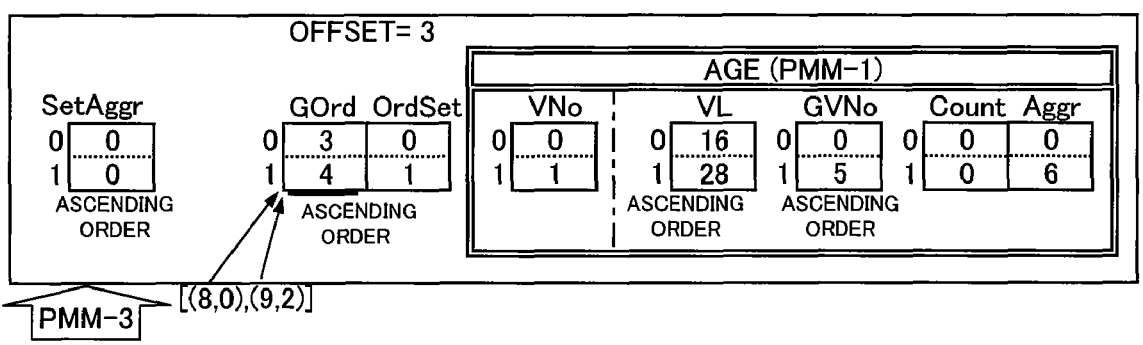
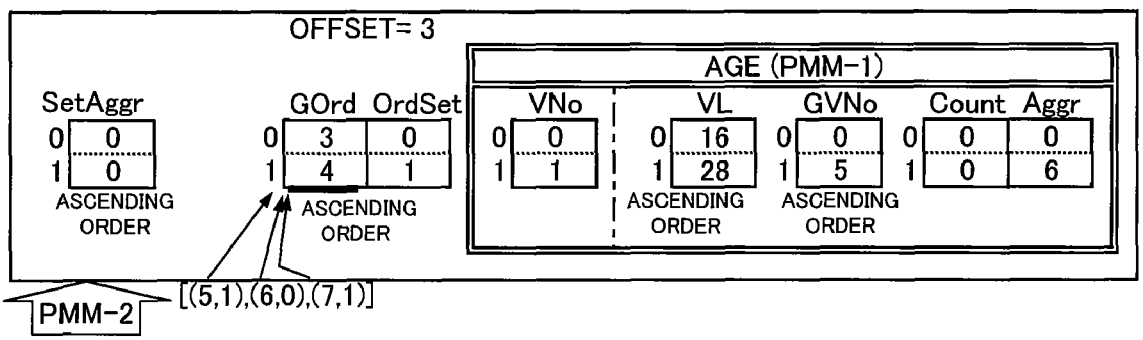
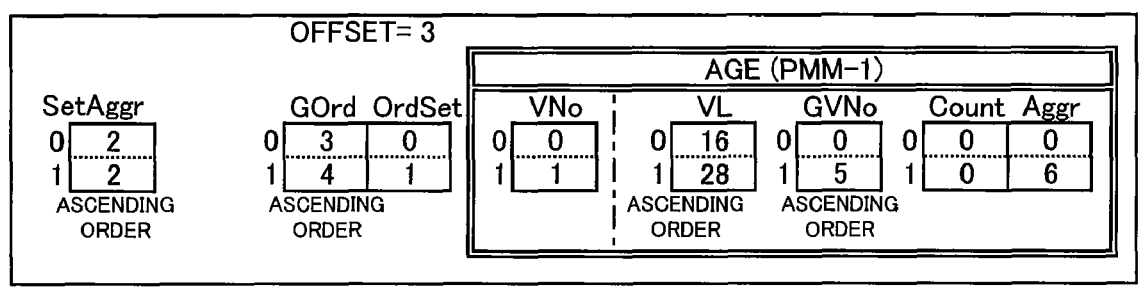

Fig.104
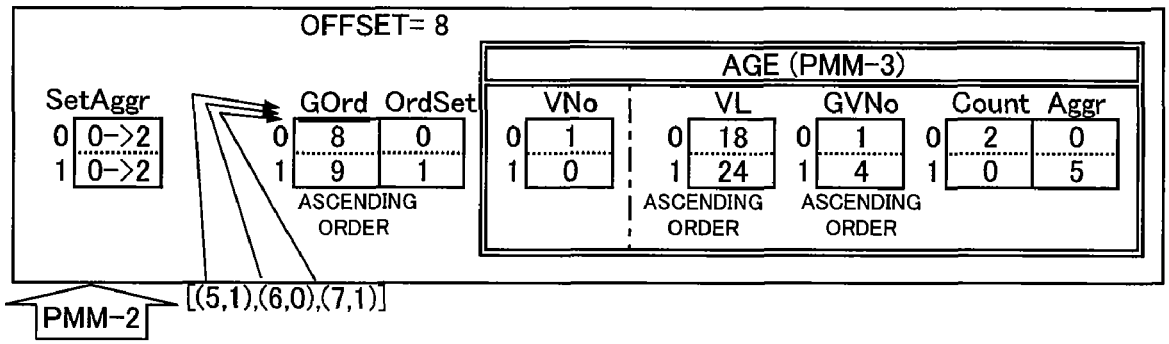
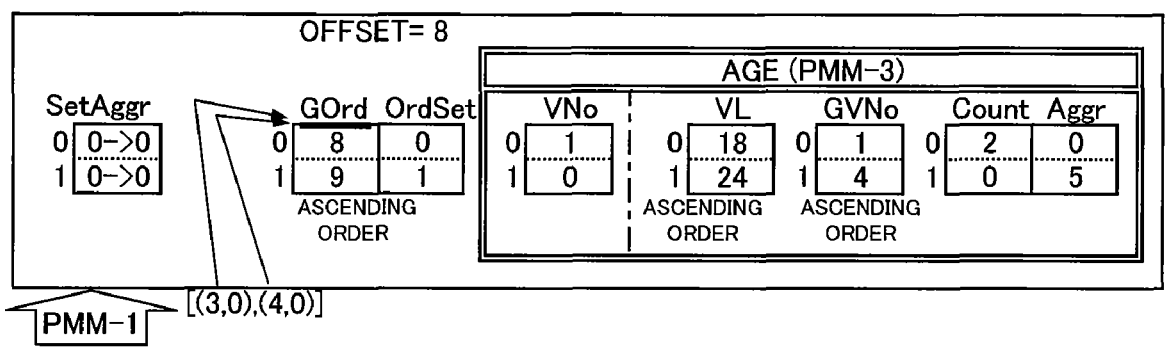
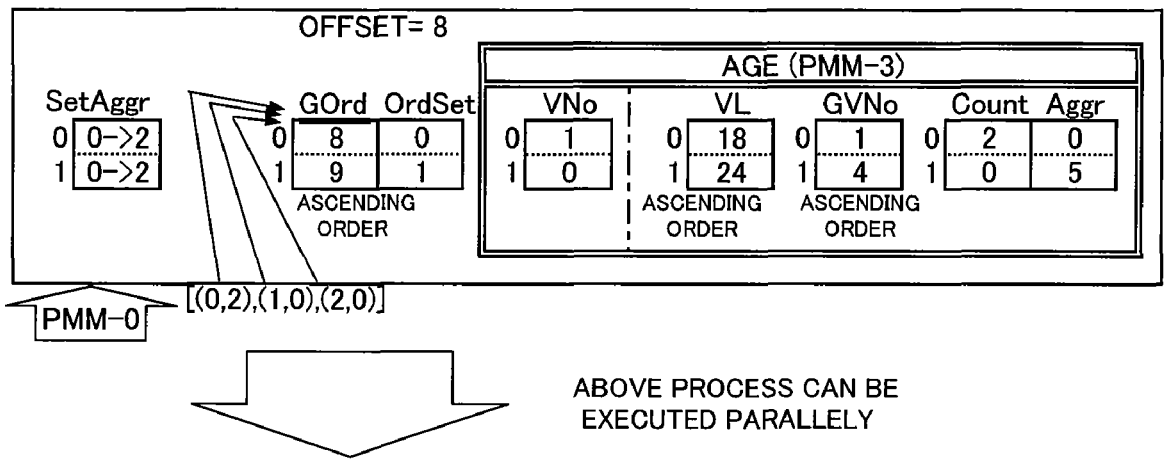
ABOVE PROCESS CAN BE EXECUTED PARALLELY
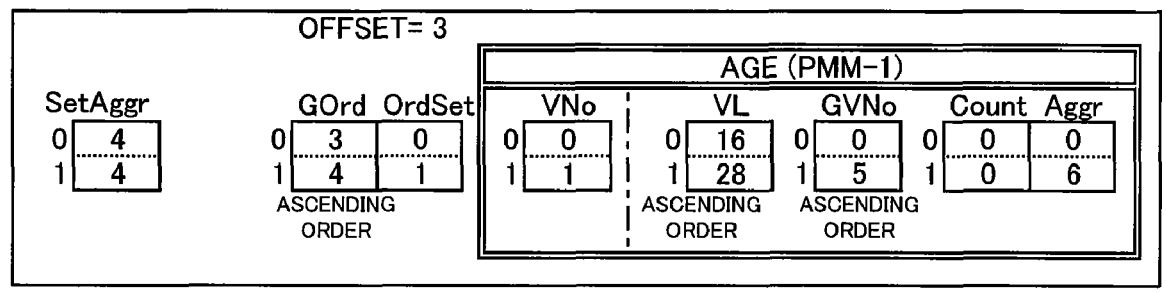

DISTRIBUTED MEMORY TYPE INFORMATION PROCESSING SYSTEM

This is a National Phase Application in the United States of International Patent Application No. PCT/JP2005/000886 filed Jan. 25, 2005, which claims priority on Japanese Patent Application No. 2004-020828, filed Jan. 29, 2004 The entire disclosures of the above patent applications are hereby incorporated by reference.

TECHNICAL FIELD

This invention relates to an information processing system employing parallel computer architecture capable of realizing SIMD (Single Instruction Stream, Multiple Data Stream).

RELATED ART

Nowadays, computers have been introduced into various places in society, and networks such as the internet have become widespread, which have enabled large data to be stored everywhere. In order to process such large data, it is necessary to perform a vast amount of calculations, and parallel processing has naturally been introduced for such calculations.

The parallel processing architecture is broadly classified into a "shared memory type" and a "distributed memory type". The former ("shared memory type") is a system of sharing a huge memory space by plural processors. In this system, since the group of processors and traffic between the shared memories are the bottle necks, it is not easy to construct a realistic system using a hundred or more processors. Therefore, in the case of calculating square roots of a billion floating point parameters, an acceleration rate of a single CPU can only be ×100. An empirical value of the acceleration rate is about ×30 at the highest.

In the latter type ("distributed memory type"), each of the processors has a local memory, and a system is constructed by joining the processors (memories). With the use of this system, it is possible to design a hardware system incorporating several hundreds to several tens of thousands of processors. Therefore, it is possible to achieve an acceleration rate of a single CPU for calculating square roots of a billion floating point parameters of several hundreds times to several tends of thousands times. However, there are the following problems in the latter type.

Patent Publication 1: International Publication No. WO00/10103 (FIGS. 3 and 4).

DISCLOSURE OF THE INVENTION

Problems that the Invention is to Solve

[First Problem: Large Array Segregation Management]

The first problem of the "distributed memory type" is data segregation management.

Since it is difficult to retain large data (since data are usually in the form of an array, data will be referred to as an array in the following description) on a local memory of a processor, the array is naturally segregated to plural local memories and managed thereby. It is obvious that various disturbances can be involved in development and execution of a program without an introduction of an efficient and flexible segregation management mechanism.

[Second Problem: Insufficient Efficiency in Inter-Processor Communication]

When the processors of the distributed memory type system access to the large array, each of the processors can rapidly access the array element on the local memory thereof, but inter-processor communication is required for accessing to an array element retained by another one of the processors. This inter-processor communication is considerably lower in performance as compared to the communication with local memory, and it is said that at least 100 clocks are required for the inter-processor communication. Therefore, in the case of sort processing, the performance is considerably reduced since a rash of inter-processor communications occurs due to referring to overall regions of the large array.

More specific explanation for this problem will be given below. A personal computer as of the year 1999 is constituted as the "shared memory type" by using one to several CPUs. A standard CPU used for such personal computer operates by an internal clock of 5 to 6 times that of a memory bus and is internally provided with an automatic parallel execution function and a pipeline processing function to process one piece of data by 1 clock (memory bus).

Therefore, the multiprocessor system of the "distributed memory type" becomes slower by 100 times that of the single processor system (shared memory type) though it has the larger number of processors.

[Third Problem: Program Supply]

The third problem of the "distributed memory type" is supply of a program to the multiple of processors.

In a system of loading different programs to the considerably number of processors and cooperatively operating the whole processors (MIMD: Multiple Instruction Stream, Multiple Data Stream) a great load is incurred for creating, compiling, and distributing the programs.

In turn, in a system of operating the considerable number of processors by using an identical program (SIMD: Single Instruction Stream, Multiple Data Stream), it is supposed that a degree of freedom of the program is reduced, and that program development for obtaining a desired result is prevented.

This invention provides a method and computer architecture for solving the first to third problems of the "distributed memory type".

The inventor of this invention has proposed a structure and a processing method for obtaining a table format view by: forming an information block for each of items for storing table format data; providing each of the information blocks with a value list storing item values and a pointer array for storing values (pointer values) assigned to each of records for designating the value list; and sequentially specifying the pointer arrays and the value lists depending on record numbers (see Patent Publication 1). In this structure, since the value lists and the pointer arrays, particularly the pointer arrays, are remarkably increased in size along with an increase in the number of records, it is desirable to perform a process such as search, tabulation, sort, and like by one instruction after segregating the value lists and the pointer arrays on plural memories.

Further, in many fields such as data mining, which is a field of analyzing table format data, there is a necessity for a joining technology of joining plural table format data by unifying a key item and creating a new table (view). Therefore, it is desirable to rapidly perform the join process of large table format data with the use of the structure described in Patent Publication 1.

Accordingly, an object of this invention is to provide an information processing system and an information processing method that realize a remarkably high speed parallel process by inputting/outputting array elements stored in various memories with a single instruction and integrating calculation and communication and are capable of considerably high speed join processing of table format data.

Means for Solving the Problems

An object of this invention is achieved by an information processing system comprising:

a plurality of memory modules each having a memory and a control device and data transmission paths for connecting the memory modules and transmitting a value from one of the memory modules to other memory modules, in which each of the memory modules retains a list of values of a first item and/or a list of values of a second item to be unified, the values being ranked in an ascending or descending order without duplication;

the information processing system being characterized in that the control device of each of the memory modules comprises:

a data sending means for sending the values included in the value list to the other memory modules;

a data receiving means for receiving the values included in the value list from the other memory modules; and a unifying means for generating a unified value list in view of the values included in the value lists of the first and the second items in all of the other memory modules by referring to the value list of the first item and the value list of the second item in the other memory modules received by the data receiving means.

As used herein, the first item corresponds to an item of a so-called master table to which a sort order of defaults is reflected. The second item corresponds to an item of a slave table.

In a preferred embodiment, the unifying means comprises:

a first ranking decision means for referring to the value list of the first item in the each of the memory modules, the value list of the second time in the each of the memory modules, and the value lists of the first and the second items in the other memory modules received by the data receiving means to decide a global value ranking relating to the first item in view of the values included in the value lists of the first and the second items in the each of the memory modules and the other memory modules and storing the decided ranking in a first global order storage array for storing the global value ranking at a position corresponding to a value of the each of the memory modules; and a second ranking decision means for referring to the value list of the first item in the each of the memory modules, the value list of the second item in the each of the memory modules, and the value lists of the first and the second items in the other memory modules received by the data receiving means to decide a global value ranking relating to the second item in view of the values included in the value lists of the first and the second items in the each of the memory modules and the other memory modules and storing the decided ranking in a second global order storage array for storing the global value ranking at the position corresponding to the values of the each of the memory modules.

In a more preferred embodiment, the first ranking decision means compares the values of the value list of the second item in the each of the memory modules, the values of the value lists of the first item in the other memory modules, or the values of the value lists of the second item in the other memory modules with the values of the value list of the first item in the each of the memory modules to find if any of the values in the compared value list is equal to the values of the value list of the first item in the each of the memory modules and deletes the identical value;

the value list of the first item from which the identical value is deleted is sent to the other memory modules via the data transmission path or to the second ranking decision means by the data sending means;

the second ranking decision means compares the values of the value list of the first item in the each of the memory modules, the values of the value lists of the first item in the other memory modules, or the values of the value lists of the second item in the other memory modules with the values of the value list of the second item in the each of the memory modules to find if any of the values in the compared value list is equal to the values of the value list of the second item of the memory module and deletes the identical value; and the value list of the second item from which the identical value is deleted is sent to the other memory modules via the data transmission path or to the first ranking decision means by the data sending means.

In another preferred embodiment, the control device of each of the memory modules comprises:

a first occurrence count array generation means for generating a first occurrence count array storing occurrence counts of the values in the value list of the second item in all the memory modules; and a second occurrence count array generation means for generating, based on the occurrence counts in the first occurrence count array relating to the value list of the second item in all the memory modules, a second occurrence count array corresponding to the occurrence counts in the first occurrence count array, in which occurrence counts of the values in the value list of the first item is stored.

In another preferred embodiment, the first occurrence count array generation means generates a local occurrence count array storing the occurrence counts in the value list of the second item in the each of the memory modules, the data sending means sends combinations of the occurrence counts in the local occurrence count array and the corresponding values in the second global value number array, and the first occurrence count array generation means refers to the occurrence counts in the local occurrence count array and the values in the second global value number array in the other memory module received by the data receiving means to generate the first occurrence count array in view of the occurrence counts of the local occurrence count array in the other memory module.

Also, in a preferred embodiment, the data sending means sends combinations of the occurrence counts in the first occurrence count array and the values in the first global order storage array to the other memory modules, and the second occurrence count array generation means generates a region for a counter array and a cumulative number array having a size identical to the value list and used as the second occurrence count array in the storage, refers to the occurrence counts in the first occurrence count array in the other memory modules received by the data receiving means, increases, when any of the values in the order storage array in the other memory modules is equal to the values in the first global order storage array in the each of the memory modules, a value at a corresponding position in the counter array by the identical value in the order storage array in the other memory modules as well as increases a value at a next storage position number in the cumulative number array by the identical value in the order storage array in the other memory modules, or increase, when none of the values in the order storage array in the other memory modules is equal to the values in the first global order storage array in the each of the memory modules, a value in the cumulative number array at a storage position number next to the position corresponding to the value in the order storage array in the other memory modules by the value in the order storage array in the other memory module, and generates a final cumulative number array by accumulating the values of the cumulative number array in the order of the storage position numbers.

Alternatively, in another preferred embodiment, the data sending means sends combinations of the occurrence counts in the first occurrence count array and the values in the first global order storage array to the other memory module, and the second occurrence count array generation means generates a region for a counter array and a cumulative number array having a size identical to the value list and used as the second occurrence count array in the storage, refers to the occurrence counts in the first occurrence count array in the other memory modules received by the data receiving means, increases, when any of the values in the order storage array in the other memory module is equal to the values in the first global order storage array in the each of the memory modules, a value at a corresponding position in the counter array by the identical value in the order storage array in the other memory modules as well as increases a value at a next storage position number in the cumulative number array by the identical value in the order storage array in the other memory modules, increases, when none of the values in the order storage array of the other memory module is equal to the values in the first global order storage array in the each of the memory modules, the value at the corresponding position in the counter array by "1", stores an invalid value as the value, at the position corresponding to the value in the order storage array in the other memory modules, in the cumulative number array, as well as, increases the value of the storage position number next to the corresponding position by the value in the order storage array in the other memory modules, and generates a final cumulative number array by accumulating the values of the cumulative number array in the order of the storage position numbers.

Also, in a more preferred embodiment, the system further comprises a data readout means for reading out the values in the value list of the first item based on the occurrence counts in the second occurrence count array such that duplication of identical values is allowed.

Alternatively, in a preferred embodiment, the information processing system further comprises a data readout means for reading out the values in the value list of the first item based on the occurrence counts of the second occurrence count array such that duplication of identical values is allowed, wherein the data readout means generates a second cumulative number array indicating a total number of records having the values in the order storage array not exceeding the values in the order storage array in the each of the memory modules by referring to the combinations of the values of the order storage array and corresponding values of the count array of the other memory modules, and reads out the values in the value list of the first item based on the values of the second cumulative number array, the value in the count array corresponding to the storage position of the second cumulative number, and the value in the final cumulative number array corresponding to the storage position such that duplication of the identical values is allowed.

An object of this invention is achieved by an information processing system comprising:

a plurality of memory modules each having a memory and a control device; and data transmission paths for connecting the memory modules and transmitting a value from one of the memory modules to other memory modules, wherein each of the memory modules retains a list of values of a plurality of items, the values being ranked in an ascending or descending order without duplication, the information processing system being characterized in that the control device of each of the memory modules retains a plurality of value lists of combinations of unification items including a first and/or a second item to be unified and comprises:

a data sending means for sending the values included in the value lists constituting the combinations of the plural unification items to the other memory modules;

a data receiving means for receiving the values included in the value lists constituting the combinations of the plural unification items from the other memory modules; and a unifying means for referring to the value list of the first item and the value list of the second item constituting the combinations of the unification items for each of the combinations of the unification items in the other memory modules received by the data receiving means to generate a unified value list in view of the values included in the value lists of the first item and the second item constituting the combinations of the unification items of all of the other memory modules.

In a preferred embodiment, the control device of each of the memory modules comprises:

a multidimensional list generation means for generating lists of multidimensional values obtained by joining the items belonging to each of the combinations of the unification items, the lists of the multidimensional values being a first multidimensional item value list obtained by joining the combinations of the first items in the combinations of the unification items and a second multidimensional item value list obtained by joining the combinations of the second items in the unification items; and a ranking assigning means for assigning a global value ranking to the first multidimensional items in view of the first multidimensional item value list of the other memory modules by referring to the first multidimensional item value list received by the data receiving means and assigning a global value ranking to the second multidimensional items in view of the second multidimensional item value list of the other memory modules by referring to the second multidimensional item value list received by the data receiving means.

In a more preferred embodiment, the control device of each of the memory modules further comprises:

a first occurrence count array generation means for generating a first occurrence count array storing occurrence counts of the values of the second multidimensional item value list in all the memory modules; and a second occurrence count array generation means for generating a second occurrence count array storing occurrence counts of the values of the first multidimensional item value list corresponding to the occurrence counts in the first occurrence count array based on the occurrence counts of the first occurrence count array relating to the second multidimensional item value list in all the memory modules.

In a more preferred embodiment, the information processing system further comprises a data readout means for reading out the values in the first multidimensional item value list based on the occurrence counts of the second occurrence count array such that duplication of identical values is allowed.

An object of this invention is achieved by a method for unifying a value list in an information processing system comprising:

a plurality of memory modules each having a memory and a control device; and data transmission paths for connecting the memory modules and transmitting a value from one of the memory modules to other memory modules, wherein each of the memory modules retains a list of values of a first item and/or a list of values of a second item to be unified, the values being ranked in an ascending or descending order without duplication, characterized in that the method comprises: in the control device of each of the memory modules, a data sending step for sending the values included in the value lists to the other memory modules;

a data receiving step for receiving the values included in the value lists from the other memory modules; and a unifying step for referring to the value list of the first item and the value list of the second item in the other memory modules received by the data receiving step and for generating a unified value list in view of the values included in the value lists of the first and the second items of all of the other memory modules.

In a preferred embodiment, the unifying step comprises:

a first ranking decision step for referring to the value list of the first item in the each of the memory modules, the value list of the second item in the each of the memory modules, as well as the value lists of the first and the second items in the other memory modules received by the data receiving step and for deciding a global value ranking relating to the first item in view of the values included in the value lists of the first item and the second item in the each of the memory modules and in the value lists of the first item and the second item in the other memory modules and storing the decided ranking in a first global order storage array for storing the global value ranking at a position corresponding to a value of the each of the memory modules; and a second ranking decision step for referring to the value list of the first item in the each of the memory modules, the value list of the second item in the each of the memory modules, and the value lists of the first and the second items in the other memory modules received by the data receiving step and for deciding a global value ranking for the second item in view of the values included in the value lists of the first item and the second item in the each of the memory modules and in the value lists of the first item and the second item in the other memory modules and storing the decided ranking in a second global order storage array for storing the global value ranking at a position corresponding to a value of the each of the memory modules.

In a more preferred embodiment, the first ranking decision step comprising the steps of:

comparing the values of the value list of the second item in the each of the memory modules, the values of the value lists of the first item in the other memory modules, or the values of the value lists of the second item in the other memory modules with the values of the value list of the first item in the each of the memory modules and, if any of the values in the compared value list is equal to the values of the value list of the first item in the each of the memory modules, deleting the identical value; and sending the value list of the first item from which the identical value is deleted to the other memory modules via the data transmission path or using the value list of the first item from which the identical value is deleted as a object to be processed in the second ranking decision step, and the second ranking decision step comprises the steps of:

comparing the values of the value list of the first item in the each of the memory modules, the values of the value lists of the first item in the other memory modules, or the values of the value lists of the second item in the other memory modules with the values of the value list of the second item in the each of the memory modules and, if any of the values in the compared value list is equal to the values of the value list of the second item in the each of the memory modules, deleting the identical value; and sending the value list of the second item from which the identical value is deleted to the other memory modules via the data transmission path or using the value list of the second item from which the identical value is deleted as a object to be processed in the first ranking decision step.

In another preferred embodiment, the method further comprises, in the control device of each of the memory modules:

a first occurrence count array generation step for generating a first occurrence count array storing occurrence counts of the values in the value lists of the second items in all the other memory modules; and a second occurrence count array generation step for generating a second occurrence count array storing occurrence counts of the values in the value list of the first item corresponding to the occurrence counts in the first occurrence count array based on the occurrence counts in the first occurrence count array relating to the value lists of the second items in all the other memory modules.

In a more preferred embodiment, the first occurrence count array generation step comprises a step for generating a local occurrence count array storing the occurrence counts in the value list of the second item in the each of the memory modules, the data sending step comprises a step for sending combinations of the occurrence counts in the local occurrence count array and the values in the second global value number array corresponding to the local occurrence count array to the other memory modules, and the first occurrence count array generation step comprises a step for referring to the occurrence counts in the local occurrence count array and the values in the second global value number array in the other memory modules received in the data receiving step and for generating the first occurrence count array in view of the occurrence counts in the local occurrence count array in the other memory modules.

In another preferred embodiment, the data sending step comprises a step for sending combinations of the occurrence counts in the first occurrence count array and the values of the first global order storage array to the other memory modules, and the second occurrence count array generation step comprises:

a step for generating a region for a counter array and a cumulative number array having a size identical to the value list and used as the second occurrence count array in the storage; and a step for referring to the occurrence counts in the first occurrence count array in the other memory modules received in the data receiving step, for increasing, when any of the values in the order storage array in the other memory modules is equal to the values in the first global order storage array in the each of the memory modules, a value at a corresponding position in the counter array by the identical value in the order storage array in the other memory modules as well as increasing a value at a next storage position number in the cumulative number array by the identical value in the order storage array in the other memory modules, or increasing, when none of the values in the order storage array in the other memory modules is equal to the values in the first global order storage array in the each of the memory modules, a value at a storage position number next to the position corresponding to the value in the order storage array in the other memory modules in the cumulative number array by the value of the order storage array in the other memory modules, and for generating a final cumulative number array by accumulating the values of the cumulative number array in the order of the storage position numbers.

In yet another preferred embodiment, the data sending step comprises a step for sending combinations of the occurrence counts in the first occurrence count array and the first global order storage array to the other memory module; and the second occurrence count array generation step comprises:

a step for generating a region for a counter array and a cumulative number array having a size identical to the value list and used as the second occurrence count array in the storage; and a step for referring to the occurrence counts in the first occurrence count array in the other memory modules received in the data receiving step, for increasing, when any of the values in the order storage array in the other memory modules is equal to the values in the first global order storage array in the each of the memory modules, a value at a corresponding position in the counter array by the identical value in the order storage array in the other memory modules as well as increasing a value at a next storage position number in the cumulative number array by the identical value in the order storage array in the other memory modules, or increasing, when none of the values in the order storage array of the other memory module is equal to the values in the first global order storage array in the each of the memory modules, the value at the corresponding position in the counter array by "1", storing an invalid value as the value at the position corresponding to the value in the order storage array in the other memory modules in the cumulative number array, as well as increasing the value of the storage position number next to the corresponding position by the value of the order storage array of the other memory module, and for generating a final cumulative number array by accumulating the values of the cumulative number array in the order of the storage position numbers.

In a preferred embodiment, the method further comprises a data readout step for reading out the values in the value list of the first item based on the occurrence counts of the second occurrence count array such that duplication of identical values is allowed.

In another preferred embodiment, the method further comprises a data readout step for reading out the values in the value list of the first item based on the occurrence counts of the second occurrence count array such that duplication of identical values is allowed, and the data readout step comprises:

a step for generating a second cumulative number array indicating a total number of records having the values of the order storage array not exceeding the values of the order storage array in the each of the memory modules by referring to the combinations of the values of the order storage array and corresponding values of the count array in the other memory modules; and a step for reading out the values in the value list of the first item based on the values in the second cumulative number array, the value of the count array corresponding to the storage position of the second cumulative number, and the value of the final cumulative number array corresponding to the storage position.

Another object of this invention is achieved by a method for unifying value lists in control device of each of memory modules in an information processing system comprising:

a plurality of memory modules each having a memory and a control device; and data transmission paths for connecting the memory modules and transmitting a value from one of the memory modules to other memory modules, wherein each of the memory modules retains a list of values of a plurality of items, the values being ranked in an ascending or descending order without duplication, where the method comprises:

a list retaining step for retaining value lists of combinations of plural unification items including a first and/or a second item to be unified;

a data sending step for sending values included in the value lists constituting the combinations of the plural unification items to the other memory modules;

a data receiving step for receiving values included in the value lists constituting the combinations of the plural unification items from the other memory modules; and a unifying step for referring to the value list of the first item and the value list of the second item constituting the combinations of the unification items for each of the combinations of the unification items in the other memory modules received in the data receiving step and generating a unified value list in view of the values included in the value lists of the first and the second items constituting the combinations of the unification items in all of the other memory modules.

In a preferred embodiment, the method further comprises in the control device of each of the memory modules:

a multidimensional list generation step for generating multidimensional value lists obtained by joining the items belonging to each of the combinations of the unification items, the lists being a first multidimensional item value list obtained by joining the combinations of the first items in the combinations of the unification items and a second multidimensional item value list obtained by joining the combinations of the second items in the unification items; and a ranking assigning step for assigning a global value ranking to the first multidimensional items in view of the first multidimensional item value list in the other memory modules by referring to the first multidimensional item value list received in the data receiving step and assigning a global value ranking to the second multidimensional items in view of the second multidimensional item value list in the other memory modules by referring to the second multidimensional item value list received in the data receiving step.

In another preferred embodiment, the method further comprises in the control device of each of the memory modules:

a first occurrence count array generation step for generating a first occurrence count array storing occurrence counts of the values in the second multidimensional item value list in all the memory modules; and a second occurrence count array generation step for generating a second occurrence count array storing occurrence counts of the values in the first multidimensional item value list corresponding to the occurrence counts in the first occurrence count array based on the occurrence counts in the first occurrence count array relating to the second multidimensional item list in all the memory modules.

Also, in another preferred embodiment the method further comprises a data readout step for reading out the values of the first multidimensional item value list based on the occurrence counts of the second occurrence count array such that duplication of identical values is allowed.

Effect of the Invention

According to this invention, it is possible to provide an information processing system and an information processing method that realize a remarkably high speed parallel processing by inputting/outputting array elements stored in various memories by a single instruction and integrating calculation and communication in a distributed memory type and capable of remarkably high speed join processing of table format data.

BEST MODE FOR CARRYING OUT THE INVENTION

[Hardware Structure]

Hereinafter, embodiments of this invention will be described with reference to accompanying drawings. FIG. 1 is a block diagram showing an outline of an information processing system according to one embodiment of this invention. As shown in FIG. 1, in this embodiment, plural memory modules with a processor (hereinafter referred to as PMM) 12-0, 12-1, 12-2, and so forth are disposed in the form of a ring, and the adjacent memory modules are connected by a first bus (see 14-0 or 14-1, for example) for transmitting data in clockwise direction and a second bus (see 16-0 or 16-1, for example) for transmitting data in anticlockwise direction. The first bus and the second bus execute packet communication between the PMMs. In this embodiment, the transmission paths (packet transmission paths) for executing the packet communication are referred to as the first bus and the second bus.

FIG. 2 is a diagram showing one example of a structure of the PMM 12. As shown in FIG. 2, the PMM 12 is provided with a control circuit 20 for controlling memory access, executing arithmetic operation, and the like in accordance with an instruction, a bus interface (I/F) 22, and a memory 24. The memory 24 has plural banks BANK0, 1, and n (denoted by 26-0 to 26-n), and each of the banks is capable of storing a predetermined array which will be described later in this specification.

The control circuit 20 is capable of data reception/transmission with an external computer and the like. Also, another computer may access the bank designated by the memory through bus arbitration.

[Data Storage Structure]

FIG. 3 is a diagram showing one example of table format data. As shown in FIG. 3, values are given to each of various items ("sex", "age", "height", and "weight" in this example) for each record in the table format data. In the information processing system according to this embodiment, the table format data are retained based on a data format shown in FIG. 4 in principle.

As shown in FIG. 4, in an array OrdSet of ordered set, a record number is given as a value for each of order numbers. In this example, the order number and the record number coincide with each other since all the records are represented.

For example, as to the sex, table format data are expressed by a value list VL storing the values of "male" or "female", which are actual item values, sorted in a predetermined order as well as by a pointer array VNo storing numbers corresponding to elements (such as record number) in the array OrdSet of the ordered set, the numbers being included in the value list indicated by the record numbers. The combination of the value list VL and the pointer array VNo is also referred to as an information block (the information block relating to the sex corresponds to the reference numeral 401).

It is possible to obtain an item value corresponding to the record number by specifying a value in the pointer array VNo at the position indicated by the element (record number) in the array OrdSet of the ordered set and then taking out an item value in the value list VL at the position indicated by the specified value. Information blocks of other items have the same structure.

When one computer has one memory (plural memories may be used physically, but this "one memory" means that the memory is disposed in one address space for an access), the array OrdSet of ordered set, the value list VL, and the pointer array VNo constituting each of information blocks are stored in the memory. However, in order to retain a large amount of records, a memory capacity is increased with an increase in size of the records; therefore, it is desirable to distribute the records. Also, from the standpoint of parallel processing, it is desirable to realize segregation of the distributed information.

Accordingly, in this embodiment, the plural PMMs perform the segregation of data of records without duplication, thereby to realize a high speed join process through the packet communication between the PMMs.

[Compile Process]

To start with, a process (compile process) for distributing data to the plural PMMs and using the distributed data will be described. For instance, as shown in FIG. 5, a case of storing data of a predetermined number of records in four PMMS (PMM-1 to PMM-3) is considered. In this example, a series of data relating to record numbers 0 to 2, a series of data relating to record numbers 3 and 4, a series of data relating to record numbers 5 to 7, and a series of data relating to record numbers 8 and 9 are stored separately. In each of PMMs, the table format data are stored in the form of the information block.

Figure 6:
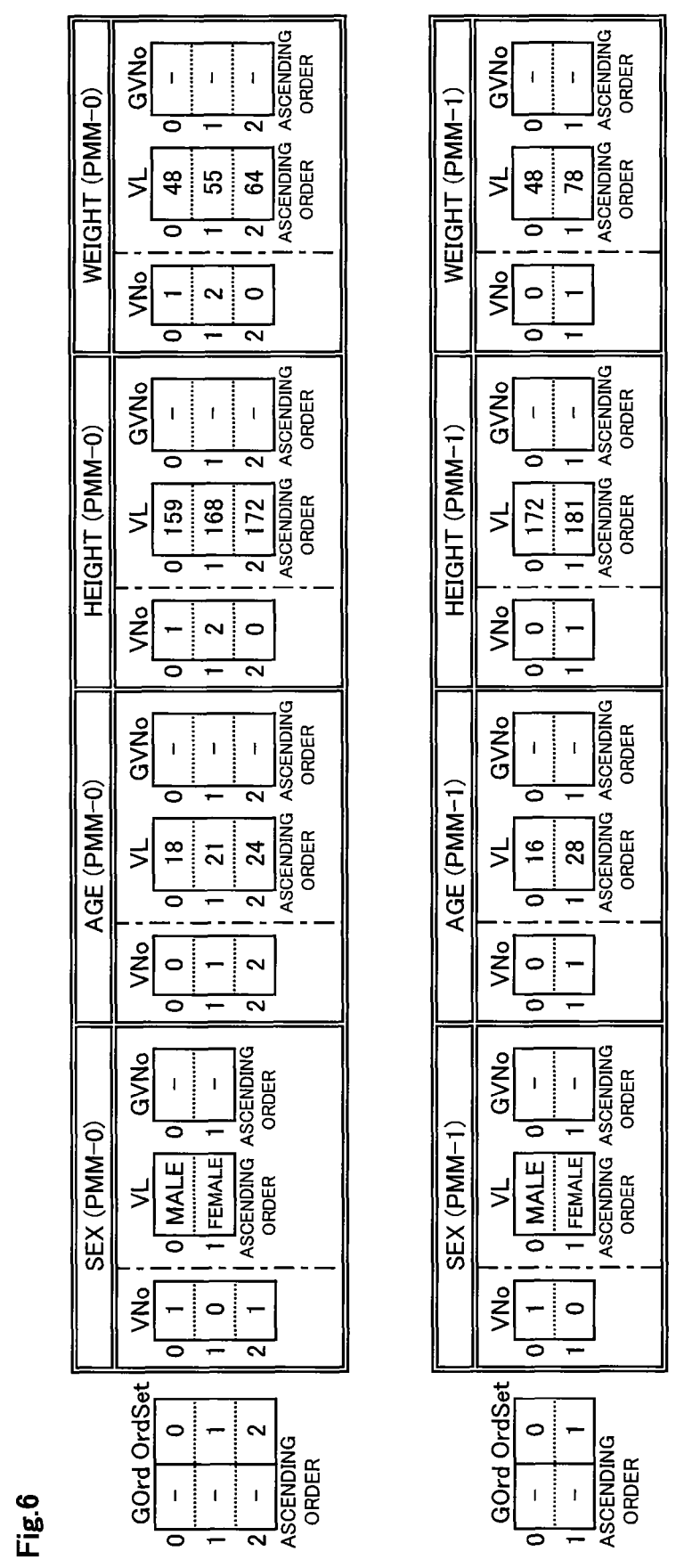
Figure 7:
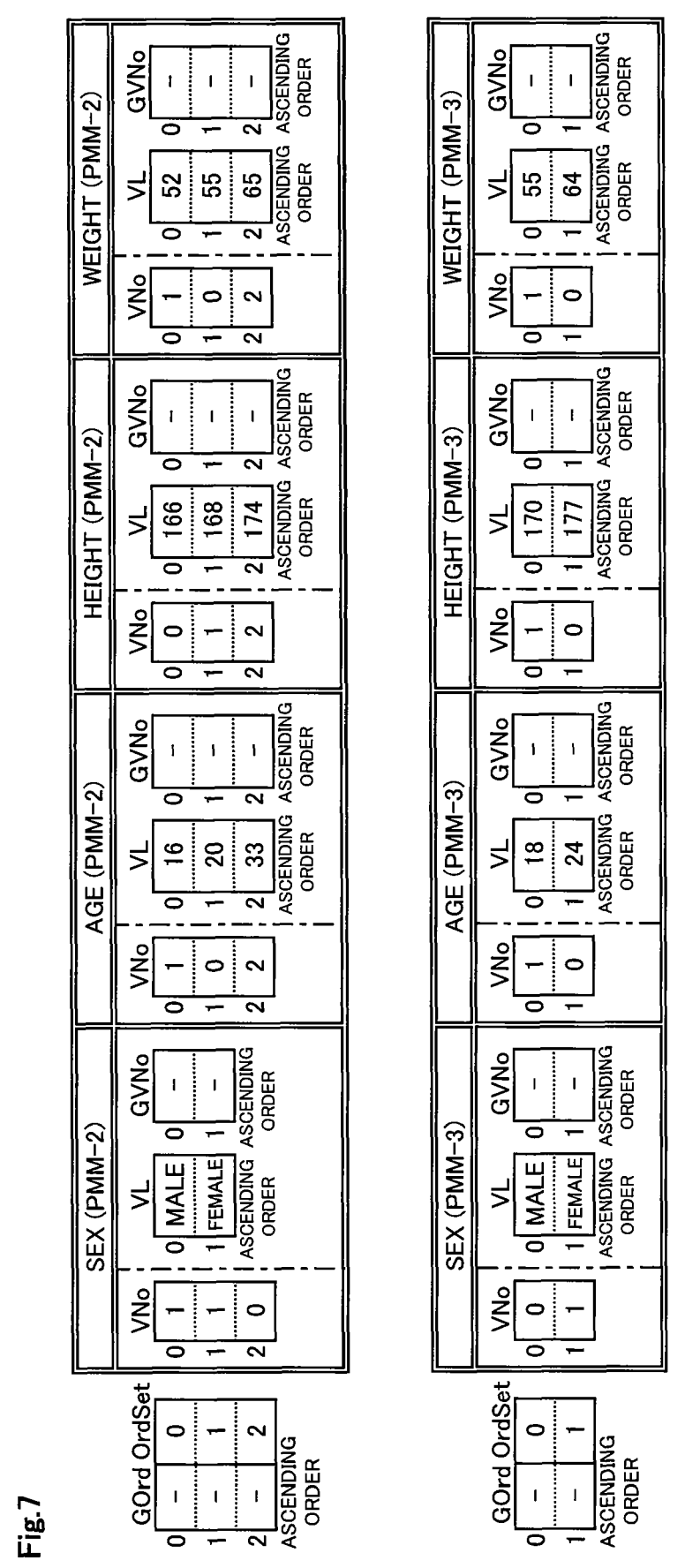

FIGS. 6 and 7 are diagrams each showing one example of the table format data initially segregated to the PMM-0 to PMM-4. As can be seen from the drawings, each of the PMMs stores a partial set or the like of an information block for each item and the like. For example, in FIG. 6, in the information block of the item "sex", a partial set VNo (this is also referred to as a "pointer array") of an original pointer array VNo (see FIG. 4) and a partial set VL (this is also referred to as a "value list") of an original value list VL (see FIG. 4) are included.

The number of elements of the pointer array VNo is the same as the number of records segregated to the PMM. In turn, from the value list VL, only the value indicated by the pointer array VNo is extracted. In the item "sex", since the values of the pointer array VNo indicate all the elements (item values) of the value list VL, the value list VL is the same as the original value list VL. Meanwhile, it is obvious that, in each of the items of "age", "height", and "weight", only a value indicated by an element in a pointer array is taken out as a partial set of an original value list VL.

Further, in the information block to be segregated, each of the elements is converted from the element of the original pointer array VNo in such a manner that the element (item value) of the value list VL is property indicated by the element of the pointer array VNo in each of PMMs, so that consistency is ensured in a local process (designation of a pointer value and designation of an item value) in the PMM.

As described in the foregoing, in the information block to be segregated, only the elements (item values) necessary for the segregated information block are retained in the value list VL. Therefore, the consistency in the local process is ensured by the pointer array VNo and the value list VL. However, in order to ensure consistency for processing among PMMs, it is necessary to position each of the elements (item value) of the value list VL segregated to each of the PMMs in the whole value lists, i.e. it is necessary to grasp the rank of each of the item values in a predetermined order in the whole value lists. Accordingly, in this embodiment, a global value number array GVNo is allocated in the segregated information block to store the numbers indicating position of values corresponding to item values.

An offset value (OFFSET) for segregating the partial set of the information block is given to each of the PMMs. The offset value OFFSET corresponds to the first value in the ordered set OrdSet regarding the record segregated with the PMM.

Also, in order to ensure the consistency in the local process, a new ordered set OrdSet is created in each of the PMMs. The number of elements of the ordered set OrdSet is the same as the number of records segregated to the PMM. In turn, in order to ensure the consistency in the inter-PMM process, it is necessary to grasp what numbers (elements of ordered set) are given to the records segregated to each of the PMMs in the overall structure. Therefore, a global ordered set array GOrd containing the numbers of the records in the overall structure is provided.

FIG. 8 is a flowchart schematically showing the compile process according to this embodiment. As shown in FIG. 8, the initial information block shown in FIGS. 6 and 7 is generated in each of the PMMs (Step 801). This is accomplished when the ordered set OrdSet, the pointer array VNo and the value list VL constituting the each information block, and the offset value OFFSET to be segregated to the PMM are given from an external computer to the PMM, for example. The arrays are stored in the memory 24 of each of the PMMs. In the following processes, the array is created in a storage device such as the memory 24. Also, in the case of increasing the speed of the processing, the arrays may be generated in the register.

In the process after Step 801 (in Steps 802 and the following steps), the process proceeds to the local process in each of the PMMs and the process relating to the inter-PMM packet communication. The control circuit 20 of each of the PMMs refers to the offset values to calculate each of values to be allocated in the global ordered set array GOrd, thereby allocating the values in the array (Step 802). FIG. 9 is a diagram showing the allocation of the values in the global ordered set array GOrd in the example shown in FIGS. 6 and 7. In this step, values obtained by adding the offset value OFFSET to the values of the ordered set are allocated at the position to which the global ordered set array GOrd corresponds. It is possible to accomplish Step 1002 by the local process in each of the PMMs.

Then, the values of the global value list number array GVNo are decided (Step 803). The decision of the values of the global value list number array GVNo will be described in detail below. From this step, the process is carried on by transmitting a packet by using the bus in the clockwise direction. FIG. 10 is a diagram showing stepwise states of the transmitted packet, and FIG. 11 is a diagram showing a list to be stored temporarily by each of the PMMs.

As shown FIG. 10, in this embodiment, each of the PMMs sends its VL values in the form of a packet in Step 1. In this step, [18, 21, 24], [16, 28], [16, 20, 33], and [18, 24] are send to the adjacent PMMs among the PMM-0 to PMM-3 in the clockwise direction. Each of the PMMs compares the values of the received packet with VL values of the relevant PMM to delete an identical value and then transmit the packet constituted of the values of the received packet from which the identical value is deleted in the clockwise direction. Step 2 is a state in which the packet is sent after the completion of the initial identical value deletion. For example, in the PMM-1, the values of the received packet [18, 24] and PMM-1's VL values [18, 21, 24] are compared. In this example, since all the values in the received packet are equal to the VL values, the packet sent from the PMM-1 contains [4]. The same process is performed in the other PMMs to send the packets. By repeating the above process, the identical value is deleted from the VL values in each of the PMMs to be sent to the adjacent PMM, so that VL values without duplication of the identical value are accumulated in each of the PMMs as shown in FIG. 11. Since the four PMMs exist in this example, four data transmissions (Steps 1 to 4 in FIG. 10) enable the VL values of each of the PMMs to be received by the rest of the PMMs.

Referring to FIG. 11, it will be understood that the same VL values are accumulated in each of the PMMs. Then, after comparing the received VL values with the VL values of the relevant PMM, a ranking of the VL values of the relevant PMM is decided in view of the orders of the other PMMs. A sum of an addition of the ranking to the relevant PMM's VL values obtained by considering each of the VL values is the global ranking of the VL values considering all the other PMMs. In FIG. 12, the value of GVNo as a result of superposition is equivalent for the order of the value to which the VL of each of the PMMs corresponds.

[Internal Join Process]

Hereinafter, a join process by the information processing system according to this invention will be described. FIG. 13A is a diagram showing a logical structure of one of tables which are joined by the join process according to this embodiment. According to this invention, a value list VL and a pointer array VNo indicating the numbers of the value list are provided for each of items for such table in one computer as shown in FIG. 13B. In the structure shown in FIG. 13B, values of the pointer array VNo are specified from values of an ordered set array OrdSet, and the table shown in FIG. 13A is obtained by taking out values of positions indicated by the VNo.

Further, in this embodiment, it is considered that partial sets of the table format data are logically segregated to four PMMs (PMM-0 to PMM-4) as shown in FIG. 14. In practice, the data shown in FIG. 15 are stored in the memory of each of the PMM-0 to PMM-4. The storage for storing the various arrays shown in FIG. 15 is not limited to the memory such as a RAM of the PMM, and the arrays may be stored in a register for improving the speed of access.

FIG. 16A is a diagram showing a logical structure of the other one of tables which are joined by the join process, and FIG. 16B is a diagram showing various arrays retained for the purpose of expressing the table format data shown in FIG. 13A with the use of a single computer in accordance with this invention. In this embodiment, it is considered in logic that partial sets of table format data are logically segregated to the PMM-0 to PMM-3 as shown in FIG. 17. At this time point, arrays are provided in the PMMs as shown in FIG. 18. In the arrays shown in FIGS. 15 and 18, it is possible to obtain a global ordered set GOrd and a global value number array GVNo by the above-described compile process.

The join process is the process for creating table format data by joining two tables by unifying values of a predetermined item. In the tables shown in FIGS. 13A, 13B, 16A, and 16B, the item "age" of the table 1 (FIGS. 13A and 13B) and the item "E age" of the table 2 (FIGS. 16A and 16B) are unified to obtain the joined table (view) shown in a lower part of FIG. 19. In the following processes, a table that reflects a sort order of defaults of a finally outputted table (view) is referred to as a master table, and the other table is referred to as a slave table. In the above-described example, the item of the master table is "age", and the item of the slave table is "E age". In this embodiment, a ranking of values in the global ordered set GOrd is used as the sort order of the defaults. Of course, it is possible to use other orders such as a ranking of values of other array as the sort order of defaults.

Hereinafter, the join process in the case where data are (array is) segregated to plural PMMs of this embodiment will be described in more detail. The case of joining the item "age (table 1)" and the item "E age (table 2)" will be considered based on the tables shown in FIGS. 13A, 13B, 16A, and 16B (in practice, the arrays segregated to the PMMs in FIGS. 15 and 18).

[Global Value Number Array GVNo' Unification]

As can be understood from a flowchart shown in FIG. 20 and a diagram of FIG. 21 showing arrays in the PMMs, each of the PMMs generates a global value number array GVNo' of each of the item "age (table 1)" and the item "E age (table 2)" in the arrays constituting partial sets of the table 1 and the table 2 segregated to the PMM, and initialize the values of each GVNo' (step 2001). As shown in FIG. 21, values in ascending order are initially given as initial values of the GVNo' in each of the items "age" and the item "E age" in each of the PMMs.

Then, each of the PMMs sends a packet containing VL values in a predetermined direction (Step 2002 and FIG. 22). As shown in FIG. 22, the packet is sent to the bus in the anticlockwise direction in this embodiment. In each of the PMMs, the packet containing the VL values relating to the table 1 is sent to the bus in the clockwise direction and the packet containing the VL values relating to the table 2 is sent to the bus in the anticlockwise direction. Of course, each of the packets may be sent in the reverse direction.

In each of the PMM-0 and the PMM-3, the packet is not actually sent, and, as describe later in this specification, the packet is used in the next step for deleting an identical value with respect to the table other than that of the item of the VL to be sent. As is apparent from the following description, a packet containing VL values relating to the table 1 of the PMM-0 is transmitted through the following path, for example.

PMM-1 (used for the process relating to table 1)→(bus in clockwise direction)→PMM-2 (used for the process relating to table 1)→(bus in clockwise direction)→PMM-3 (used for the process relating to table 1)→(data transmission in PMMs)→PMM-3 (used for the process relating to table 2)→(bus in anticlockwise direction)→PMM-2 (used for the process relating to table 2)→(bus in anticlockwise direction)→PMM-1 (used for the process relating to table 2)→PMM-0 (used for the process relating to table 2)

Upon reception of the packet, the PMM deletes the value, that is equal to the VL value belonging to the PMM, in the VL values belonging to other PMMs contained in the packet (Step 2003), compares the VL values in the other PMMs from which the identical values have been deleted with the VL values of the relevant PMM, decides a ranking of the VL of the relevant PMM, and stores the ranking in the array GVNo' (Step 2004). As shown in FIG. 23, for example, in the table 1 of the PMM-0, the packet [18] containing the VL value relating to the table 2 of the PMM-0 is internally transmitted. Then, the PMM-0 compares the packet with the VL values [18, 21, 24] relating to the table 1 to delete the identical value [18] from the internally transferred packet. Also, since the packet from which the identical values are deleted becomes [φ], the ranking of the VL of the relevant PMM does not change, and, therefore, the value of GVNo does not change.

The table 1 of the PMM-1 receives a packet [18, 21, 24] containing the VL values relating to the table 1 of the PMM-0. In this case, since identical value does not exist, deletion of identical value is not performed. In turn, a ranking of the VL values of the PMM-1 is decided from the values contained in the received packet, so that the values of GVNo' are updated. The same process is performed in the other PMMs.

After deciding the ranking of VL values in each of the PMMs and storing values to the GVNo, the packet containing the values after the identical value deletion is further sent in a predetermined direction (Step 2005).

By repeating the identical value deletion from the received packet, the decision of rankings of VL values of the relevant PMM with reference to packet values, and the packet transmission from which the identical value was deleted, it is possible to obtain a global value number array GVNo' indicating a global order of VL considering the VL values of the other PMMs. FIG. 24 is a diagram showing a state in which the global value number array GVNo' is obtained in each of the PMMs.

As described in the foregoing, it is possible to unify the table 1 and the table 2 by causing the VL relating to the table 1 and table 2 segregated to the PMMs to pass through each of the PMMs, and to be used for deciding the ranking relating to the table 1 and the other ranking relating to the table 2. That is, when the value of GVNo' in each of the tables is identical to each other, the value indicates the same VL value.

[Sort Process of Slave Table]

Next, a sort process using the item "E age" in the table 2 as a key is executed. The sort process is equivalent to rearrangement of the global order number array GOrd by using the global value number array GVNo (GVNo' in this embodiment) of the item to be sorted. Since the table 2 has already been sorted by the item "E age", the sort process is omitted.

[Slave Table Counting Up]

After the termination of the sort process, each of the PMMs counts the number of appearances (a count of occurrences) of each of the GVNo' values in the partial set of the table 2 segregated to the PMM, the table 2 being equivalent to the slave table (Step 2501). The occurrence count indicates how many records (elements in the ordered set array OrdSet) segregated to the PMM represent each of the values in the value list VL of the PMM. The calculation of the occurrence count of each of the values of GVNo' is equivalent to the calculation of the occurrence count of each of the values of GVNo.

More specifically, as shown in FIG. 26, each of the PMMs creates a count up region array Count for the table 2 to store an initial value 0 for each of the values in the array.

Each of the PMMs takes out a value of the ordered set array OrdSet to count up the count value at the position of the value of GVNo pointed out by the value of the OrdSet. By repeating this process (see FIGS. 27 and 28), it is possible to obtain the occurrence counts of the VL values in the count array Count.

After that, each of PMMs sends the packet including a combination of the GVNo of the relevant PMM and the corresponding occurrence counts to a bus in a predetermined direction (Step 2502). As shown in FIG. 29A, in this embodiment, the packet including the combination is sent to the bus in the clockwise direction. Upon reception of such packet, each of the PMMs checks the values of GVNo in the combination of the packet, and, in the case where any of the values of the global value number array GVNo of the relevant PMM is equal to any of the values of the GVNo of the packet, adds up the occurrence counts combined with the value of the received GVNo value to the count value in the count array corresponding to the GVNo value of the relevant PMM (Step 2503). Then, the PMM sends the received packet to the bus in the predetermined direction (Step 2504). By repeating Steps 2503 and 2504 for a predetermined times, it is possible to allocate the values (global occurrence counts) considering GVNo of the other PMMs and the occurrence counts of the GVNo values in the count array. In this embodiment, as shown in FIGS. 29A to 29D, it is possible to obtain the global occurrence counts in the count array by repeating the data transmission for only four times which is corresponding to the number of PMMs. Of course, since it is possible to obtain the occurrence counts of GVNo in each of the PMMs as described later in this specification, it is possible to grasp the occurrence counts of the array GVNo' indicating the global number of the values of the value list in the joined table.

In the process of FIG. 25, each of the PMMs sends the received packet in the predetermined direction without changing the contents of the packet. Therefore, after the reception of the packet, the PMM may temporarily store the packet to its memory or register before sending the packet in the predetermined direction to perform the process of adding the occurrence counts after sending the packet. Thus, it is possible to achieve parallel processing in the PMMs.

[Process Relating to Master Table]

Next, each of the PMMs constructs two arrays (counter array Count and aggregation array Aggr) for the table 1 in order to achieve consistency of the table 2 serving as the slave table with the table 1. Definition of the arrays will be described later in this specification.

In this embodiment, the information of the array of each of the PMMs of the table 2 is sent to all the PMMs, and each of the PMMs generates the counter array Count and the aggregation array Aggr based on the received information of the arrays of the table 2. FIG. 31 is a diagram showing a state in which a packet formed of combinations of the values of the global value number array GVNo' and the corresponding value of the count array (value of GVNo and value of Count) relating to the table 2 is sent from each of the PMM-0 to PMM-3 to the PMM-0. The packet formed of the combination of the values relating to the table 2 of the PMM-0 is directly transmitted to itself without passing through the bus. Each of the packets of the PMM-1 to PMM-3 formed of the combination of the values relating to the table 2 is sent via the bus to be received by the PMM-0.

It is possible to generate the count array and the aggregation array in the PMM-0 in a parallel fashion when the rest of PMMs sends data to the PMM-0 using the different buses at this time point. Of course, the PMM-1 and the PMM-2 may sequentially send the packets to the PMM-0 using the same or different buses.

FIG. 30 is a flowchart showing the process executed by the PMM which has received the packet. As shown in FIG. 30, after the reception of the packet (Step 3001), the PMM refers to the values of the GVNo' in the packet to determine if any identical value exists in the GVNo' relating to the table 1 (Step 3002). When it is determined "Yes" in Step 3002, the PMM counts up the value at the corresponding position in the count array Count of the table 1 by the value of Count in the packet (Step 3003) simultaneously with counting up a value at the position next to the formerly mentioned position (position of which the number indicating the position in the array is increased by one) in the aggregation array Aggr of the table 1 by the value of the Count in the packet (Step 3004).

On the other hand, when it is determined "No" in Step 3002, the PMM founds a value which is a minimum and yet larger than the values of the GVNo' in the packet (Step 3005). Then, the PMM counts up the value, at the position corresponding to the found value in the count array Count of the table 1, by the value of Count in the packet (Step 3006). This process is executed for each of the values in the received packet (see Steps 3007 and 3008).

In the example of FIG. 31, (1, 2) is transmitted from the PMM-0 as (value of GVNo', value of Count) of the table 2. As to the table 1, the value "1" exists in the GVNo'. Therefore, the value in the count array Count at the corresponding position is counted up from "0" to "2" in accordance with the value of the Count in the packet. Also, in the aggregation array Aggr, the value of the next position is counted up from "0" to "2" in accordance with the value of Count in the packet.

From PMM-1, (2, 1) and (4, 2) are given as (value of GVNo', value of Count) of the table 2. In this case, the value of GVNo' "2" does not exist in the table 1. Then, it is understood that the value which is larger than "2" and minimum among the GVNo' values relating to the table 1 is "3" (and the position of the value is "1"). Therefore, the value of Aggr of the position is counted up from "0" to "1" in accordance with the value of Count in the packet. In the same manner, the value of GVNo' "4" does not exist in the table 1. Then, it is understood that, as to the table 1, the value which is larger than "4" and minimum among the GVNo' values is "5" (and that the position of the value is "2"). Therefore, the value of Aggr of the position is counted up from "0" to "2" in accordance with the value of Count in the packet.

The same process is executed on (value of GVNo', value of Count) received from other PMMs (PMM-2 and PMM-3) to calculate values of the count array Count and the aggregation array.

After generating the count array Count and the aggregation array Aggr based on the packets received from the PMMs, a final count array Count and a final aggregation array Aggr are generated by combining the generated count arrays and the aggregation arrays. As shown in FIG. 32, each of the PMMs calculates a sum of the values counted up in each of the generated count arrays count (Step 3201) to obtain the final value of the count array Count (see Step 3203 and FIG. 33A). In the same manner, the PMM calculates a sum of the values counted up in each of the generated aggregation arrays Aggr (see Step 3203 and FIG. 33A) and adding up the obtained values from the first value (Step 3204) to obtain the final value of the aggregation array Aggr (Step 3205). FIG. 33B is a diagram showing the ultimately obtained count array Count and aggregation array Aggr in the PMM-0.

The same process is executed in the other PMMs to obtain the count array Count and the aggregation array Aggr. FIG. 34 is an illustration of the generation of the count array Count and the aggregation array based on (value of GVNo', value of Count) of each of the PMM-0 to PMM-2 in the PMM-1, and FIG. 35 is an illustration of the generation of the final count array Count and the final aggregation array Aggr. FIGS. 36 and 38 are diagrams for illustrating the generation of the count array Count and the aggregation array based on (value of GVNo', value of Count) of each of the PMM-0 to the PMM-2 in each of the PMM-2 and the PMM-3, and FIGS. 37 and 39 are diagrams for illustrating the final count array Count and the final aggregation array Aggr in each of PMM-2 and PMM-3.

Each of the values in the counter array represents the number of appearance of the value in each of the PMMs considering the values of the slave table of other PMMs. The aggregation array Aggr indicates a current cumulative total of the value of GVNo not exceeding the value of GVNo based on the occurrence counts of the value considering the slave table. As described above, after the generation of the count array including the occurrence counts and the aggregation array representing the cumulative total of the value of GVNo of the whole slave tables of the master table segregated to each of the PMMs, the data described below are exchanged between the PMMs to calculate a multiplicity of each of the records of the overall master table. As described in detail later in this specification, an aggregation array SetAggr which does not exceed the value of GOrd and represents a logical sum of records is generated. From the aggregation array SetAggr, it is possible to grasp the multiplicity of the overall master table. FIG. 93 is a flowchart showing a process executed by each of PMMs for generating the aggregation array SetAggr. As shown in FIG. 93, each of the PMMs generates a region for the aggregation array SetAggr in the memory and initializes the values (Step 9301). The size of the aggregation array SetAggr is the same as that of the array GOrd or the OrdSet. Each of the PMMs initializes pointers indicating storage position numbers of the arrays SetAggr, GOrd, and OrdSet.

Then, the PMM specifies the value of an array VNo indicated by the value of the array OrdSet at the position of the storage position number, and then specifies the value in the count array Count indicated by the specified VNo value is specified (Step 9303). Each of the PMMs stores the specified value of the count array Count at the position indicated by the storage position number in the aggregation array SetAggr. FIG. 94 is a diagram showing a state in which the value of the array Count is stored in the array SetAggr. In FIG. 94, in the PMM-0, for example, the value of the array VNo indicated by the value "0" of the array OrdSet of the storage position number "0" is "0". The value of the count array Count at the position indicated by the value "0" of the array VNo is "2". Therefore, in the aggregation array Set Aggr, "2" is stored at the position of the storage position number "0". The same process is executed in each of the other PMMs (PMM-1 to PMM-3). Thus, in the aggregation array SetAggr, the values shown in FIG. 95A are stored. Further, each of the PMMs changes the aggregation array SetAggr into cumulative values (Step 9307). In the process of changing the aggregation array into the cumulative values, each of the PMMs repeats the process for adding each of the values of the array SetAggr to the value at a position having the storage position number larger by "1". Thus, an aggregation array SetAggr shown in FIG. 95B is obtained.

Next, by exchanging the combination of the value of the array GOrd and the corresponding value of the array Count among the PMMs, an array SetAggr indicating the multiplicity of each of the records of the master table considering the whole PMMs is ultimately accomplished.

FIGS. 96 and 97 are flowcharts showing a process executed for obtaining the final SetAggr in each of the PMMs. As shown in FIG. 96, each of the PMMs sends a packet containing the combination of a value of the array GOrd and the corresponding value of the array Count (value of GOrd, value of Count) in a predetermined direction via the transmission path (Step 9601). FIG. 98 is an illustration of the generation of (value of GOrd, value of Count). For example, in the PMM-0, for the first value "0" of the array GOrd, the value of the array VNo indicated by the value "0" of the array OrdSet indicated by the same storage position number is specified. Further, the value in the array Count at a position indicated by the value "0" of the array VNo is "2". Therefore, a packet (0, 2) is created at first. Likewise, a packet (1, 0) is created for the following value "1" of the array GOrd, and a packet (2, 0) is created for the following value "2" of the array GOrd. Accordingly, packets each containing (0, 2), (1, 0), and (2, 0) are sent from the PMM-0 in the predetermined direction. The same process is performed in the other PMMs to generate packets.

In this embodiment, the PMMs are connected by using the first bus and the second bus in the form of a ring as shown in FIG. 1. Therefore, data may be sent in predetermined one of the buses. As described later in this specification, when it is possible to transmit data among PMMs by using plural buses, it is possible to perform the parallel processing. For example, in this embodiment, the first bus 14 is used for transmitting a packet as shown in FIGS. 99 and 100. As shown in FIG. 99, in the initial step, the PMM-0 sends a packet to the PMM-1, while the PMM-1, the PMM-2, and the PMM-3 send a packet to the PMM-2, the PMM-3, and the PMM-3, respectively.

Upon reception of the packet from the other PMM (Step 9602), each of the PMMs compares values of GOrd in the packet received from the other PMM with the values of the array GOrd in the relevant PMM (Step 9603).

Each of the PMMs specifies a range of values larger than the GOrd values of the another PMM (values of GOrd in the packet) for the array GOrd in the relevant PMM (Step 9604). Then, the PMM temporarily stores the Count value combined with the GOrd in the packet in the storage as a value to be added to the value of the range specified in step 9604 (Step 9605). In the case where the GOrd values of the another PMM is larger than all the values of the array GOrd in the relevant PMM, the range of the value does not exist in Step 9604 (range is φ), so that the value to be added does not exist (or set to "0"). The process from Step 9603 to Step 9605 is executed for all the combinations (value of GOrd, value of Count) in the received packet (see Steps 9606 and 9607).

After that, the PMM adds up the values to be added to the values of the array SetAggr temporarily stored for all the combinations of (value of GOrd, value of Count) to temporarily store the cumulative value in the storage (Step 9608). This cumulative value represents a value to be added to each of the values of the array SetAggr of other PMMs.

After that, the received packet is sent in the predetermined direction via the transmission path (Step 9609). The sending of the received packet is not limited to this step, and the packet may be sent in advance of the process from Step to Step 9607 after temporarily storing the data of the packet in the storage.

The above process is executed for each of the packets relating to all the other PMMs (see Steps 9701 and 9702 of FIG. 97). When it is determined "No" in Step 9701, the process returns to step 9602 to receive a packet from other PMMs to repeat the process for a combination of (value of GOrd, value of Count) in the packet.

When the process for all the other PMMs is terminated, each of the PMMs adds up the cumulative value temporarily stored for each of the values of the array SetAggr to calculate a merged value of the value to be added to each of the values of the array SetAggr of each of the other PMMs (Step 9703). Then the PMM adds each merged value to each of the values of the array SetAggr to obtain a final array SetAggr (Step 9704).

Referring to FIG. 99 again, in the initial step for the packet transmission (Step 1 of FIG. 99), the packet relating to the PMM-3 serving as another PMM is received in the PMM-0 so that the process is performed on the received packet in the PMM-0. Also, in the PMM-1, the PMM-2, and PMM-3, the packet relating to the PMM-0, the PMM-1, the PMM-2 each serving as the another PMM are received respectively so that the process is performed on the received packet in each of the PMMs.

In the next packet transmission step (Step 2 in FIG. 99) the packet relating to the PMM-2, PMM-3, the PMM-0, and the PMM-1 are received in the PMM-0, the PMM-1, the PMM-2, and the PMM-3 respectively so that the process is performed on the received packet in each of the PMMs, and the packet relating to the PMM-1, the PMM-2, the PMM-3, and the PMM-0 are received in the PMM-0, the PMM-1, the PMM-2, and the PMM-3 respectively so that the process is performed on the received packet in each of the PMMs in the subsequent packet transmission step (Step 3 of FIG. 99). The packet received by each of the PMMs is sent further in the predetermined direction as described above, so that it is possible for each of the PMMs to receive (value of GOrd, value of Count)

relating to all the other PMMs. FIG. 100 is a diagram showing the packet received by each of the PMMs in the Steps 1 to 3 shown in FIG. 99.

Each of the FIGS. 101 to 104 is a diagram showing a state in which the process in response to the reception of the packet is executed in each of the PMM-0, the PMM-1, the PMM-2, and the PMM-3. For example, in the case where the PMM-0 has received a packet relating to the PMM-3 (corresponds to Step 1 in FIGS. 99 and 100), the GOrd in the packet are "8" and "9". Therefore, a range of values larger than the values of GOrd of the other PMM does not exist for the array GOrd of the relevant PMM in view of any values of the GOrd in the packet, that is "φ". Accordingly, a value to be added to the array SetAggr does not exist (or the value to be added is "0"). This applies to the packets of the other PMMs. Therefore, in the case of performing the process of FIGS. 96 and 97, since the value to be added (merged value in Step 9703) to each of the values of the array SetAggr is "0", the values of the array SetAggr are [0, 2, 2] which have not changed from those before the process (FIG. 101).

Referring to FIG. 102, in the case where the PMM-1 has received the packet relating to the PMM-0, the values of the GOrd in the packet are "0", "1", and "2". For example, with respect to the value "0", since the first value of the array GOrd of the relevant PMM is "3", the elements from the first value are included in a range of the values. Therefore, with respect to the value "0" of GOrd relating to the PMM-0, the value "2" of Count combined is the value to be added to all the values of the array SetAggr.

With respect to the values "1" and "2" of GOrd relating to the PMM-0, since the first value of the array GOrd of the relevant PMM is 3, the elements from the first value are included in a range of the values. Therefore, with respect to the values "1" and "2" of GOrd relating to the PMM-0, the values of Count which are combined with the values "1" and "2" are the values to be added to all the values of the array SetAggr. In this case, the values of the Count are "0", the value to be added to each of the values of the array SetAggr is "0".

Also, as a result of executing the process of FIGS. 96 and 97 after receiving the packets relating to the PMM-3 and PMM-2, each of the values to be added to the array SetAggr becomes "0".

Therefore, the merged value to be added to the first value of the array SetAggr becomes "2", and the merged value to be added to the next value becomes "2" also. As a result, the values of the array SetAggr become [2, 2].

As shown in FIGS. 103 and 104, it is apparent that the process is executed in each of the PMM-2 and the PMM-3 in the same manner to calculate merged values to be added to the values of the array SetAggr, thereby obtaining final values of the array SetAggr.

FIG. 40 is a diagram showing data relating to the table 1 in each of the PMM-0 to PMM-3 after executing the above-described process. FIG. 41 is diagram showing logical table format of the data of the table 1. FIG. 42 is a diagram showing data relating to the table 2 in each of the PMM-0 to the PMM-3 after executing the above-described process. FIG. 43 is a diagram showing logical table format of the data of the table 2.

[Another Method for Generation of Arrays Count and Aggr]

In the above-described example, in each of the PMMs, the packet containing the combination of the GVNo of the relevant PMM and the corresponding occurrence count is sent to the bus in the predetermined direction (see Step 2502 of FIG. 25 and FIG. 29A), after counting up the slave table (see FIGS. 26 to 28). In this example, in the case where a value identical to any of the GVNo values of the relevant PMM exist in the received packet, the occurrence count combined with the received GVNo value is added to the count value in the count array corresponding to the relevant PMM's GVNo value. However, this process may be omitted so that a packet containing a combination of the GVNo' of the relevant PMM value and a corresponding value (occurrence count) of the array Count generated in relation to the slave table in each of the PMMs is sent to each of the other PMMs to generate the arrays Count and Aggr relating to the maser table in the other PMMs. According to this process, it is possible to omit the packet transmission step shown in FIGS. 29A to 29D.

FIG. 85 is a diagram showing a state in which the packet constituted of (value of GVNo, value of Count) relating to the table 2 is sent from each of the PMM-0 to the PMM-3 to the PMM-0, and FIG. 86 is an illustration of how to obtain a final count array Count and a final aggregation array Aggr in the PMM-0. FIG. 85 and FIG. 86 substantially correspond to FIG. 31 and FIGS. 33A and 33B. Please note that the occurrence count corresponding to the GVNo' value is different in the packet sent from the PMM-1 as compared to the example of FIG. 31. This is because the process of organizing the numbers of appearances having the identical GVNo' value in any one of the PMMs as shown in FIGS. 29A to 29D is omitted in this method. Also, by the same reason, a packet of a combination of the value 4 of the GVNo' and the corresponding occurrence count is sent from the PMM-2.

FIG. 87 is a diagram showing a state in which a packet constituted of (value of GVNo, value of Count) relating to the table 2 is sent from each of the PMM-0 to the PMM-3 to the PMM-1, and FIG. 88 is an illustration of how to obtain a final count array Count and a final aggregation array Aggr in the PMM-1. FIG. 87 and FIG. 88 substantially correspond to FIG. 34 and FIG. 35.

FIG. 89 is a diagram showing a state in which a packet constituted of (value of GVNo, value of Count) relating to the table 2 is sent from each of the PMM-0 to the PMM-3 to the PMM-2, and FIG. 90 is an illustration of how to obtain a final count array Count and a final aggregation array Aggr in the PMM-2. FIG. 89 and FIG. 90 substantially correspond to FIG. 36 and FIG. 37.

FIG. 91 is a diagram showing a state in which a packet constituted of (value of GVNo, value of Count) relating to the table 2 is sent from each of the PMM-0 to the PMM-3 *f* to the PMM-3, and FIG. 92 is an illustration of how to obtain a final count array Count and a final aggregation array Aggr in the PMM-3. The FIG. 91 and FIG. 92 substantially correspond to FIG. 38 and FIG. 39.

With the use of this method, it is possible to generate the arrays Count and Aggr relating to the master table, too, as shown in FIGS. 86, 88, 90, and 92.

[Array Value Readout Process]

Hereinafter, data readout from data in the form shown in FIGS. 40 and 42 will be described. FIG. 44 is a flowchart showing process executed by each of the PMMs for the readout process.

The PMM initializes a readout request record number RNo to "0" (Step 4400). Then, it is determined whether or not a value which is equal to or smaller than the RNo and is largest in SetAggr values (hereinafter also referred to as value A) (Step 4401) exists. If it is determined "No" in Step 4401, RNo is incremented (Step 4402).

If it is determined "Yes" in Step 4401, the PMM specifies a Count value (hereinafter also referred to as value "C") at a position indicated by the VNo from the OrdSet value corresponding to the SetAggr and a VNo value at a position specified by the OrdSet value (Step 4403). From the Count value, it is apparent that the number of the records existing in a table to be created is "C".

Then, the PMM determines whether or not RNo<(A+C) (Step 4404) is true. If it is determined "No" in Step 4404, the process proceeds to Step 4402. If it is determined "Yes" in step 4404, the PMM refers to the Aggr value at a position corresponding to the Count value as a base for referring to the table 2 (Step 4405). This Aggr value is also referred to as "Base" in the following description. The value "Base" is the base for the values of GOrd of the table 2.

Then, the PMM advances process for specifying the values of the table 2. An offset value Offset relating to the table 2 is calculated by (RNo-A) (Step 4406). Then, in the GOrd values of the table 2, a value coinciding with (Base+Offset) is specified (Step 4407), and the VNo value in the table 2 indicated by an OrdSet value at a position same as that of the specified value is specified (Step 4408).

In Step 4408, since the VNo can be specified from the OrdSet value of table 1 in Step 4403, it is possible to take out the VL value of table 1. The VL value is not limited to the values relating to the unified items and can be values of other items. Also, in Steps 4407 and 4408, VNo values of the table 2 are specified from the OrdSet values of the table 2. Therefore, it is possible to take out the VL values of the table 2 in the same manner. The values taken out from the table 2 can be allocated in the table as the values of the table 2 (Step 4409). With respect to the table 2 serving as the slave table, it is possible to specify the VL values not only in the values of the unified items but also in values of other items.

Each of FIGS. 45 to 50 is a diagram showing a state of the readout process in each of the PMM-0 to the PMM-3. Also, each of FIGS. 51A to 51F is a diagram showing a join table read out when the process of FIGS. 45 to 50 is terminated.

By merging the tables read out in the process steps, it is possible to ultimately obtain a joined table (view) as shown in FIG. 52.

[Multi-Item Join]

It is possible to realize join process with the use of plural items as key items in addition to the join process using one item as the key item. The join process using plural items as the key items is referred to as "multi-item join" in this specification. For example, a case of creating a joined table by joining the items "sex" and "E sex" and joining the items "age" and "E age" under the table format data (and data segregation to PMMs) shown in FIGS. 13A to 15 and the table format data (and data segregation to PMMs) shown in FIGS. 53 to 55. FIG. 56 shows a table (view) generated as a result of the join process. In this example, since the sort order of the items "sex" and "age" is retained, the tables including the items are used as the master table (hereinafter also referred to as table 1), and the tables including the items "E age" and "E sex" are used as the slave table (hereinafter also referred to as table 2).

In the multi-item join, a unified global value number array GVNo' is generated for each of the items to be joined. More specifically, the process described with reference to FIGS. 20 to 24 is executed in each of the PMMs. In the foregoing example, the result of unifying GVNo' in the items "sex" and "E sex" is shown in FIG. 57, and the result of unifying GVNo' in the items "age" and "E age" is shown in FIG. 58. Shown in FIG. 59 is a state of the master table after unifying each of GVNo', and shown in FIG. 60 is the slave table after unifying GVNo'.

Then, with respect to the master table, the unified value number arrays GVNo' of the items "sex" and "age" are joined to generate GVNo relating to the item "sex×age". FIG. 61 is a flowchart schematically showing the generation of GVNo relating to the joined items. As shown in FIG. 61, each of the PMMs generates an intermediate list in which GVNo' values corresponding to the values of the ordered set OrdSet of one of the items to be joined are stored (Step 6101). In FIG. 62, values are taken out from the ordered set array OrdSet of each of the PMMs to use the value of the pointer array VNo relating to the item "sex" indicated by the taken out value for specifying the GVNo' value at a position indicated by VNo value. The PMM allocates the specified GVNo' value in the intermediate list relating to the item "sex" and the position corresponding to the position of the OrdSet value (see the arrow of FIG. 62). This process is executed for each of the values of OrdSet to accomplish the intermediate list relating the item "sex".

Likewise, the PMM generates an intermediate list in which GVNo' values corresponding to the values of the ordered set OrdSet for the other one of the items to be joined (Step 6102). FIG. 63 is an illustration of the generation of the intermediate list relating to the item "age" in the above-described example.

A value list VL of the joined item is generated in each of the PMMs (Step 6103). In the value list VL of the joined item, the values of the intermediate list of one of the items and the values of the intermediate list of the other item are sorted to achieve a predetermined order (ascending order, for example) of the one of the items. In FIG. 64, VL of the item "character× age" on the right is the value list of the joined item. In this example, the combination of the values of "character" and the values of "age" are sorted to achieve an ascending order in the item "character". Of course, the order of the pointer array VNo is sorted in accordance with the rearrangement.

After this process, a global value number array GVNo relating to the joined item is generated by compile process among the PMMs (Step 6104). The compile process among the PMMs is executed in the manner described above with reference to FIGS. 8 to 12. FIG. 65 is a diagram showing the global value number array GVNo generated by the above example.

Each of the PMMs generate GVNo relating to the joined item ("sex×age") by joining the unified value number array GVNo' of the joined items ("sex" and "age" in the above example) for the slave table. FIG. 66 is an illustration of generation of an intermediate list of the item "E sex" of the slave table, FIG. 67 is an illustration of generation of an intermediate list of the item "E age" of the slave table, FIG. 68 is an illustration of generation of a value list of a joined item "E sex"×"E age" by compile process of the joined item in each of the PMMs, and FIG. 69 is an illustration of generation of a global value number array GVNo of the joined item by inter-PMM compile process.

A process after this is the same as the single item join process described in the foregoing. In this example, sort of the slave table, count up of the slave table, process relating to the master table, and readout of array values are executed for the joined item.

[External Join]

Hereinafter, an external join process will be described. In the external join process, in the case where a matching key does not exist in a counterpart table (slave table), the position is left as a blank record. In the join process described above (which is also referred to as internal join), the record is deleted in the case where the matching key does not exist in the counterpart table. In turn, in the external join, the blank record is inserted to keep the record of the relevant table.

When the external join is executed under the table format data (and data segregation to the PMMs) shown in FIGS. 13A to 15, a table (view) shown in a lower part of FIG. 70 is generated. From the lower part of FIG. 70, it is apparent that there are the blank frames in the joined table in the case where matching keys do not exist in the slave table (table 2).

In the external join process, generations of the count array Count and the aggregation array Aggr in the master table (table 1) for achieving consistency with the table 2 serving as the slave table are slightly different from the internal join.

In the external join, in the case where the value of Count is "0" when the count array Count and the aggregation array Aggr are obtained in each of the PMMs (see FIGS. 33A, 33B, 35, 37, and 39), the value is changed to "1" and a value at a corresponding position in the aggregation array Aggr is changed to "−1". This is performed for the purpose of reserving a display region for displaying the blank record in the case where a matching key does not exist in the master table. The value of Aggr is changed to "−1" in order to indicate that the blank region must be formed when creating a view by giving such impossible value.

Referring to FIG. 71 (particularly the right part), it is apparent that the values of the elements having the Count value of "0" and the corresponding Aggr values in FIGS. 33A, 33B, 35, 37, and 39 are changed to "1" and "−1" respectively as a result of the external join process.

FIG. 72 is a diagram showing a state in which necessary arrays such as the count array Count and the aggregation array Aggr are generated in the table 1 (master table), and FIG. 73 is a diagram showing a state in which necessary arrays such as the count array Count and the aggregation array Aggr are generated in the table 2 (slave table).

After the generation of the necessary arrays, values in the arrays are read out in each of the PMMs. The values are read out based on the process shown in FIG. 44 basically in the same manner as in the internal join process, but there is a different step which is performed when the Aggr value is "−1". As shown in FIG. 74, in the state where Step 4405 is terminated, each of the PMMs determines whether or not the value "base" is "−1" (Step 7401). When it is determined "No" in Step 7401, the process proceeds to Step 4406. In turn, when it is determined "Yes" in Step 7401, the PMM allocates information indicating the absence state of value such as a symbol "−" in the corresponding position of the table 2 (Step 7402) to return to Step 4402.

Each of FIGS. 75 to 77 is a diagram showing a state of the readout process in the PMM-0 to PMM-3. Examples of FIGS. 75 and 76 are the same as those of the internal join process (see FIGS. 45 and 46). In the example shown in FIG. 77, SetAggr Value (=2) equal to or lower than "RNo (=2)" exists in PMM-0 (see Step 4401), and "RNo (=2)<A+C (=2+1)" holds in PMM-0 (Yes in Step 4404). However, since the Aggr value (Base) is "−1", no value exists in the table 2. Therefore, "record of JOIN table=2" of FIG. 78 is indicated for the table 2. FIG. 78 is a diagram showing values of the table 1 and values of the table 2 in each of records of the joined table. As shown in FIG. 78, "−" is given for convenience sake as a value for the absence of value in table 2. By combining this process, it is possible to obtain the table (view) shown in the lower part of FIG. 70.

[Search and Other Process]

In this embodiment, it is possible to perform a search process and a sort process of a join table. In the search process, GOrd and OrdSet are refined with the use of a key item of the search process, followed by executing join in the refined state. The table format data (and data segregated to PMMs) shown in FIGS. 13A to 15 and the table format data (and data segregated to PMMs) shown in FIGS. 16A to 18 are considered. In this example, after searching with the use of a key item (sex, for example), only a combination of a GOrd value and an OrdSet value of which a GVNo value of the item "sex" is "1" (female) is taken out. It is possible to obtain a combination of values shown in the left part of FIG. 80 by executing a process relating to the internal join for the items "age" and "E age" in this state, and it is possible to obtain a table (view) shown in the right part of FIG. 80 based on the value combination.

Also, it is possible to accomplish a sort process of the joined table. In the sort process, GOrd values are rearranged in accordance with GVNo with the use of an item serving as a key in the master table. The OrdSet values are replaced in accordance with the replacement of the GOrd values. The table format data (and data segregation to PMMs) shown in FIGS. 13A to 15 and the table format data (and data segregated to PMMs) shown in FIGS. 16A to 18 are considered. A case of executing an internal join process of items "age" and "E age" after the sort process with the use of "age" will be described briefly.

To start with, the master table is sorted with the use of the item "age" as a key. FIG. 81 is an illustration of GOrd and OrdSet before the sort process and GOrd and OrdSet after the sort process. Each of the PMMs uses GOrd and OrdSet after the sort process to generate Count for the slave table (table 2) and to generate necessary arrays (Count, Aggr, SetAggr) for the master table (table 1). FIG. 82 is a diagram showing various arrays relating to the master table, and FIG. 83 is a diagram showing various arrays relating to the slave table. In FIGS. 82 and 83, arrays relating to the items other than "age" and "E age" are omitted.

Values shown in the left part of FIG. 84 are obtained by performing a readout process in the procedure described in the foregoing from the arrays shown in FIGS. 82 and 83, and it is possible to obtain a table (view) shown in the right part of FIG. 84 based on the values.

This invention is not limited to the above embodiments, and it is possible to make various modifications in the scope of this invention recited in claims. It is apparent that such modifications are encompassed by the scope of this invention.

In the foregoing embodiments, the PMMs are connected in the form of a ring with the use of the first bus (first transmission path) for transmitting a packet in a clockwise direction and the second bus (second transmission path) for transmitting a packet in an anticlockwise direction. With such constitution, it is possible to advantageously equalize the delay times of packet transmissions. However, the constitution is not limited to the above-described one, and another transmission path such as a bus type may be used.

Also, though PMMs each having the memory, the interface, and the control circuit are used in this embodiment, the PMMs are not limited to the above-described ones, and personal computers or servers may be used as information processing units to be used in place of the PMMs for segregating local table format data. Alternatively, a constitution may be adopted such that a single personal computer or a single server retains plural information processing units. In such cases, the information processing unit receives values indicating an order of records and refers to a global ordered set array GOrd to specify the records. Also, it is possible to specify an item value by referring to a global value number array.

Further, though each of the PMMs generates a packet from data and sends the packet to the transmission path in the foregoing embodiment, the data may of course be sent in other forms than the packet without limitation to the packet.

Also, the transmission path between the adjacent information processing units may be a so-called network type or a bus type.

In the case of employing the constitution of providing plural information processing units with a single personal computer, it is possible to use this invention as described below. For example, in the case of using table format data of Sapporo branch, Tokyo branch, and Fukuoka branch, processes of search, aggregation, sort, or the like by the unit of branch. Further, by using global table format data obtained by integrating the three branches, it is possible to realize a join process relating to the global table format data by using the table format data of each of the branches as a partial table in the overall table.

Of course, in the case of connecting plural personal computers with the use of a network, it is possible to realize a process relating to local table format data segregated to the personal computers and a process relating to global table format data in the same manner.

Further, in the foregoing embodiments, the table format data are represented by the value list VL in which actual item values are sorted in the predetermined order and the pointer array VNo for value list, in which the numbers of the value list indicated by the record numbers are stored corresponding to the elements of the ordered set array OrdSet. However, the table format data are not limited to the above-descried one, and it is possible to apply this invention to a case of using a value list in which actual item values are sorted and stored in a predetermined order. In unifying of the values in this case, for example, each of the PMMs refers to the value list of items of the master table and the value list of items of the slave table to generate a unified value list considering values included in the value lists of master tables and slave tables of all the other PMMs.

BRIEF DESCRIPTION OF THE DRAWINGS

FIG. 3 is a diagram showing one example of table format data.

Figure 4:
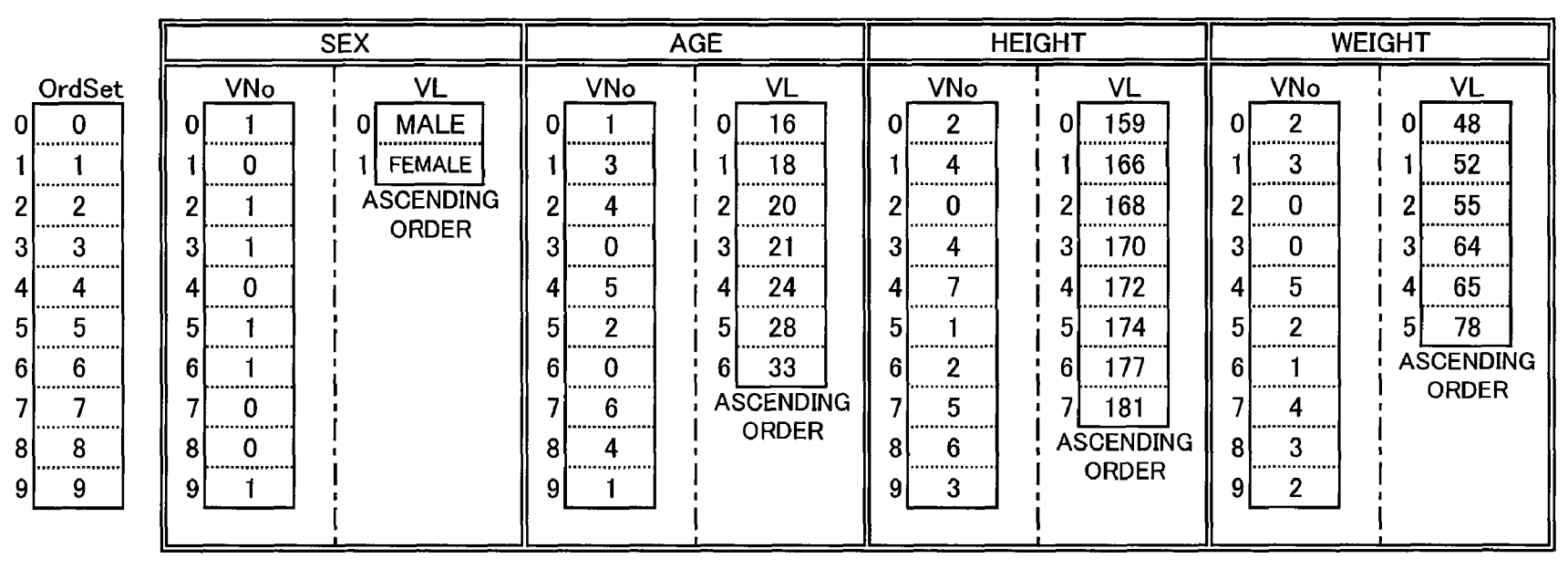

FIG. 4 is an illustration of a principle of a structure for retaining table format data according in this embodiment.

FIG. 5 is an illustration of an array segregated to each of the PMMs and values of the array in this embodiment.

FIG. 6 is a diagram showing one example of table format data initially segregated to each of the PMM-0 to the PMM-4.

FIG. 6 is a diagram showing one example of table format data initially segregated to each of the PMM-0 to the PMM-4.

FIG. 11 is a diagram showing a list to be temporarily stored by each of the PMMs according to this embodiment.

FIG. 13A is a diagram showing a logical structure of one of tables which are joined by a join process, and FIG. 13B is a diagram showing various arrays necessary for representing a table of FIG. 13A with the use of a single computer in accordance with this invention.

FIG. 14 is a diagram showing logical tables segregated to the PMMs.

Figure 15:
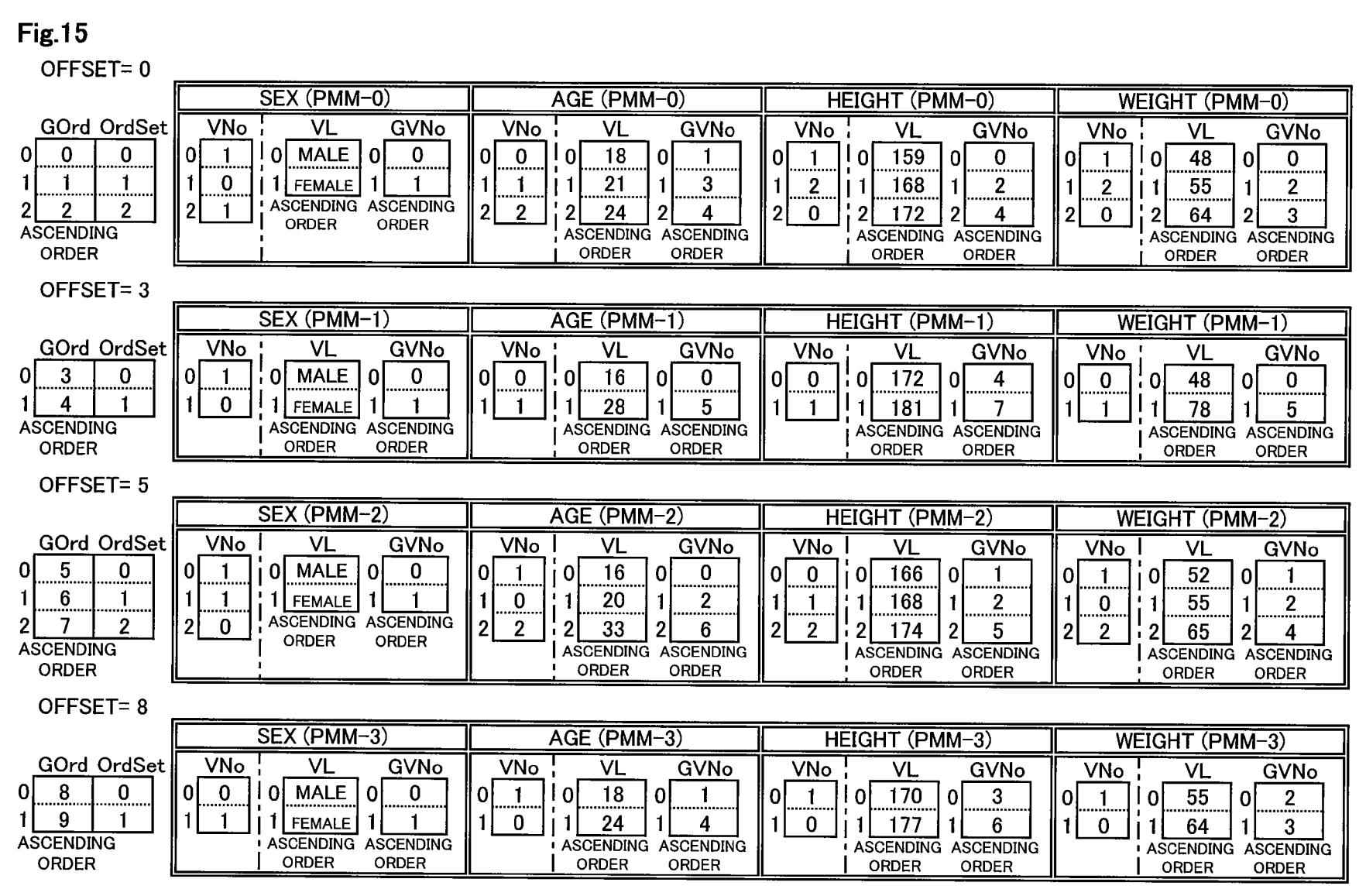

FIG. 15 is a diagram showing actual arrays segregated to the PMMs.

FIG. 16A is a diagram showing a logical structure of the other one of tables which are joined by the join process, and FIG. 16B is a diagram showing various arrays necessary for representing a table shown in FIG. 16A with the use of a single computer.

FIG. 17 is a diagram showing logical tables segregated to the PMMs.

FIG. 18 is a diagram showing actual arrays segregated to the PMMs.

FIG. 19 is a diagram showing a state in which a table (view) is obtained by joining two table format data.

FIG. 26 is an illustration of the slave table count-up process.

Each of FIG. 29A to D is an illustration of a packet transmission for obtaining global count values.

Figure 1:
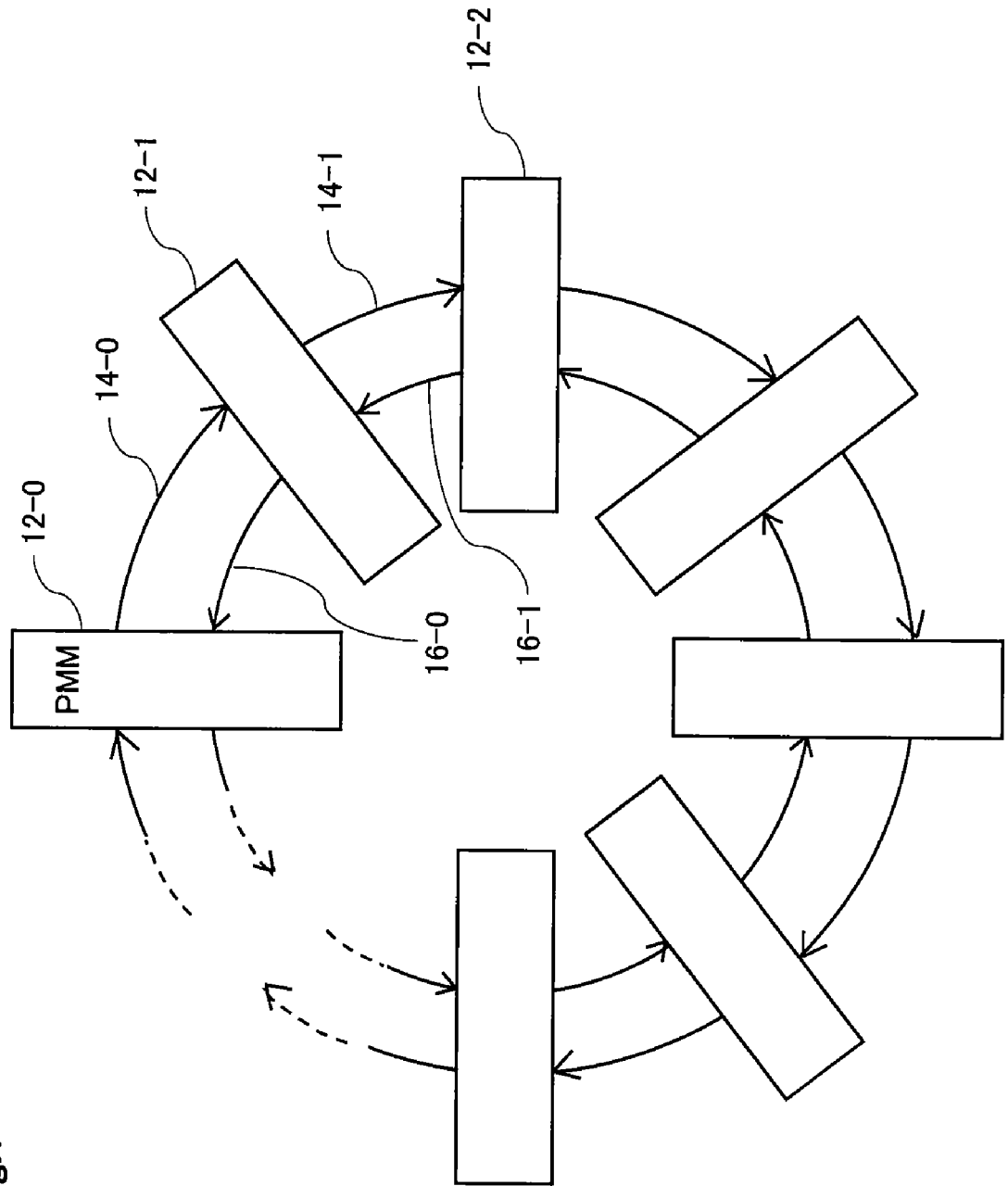
FIG. 1 is a block diagram showing an outline of an information processing system according to one embodiment of this invention.
Figure 2:
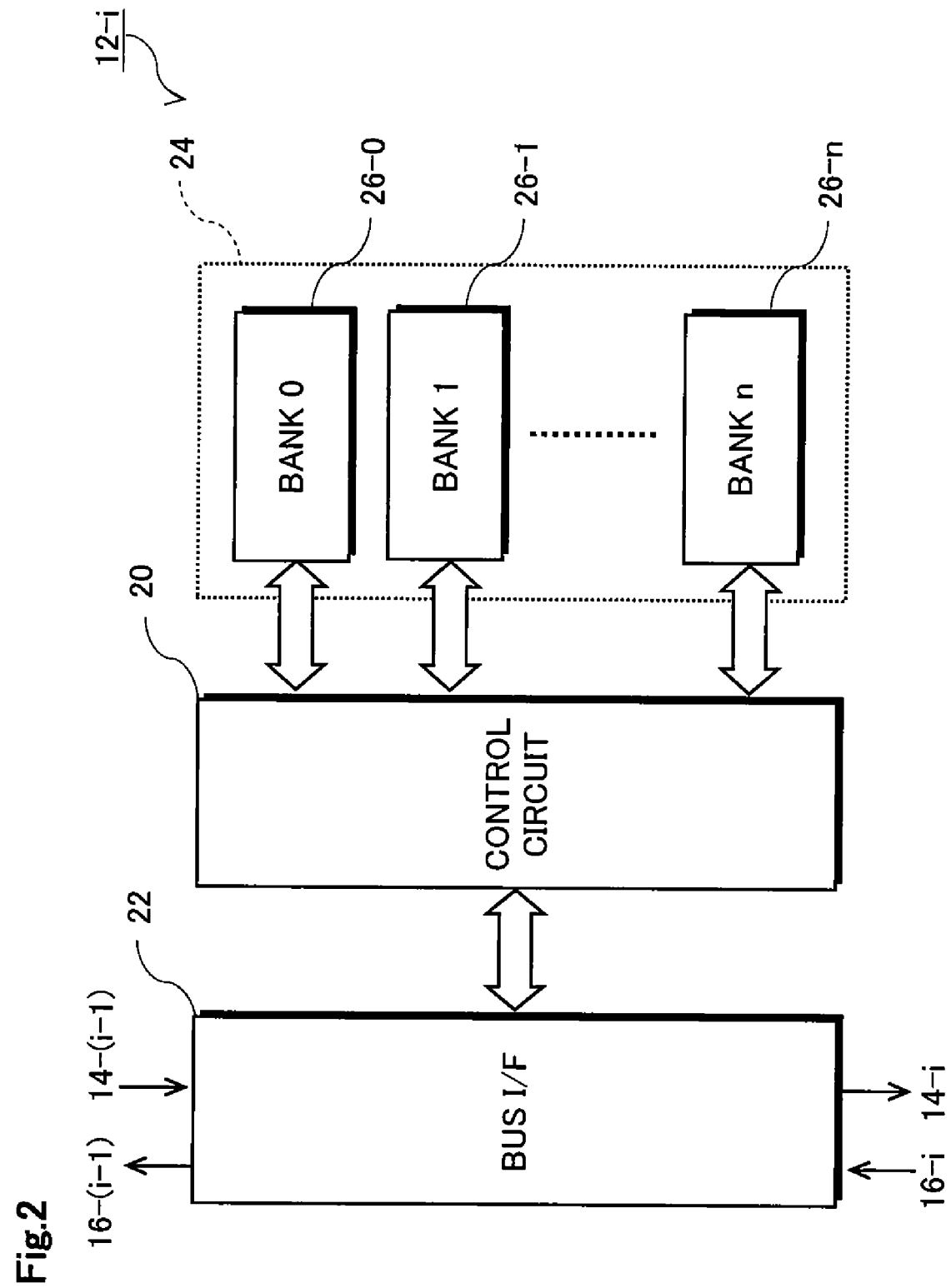
FIG. 2 is a diagram showing one example of a structure of the PMM according to the embodiment of this invention.
Figure 8:
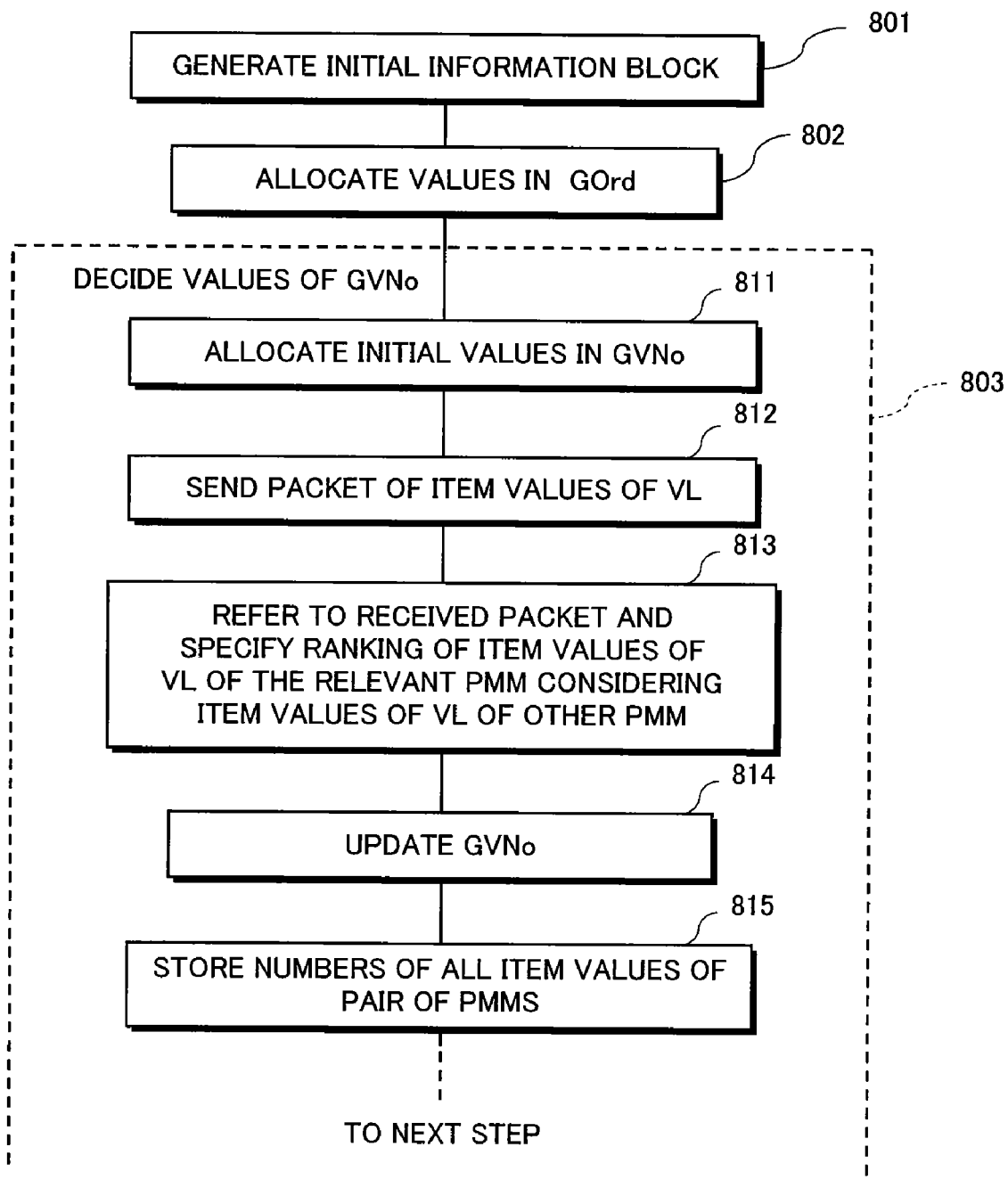
FIG. 8 is a flowchart schematically showing a compile process according to this embodiment.
Figure 9:
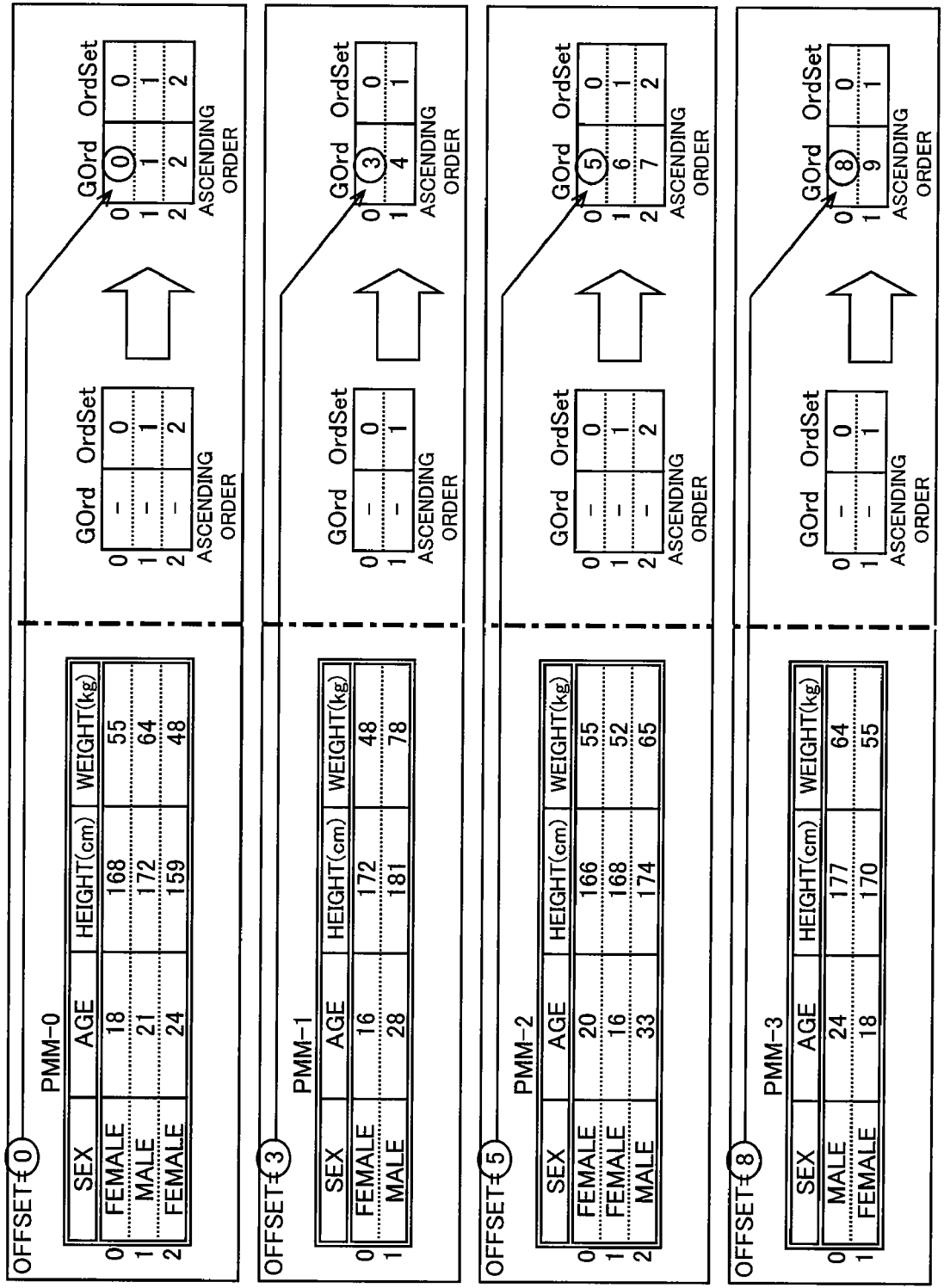
FIG. 9 is a diagram showing allocation of the values in a global ordered set array GOrd in the example shown in FIGS. 6 and 7.
Figure 10:
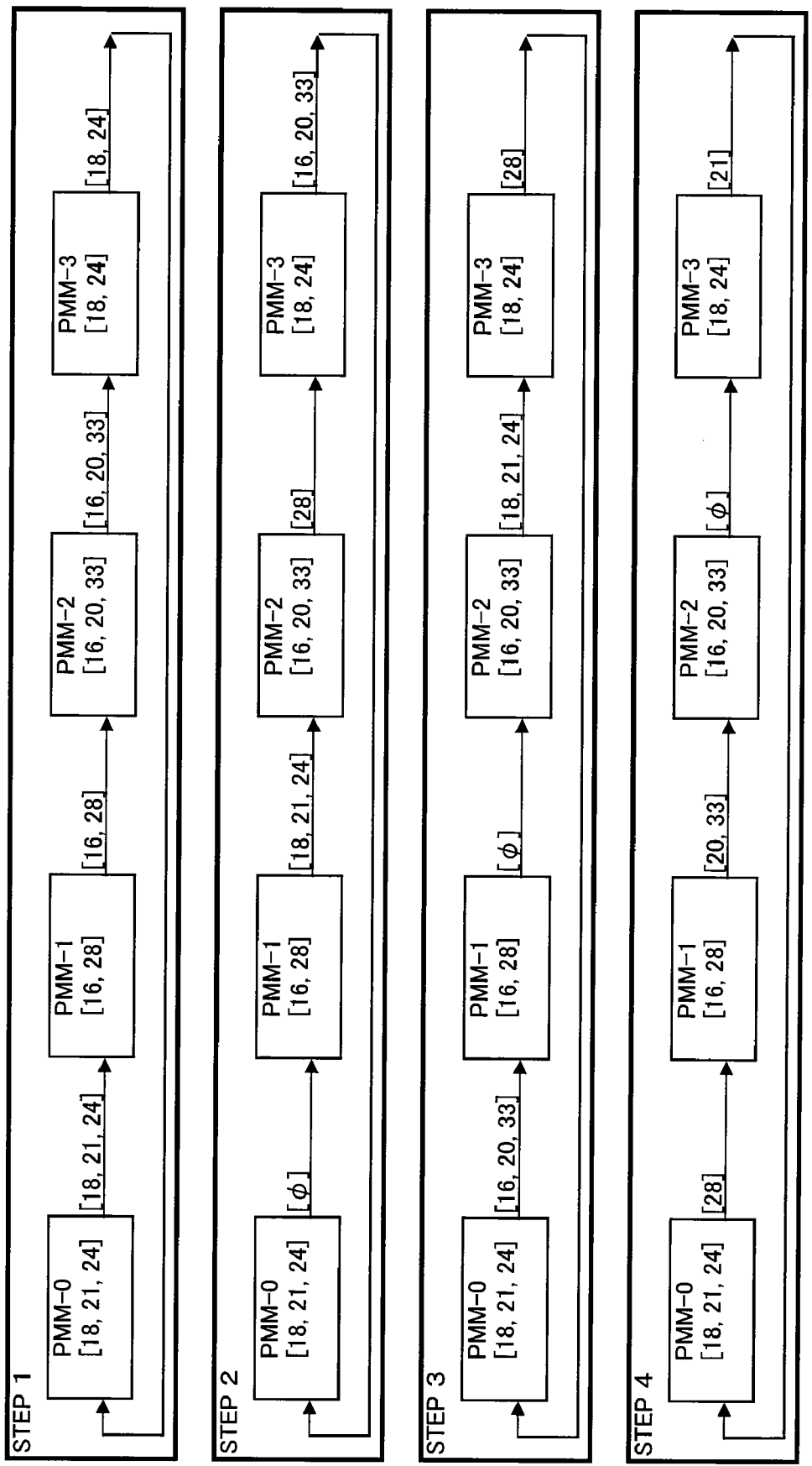
FIG. 10 is a diagram showing stepwise states of the transmitted packet in this embodiment.
Figure 12:
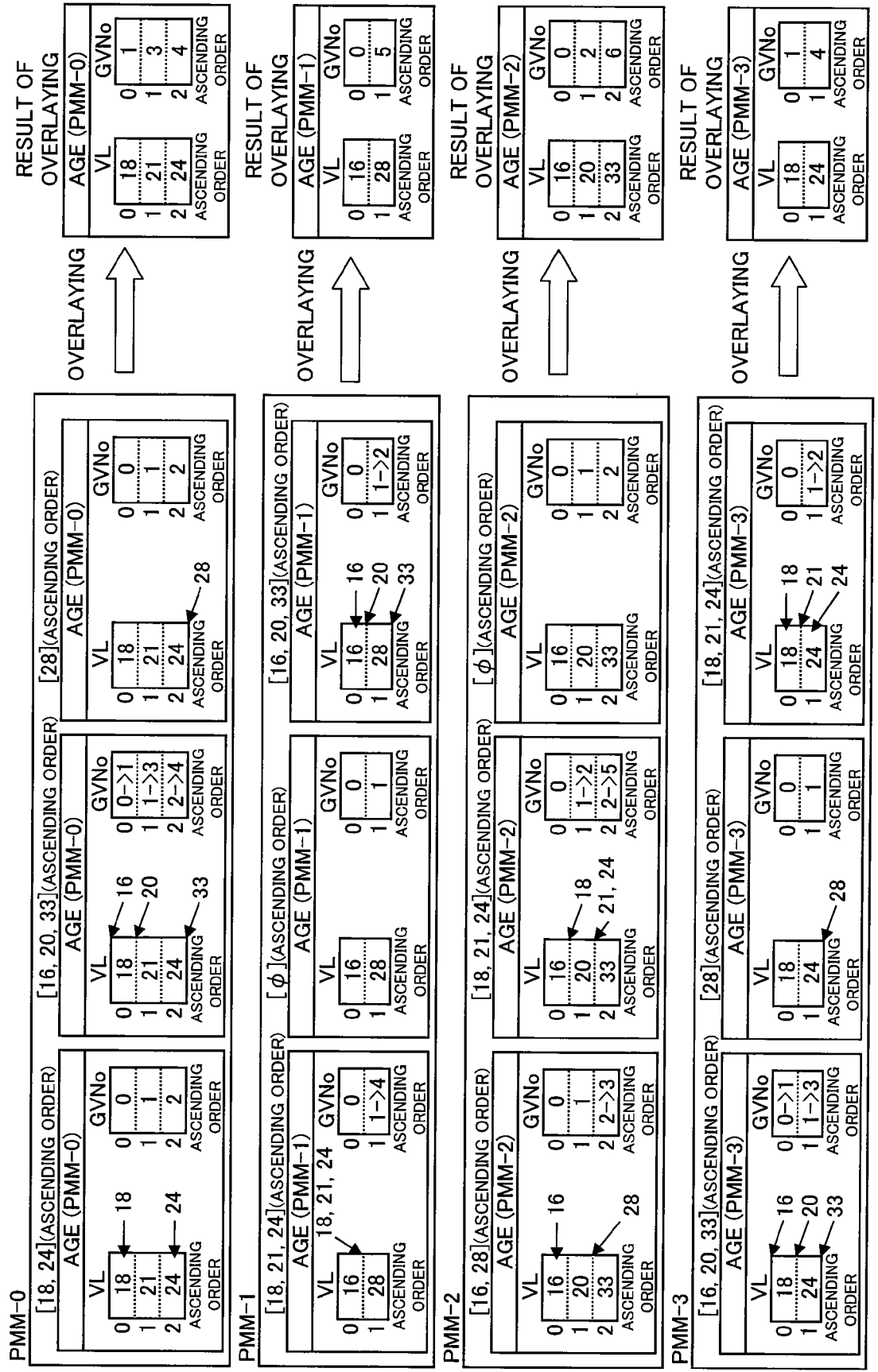
FIG. 12 is an illustration of a process where values of GVNo' are obtained by superposing the values from the temporarily stored array according to this embodiment.
Figure 20:
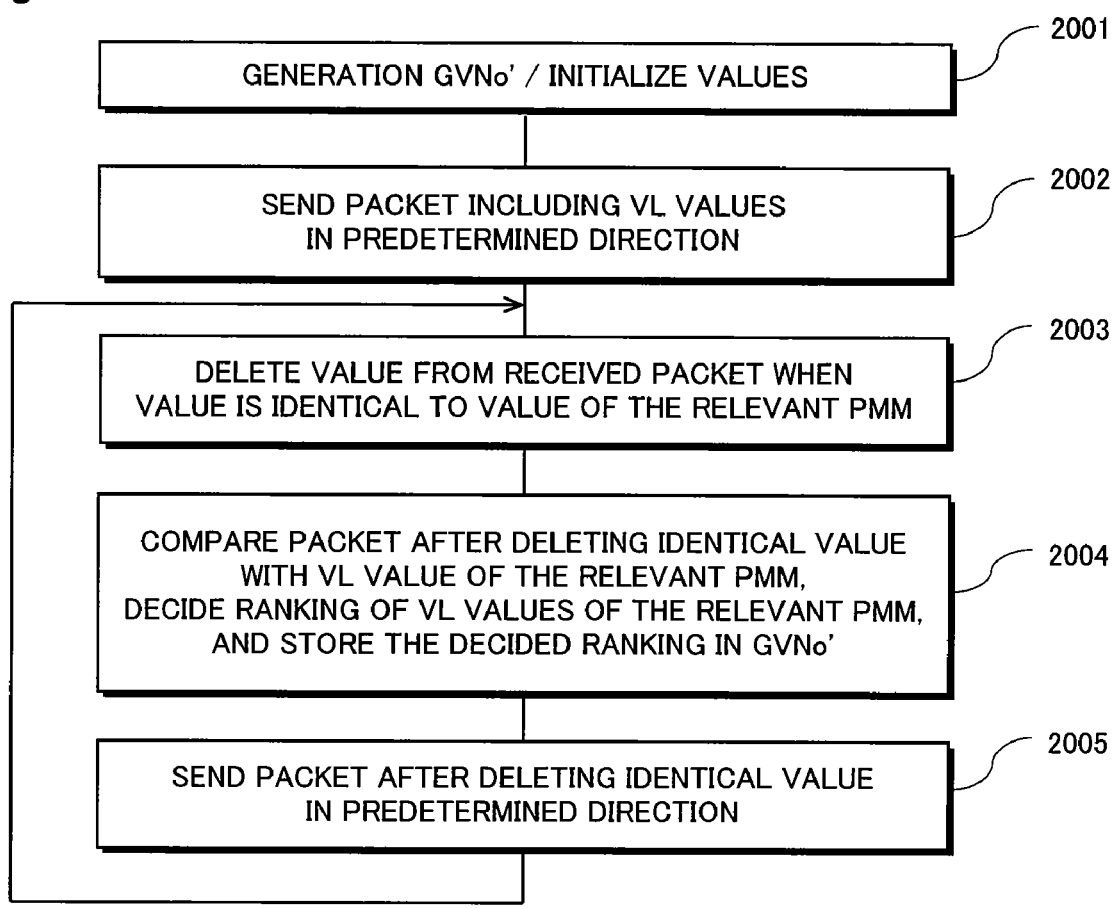
FIG. 20 is a flowchart showing an unification process of global value number array GVNo'.
Figure 21:
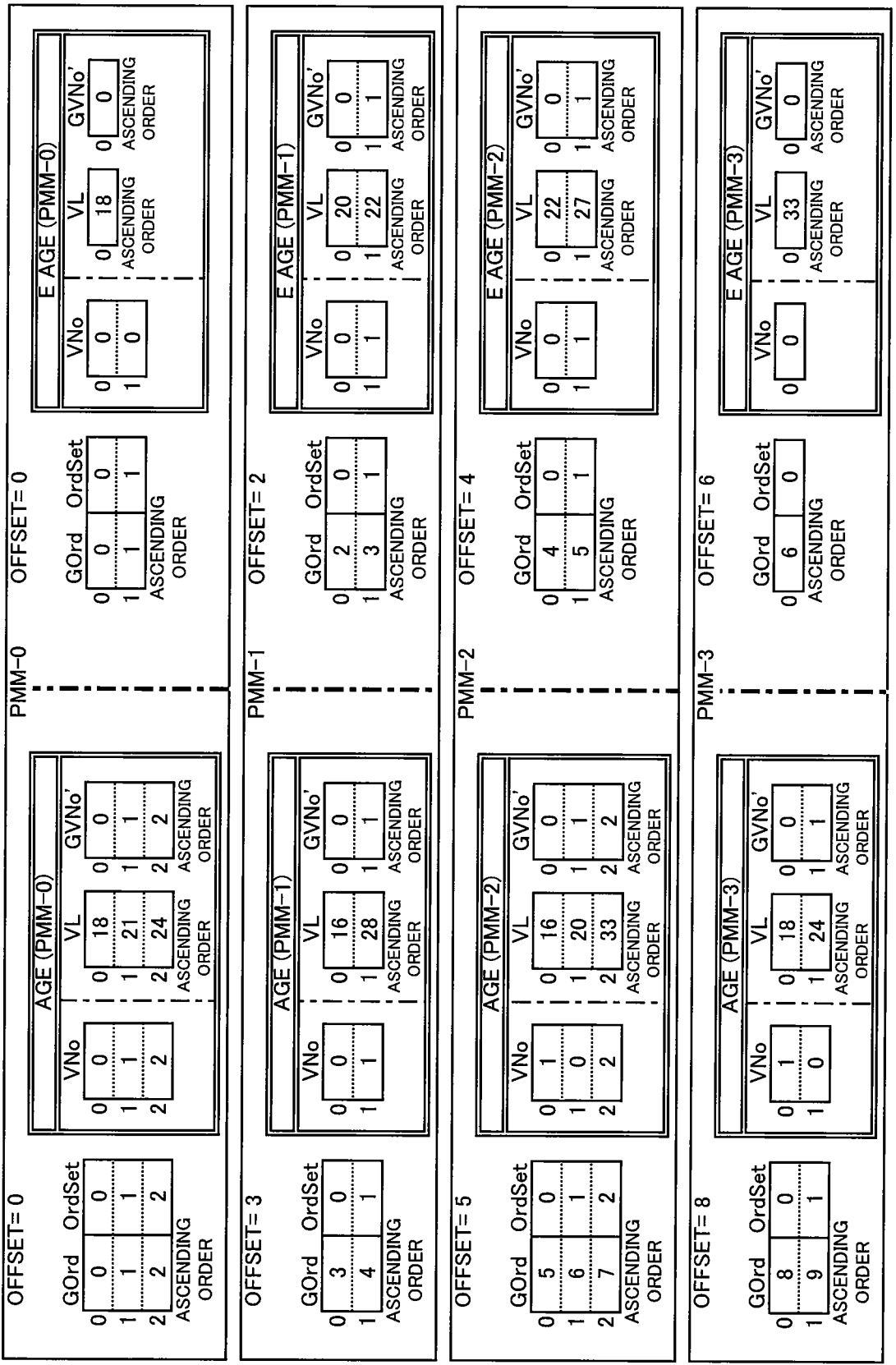
FIG. 21 is an illustration of the unification process of global value number array GVNo'.
Figure 22:
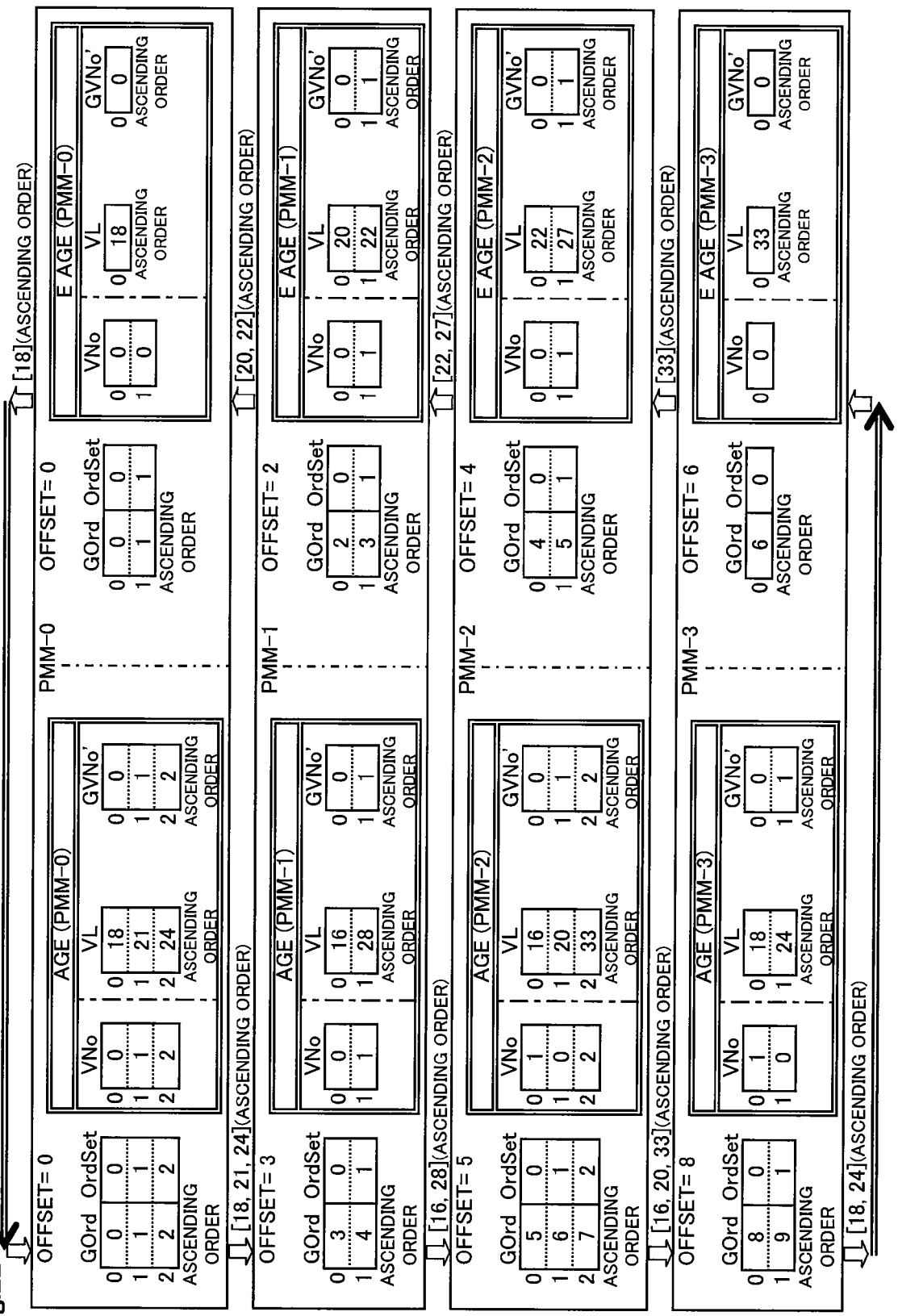
FIG. 22 is an illustration of the unification process of global value number array GVNo'.
Figure 23:
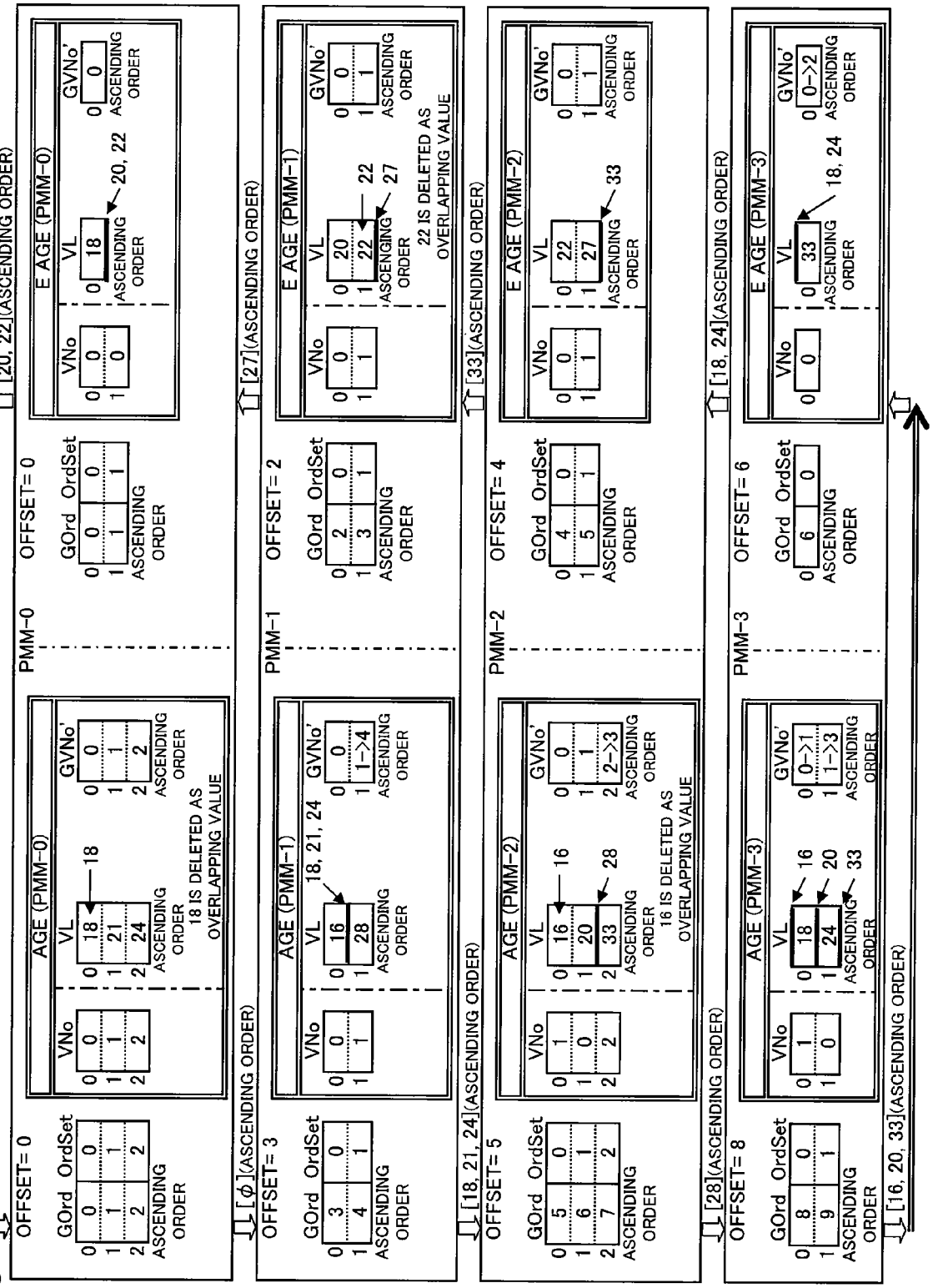
FIG. 23 is an illustration of the unification process of global value number array GVNo'.
Figure 24:
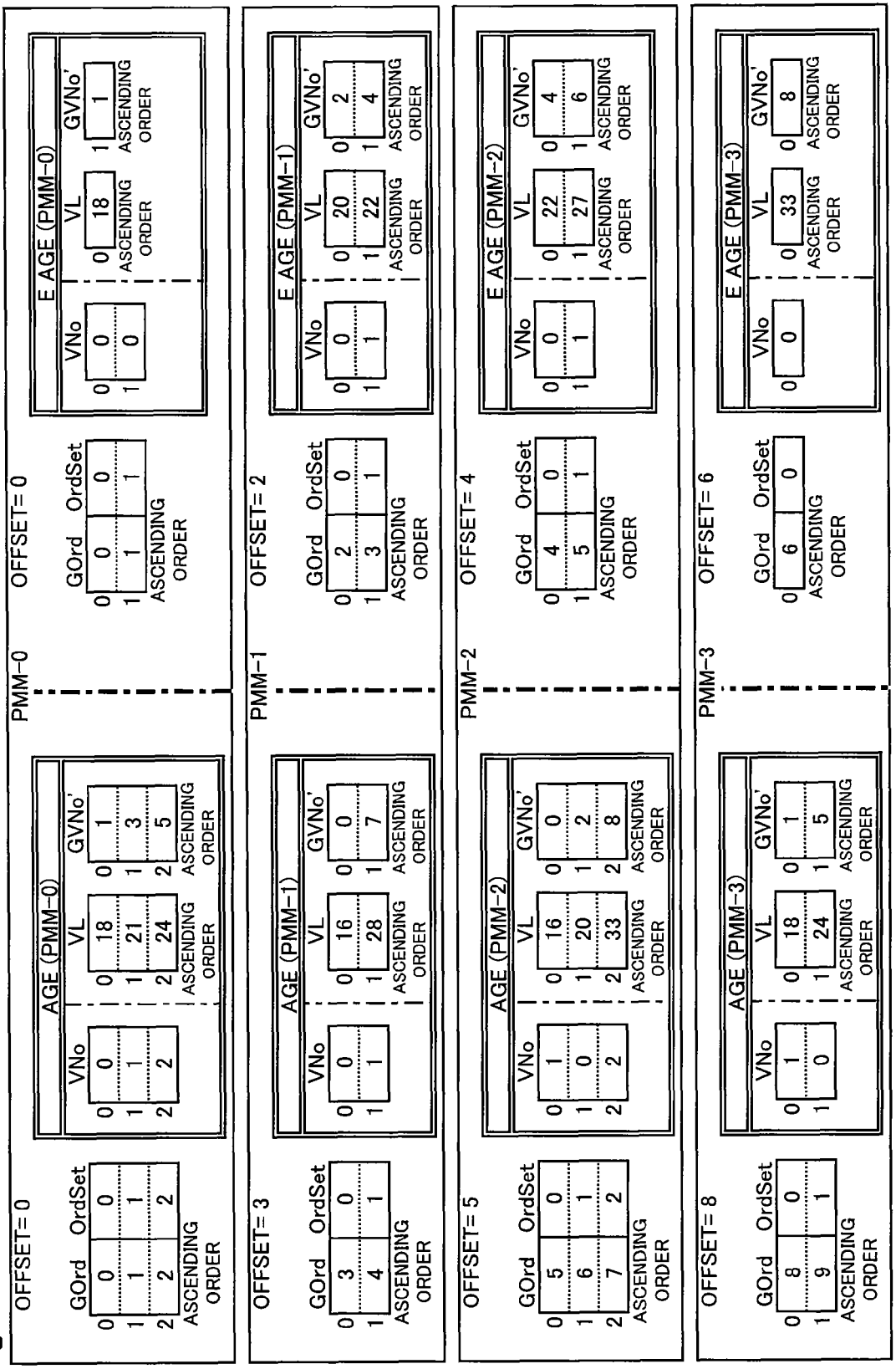
FIG. 24 is an illustration of the unification process of global value number array GVNo'.
Figure 25:
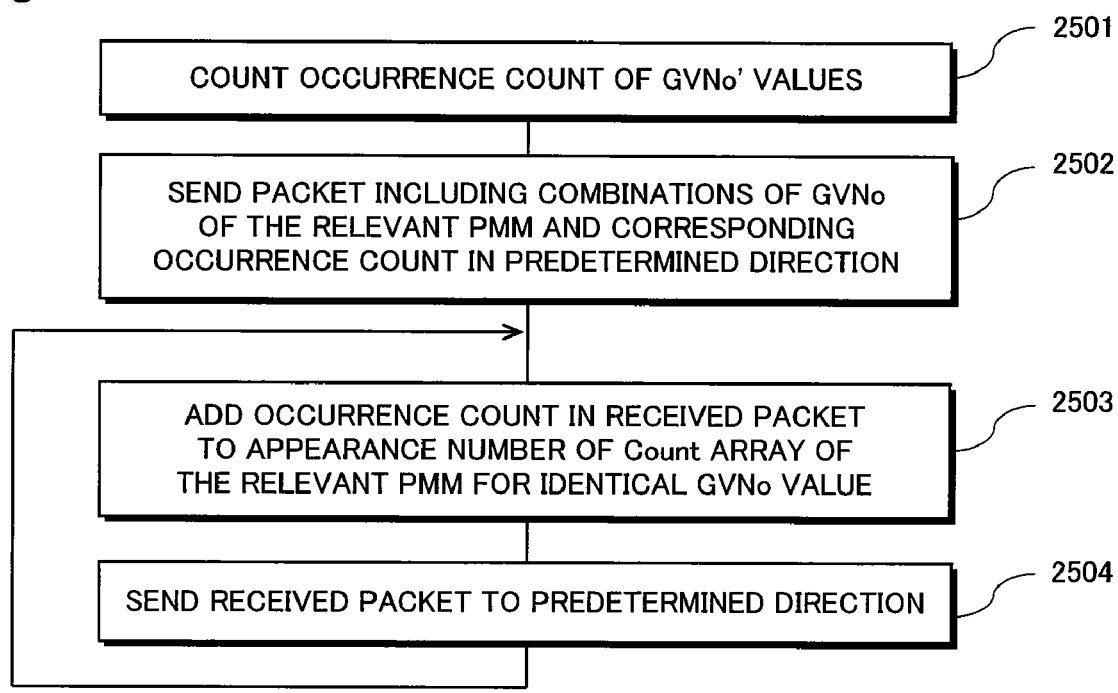
FIG. 25 is a flowchart showing a slave table count-up process according to this embodiment.
Figure 27:
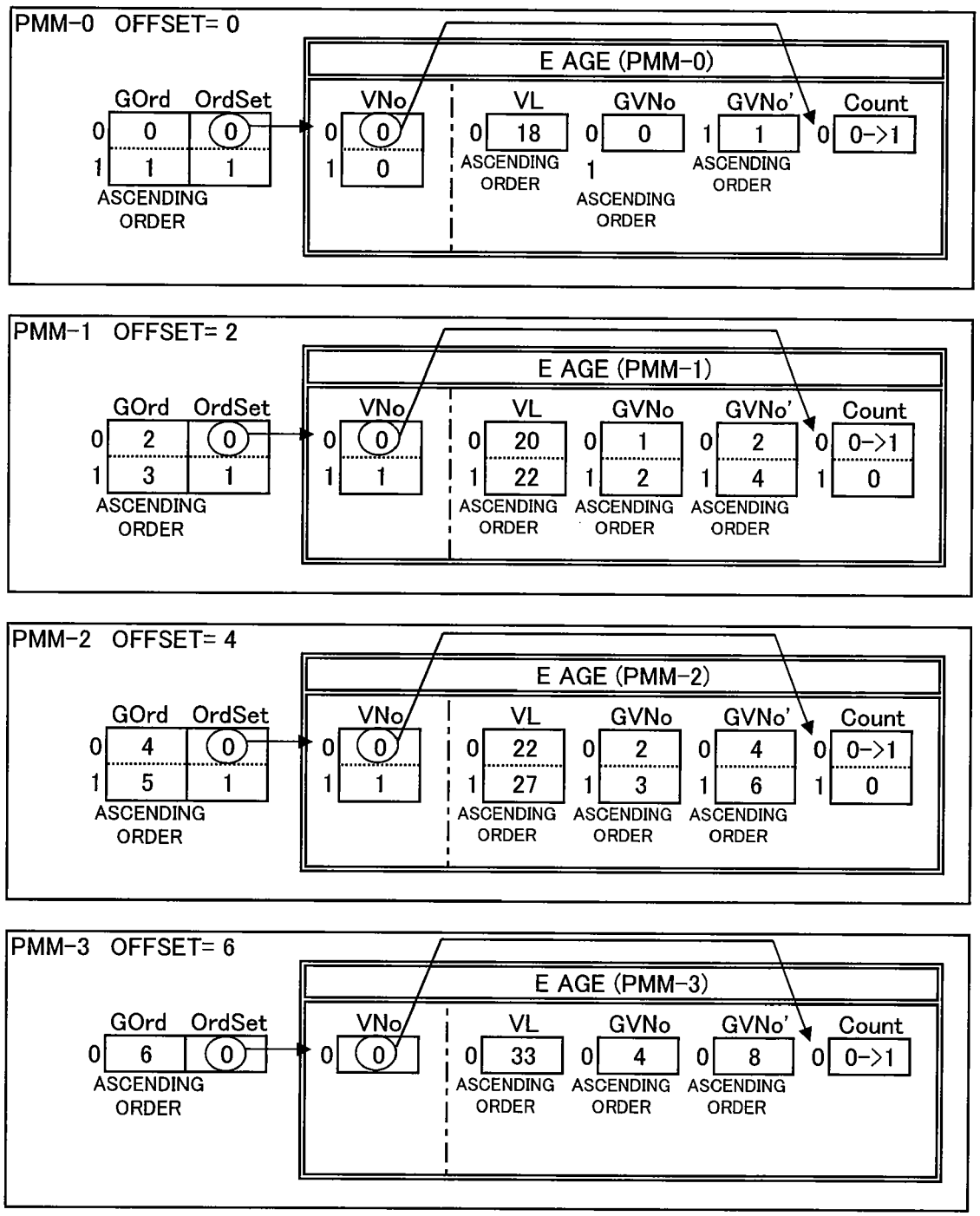
FIG. 27 is an illustration of the slave table count-up process.
Figure 28:
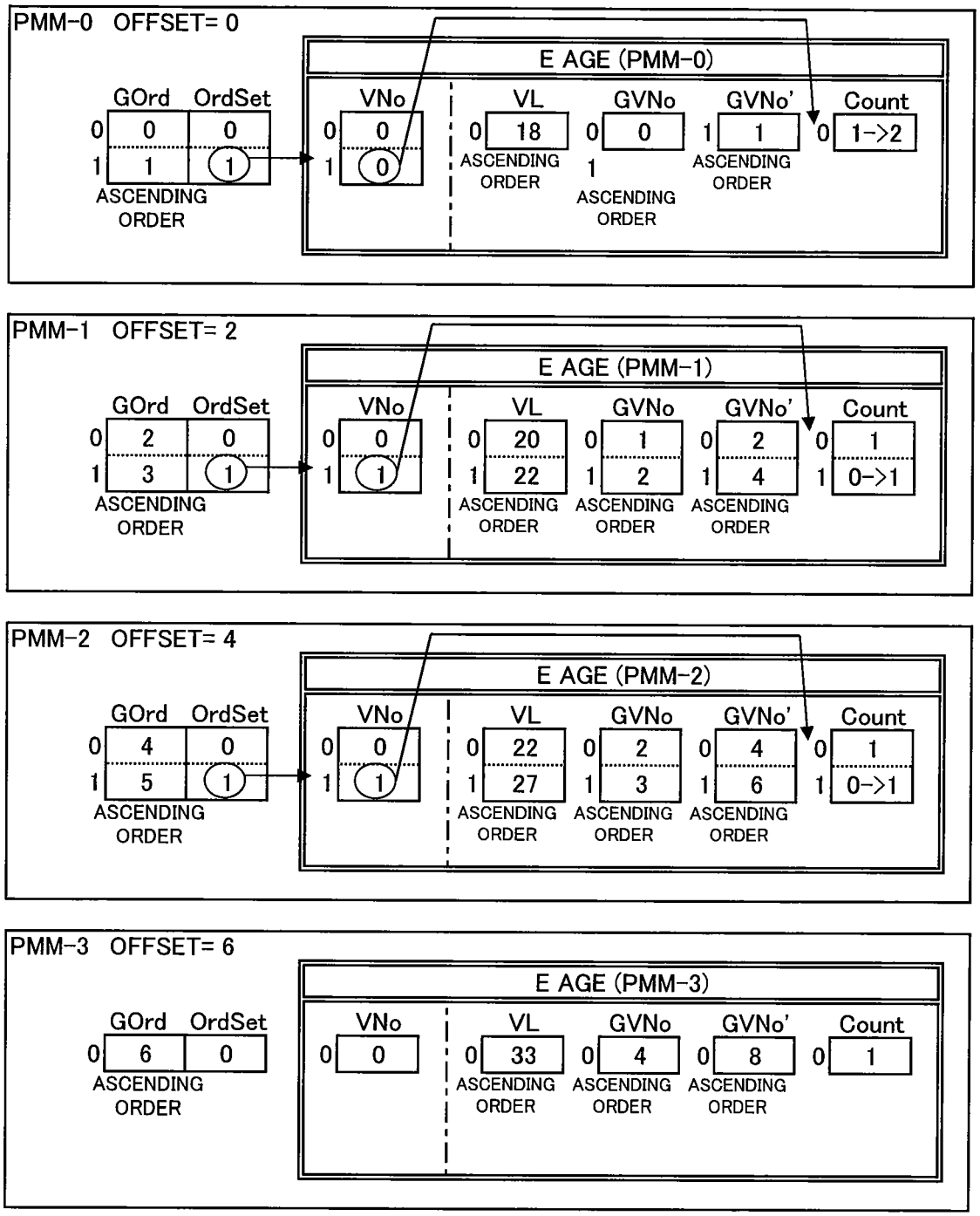
FIG. 28 is an illustration of the slave table count-up process.
Figure 30:
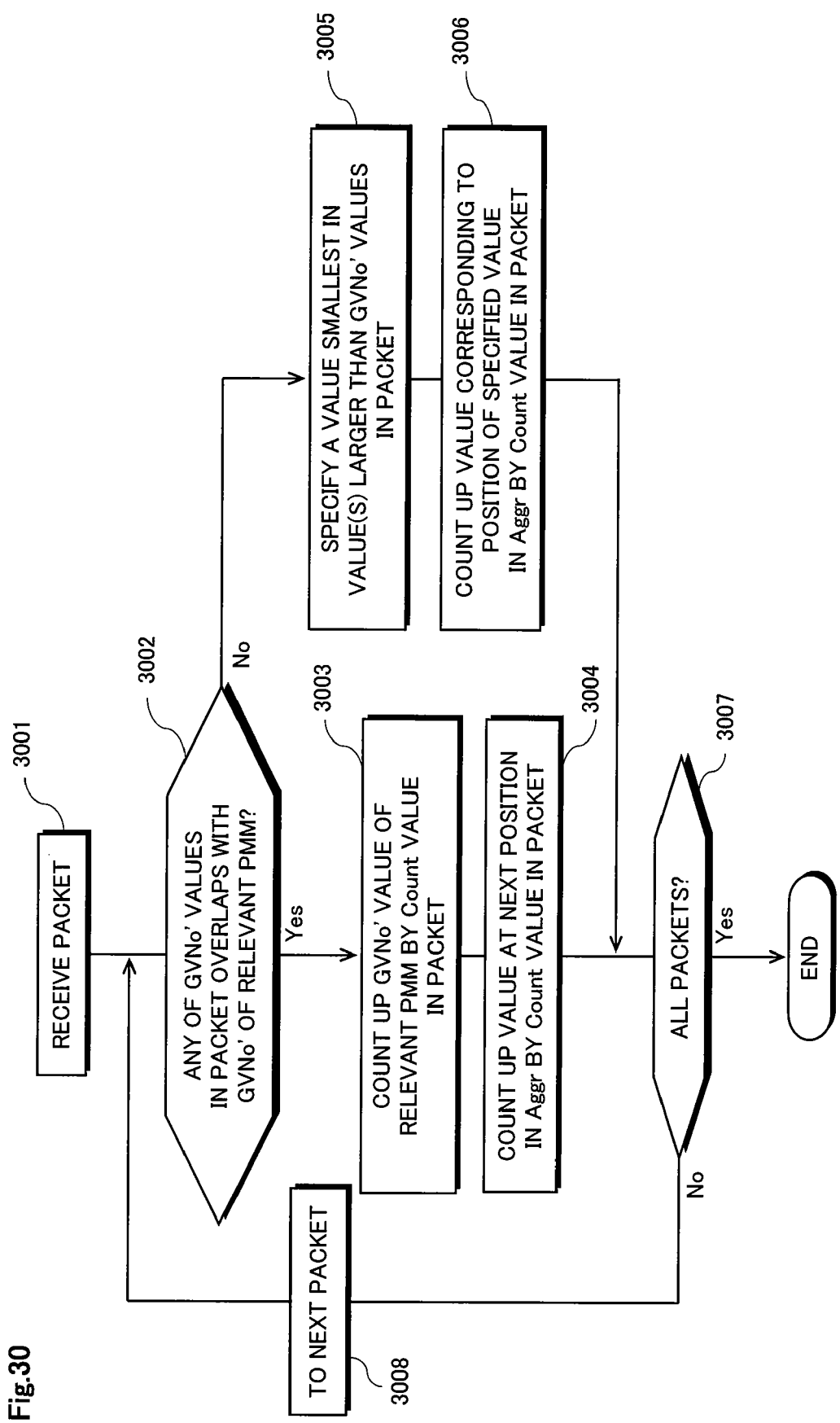

FIG. 30 is a flowchart showing a process executed by the PMM which has received the packet.

Figure 31:
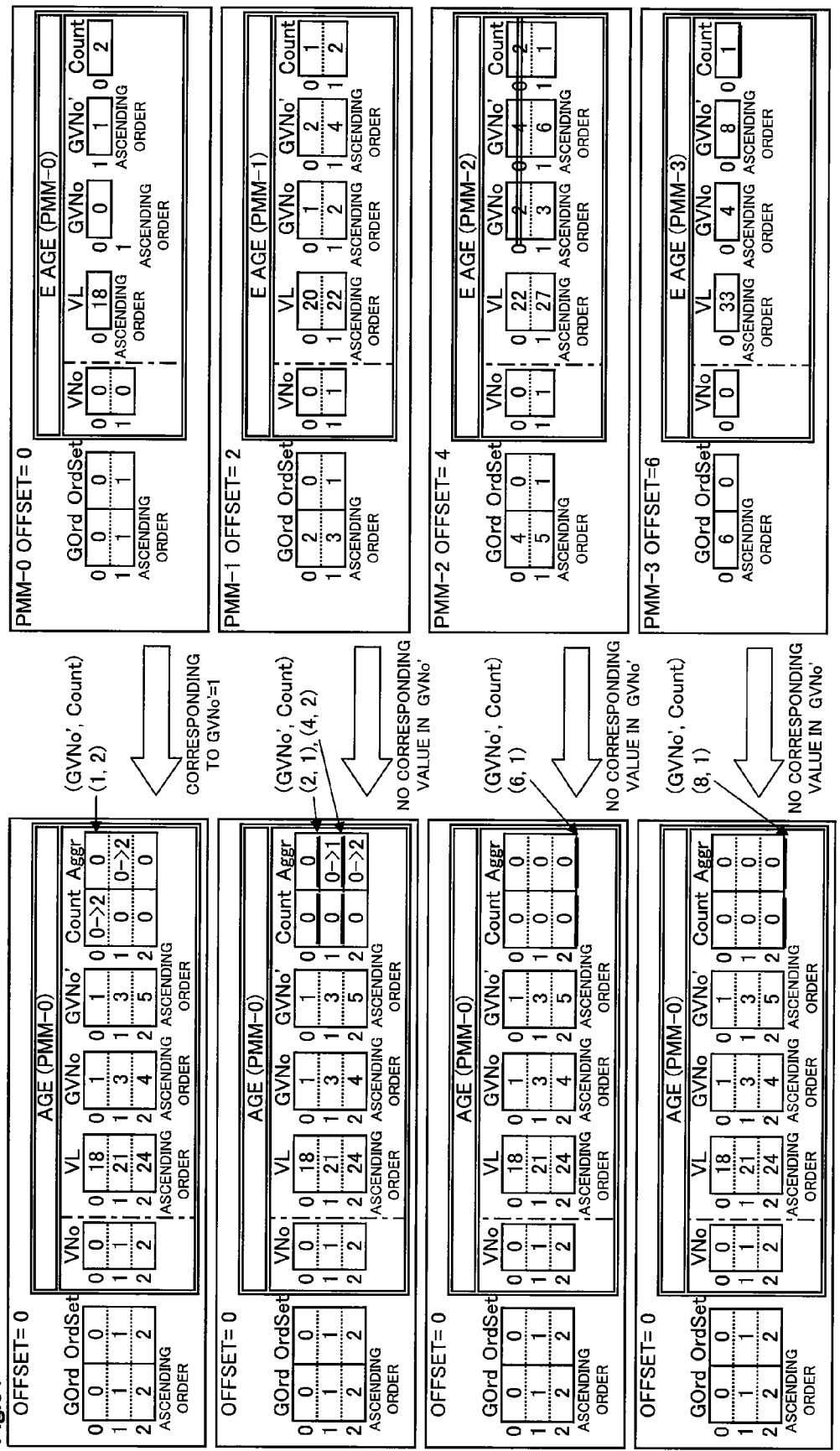

FIG. 31 is a diagram showing a state in which a packet constituted of values (value of GVNo, value of Count) relating to a table 2 is sent from each of the PMM-0 to the PMM-3 to PMM-0.

Figure 32:
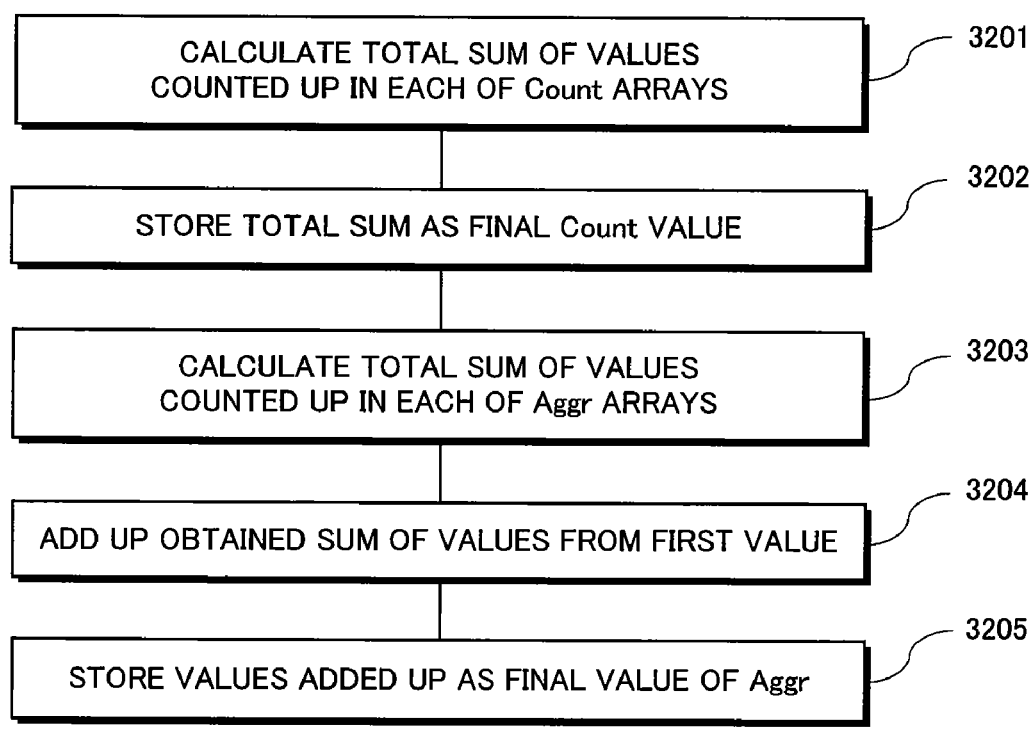

FIG. 32 is a flowchart showing a process of obtaining a final count array Count and a final aggregation array Aggr by combining values of a count array count and an aggregation array Aggr of each of the PMMs.

Figure 33A:
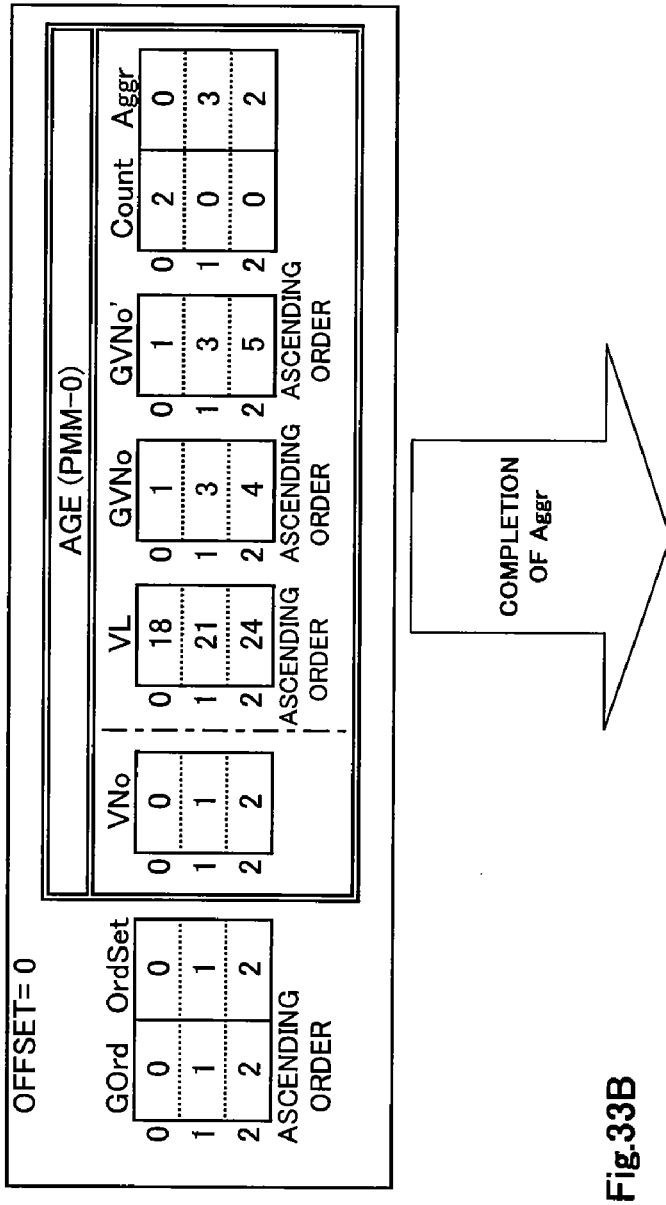
Figure 33B:
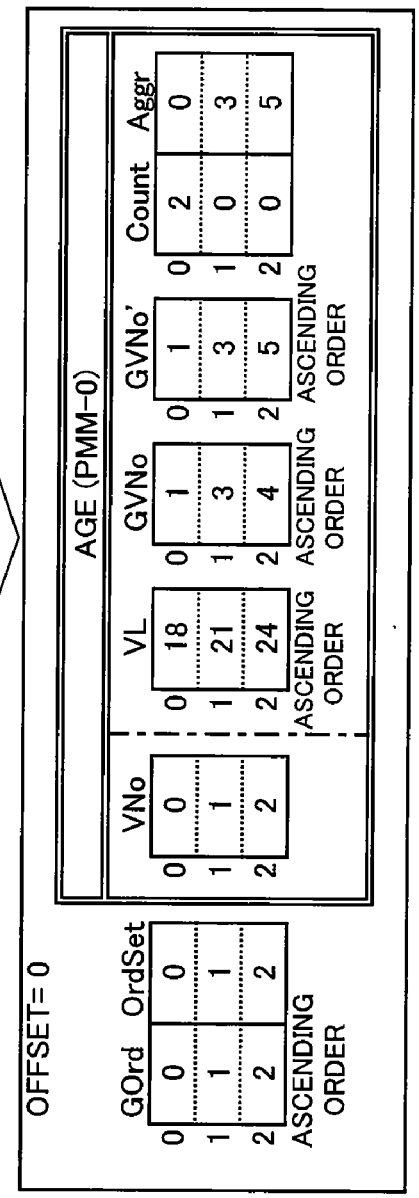

Each of FIGS. 33A and 33B is an illustration of obtainment of the final count array Count and the final aggregation array Aggr in the PMM-0.

Figure 34:
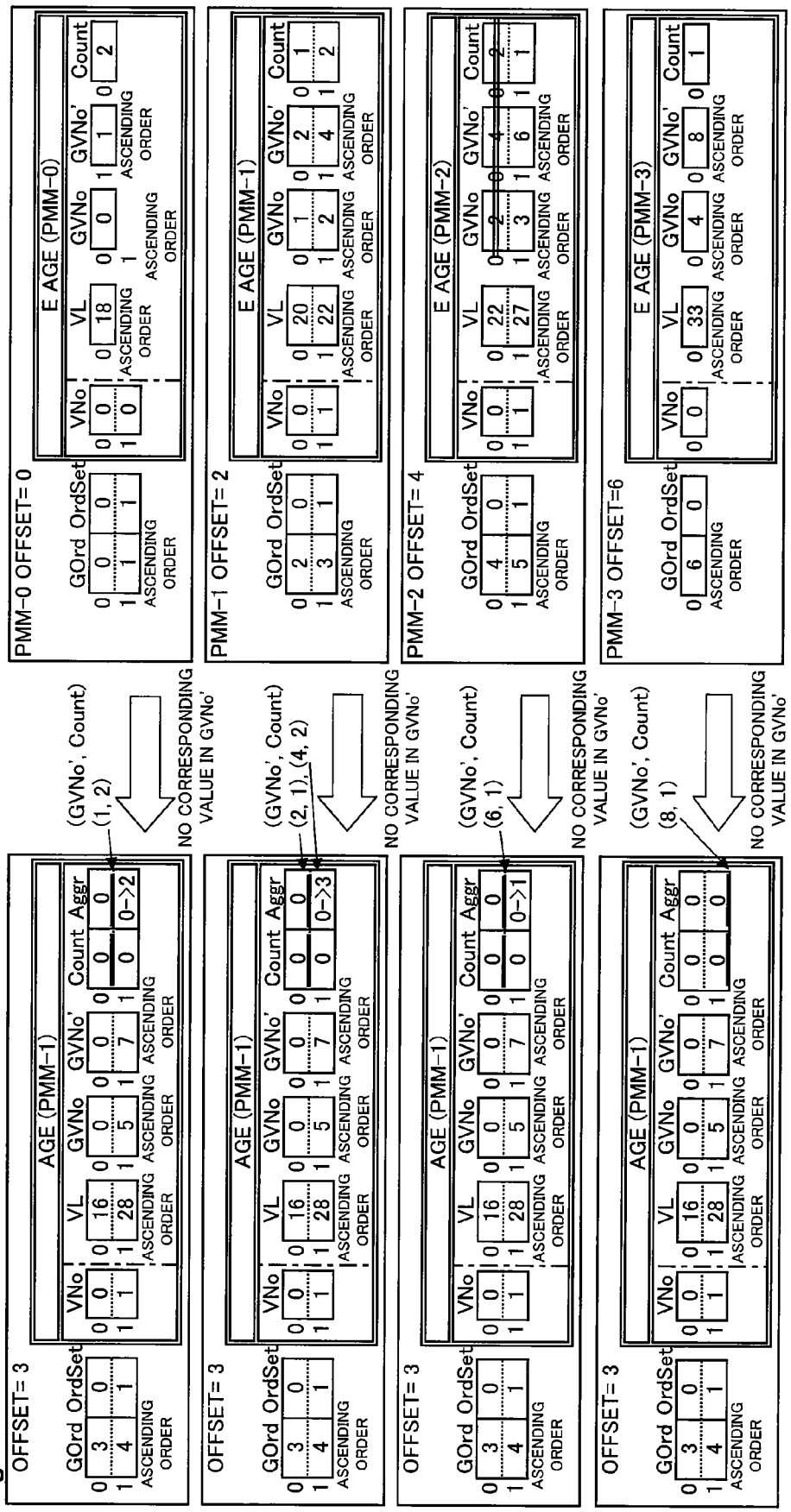

FIG. 34 is a diagram showing a state in which a packet constituted of values (value of GVNo, value of Count) relating to the table 2 is sent from each of the PMM-0 to the PMM-3 to PMM-1.

Figure 35:
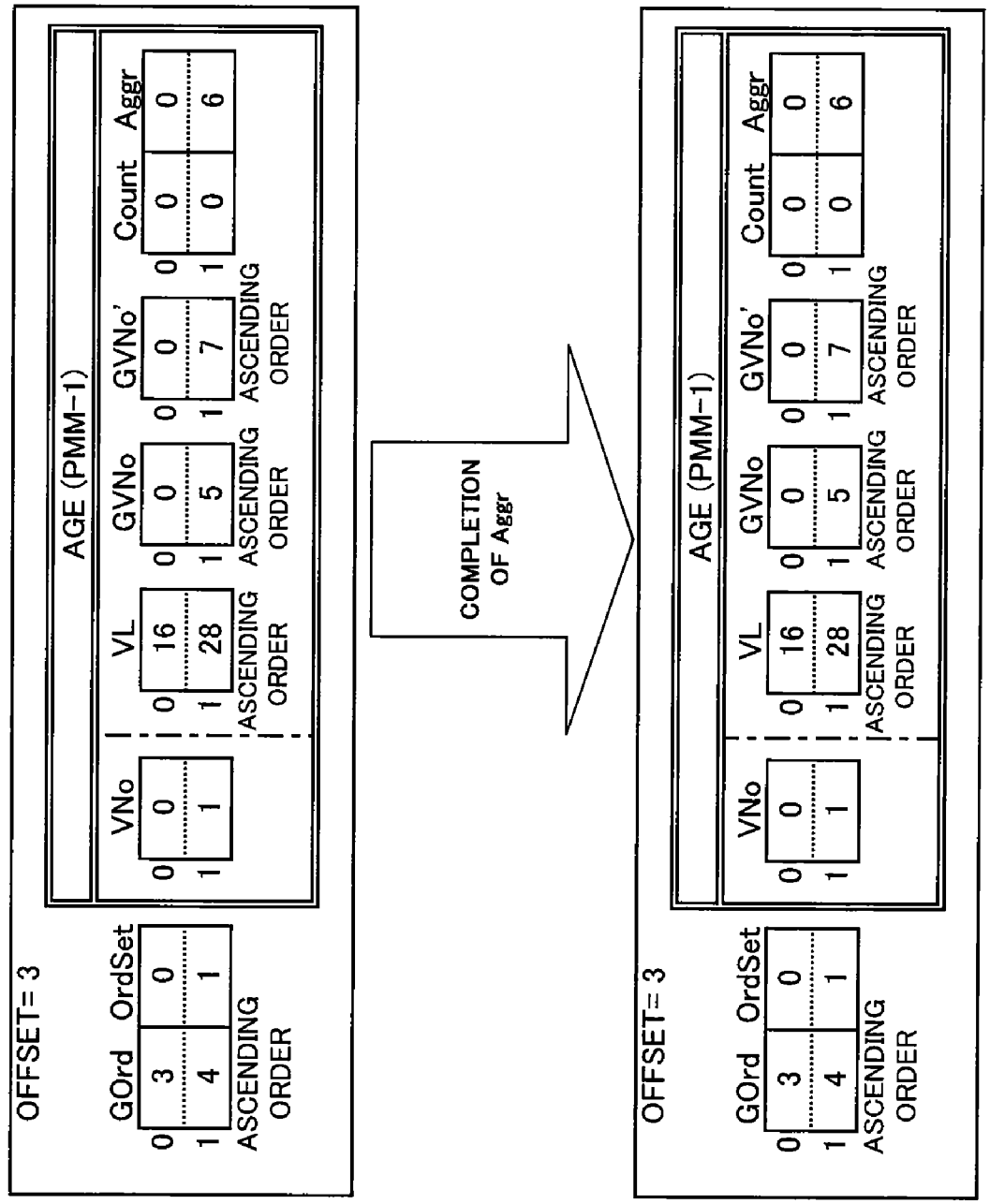

FIG. 35 is an illustration of obtainment of the final count array Count and the final aggregation array Aggr in the PMM-1.

Figure 36:
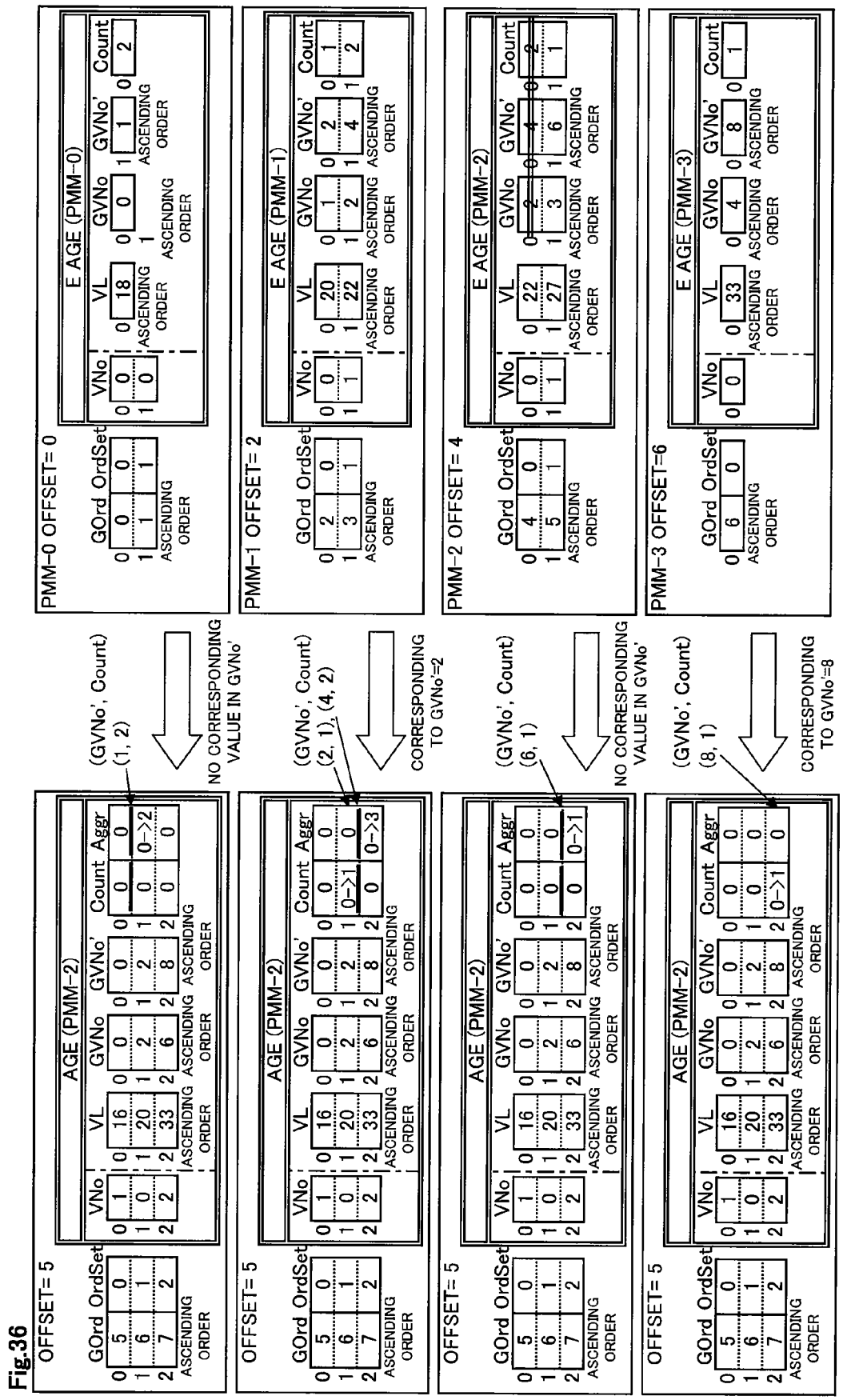

FIG. 36 is a diagram showing a state in which a packet constituted of values (value of GVNo, value of Count) relating to the table 2 is sent from each of the PMM-0 to the PMM-3 to PMM-2.

Figure 37:
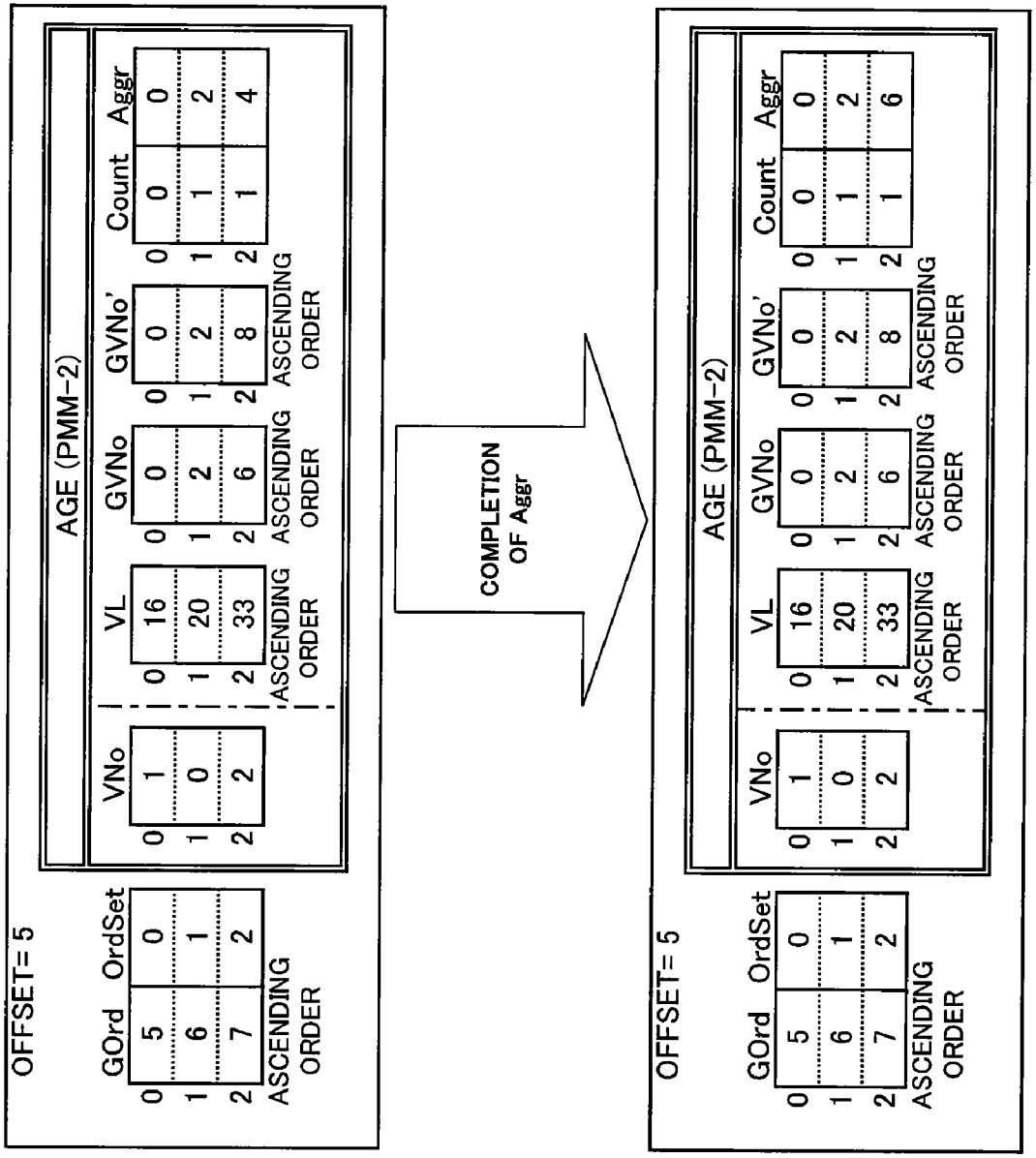

FIG. 37 is an illustration of obtainment of the final count array Count and the final aggregation array Aggr in the PMM-2.

Figure 38:
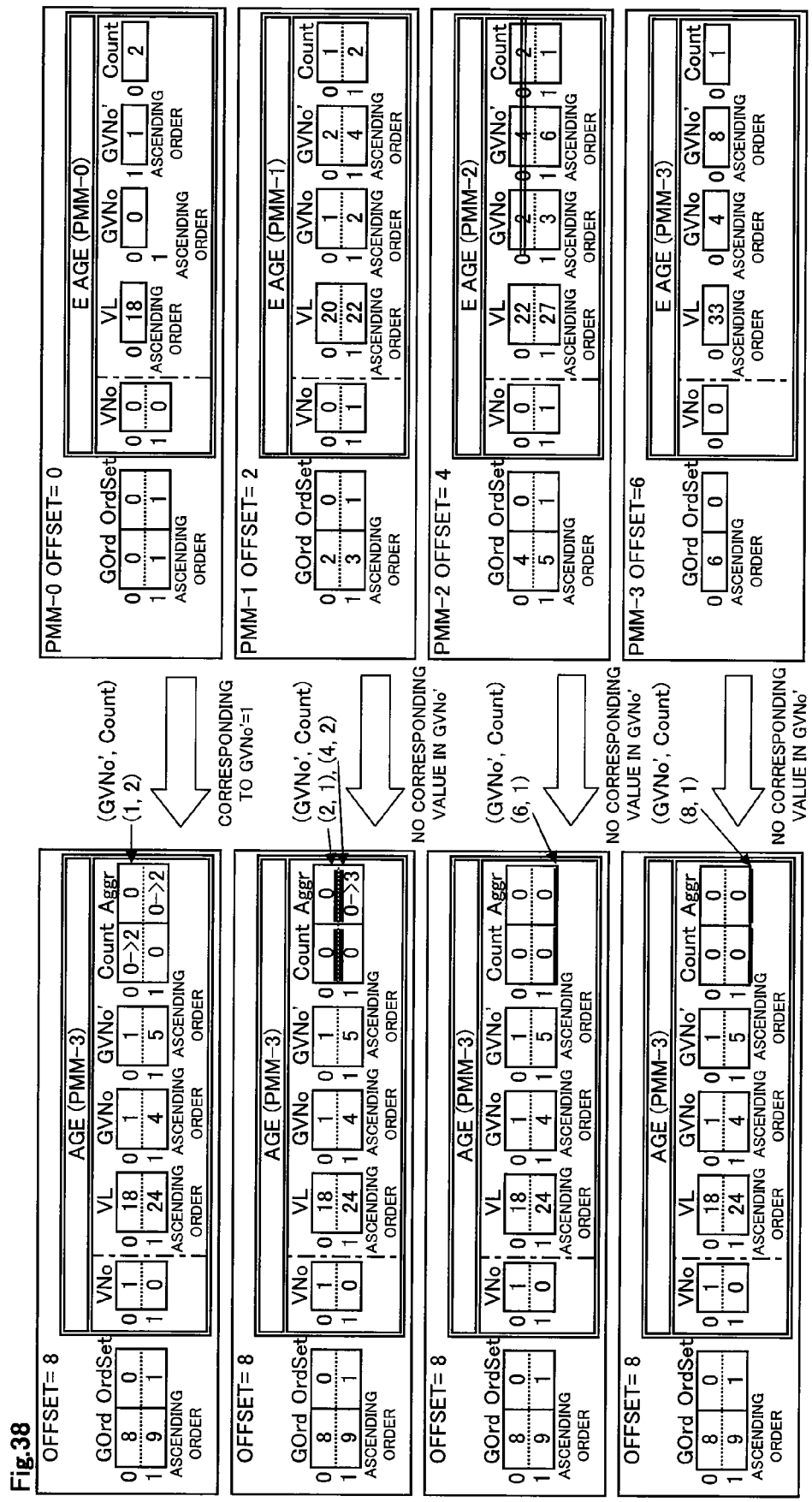

FIG. 38 is a diagram showing a state in which a packet constituted of values (value of GVNo, value of Count) relating to the table 2 is sent from each of the PMM-0 to the PMM-3 to PMM-3.

Figure 39:
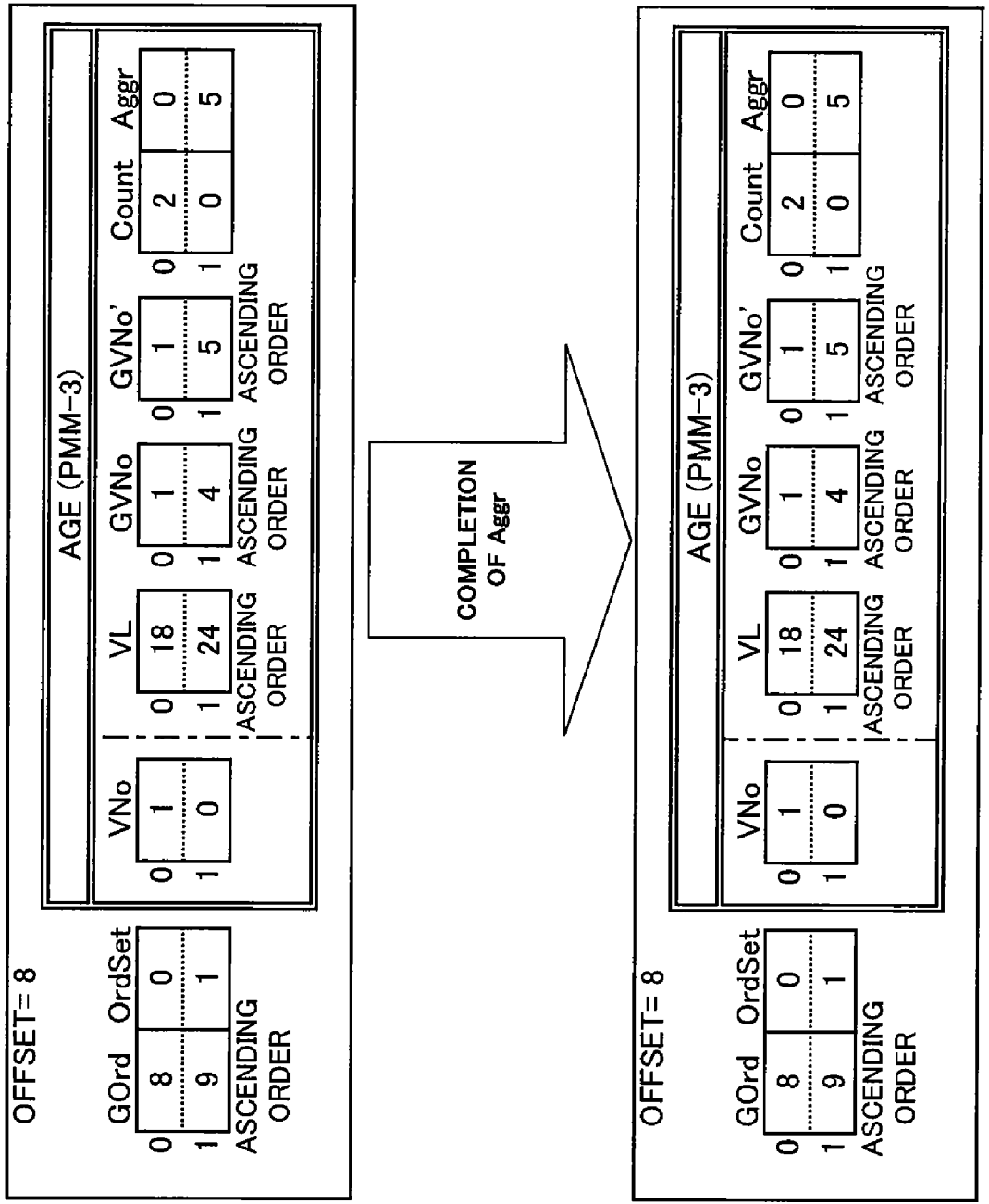

FIG. 39 is an illustration of obtainment of the final count array Count and the final aggregation array Aggr in the PMM-3.

Figure 40:
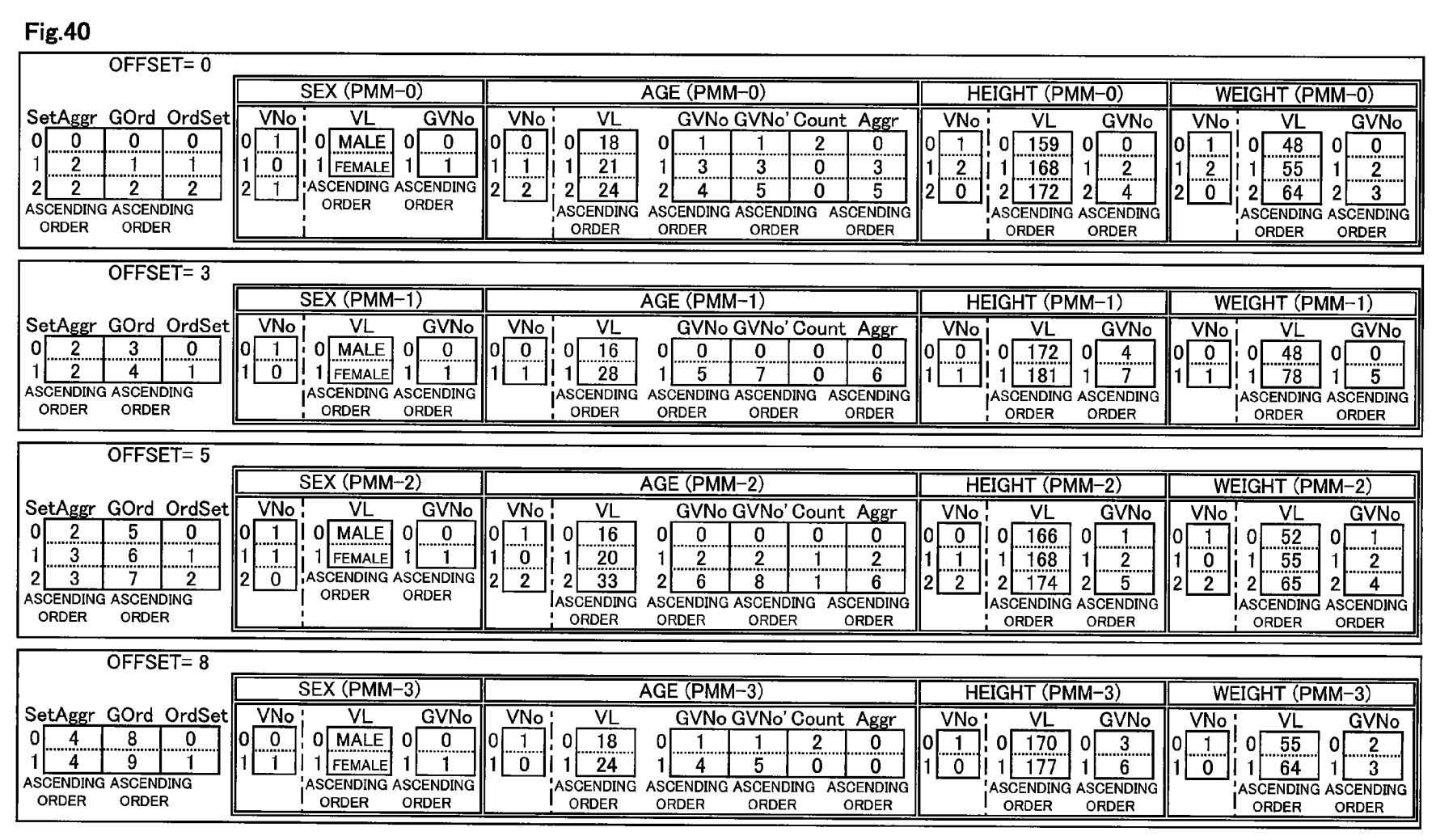

FIG. 40 is a diagram showing arrays relating to a master table obtained by the join process.

FIG. 41 is diagram showing the arrays of FIG. 40 in a logical table format.

Figure 42:
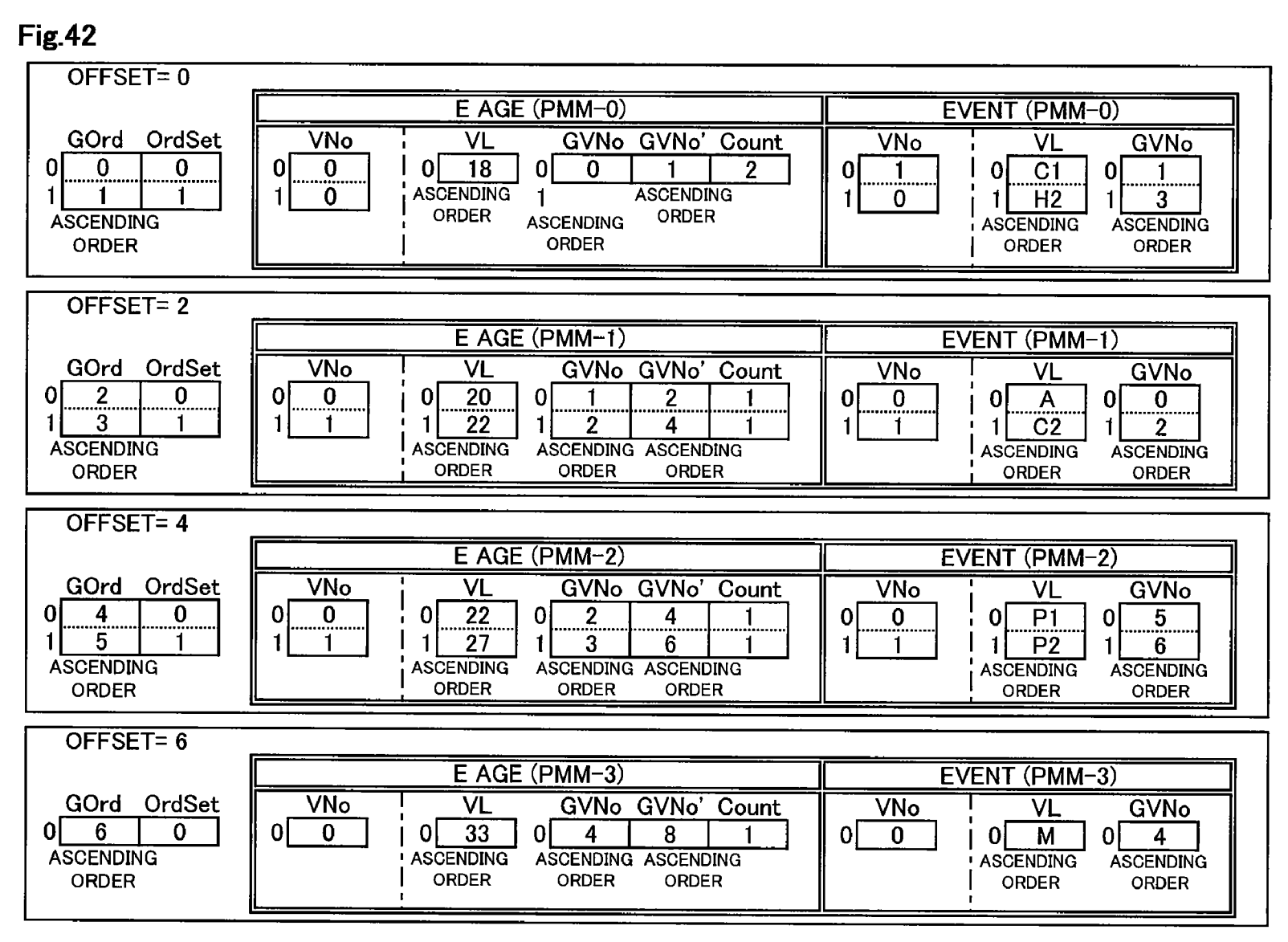

FIG. 42 is a diagram showing arrays obtained by the join process.

FIG. 43 is diagram showing the arrays of FIG. 40 in a logical table format.

Figure 44:
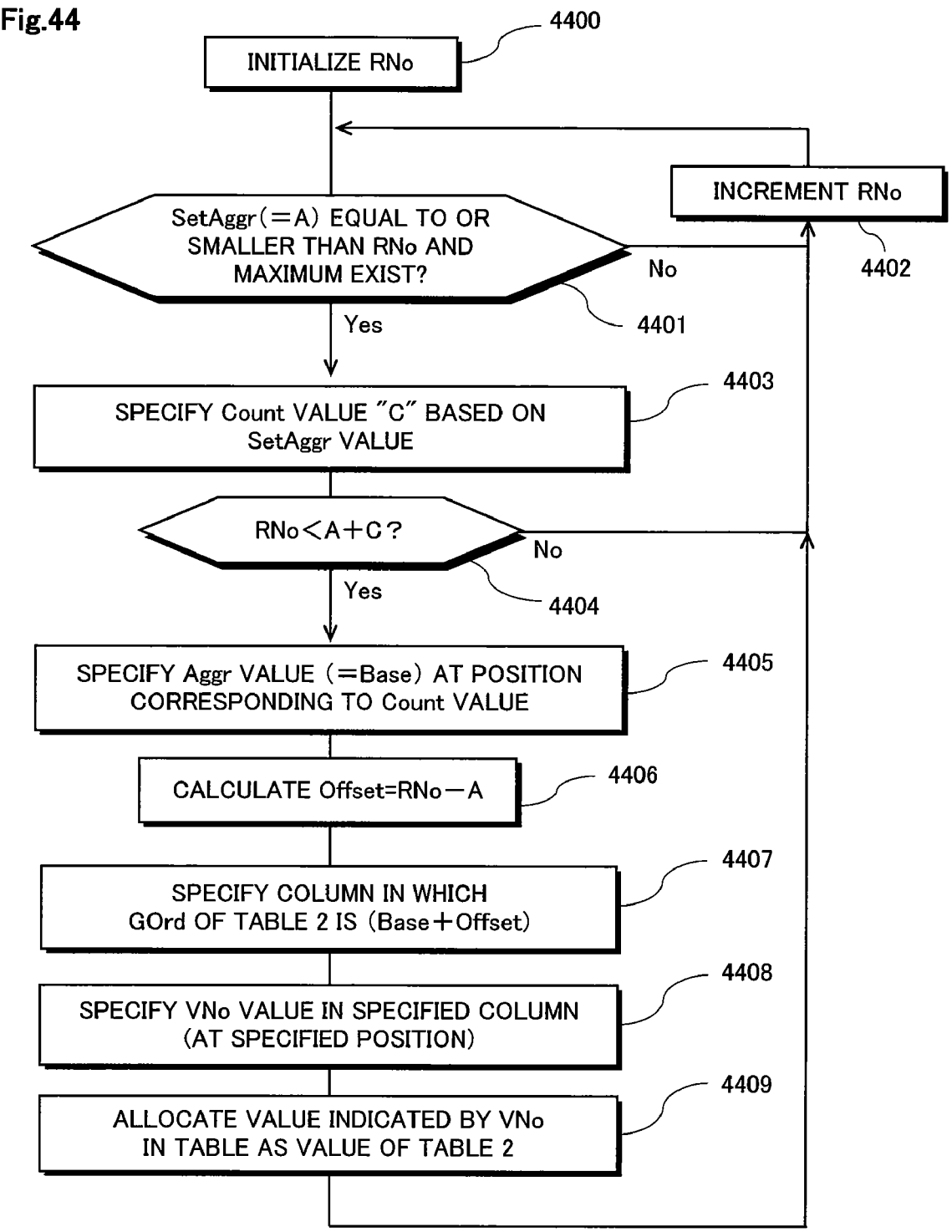

FIG. 44 is a flowchart showing a readout process on the joined table.

Figure 45:
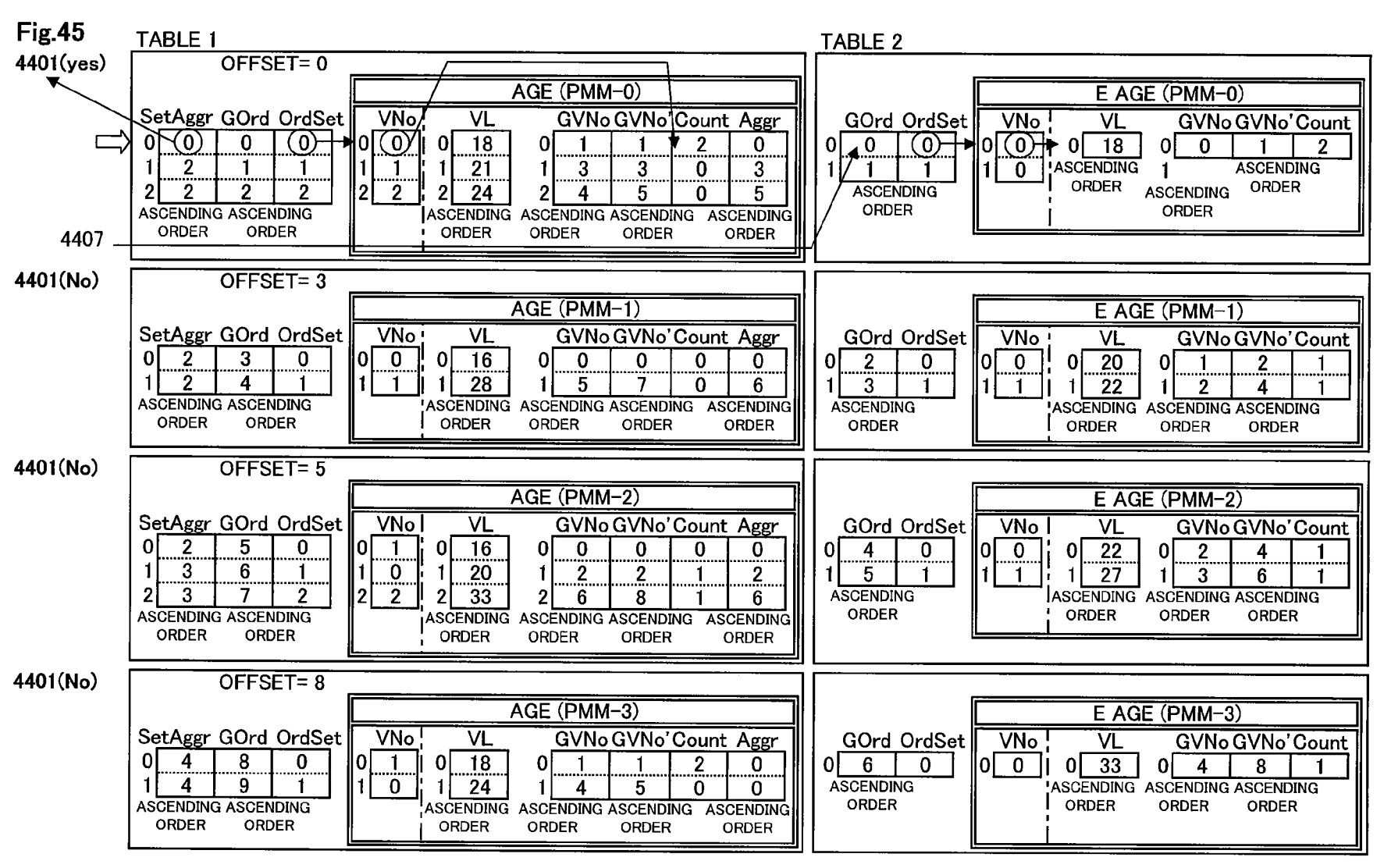
Figure 46:
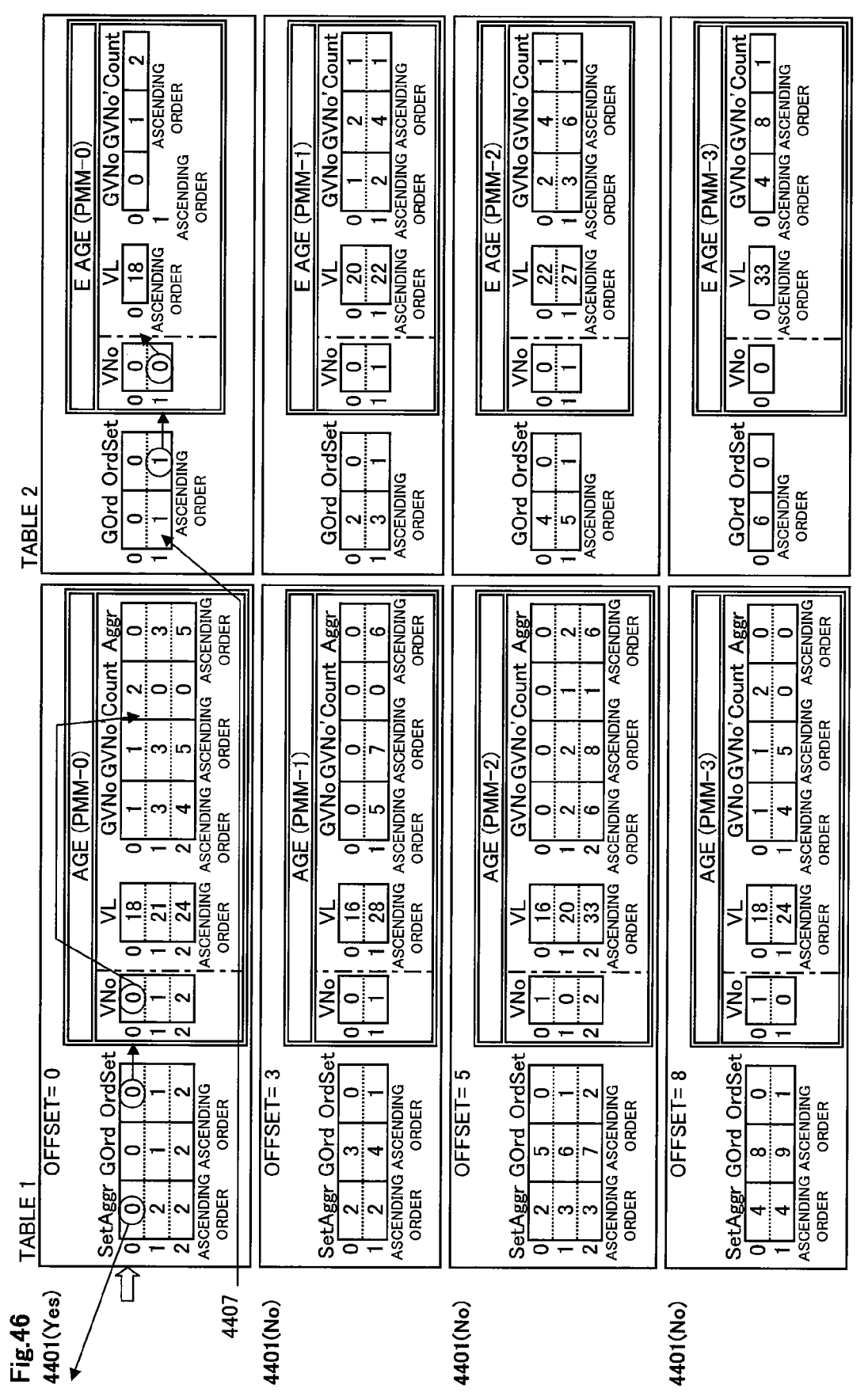
Figure 47:
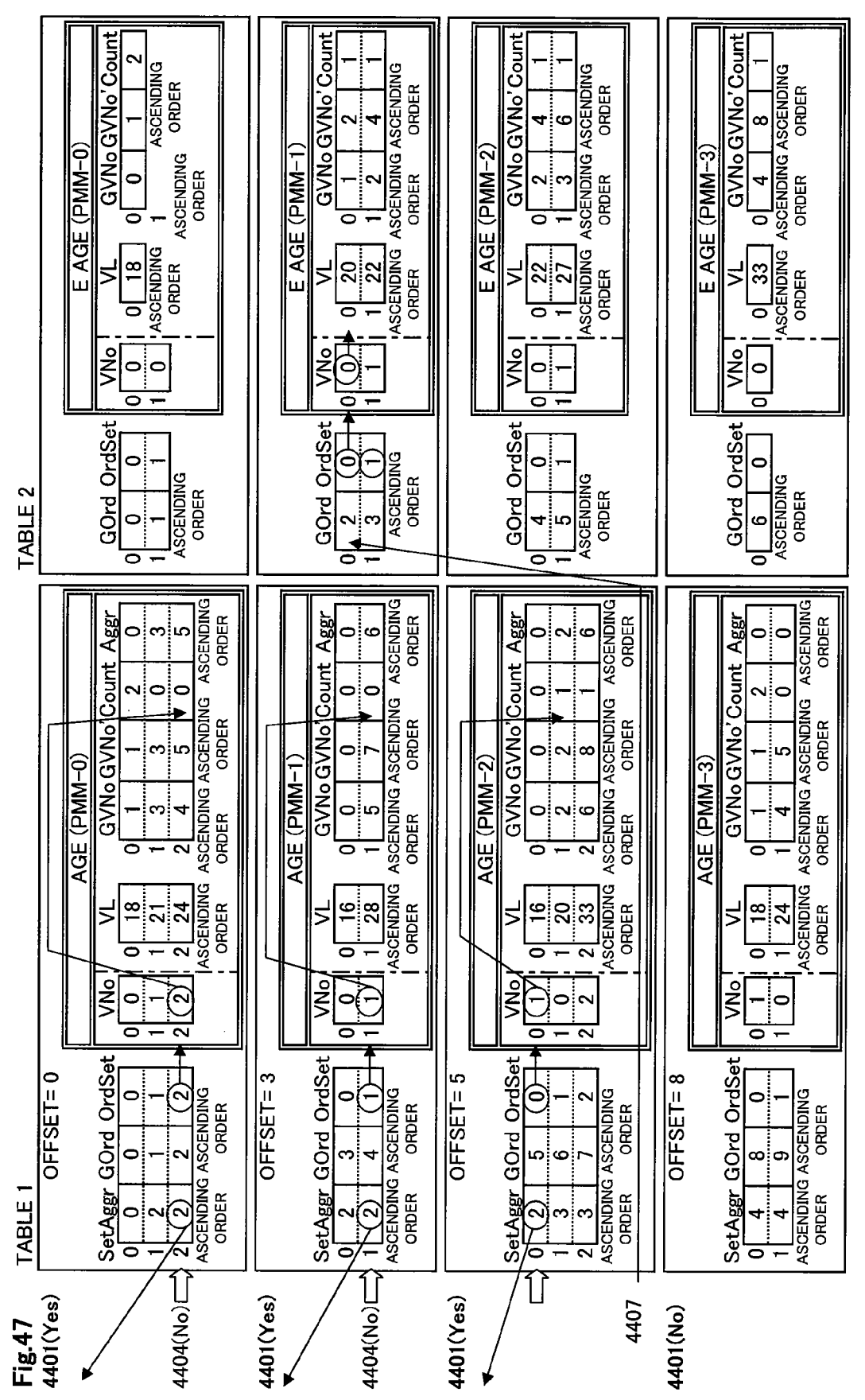
Figure 48:
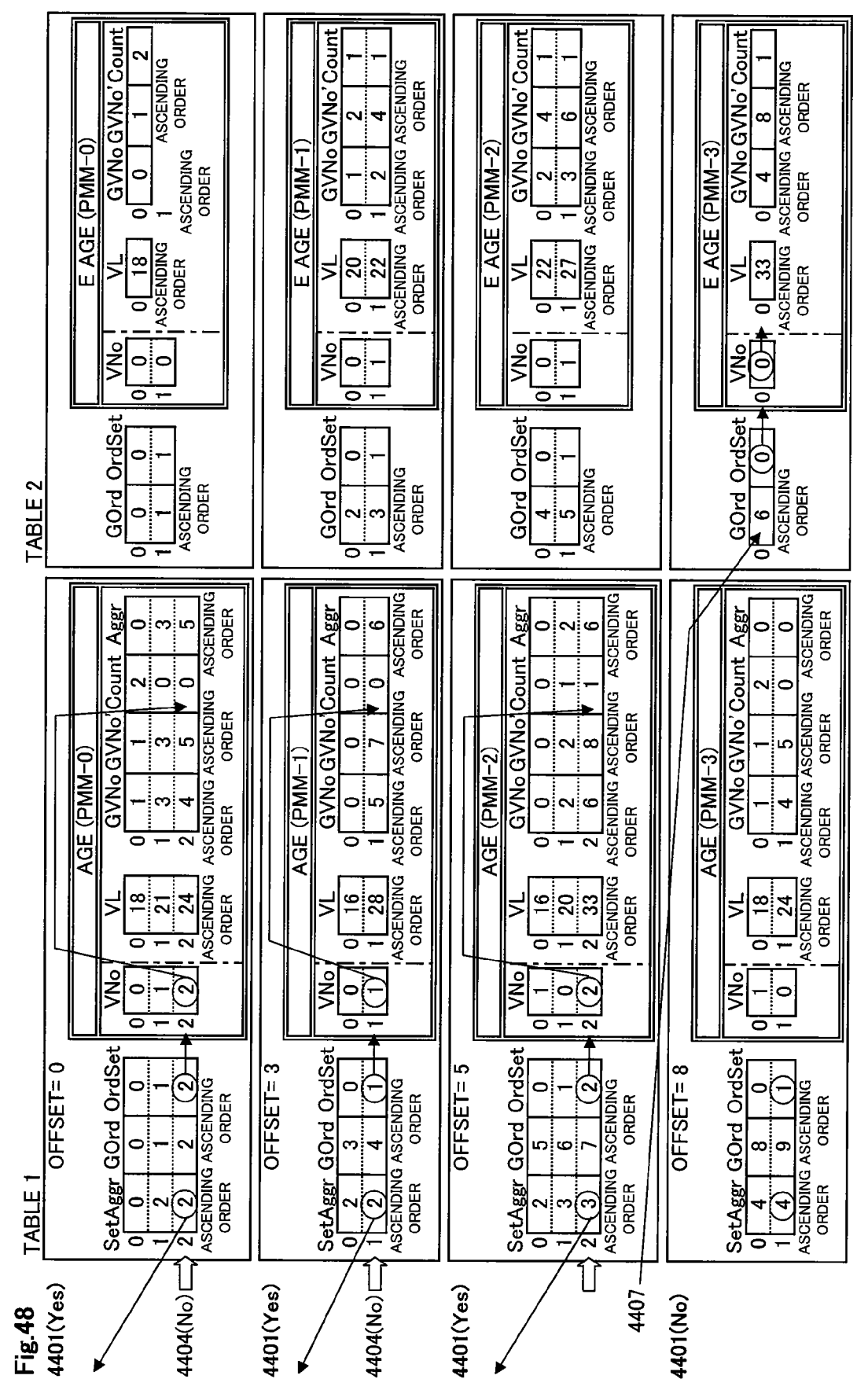
Figure 49:
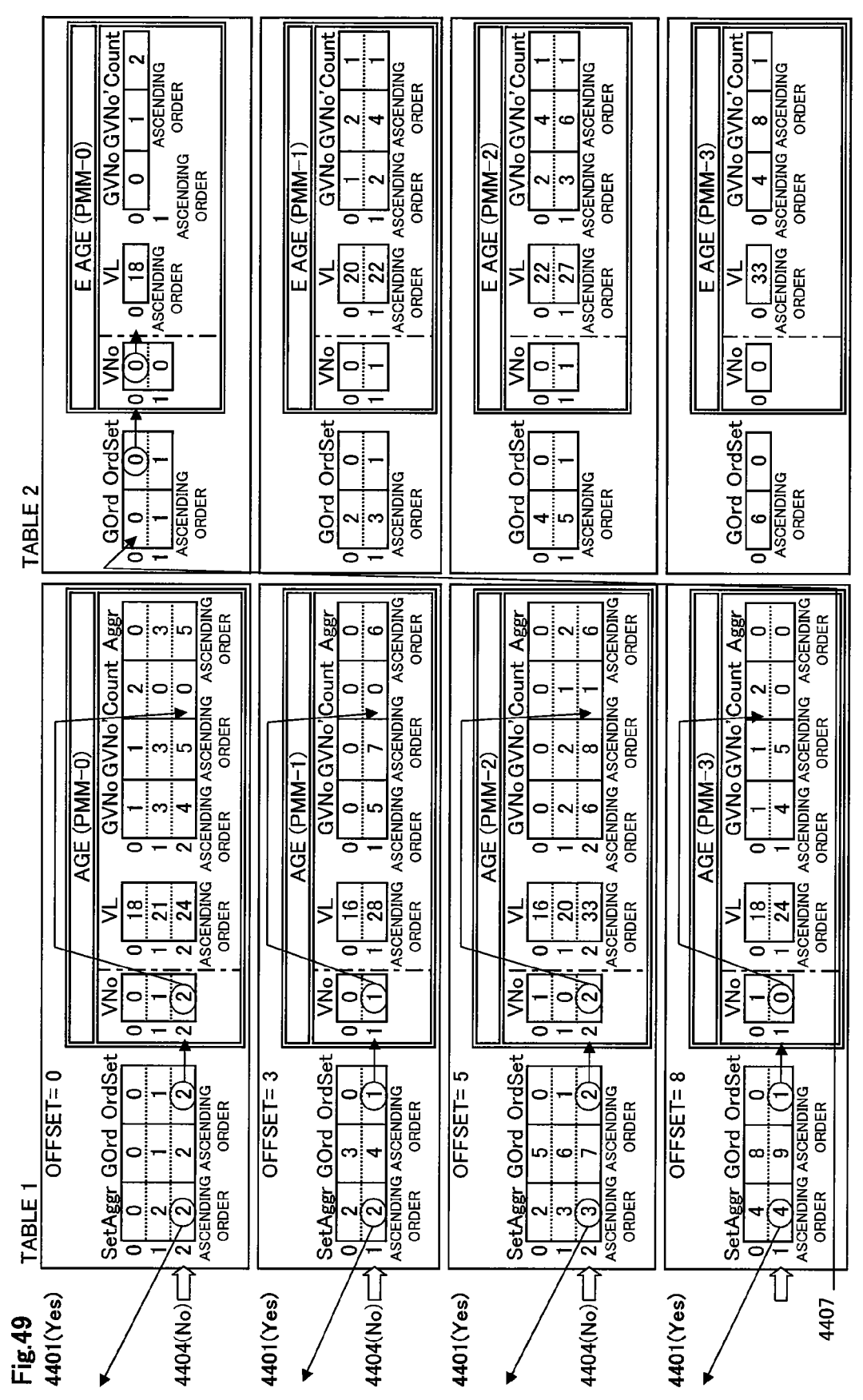
Figure 50:
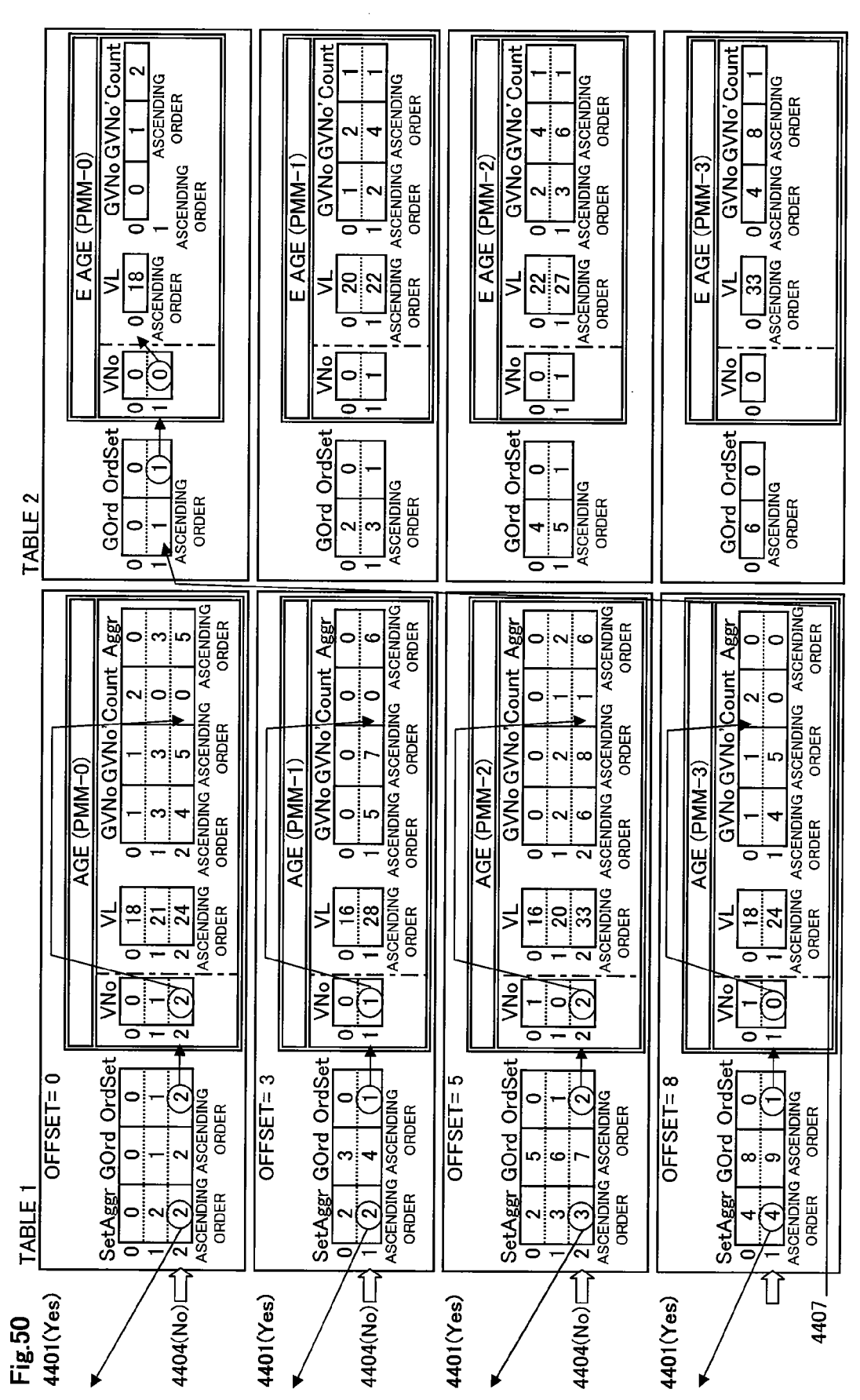

FIG. 45 is an illustration of the table readout process.
FIG. 46 is an illustration of the table readout process.
FIG. 47 is an illustration of the table readout process.
FIG. 48 is an illustration of the table readout process.
FIG. 49 is an illustration of the table readout process.
FIG. 50 is an illustration of the table readout process.

Each of FIGS. 51A to 51F is a diagram showing the joined table obtained by the process of FIGS. 45 to 50.

Figure 52:
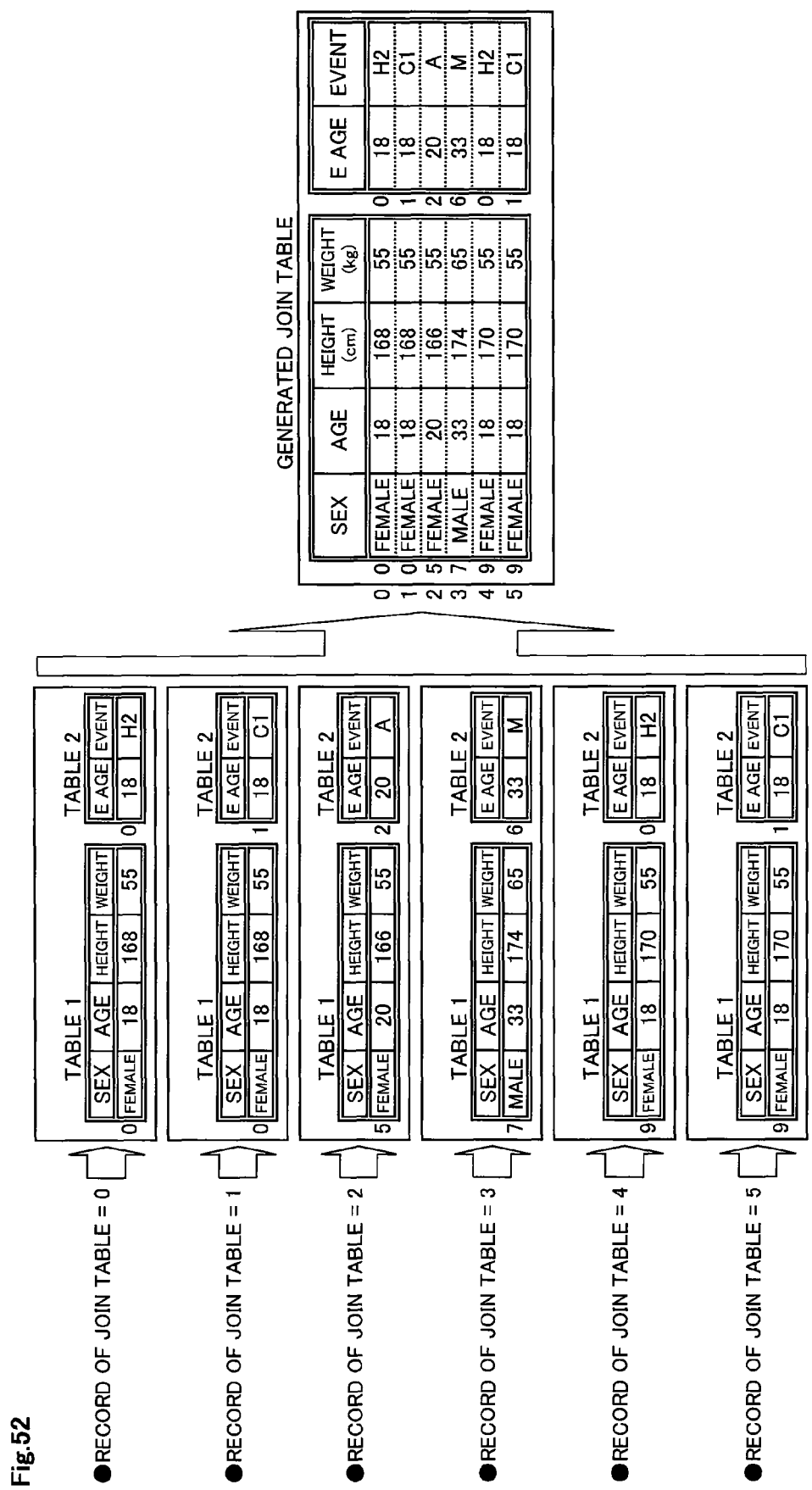

FIG. 52 is a diagram showing a finally obtained table.

Figure 53:
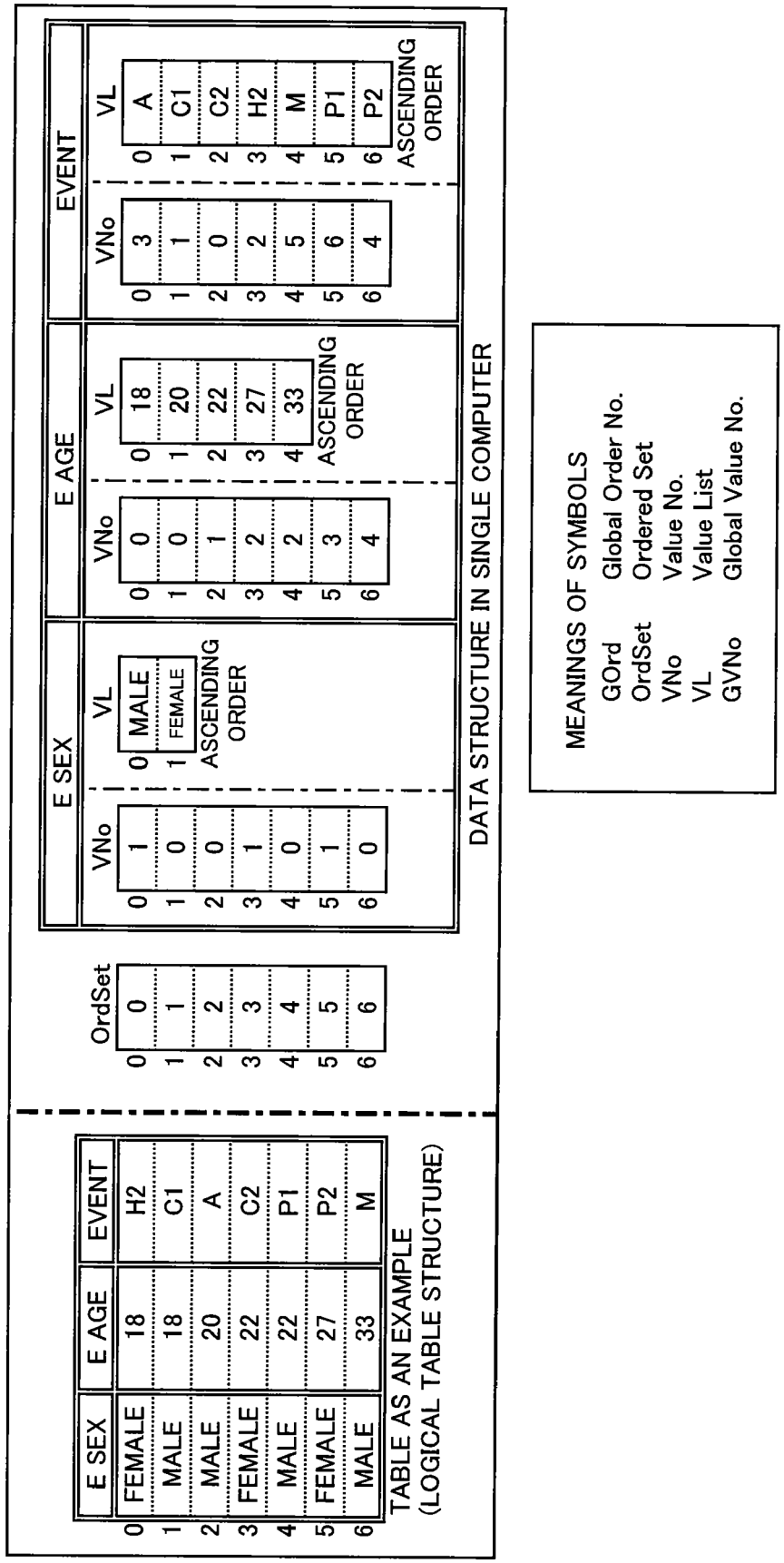

FIG. 53 is a diagram showing a logical structure of one of the tables to be joined by the join process, and a diagram showing various arrays necessary for representing a table with the use of a single computer in accordance with this invention.

FIG. 54 is a diagram showing logical tables segregated to the PMMs.

Figure 55:
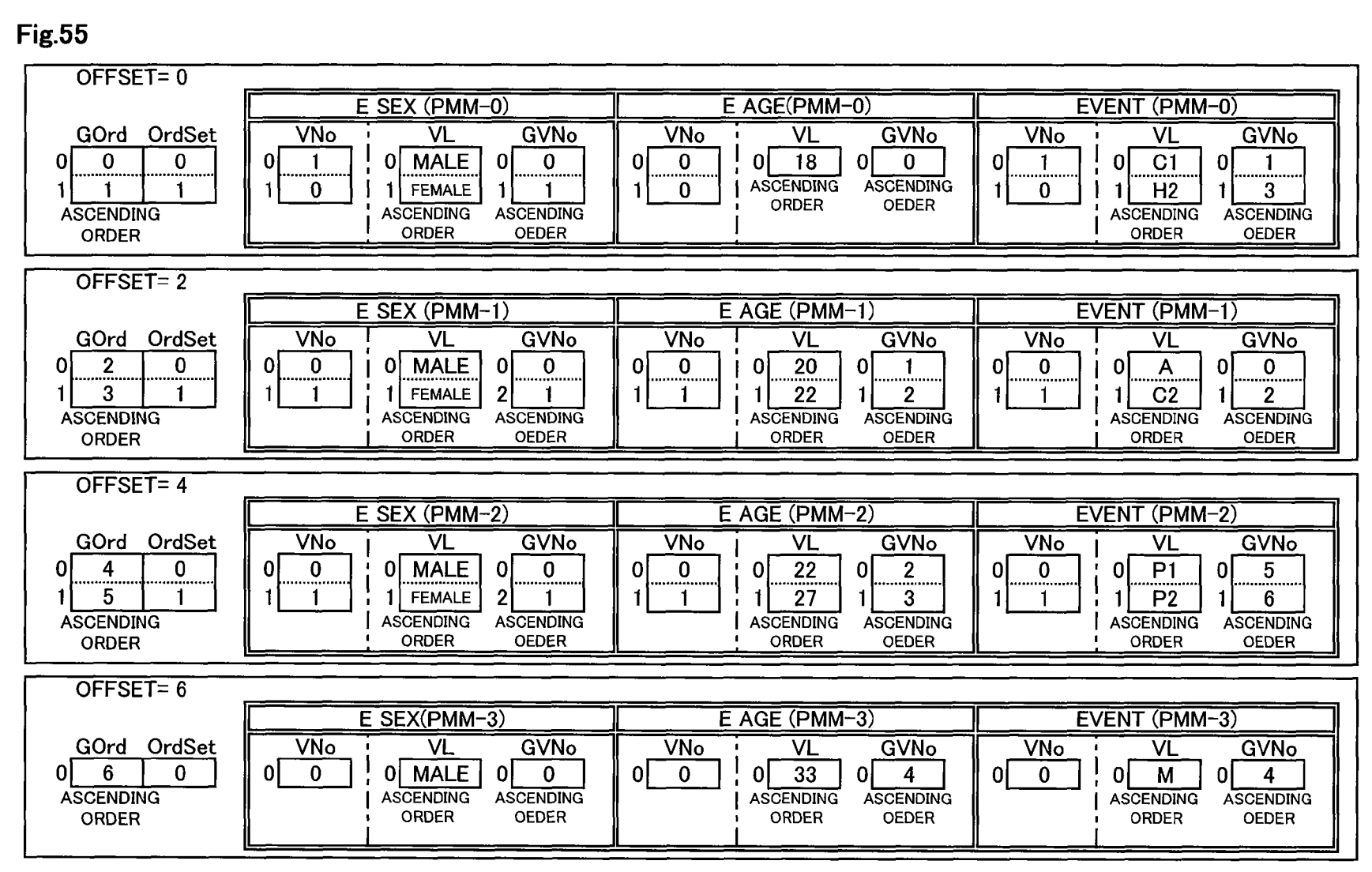

FIG. 55 is a diagram showing actual arrays segregated to the PMMs.

FIG. 56 is a diagram showing a table obtained by the master table (table 1), the slave table (table 2), and a table obtained by the join process.

Figure 57:
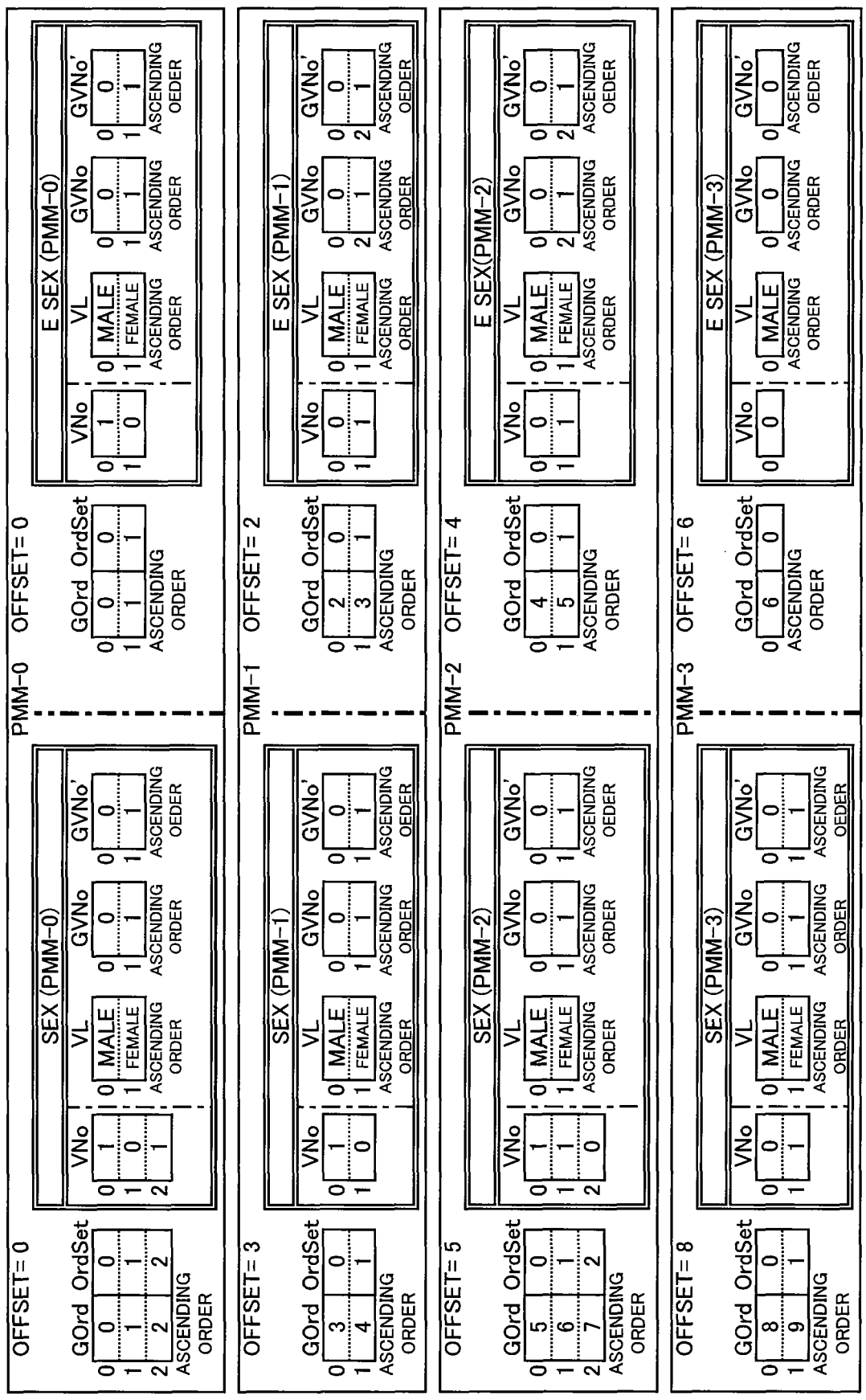

FIG. 57 is a diagram showing a result of unification of GVNo' in items "sex" and "E sex".

Figure 58:
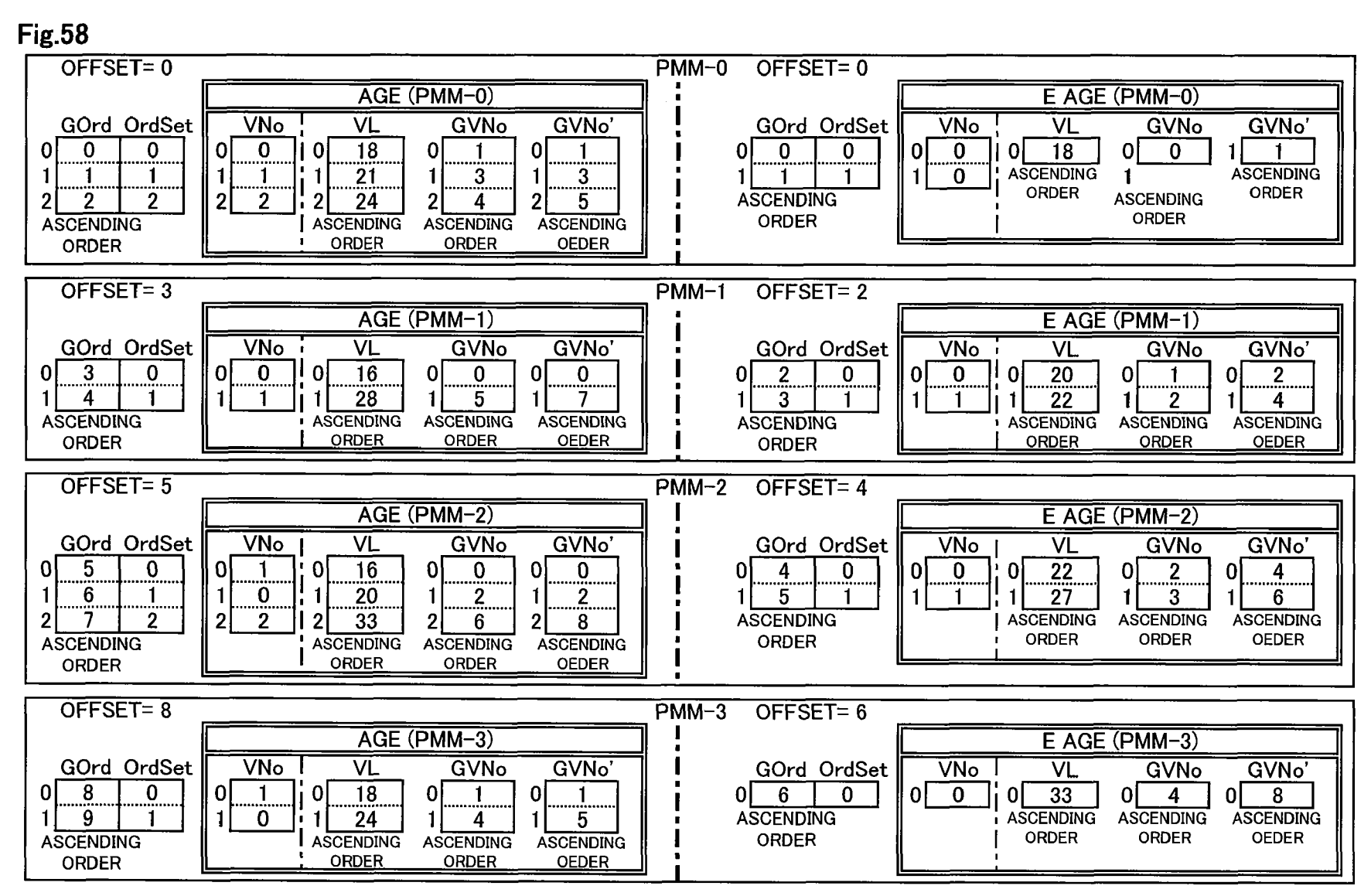

FIG. 58 is a diagram showing a result of unification of GVNo' in items "age" and "E age".

FIG. 59 is a diagram showing a state of the master table after unifying GVNo'.

FIG. 60 is a diagram showing the slave table after unifying GVNo'.

Figure 61:
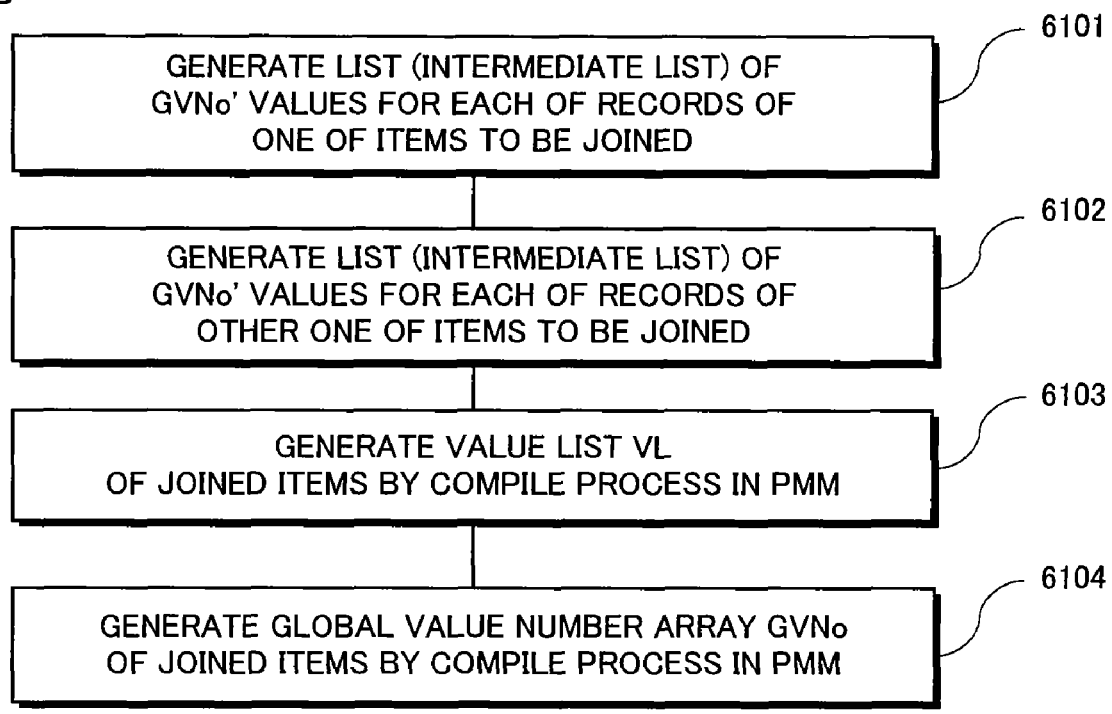

FIG. 61 is a flowchart schematically showing generation of GVNo relating to the joined items.

Figure 62:
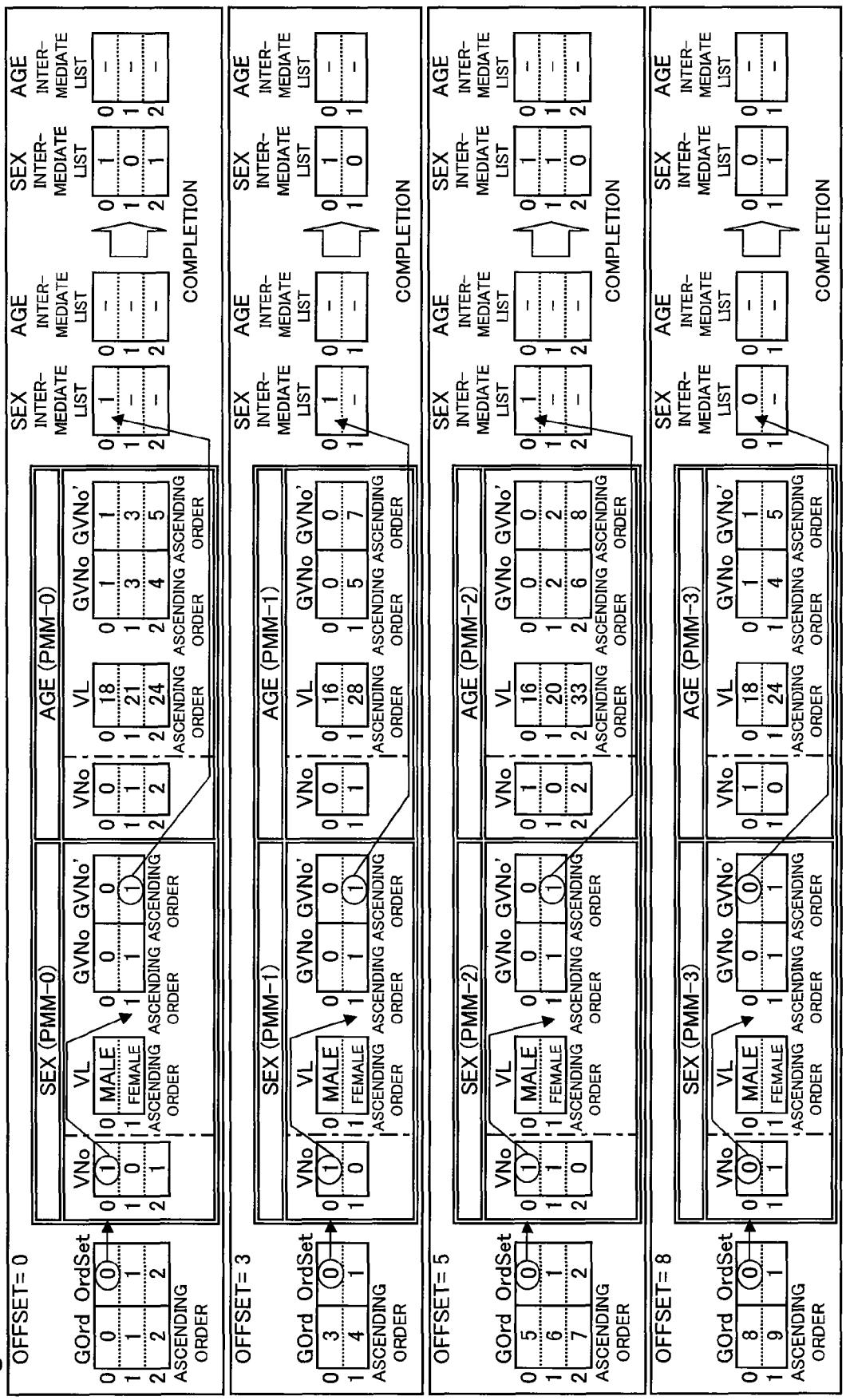

FIG. 62 is an illustration of generation of an intermediate list of one of items in the master table.

Figure 63:
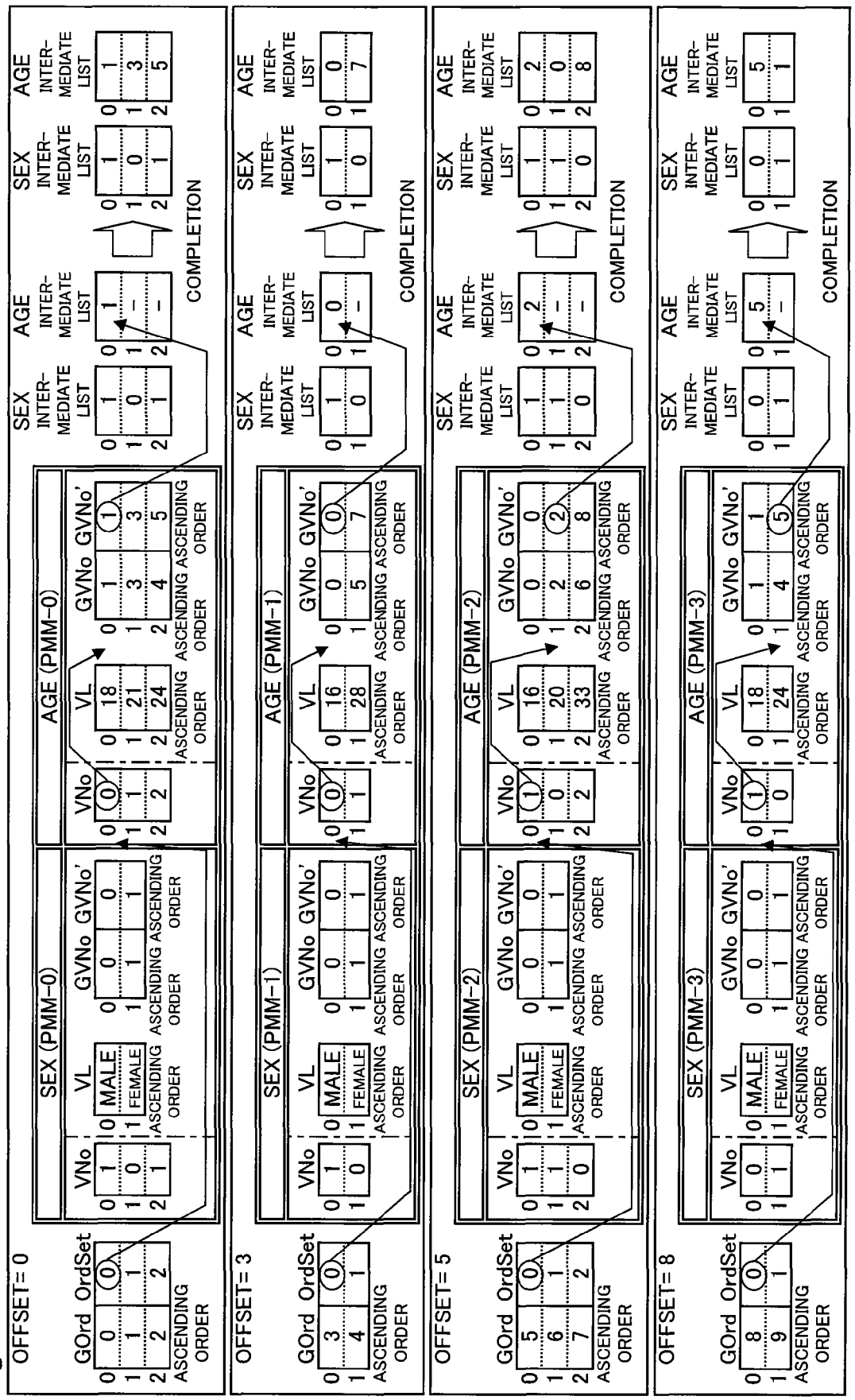

FIG. 63 is an illustration of generation of an intermediate list of the other one of items in the master table.

Figure 64:
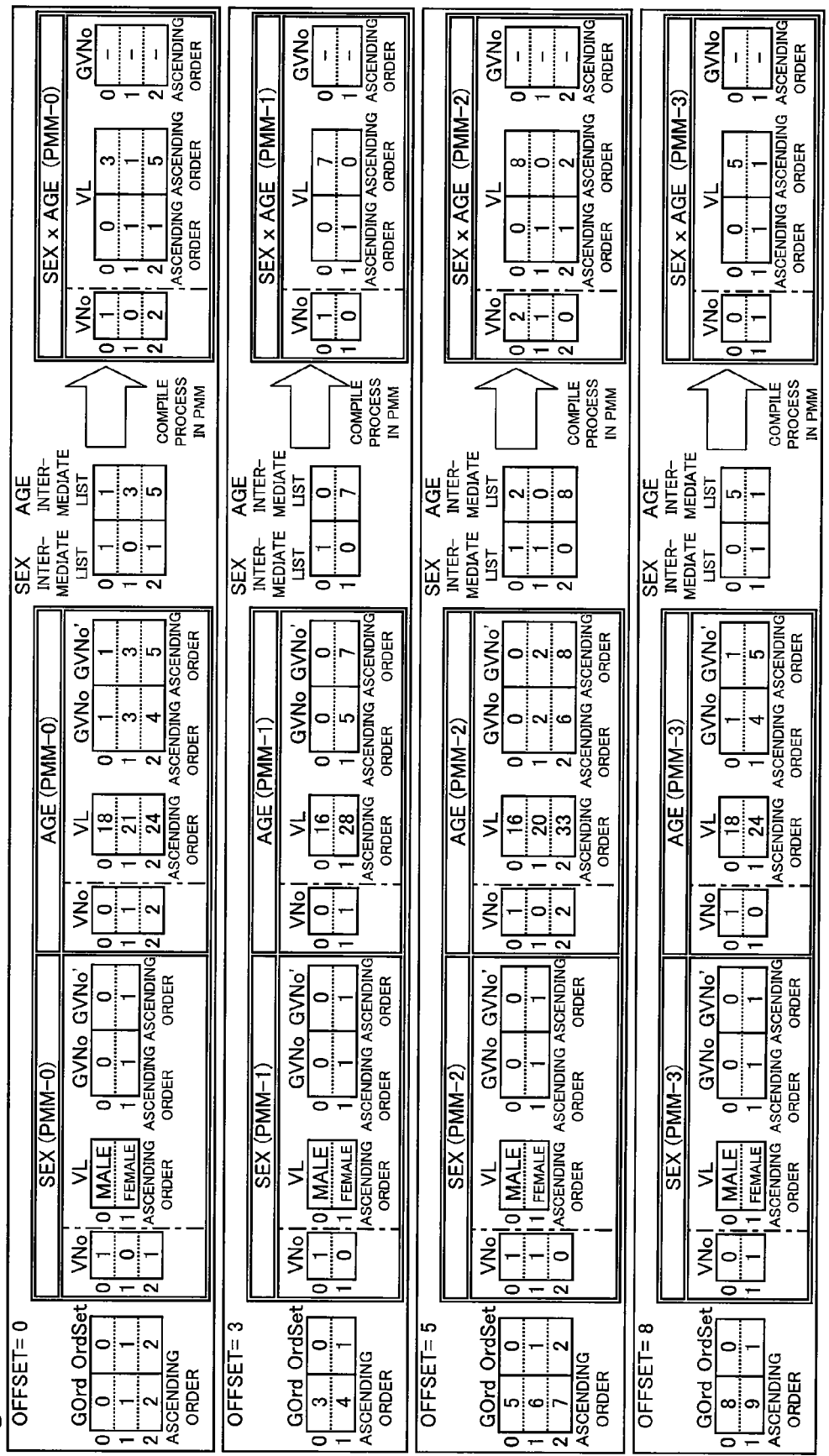

FIG. 64 is an illustration of a value list VL relating to the joined items in the master table.

FIG. 65 is a diagram showing a global value number array GVNo generated for the joined items.

Figure 66:
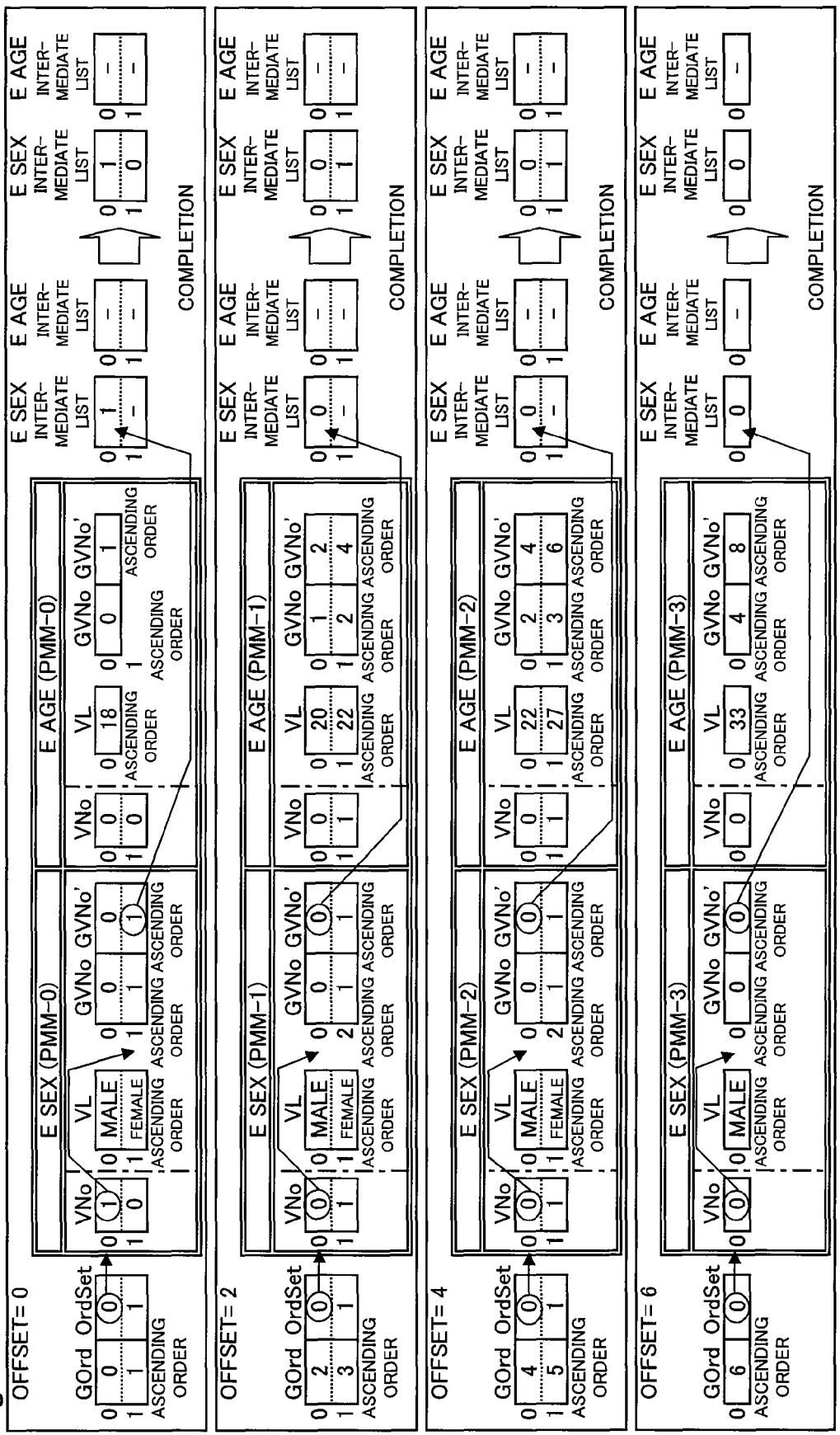

FIG. 66 is an illustration of generation of an intermediate list of the item "E sex" of the slave table.

Figure 67:
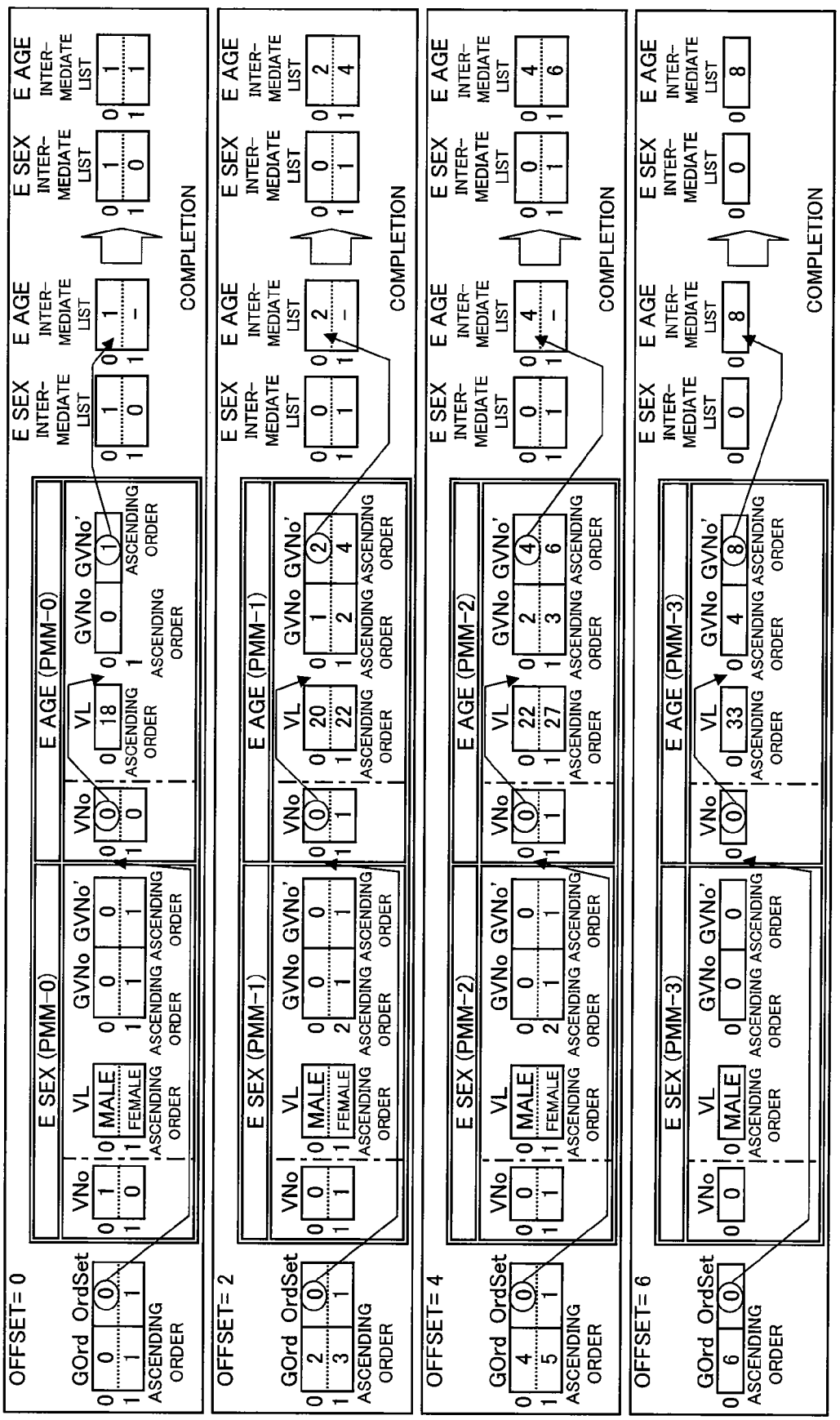

FIG. 67 is an illustration of generation of an intermediate list of the item "E age" of the slave table.

Figure 68:
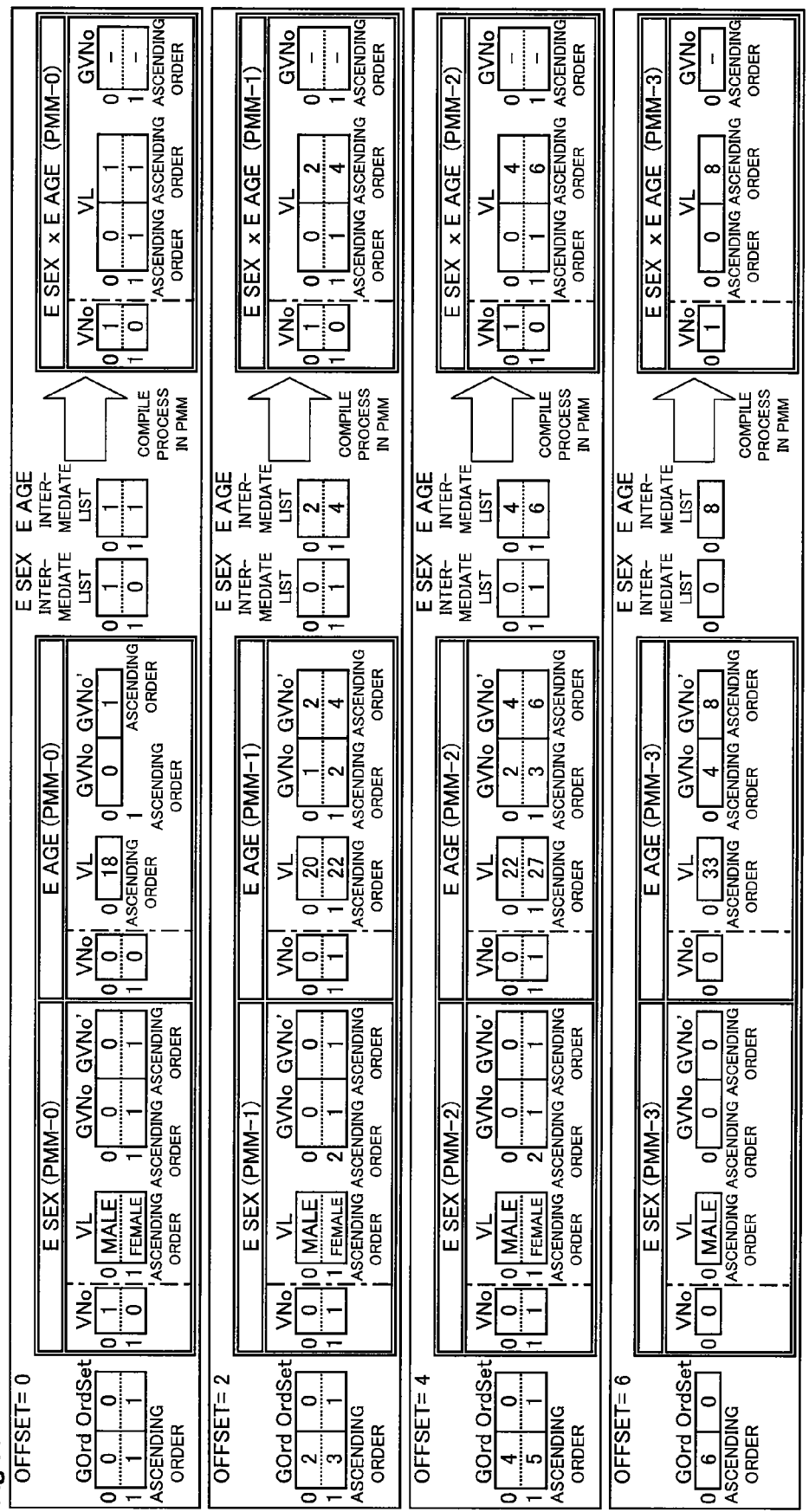

FIG. 68 is an illustration of generation of a value list of a joined item "E sex"×"E age" by a compile process in each of the PMMs.

FIG. 69 is an illustration of generation of a global value number array GVNo of the joined item by an inter-PMM compile process.

Figure 70:
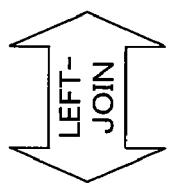

FIG. 70 is a diagram showing a table (view) generated by an external join process.

Figure 71:
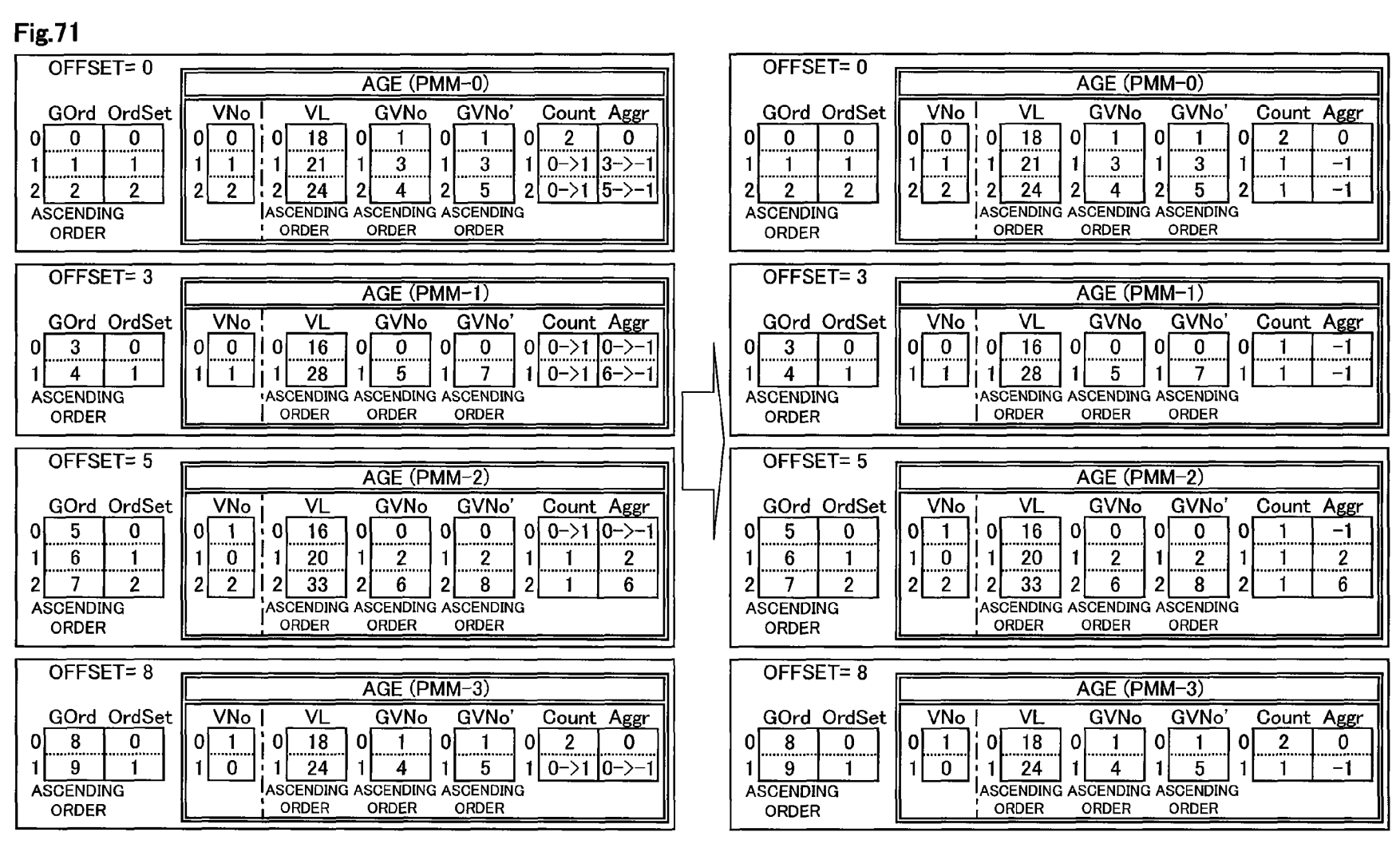

FIG. 71 is an illustration of Count and Aggr in the external join process.

FIG. 72 is a diagram showing a state in which necessary arrays are generated in the master table.

FIG. 73 is a diagram showing a state in which necessary arrays are generated in the slave table.

Figure 74:
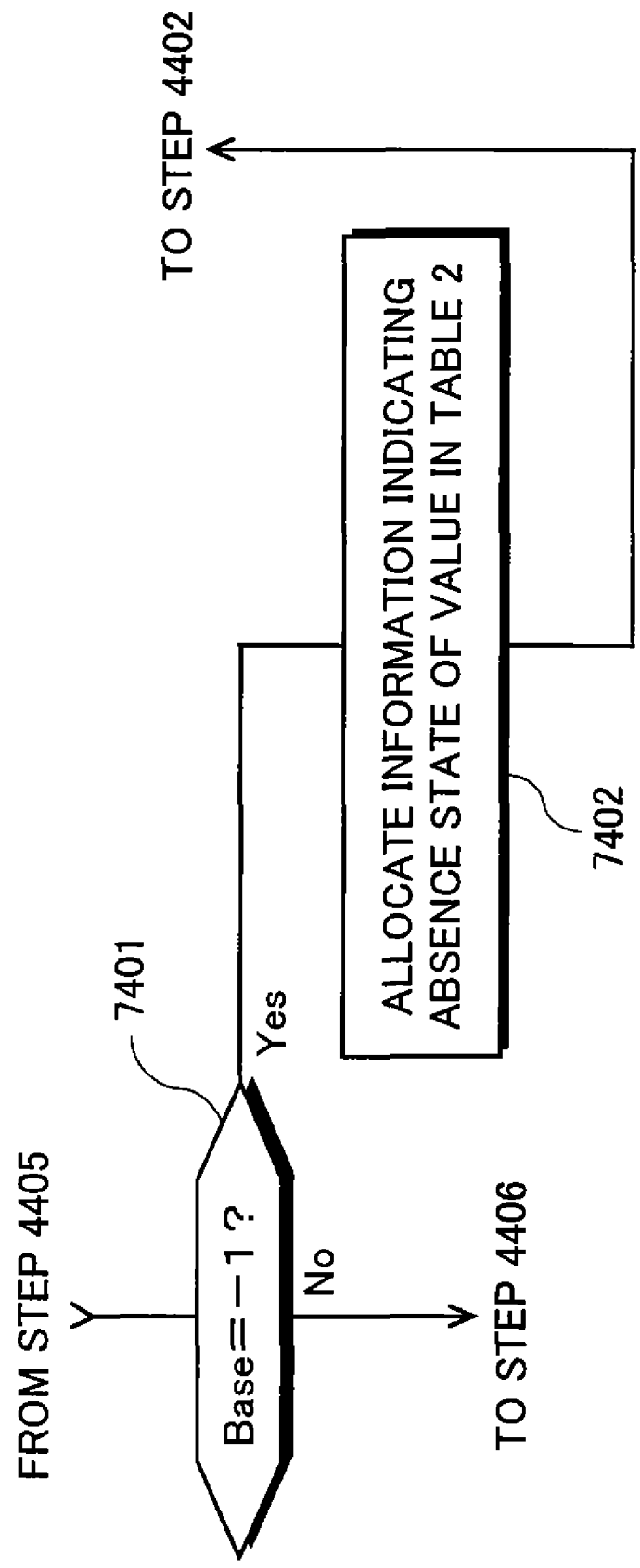

FIG. 74 is a flowchart showing a readout process of the table joined by the external join process.

Figure 75:
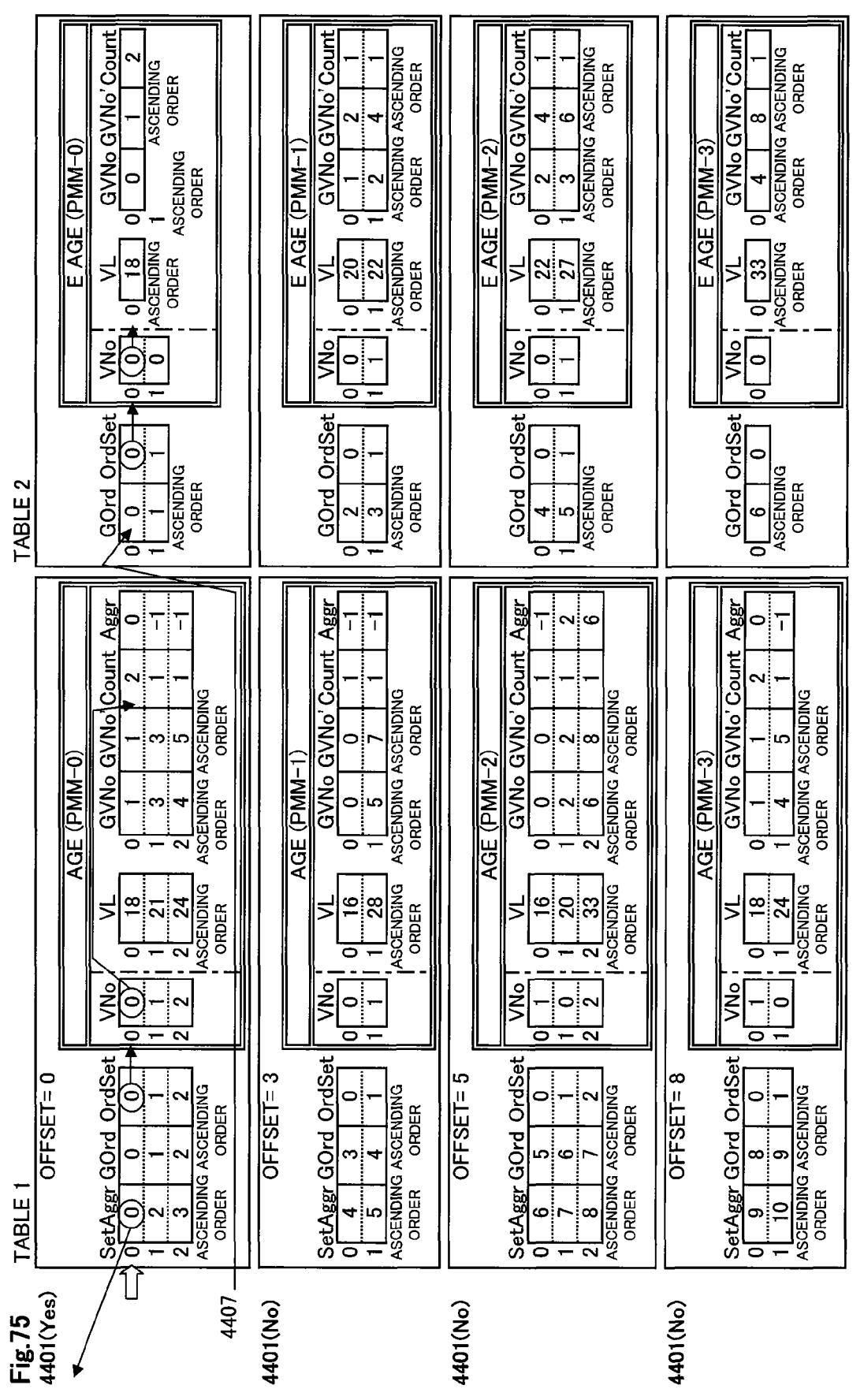

FIG. 75 is a diagram showing a state of the readout process in the PMM-0 to the PMM-3.

Figure 76:
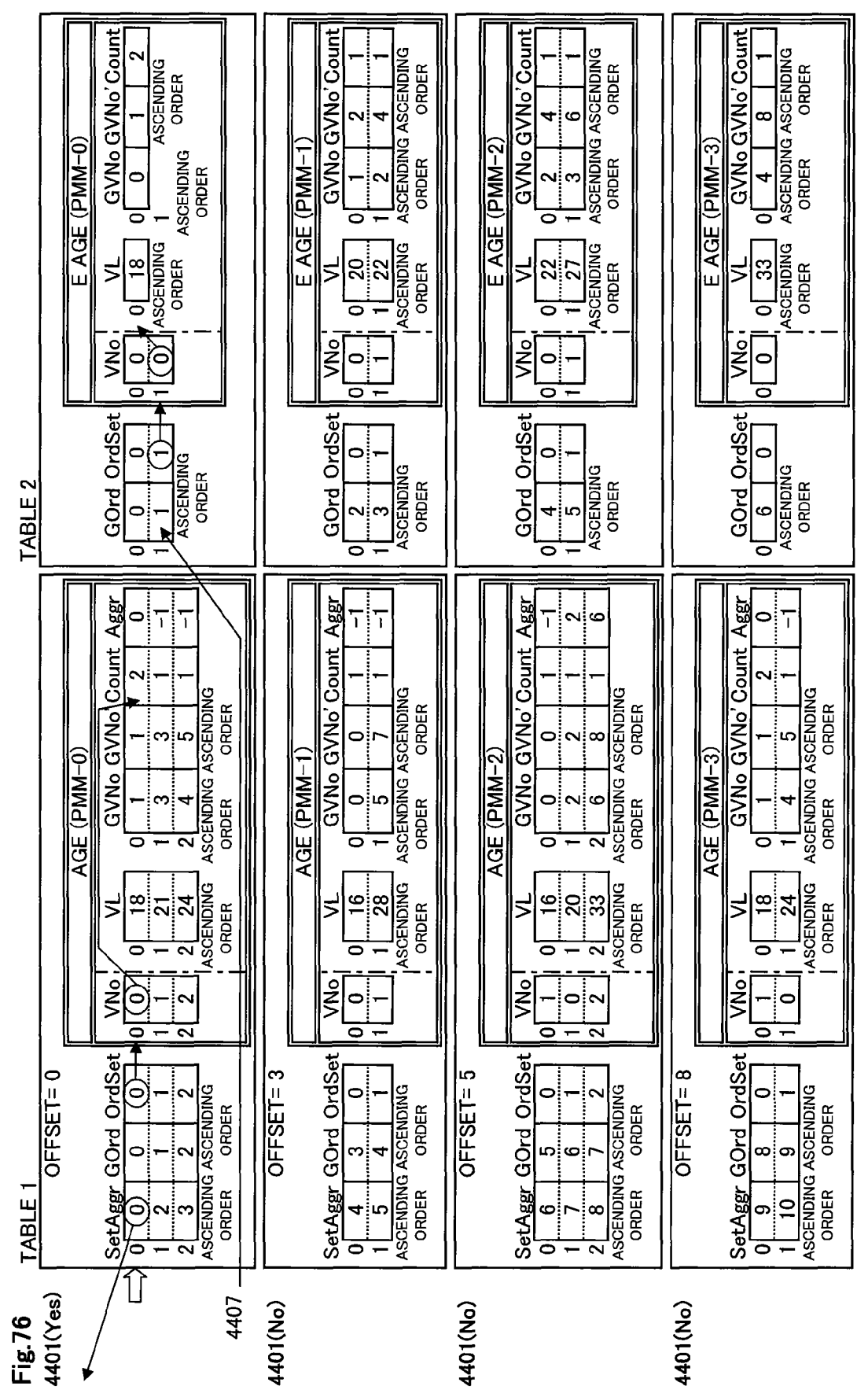

FIG. 76 is a diagram showing a state of the readout process in the PMM-0 to the PMM-3.

Figure 77:
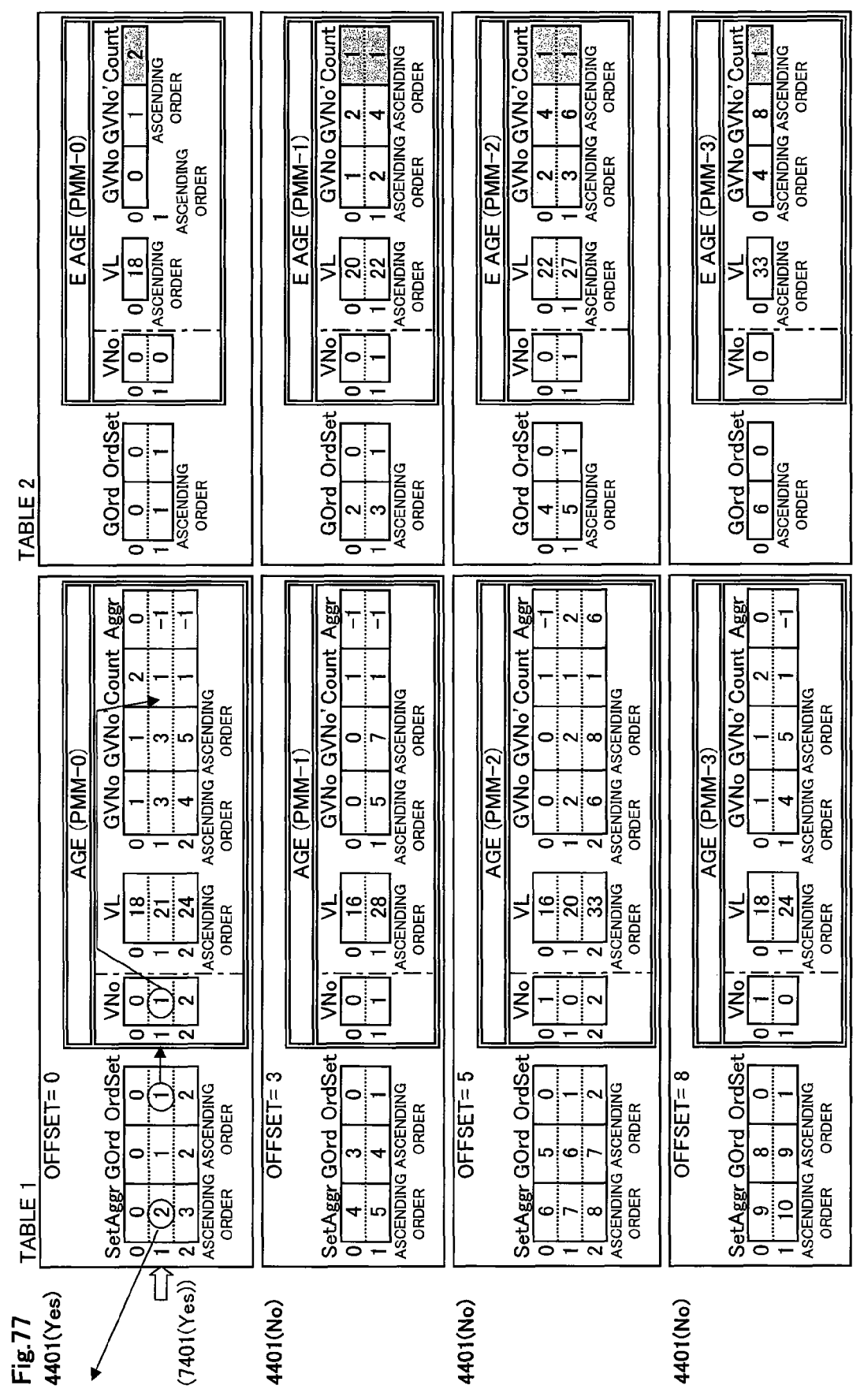

FIG. 77 is a diagram showing a state of the readout process in the PMM-0 to the PMM-3.

FIG. 78 is a diagram showing information read out in the external join process.

Figure 79:
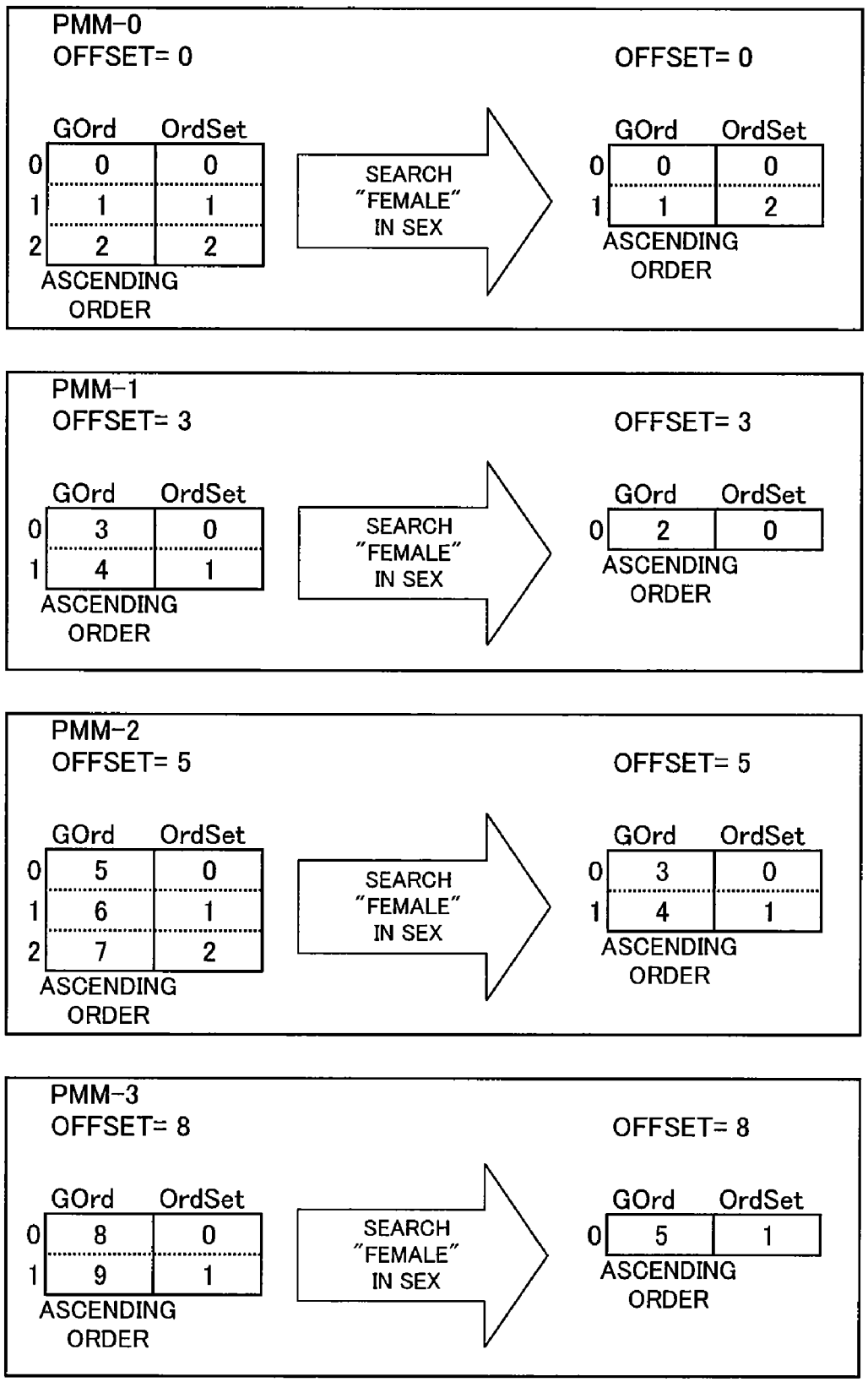

FIG. 79 is an illustration of a search process in a main table.

Figure 80:
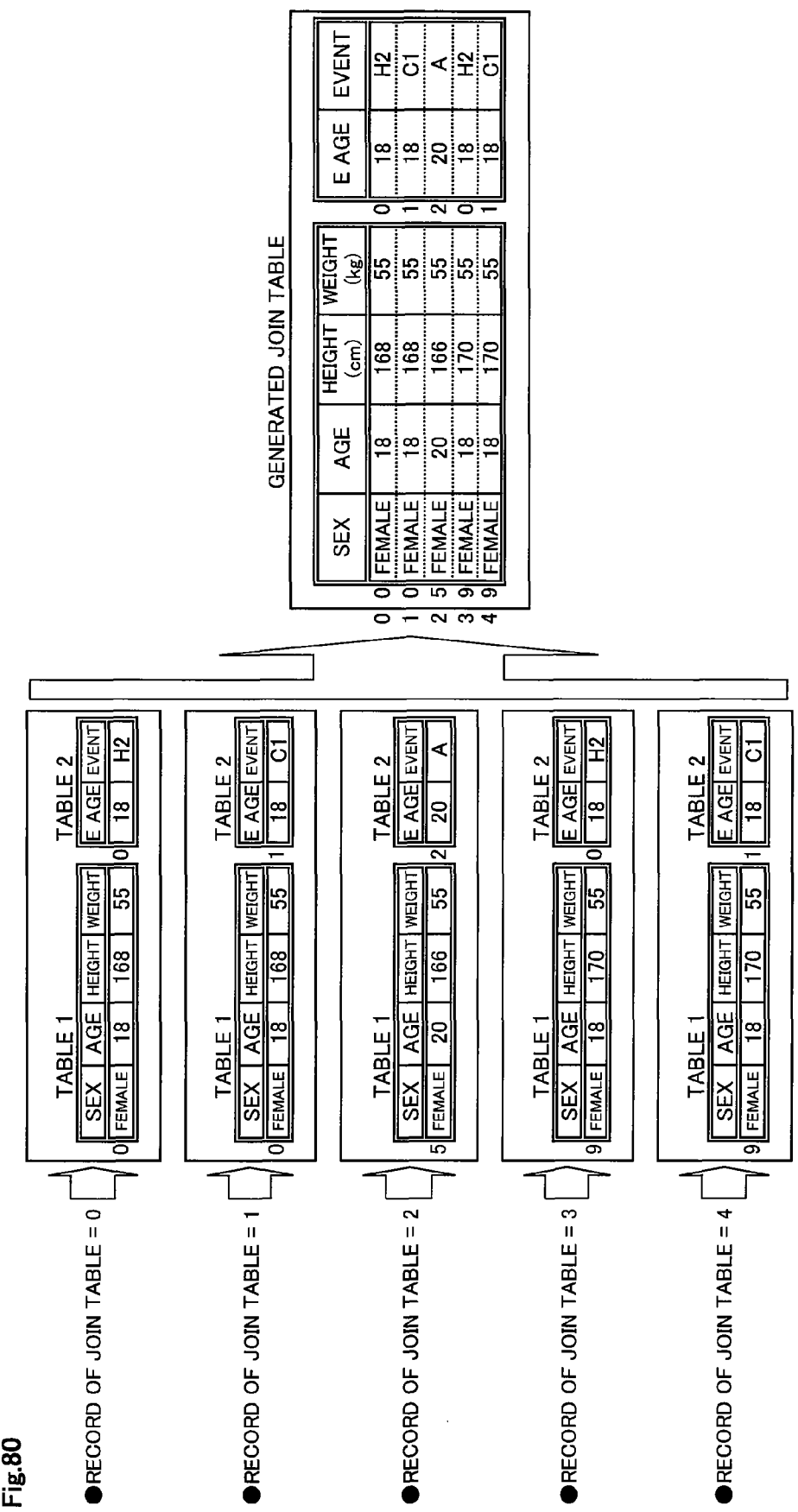

FIG. 80 is an illustration of a table (view) generated by the search process and the join process.

Figure 81:
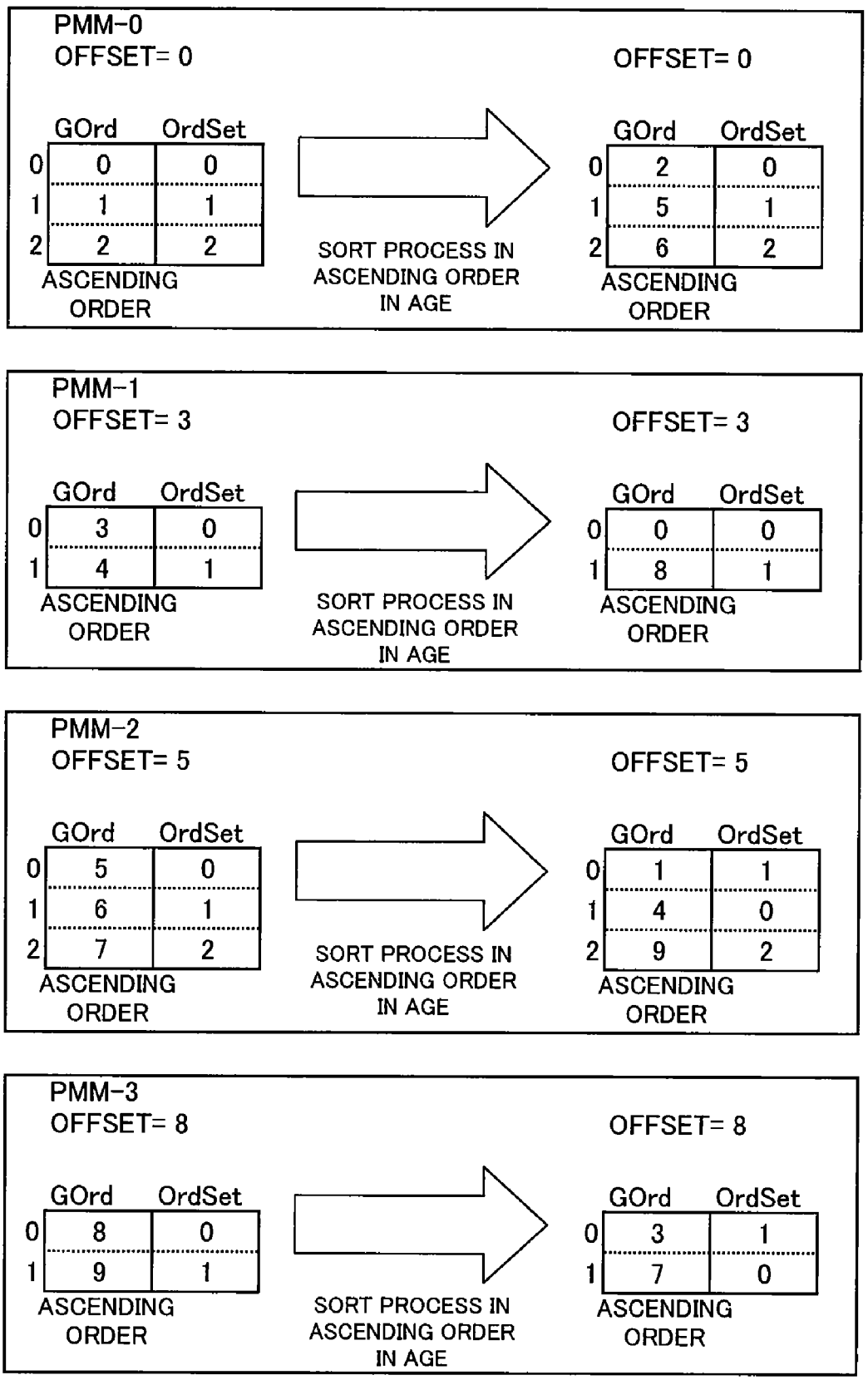

FIG. 81 is an illustration of a sort process in the main table.

FIG. 82 is an illustration of the master table after the sort process.

Figure 83:
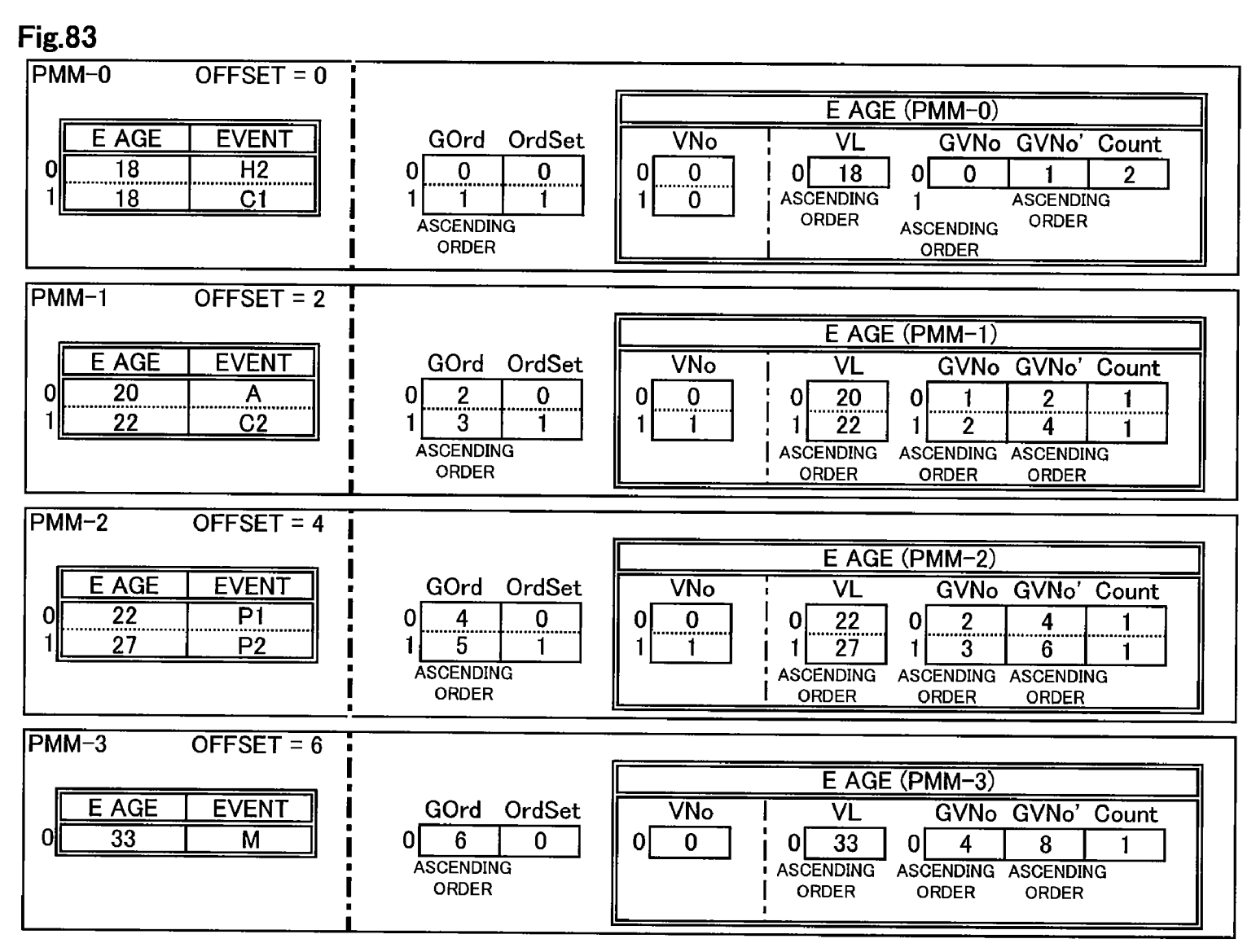

FIG. 83 is an illustration of the slave table after the sort process.

Figure 84:
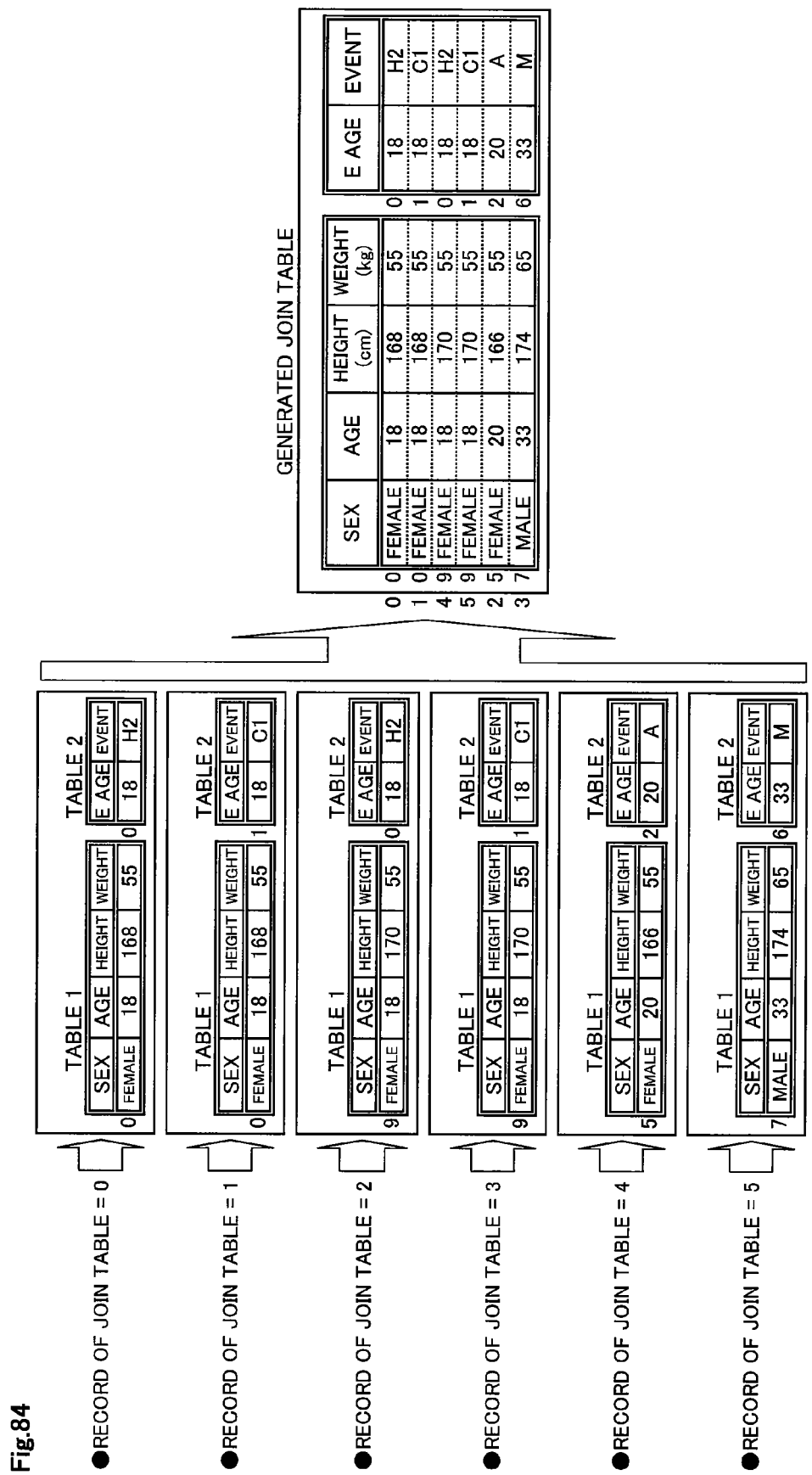

FIG. 84 is an illustration of a table (view) generated by the sort process and the join process.

Figure 85:
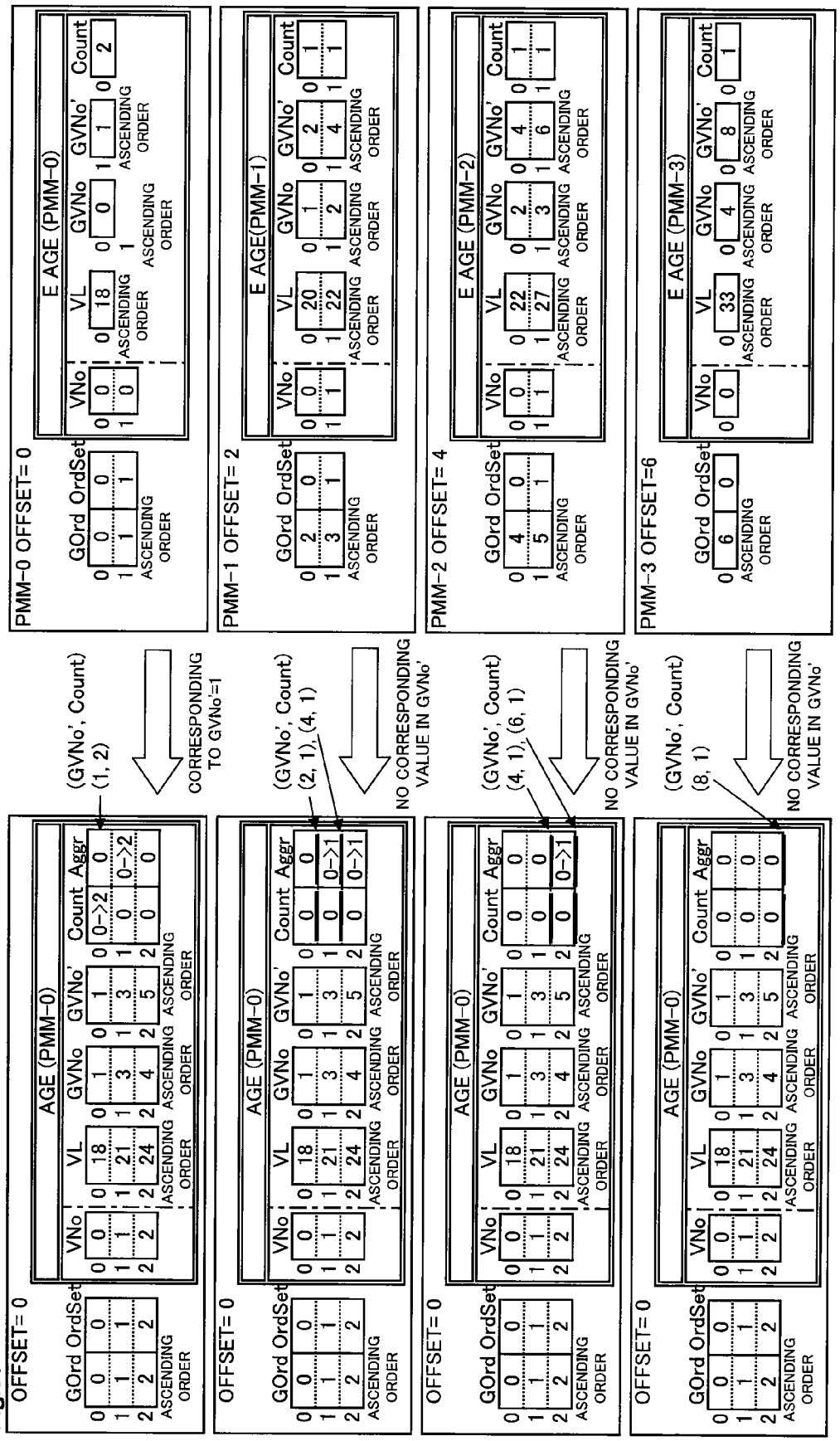

FIG. 85 is a diagram showing a state in which a packet constituted of (value of GVNo, value of Count) relating to the table 2 is sent from each of the PMM-0 to the PMM-3 to the PMM-0 based on another method.

Figure 86:
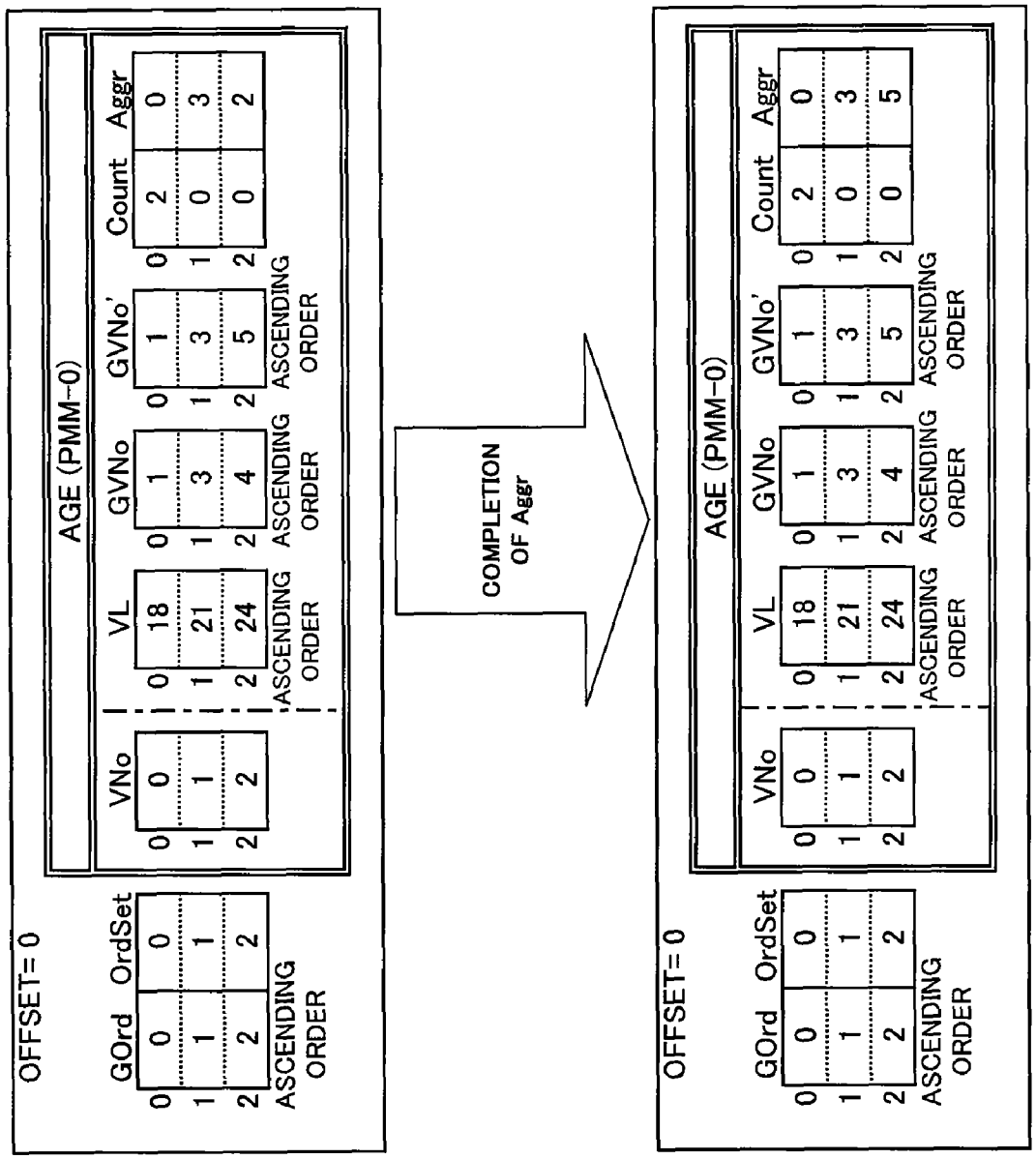

FIG. 86 is an illustration of obtainment of a final count array Count and a final aggregation array Aggr in the PMM-0 based on another method.

Figure 87:
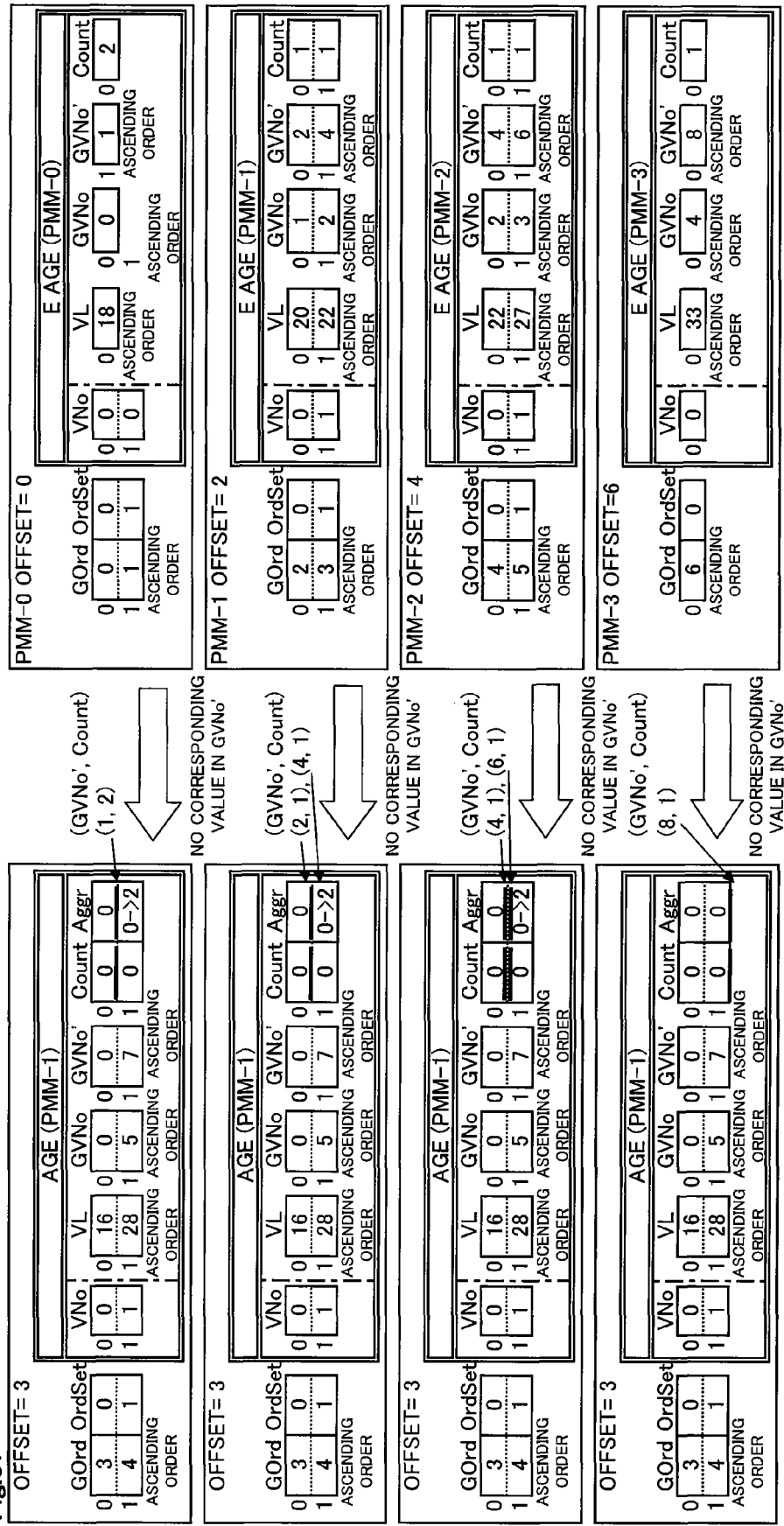

FIG. 87 is a diagram showing a state in which a packet constituted of (value of GVNo, value of Count) relating to the table 2 is sent from each of the PMM-0 to the PMM-3 to the PMM-1 based on another method.

Figure 88:
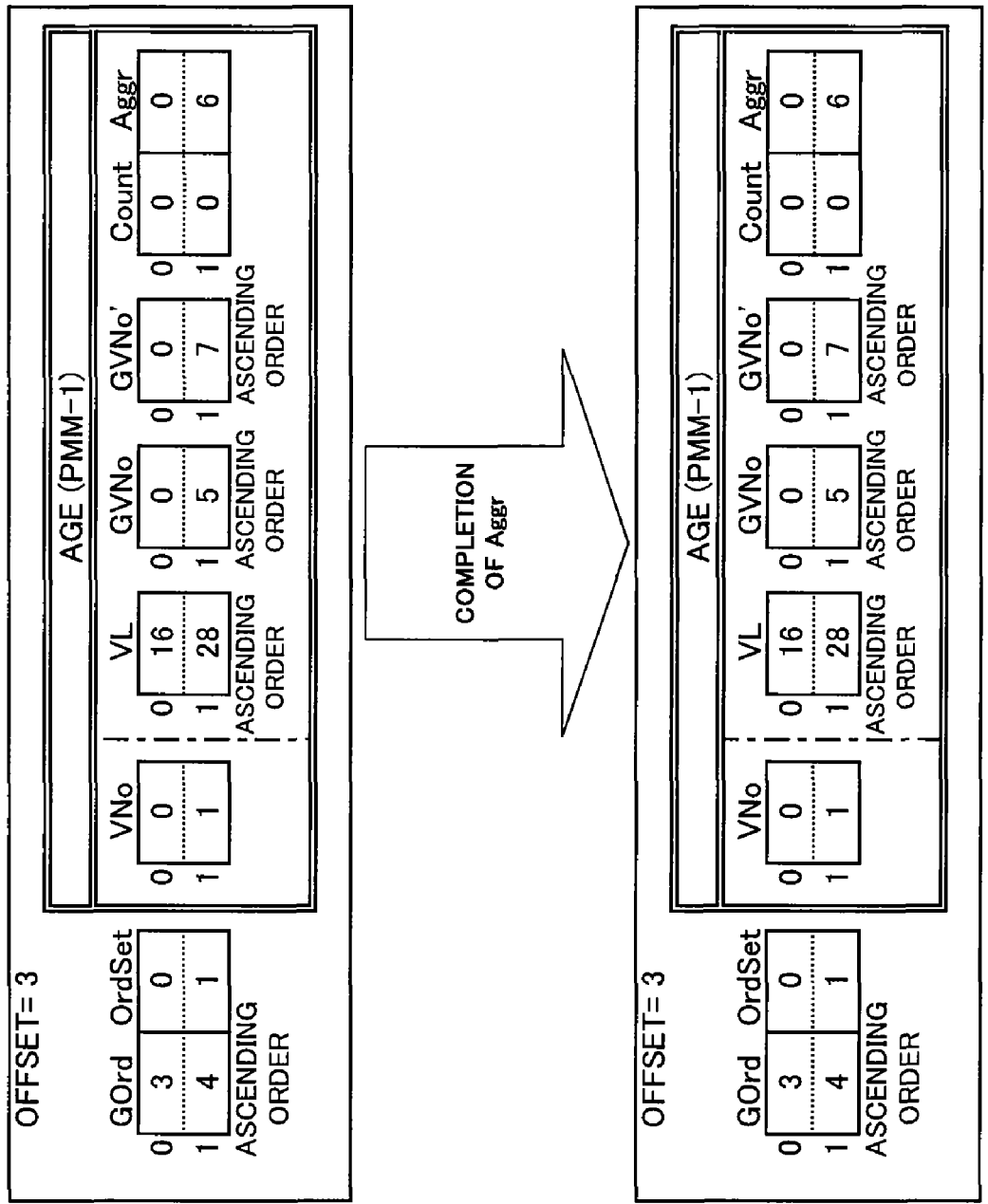

FIG. 88 is an illustration of obtainment of a final count array Count and a final aggregation array Aggr in the PMM-1 based on another method.

Figure 89:
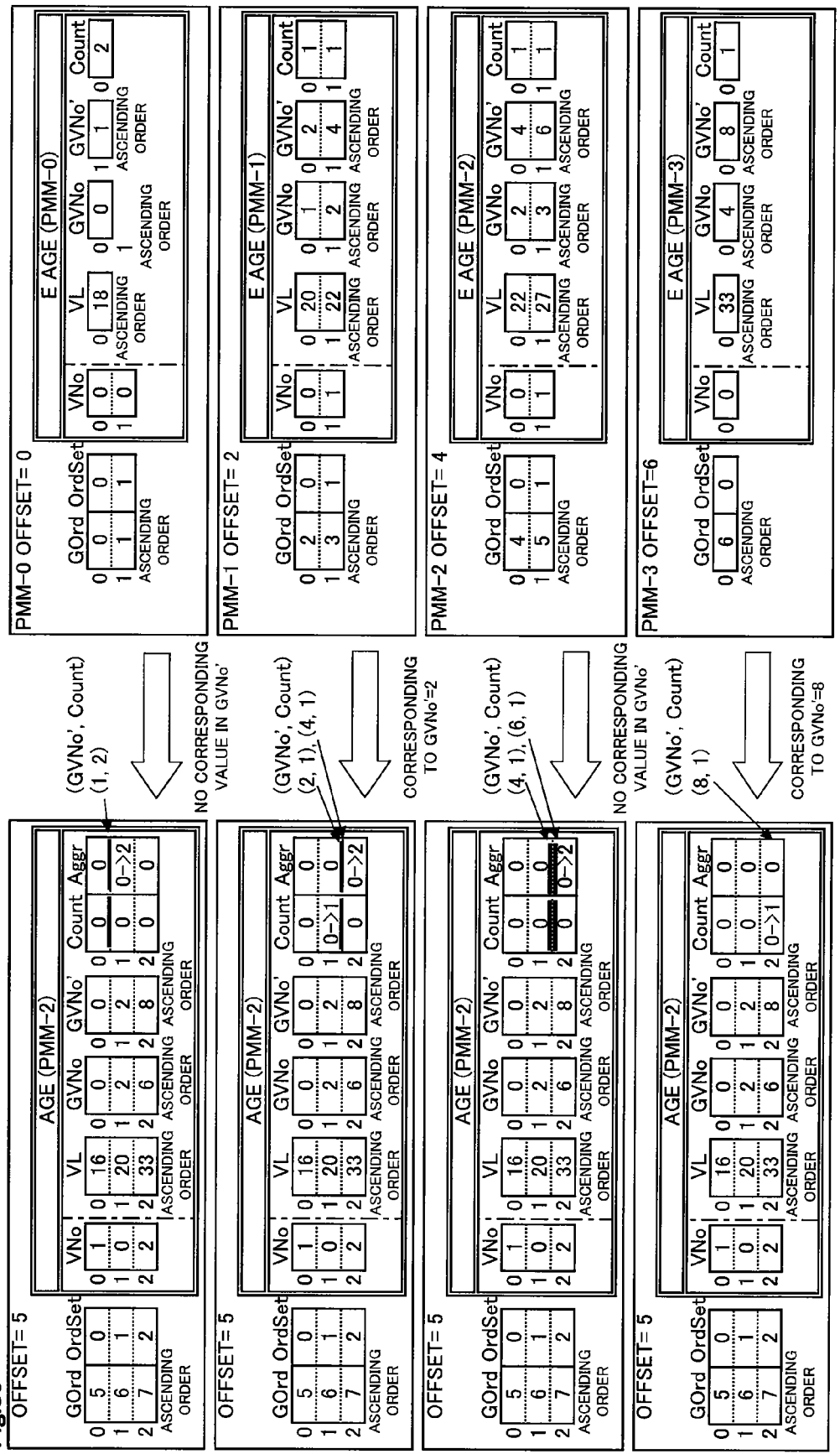

FIG. 89 is a diagram showing a state in which a packet constituted of (value of GVNo, value of Count) relating to the table 2 is sent from each of the PMM-0 to the PMM-3 to the PMM-2 based on another method.

Figure 90:
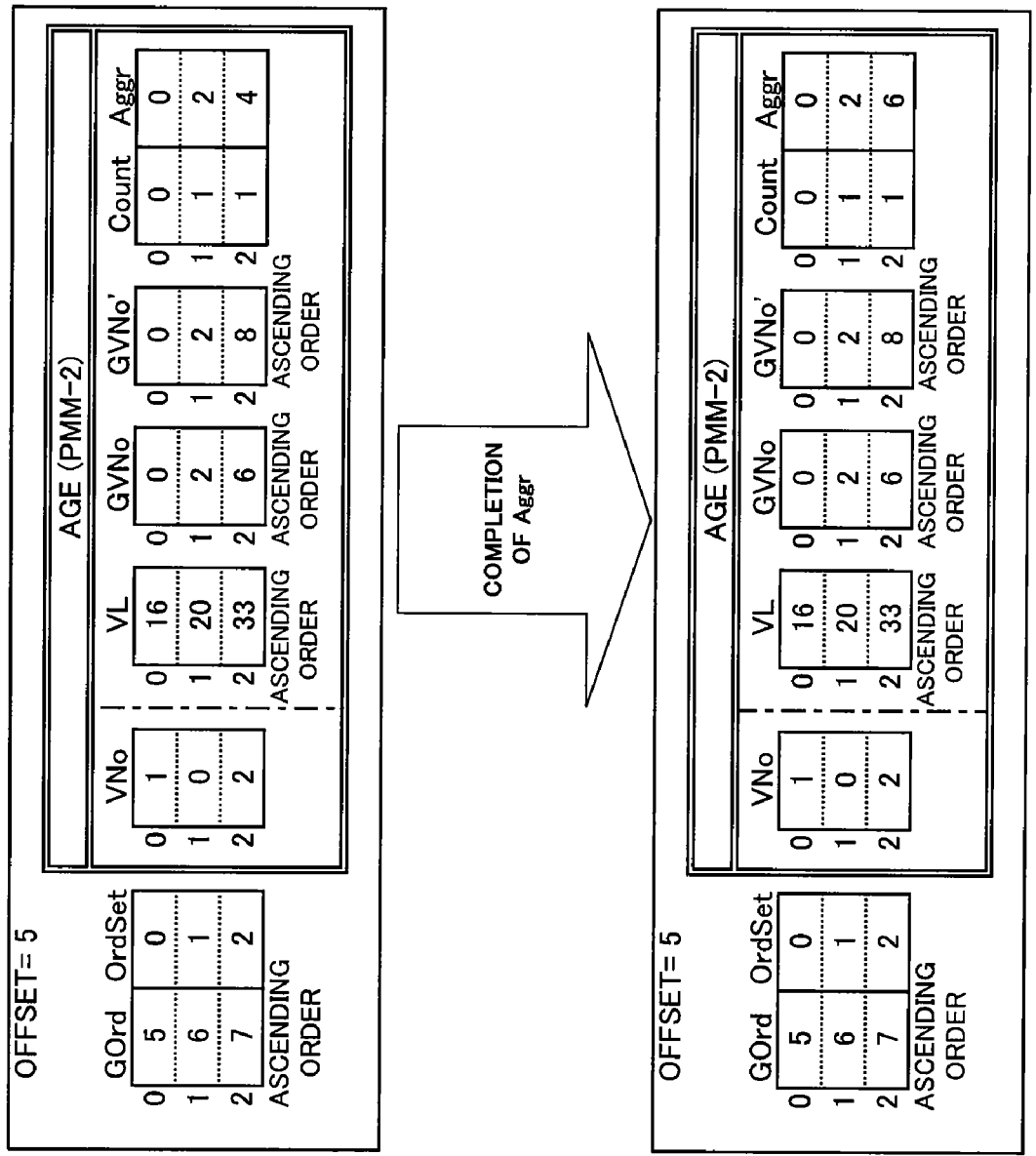

FIG. 90 is an illustration of obtainment of a final count array Count and a final aggregation array Aggr in the PMM-2 based on another method.

Figure 91:
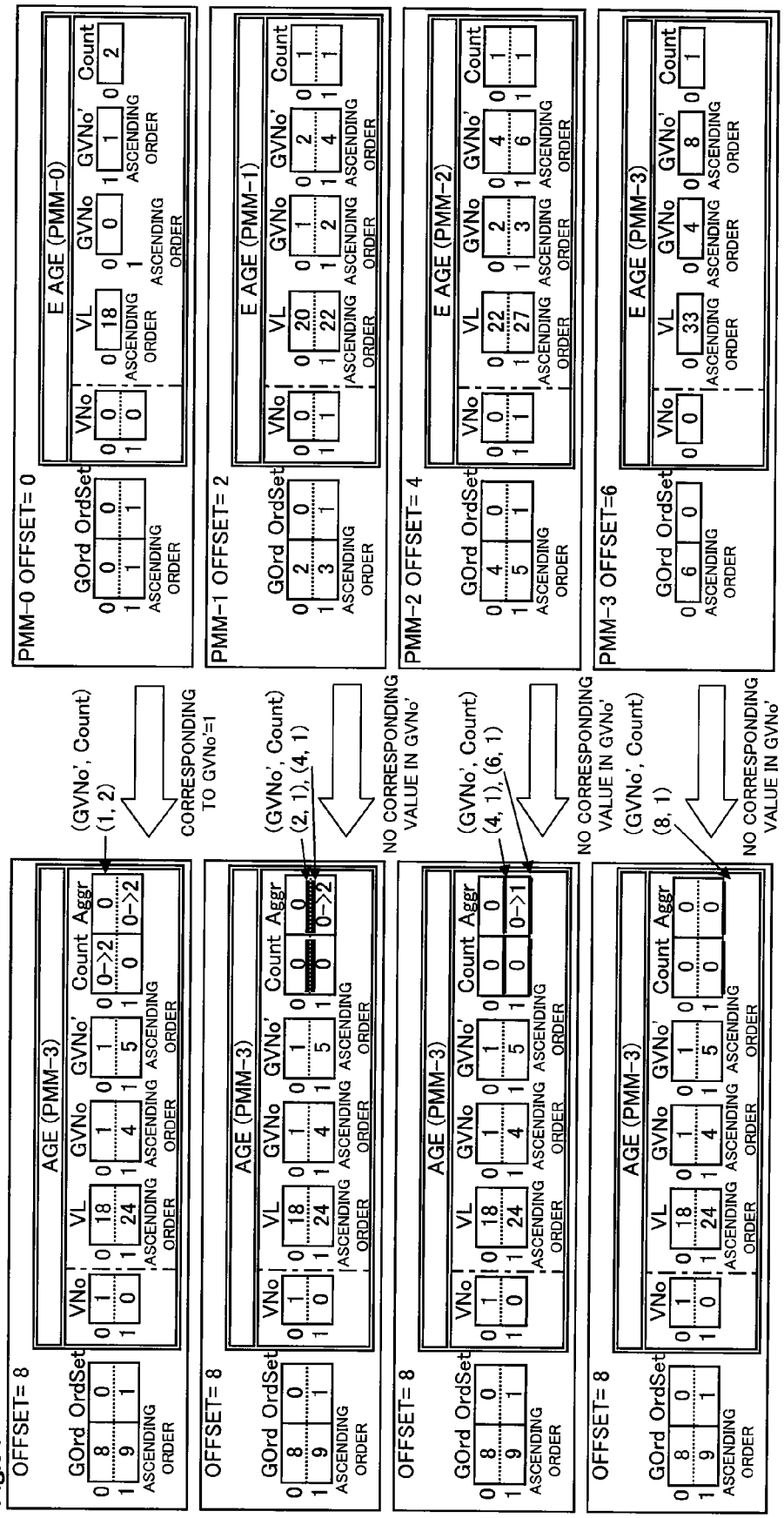

FIG. 91 is a diagram showing a state in which a packet constituted of (value of GVNo, value of Count) relating to the table 2 is sent from each of the PMM-0 to the PMM-3 to the PMM-3 based on another method.

Figure 92:
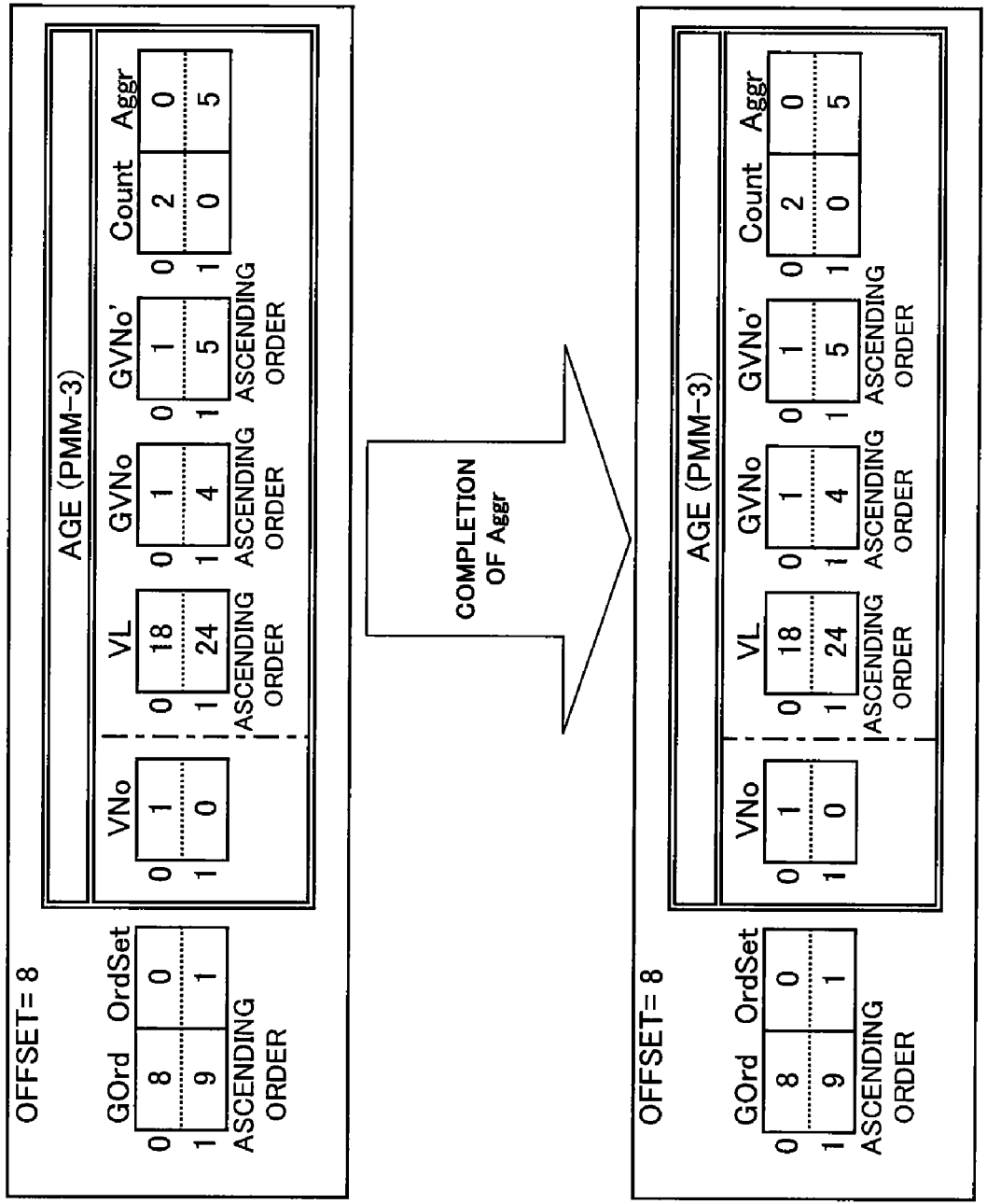

FIG. 92 is an illustration of obtainment of a final count array Count and a final aggregation array Aggr in the PMM-3 based on another method.

Figure 93:
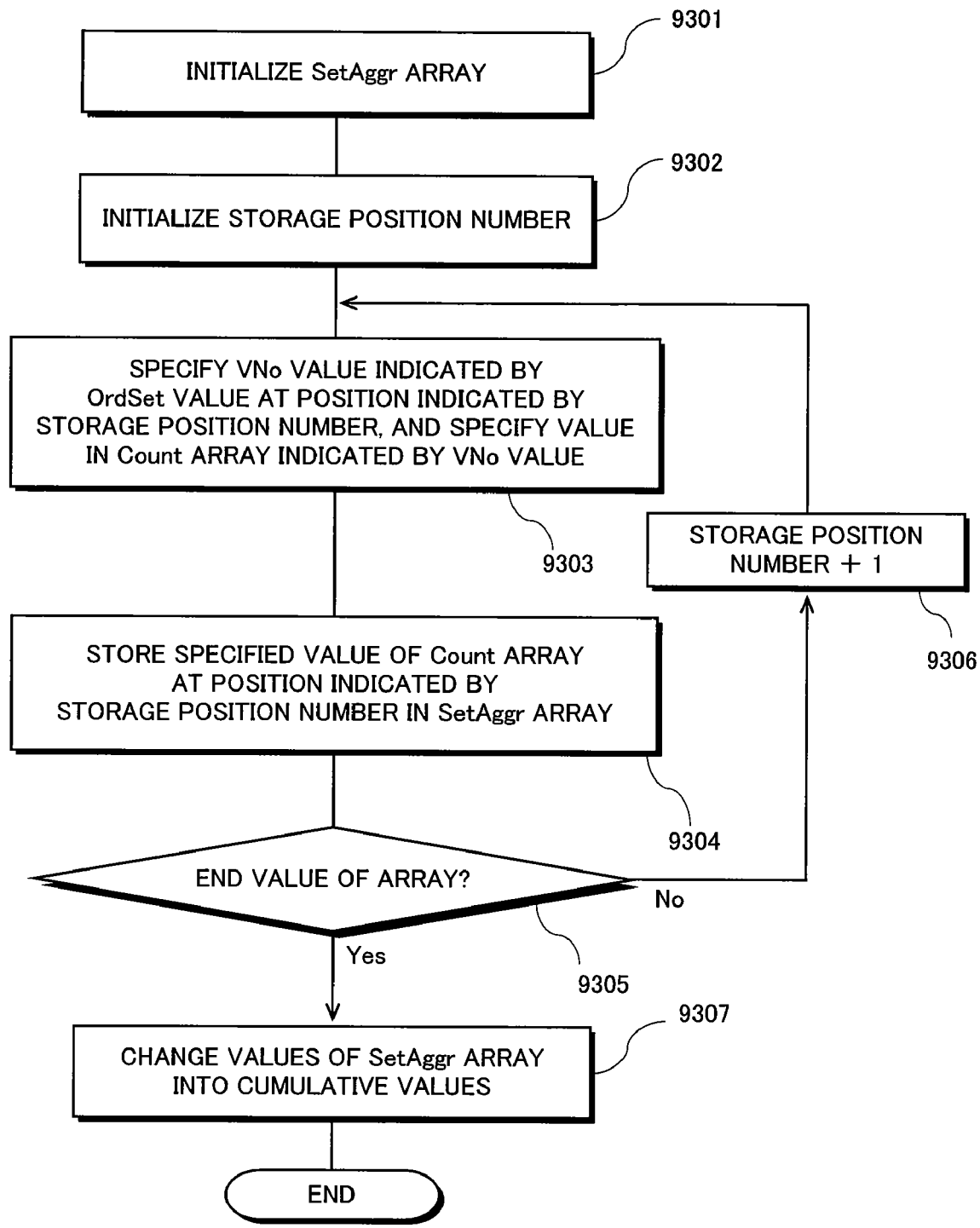

FIG. 93 is a flowchart showing a process executed by each of PMMs for generating an aggregation array SetAggr.

Figure 94:
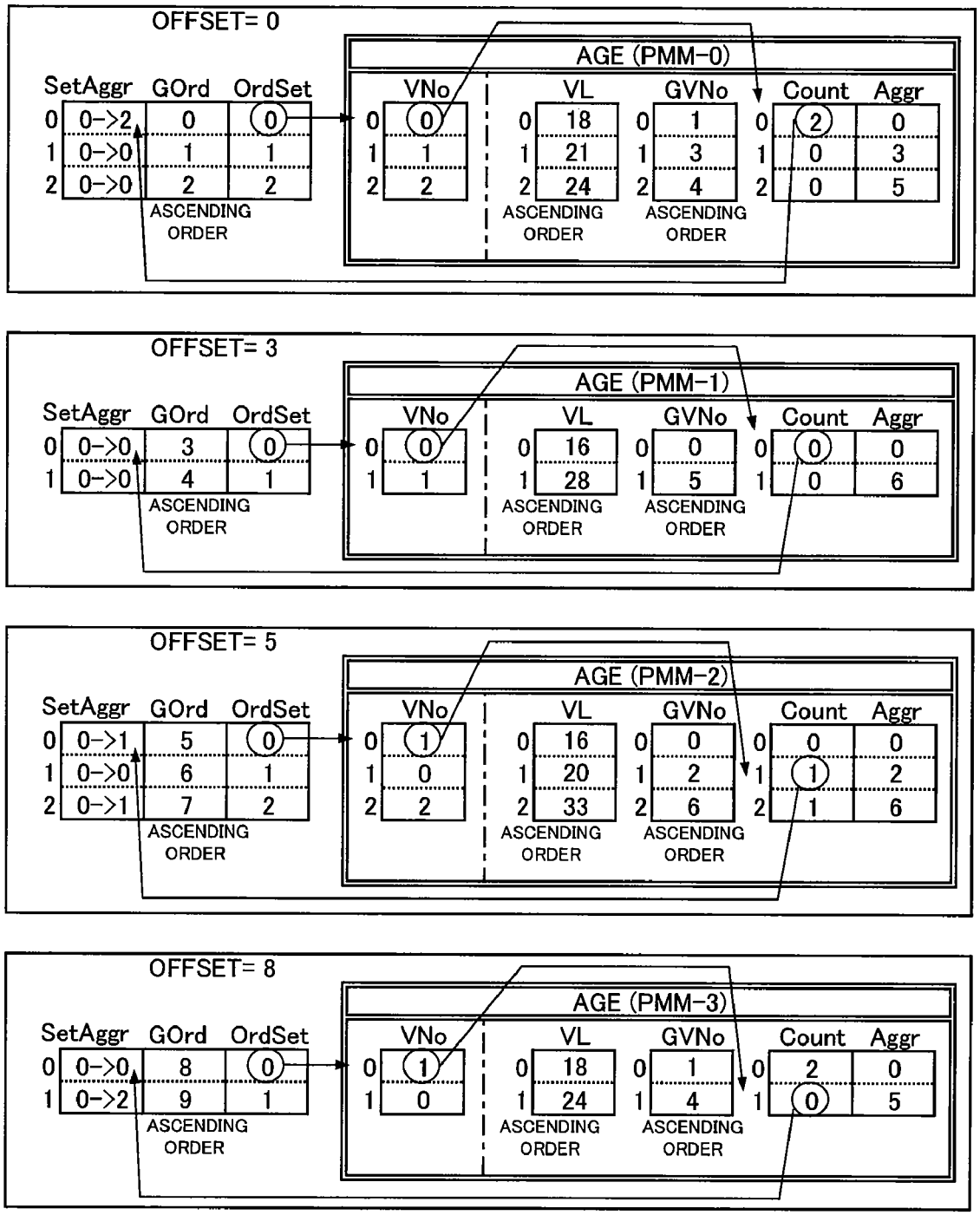

FIG. 94 is a diagram showing a state in which a value of the array Count is stored in the array SetAggr.

Each of FIGS. 95A and 95B is a diagram showing a state of the array SetAggr on which the process of FIG. 93 has been performed.

Figure 96:
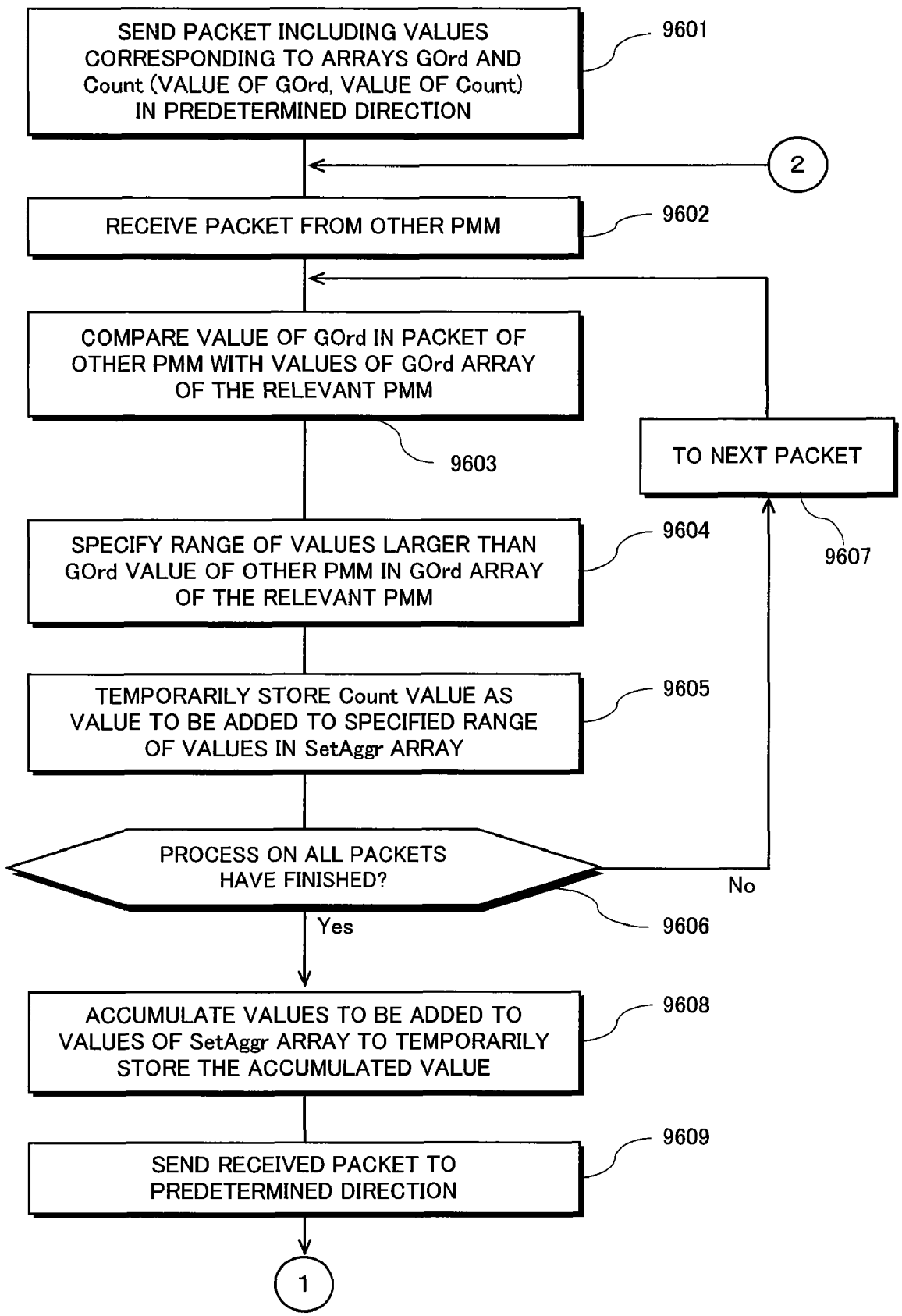

FIG. 96 is a flowchart showing a process executed to obtain a final SetAggr in each of the PMMs.

Figure 97:
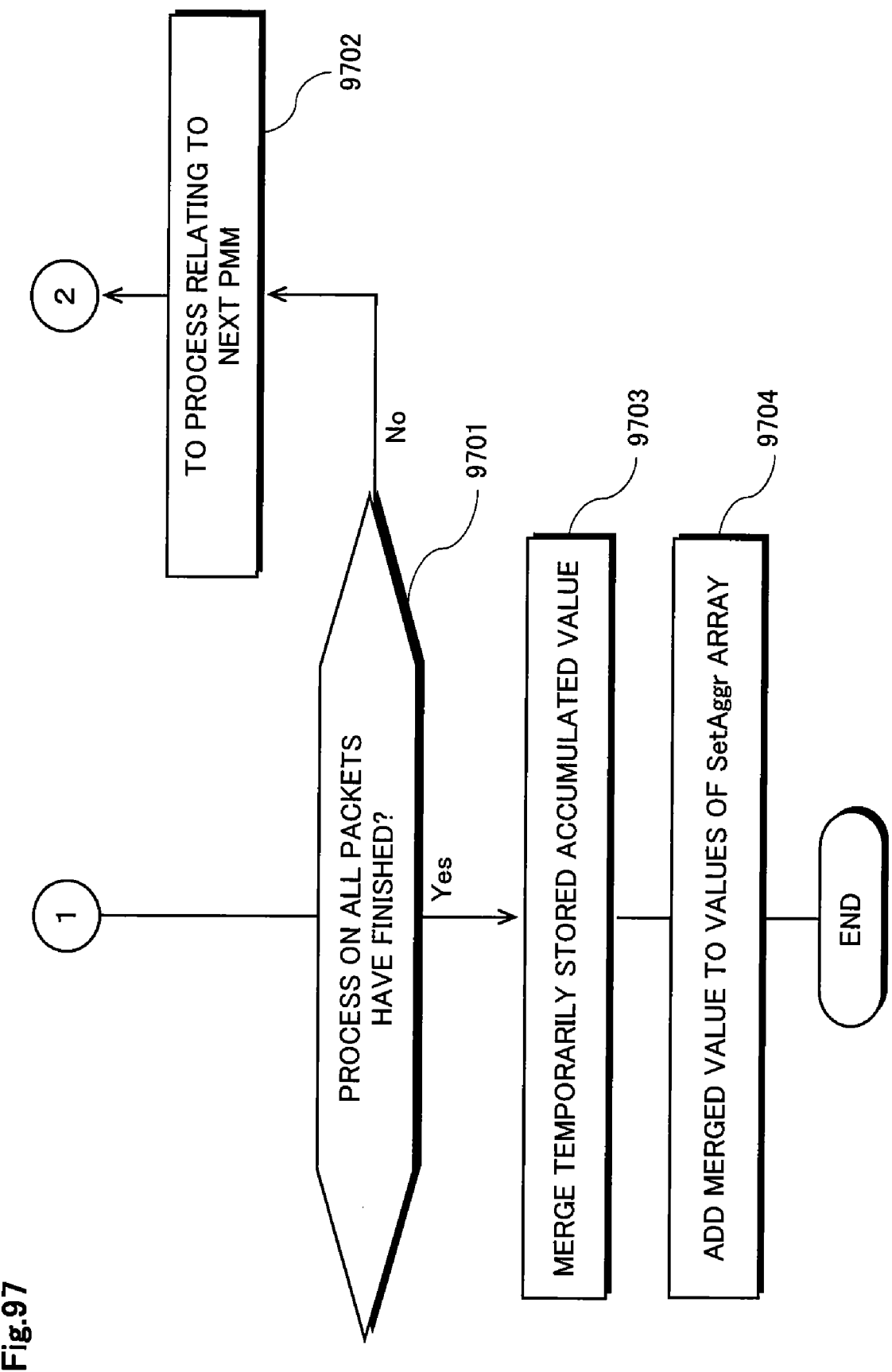

FIG. 97 is a flowchart showing a process executed to obtain a final SetAggr in each of the PMMs.

Figure 98:
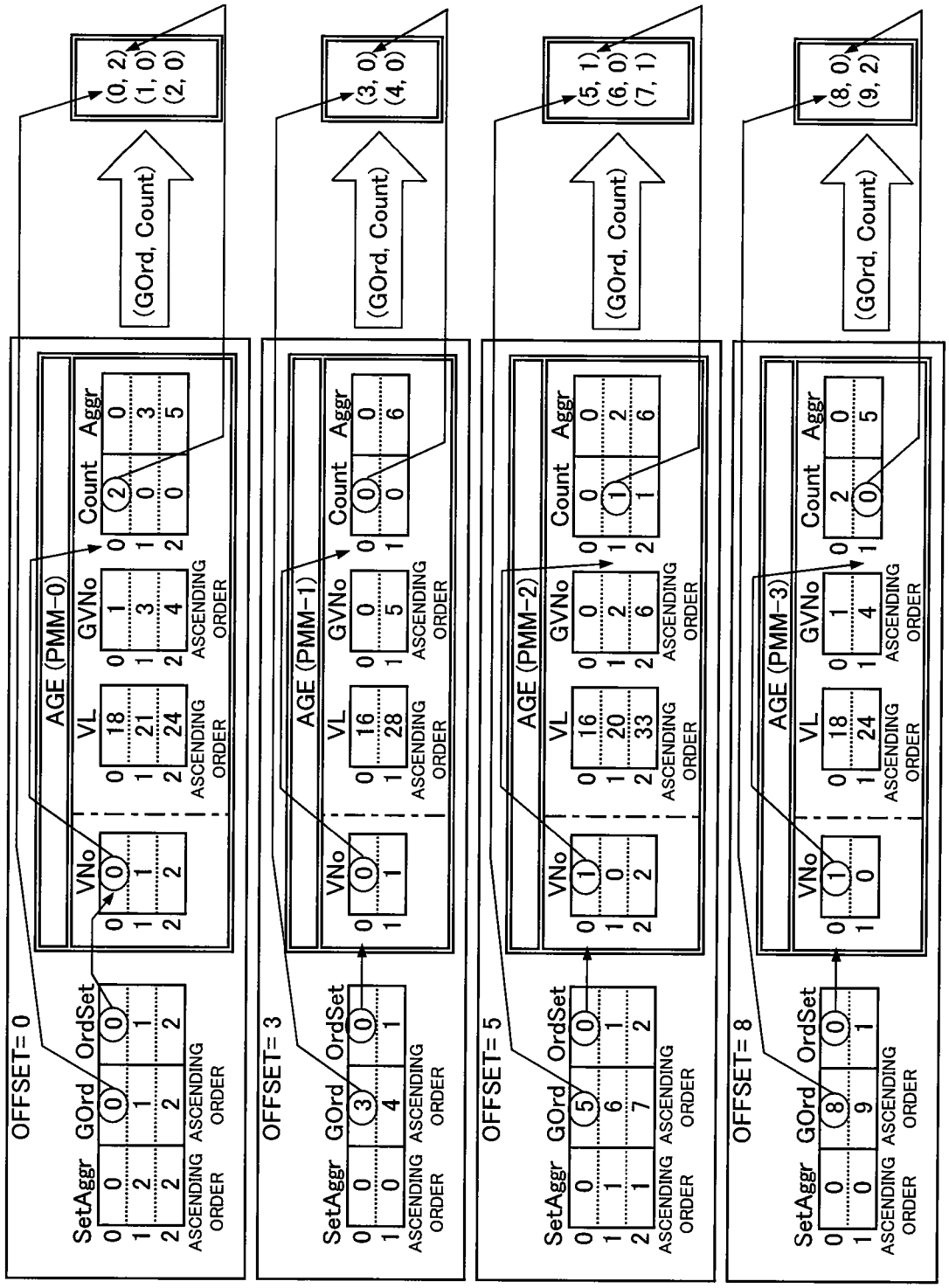

FIG. 98 is an illustration of generation of (value of GOrd, value of Count).

Figure 99:
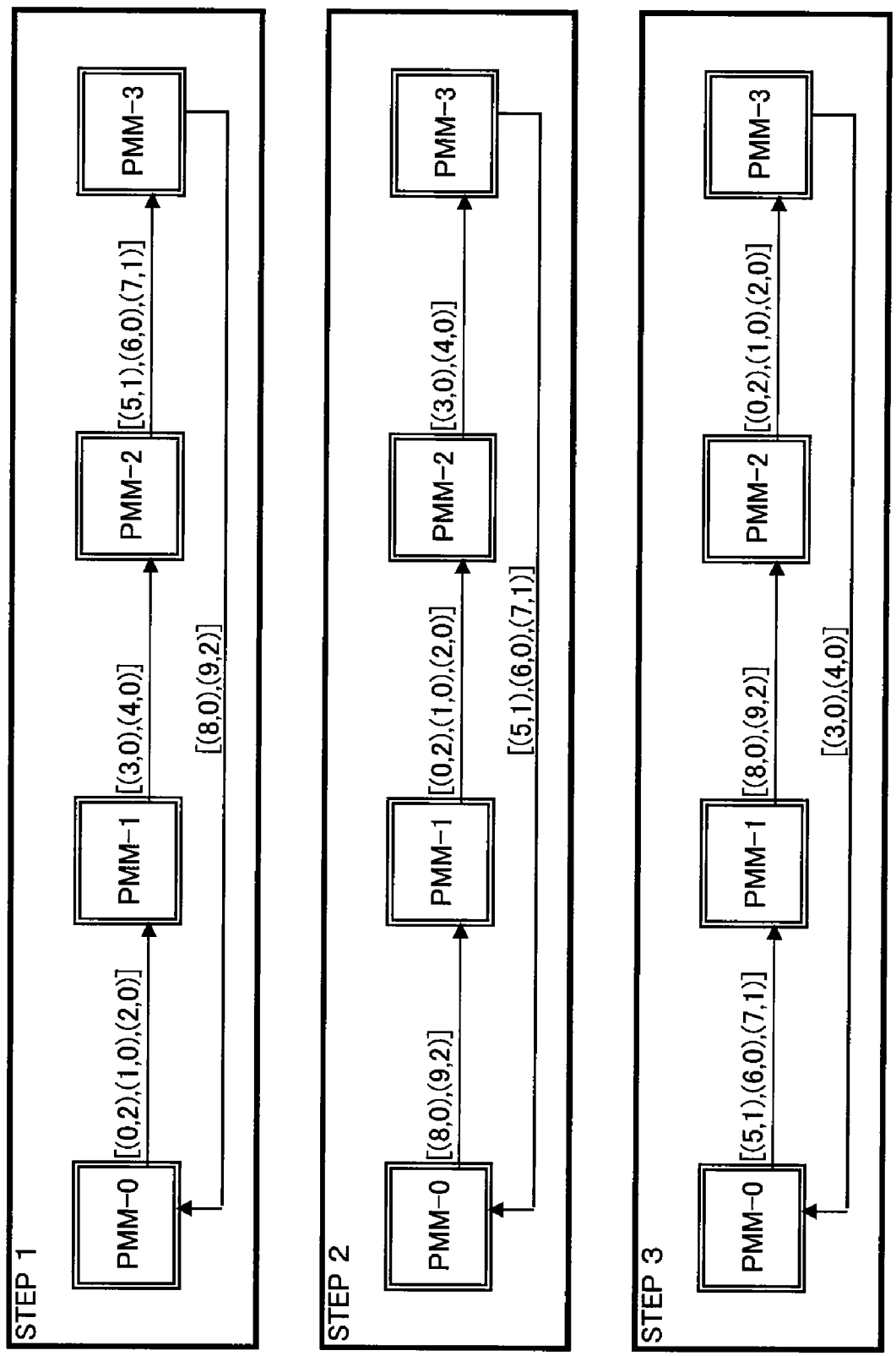

FIG. 99 is an illustration of inter-PMM packet transmission.

FIG. 100 is a diagram showing the packet received by the packet transmission.

FIG. 101 is a diagram showing a state in which a process is executed in response to the packet reception in the PMM-0.

FIG. 102 is a diagram showing a state in which a process is executed in response to the packet reception in the PMM-1.

Figure 103:
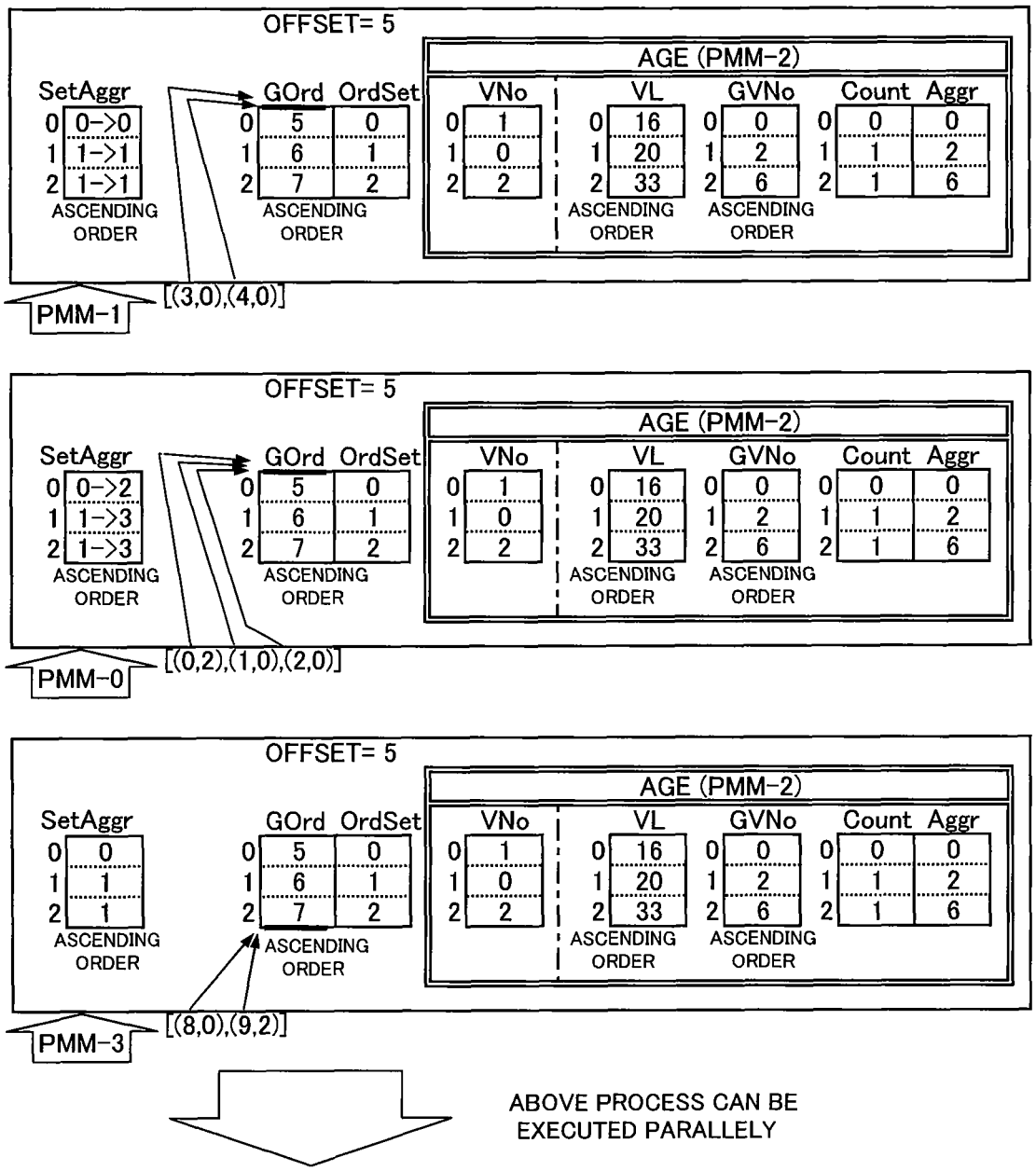

FIG. 103 is a diagram showing a state in which a process is executed in response to the packet reception in the PMM-2.

FIG. 104 is a diagram showing a state in which a process is executed in response to the packet reception in the PMM-3.

DESCRIPTION OF REFERENCE NUMERALS

12: PMM
14: first bus
16: second bus
20: control circuit
22: bus I/F
24: memory
26: bank

The invention claimed is:

1. An information processing system comprising:
   (a) a plurality of memory modules, each module having a memory and a control device; and
   (b) data transmission paths for connecting the memory modules and transmitting a value from one of the memory modules to other memory modules,
   in which each of the memory modules retains a value list of values of a first item, or a value list of values of a second item to be unified, or the value list of values of the first item and the value list of values of the second item, the values being ranked in an ascending or descending order without duplication, characterized in that
   the control device of each of the memory modules comprises
      i. a data sending means for sending the values included in the value list of the first item, or the value list of the second item or the value list of the first item and the value list of the second item to the other memory modules;
      ii. a data receiving means for receiving the values included in the value list of the first item, or the value list of second item, of the value list of the first item and the value list of the second item from the other memory modules; and
      iii. a unifying means for referring to the value list of the first item and the value list of the second item in the other memory modules received by the data receiving means and deciding a ranking of the values in the value list of the first item, or the values in the value list of the second item, or the values in the value list of the first item and the second item, in view of the values included in the value lists of the first and the second items from all of the other memory modules,
   the unifying means comprising
      a first ranking decision means for referring to the value list of the first item in each of the memory modules or the value list of the second item in each of the memory modules, or the value list of the first item and the value list of the second item, in each of the memory modules as well as the value lists of the first and the second items in the other memory modules received by the data receiving means,
      for comparing the values of the value list of the second item in each of the memory modules, the values of the value list of the first item in the other memory module, or the values of the value list of the second item in the other memory modules with the values of the value list of the first item of each of the memory modules, and if any of the values in the compared value lists is equal to the values of the value list of the first item in each of the memory modules, deleting the identical value, and
      for deciding a global value ranking for the first item in view of the values included in the value lists of the first item and the second item in each of the memory modules and in the value lists of the first item and the second item in the other memory modules and storing the decided ranking in a first global order storage array for storing the global value ranking at a position corresponding to a value of each of the memory modules; and
      a second ranking decision means for referring to the value list of the first item in each of the memory modules, or the value list of the second item in each of the memory modules, or the value list of the first item and the value list of the second item in each of the memory modules, as well as the value lists of the first and the second items in the other memory modules received by the data receiving means,
      for comparing the values of the value list of the first item in each of the memory modules, the values of the value list of the first item in the other memory modules, or the values of the value list of the second item in the other memory modules with the values of the value list of the second item in each of the memory modules, and if any of the values in the compared value lists is equal to the values of the value list of the second item in each of the memory modules, deleting said any of the values, and
      for deciding a global value ranking for the second item in view of the values included in the value lists of the first item and the second item in each of the memory modules and in the value lists of the first item and the second item in the other memory modules and storing the decided ranking in a second global order storage array for storing the global value ranking at the position corresponding to the value of each of the memory modules.

2. The information processing system according to claim 1, wherein
   the value list of the first item from which the identical value is deleted is sent to the other memory modules via the data transmission path or to the second ranking decision means by the data sending means and
   the value list of the second item from which the identical value is deleted is sent to the other memory modules via the data transmission path or to the first ranking decision means by the data sending means.

3. The information processing system according to claim 2, wherein
   the control device of each of the memory modules further comprises:
   a first occurrence count array generation means for generating a first occurrence count array storing occurrence counts of the values in the value list of the second item in all the memory modules; and
   a second occurrence count array generation means for generating, based on the occurrence counts in the first occurrence count array relating to the value list of the second item, a second occurrence count array storing occurrence counts of the values of the value list of the first item, the occurrence counts in the second occurrence count array corresponding to the occurrence counts in the first occurrence count array.

4. The information processing system according to claim 3, wherein
the first occurrence count array generation means generates a local occurrence count array storing the occurrence counts of the value list of the second item in each of the memory modules;
the data sending means sends combinations of the occurrence counts in the local occurrence count array and the corresponding values in the second global value number array; and
the first occurrence count array generation means is arranged to refer to the occurrence counts of the local occurrence count array and the values of the second global value number array in the other memory modules received by the data receiving means and to generate the first occurrence count array in view of the occurrence counts in the local occurrence count array in the other memory modules.

5. The information processing system according to claim 3, wherein
the data sending means sends combinations of the occurrence counts in the first occurrence count array and the values in the first global order storage array to the other memory modules; and
the second occurrence count array generation means is arranged to generate a region for a counter array and a cumulative number array having a size identical to the value list and used as the second occurrence count array in the storage,
the second occurrence count array generation means is arranged to refer to the occurrence counts in the first occurrence count array in the other memory modules received by the data receiving means, and is arranged to increase a value at a corresponding position in the counter array by a certain value when any of the values in the order storage array in the other memory modules is equal to the value in the first global order storage array in each of the memory modules, said certain value being said any of the values in the order storage array in the other memory modules and also increase a value at a next storage position number in the cumulative number array by said any of the values in the order storage array in the other memory modules, or increase a value in the cumulative number array at a storage position number next to the position corresponding to the value in the order storage array in the other memory modules by the value in the order storage array in the other memory modules when none of the values in the order storage array in the other memory modules is equal to the values in the first global order storage array in each of the memory modules, and
the second occurrence count array generation means is arranged to generate a final cumulative number array by accumulating the values of the cumulative number array in the order of the storage position numbers.

6. The information processing system according to claim 5, further comprising:
a data readout means for reading out the values in the value list of the first item based on the occurrence counts of the second occurrence count array so duplication of identical values is allowed, wherein the data readout means is arranged to generate a second cumulative number array indicating a total number of records having the values of the order storage array not exceeding the value of the order storage array of each of the memory modules by referring to the combinations of the values of the order storage array and corresponding values of the count array of the other memory modules and read out the values in the value list of the first item based on the values of the second cumulative number array, the value of the count array corresponding to the storage position of the second cumulative number, and the value of the final cumulative number array corresponding to the storage position so duplication of identical values is allowed.

7. The information processing system according to claim 3, wherein
the data sending means sends combinations of the occurrence counts of the first occurrence count array and the values of the first global order storage array to the other memory modules; and
the second occurrence count array generation means is arranged to generate a region for a counter array and a cumulative number array having a size identical to the value list and used as the second occurrence count array in the storage,
the second occurrence count array generation means is arranged to refer to the occurrence counts of the first occurrence count array in the other memory modules received by the data receiving means, and is arranged to increase a value at a corresponding position in the counter array by a certain value when any of the values in the order storage array in the other memory modules is equal to the value in the first global order storage array in each of the memory modules, said certain value being said any one of values in the order storage array in the other memory modules, and also increase a value at a next storage position number in the cumulative number array by said any of the values in the order storage array in the other memory modules, or increase the value at the corresponding position in the counter array by "1", when none of the values in the order storage array in the other memory modules is equal to the values in the first global order storage array in each of the memory modules, store an invalid value as the value, at the position corresponding to the value in the order storage array in the other memory modules, in the cumulative number array, and increase the value of the storage position number next to the corresponding position by the value of the order storage array in the other memory modules, and
the second occurrence count array generation means is arranged to accumulate the values of the cumulative number array in the order of the storage position numbers.

8. The information processing system according to claim 3, further comprising a data readout means for reading out the values in the value list of the first item based on the occurrence counts in the second occurrence count array so duplication of identical values is allowed.

9. A method for unifying a value list in an information processing system, wherein the system comprises
a plurality of memory modules, each module having a memory and a control device; and
data transmission paths for connecting the memory modules and transmitting a value from one of the memory modules to other memory modules, wherein each of the memory modules retains a value first list of values of a first item, or a value list of values of a second item to be unified, or the value list of values of the first item and the value list of values of the second item, the values being ranked in an ascending or descending order without duplication, wherein the method comprises, in the control device of each of the memory modules:

(a) a data sending step for sending the values included in value list of the first item, or the value list of the second item or the value list of the first item and the value list of the second item to the other memory modules;

(b) a data receiving step for receiving the values included in value list of the first item, or the value list of the second item or the value list of the first item and the value list of the second item from the other memory modules; and (c) a unifying step for referring to the value list of the first item and the value list of the second item of the other memory modules received in the data receiving step, and for deciding a ranking of the values in the value list of the first item, or the values in the value list of the second item, or the values in the value list of the first item and the value list of the second item, in view of the values included in the value lists of the first and the second items from all of the other memory modules;

the unifying step comprising i, a first ranking decision step (i-1) for referring to the value list of the first item in each of the memory modules, or the value list of the second item in each of the memory modules, or the value list of the first item and the value list of the second item in each of the memory modules, as well as the value lists of the first and the second items in the other memory modules received in the data receiving step;

(i-2) for comparing the values of the value list of the second item in each of the memory modules, the values of the value list of the first item in the other memory modules, or the values of the value list of the second item in the other memory modules with the values of the value list of the first item in each of the memory modules and, if any of the values in the compared value list is equal to the values of the value list of the first item in each of the memory modules, deleting said any of the values; and (i-3) for deciding a global value ranking for the first item in view of the values included in the value lists of the first item and the second item in each of the memory modules and in the value lists of the first item and the second item in the other memory modules and storing the decided ranking in a first global order storage array for storing the global value ranking at a position corresponding to a value of each of the memory modules; and ii. a second ranking decision step (ii-1) for referring to the value list of the first item in each of the memory modules, or the value list of the second item in each of the memory modules, or the value list of the first item and the value list of the second item in each of the memory modules, as well as the value lists of the first and the second items in the other memory modules received in the data receiving step;

(ii-2) for comparing the values of the value list of the first item in each of the memory modules, the values of the value list of the first item in the other memory modules, or the values of the value list of the second item in the other memory modules with the values of the value list of the second item in each of the memory modules and, if any of the values in the compared value list is equal to the values of the value list of the second item in each of the memory modules deleting the identical value; and (ii-3) for deciding a global value ranking for the second item in view of the values included in the value lists of the first item and the second item in each of the memory modules and the other memory modules and storing the decided ranking in a second global order storage array for storing the global value ranking at the position corresponding to the value of each of the memory modules.

10. The method according to claim 9, wherein the value list of the first item from which the identical value is deleted is sent to the other memory modules via the data transmission path or becomes an object to be processed in the second ranking decision step, and the value list of the second item from which the identical value is deleted is sent to the other memory modules via the data transmission path or becomes an object to be processed in the first ranking decision step.

11. The method according to claim 10, wherein in the control device of each of the memory modules, the method further comprises:

a first occurrence count array generation step for generating a first occurrence count array storing occurrence counts of the values of the value list of the second item in all the other memory modules; and a second occurrence count array generation step for generating a second occurrence count array storing occurrence counts of the values in the value list of the first item corresponding to the occurrence counts in the first occurrence count array based on the occurrence counts in the first occurrence count array relating to the value list of the second item in all the other memory modules.

12. The method according to claim 11, wherein the first occurrence count array generation step comprises a step for generating a local occurrence count array storing the occurrence counts of the value list of the second item in each of the memory modules;

the data sending step comprises a step for sending combinations of the occurrence counts in the local occurrence count array and the values in the second global value number array corresponding to the local occurrence count array to the other memory modules; and the first occurrence count array generation step comprises a step for referring to the occurrence counts in the local occurrence count array and the values of the second global value number array in the other memory module received in the data receiving step and for generating the first occurrence count array in view of the occurrence counts in the local occurrence count array in the other memory modules.

13. The method according to claim 11, wherein the data sending step comprises a step for sending combinations of the occurrence counts in the first occurrence count array and the values of the first global order storage array to the other memory modules; and the second occurrence count array generation step comprises a step for generating a region for a counter array and a cumulative number array having a size identical to the value list and used as the second occurrence count array in the storage; and a step for referring to the occurrence counts in the first occurrence count array from the other memory module received in the data receiving step, for increasing a value at a corresponding position in the counter array by a certain value when any of the values in the order storage array in the other memory modules is equal to the value in the first global order storage array in each of the memory modules, said certain value being said any of the values in the order storage array in the other memory modules and also increasing a value at a next storage position number in the cumulative number array by said any of the values in the order storage array in the other memory modules, or increasing a value in the cumulative number array at a storage position number next to the position corresponding to the value in the order storage array in the other memory modules by the value in the order storage array in the other memory modules when none of the values in the order storage array in the other memory modules is equal to the values in the first global order storage array in each of the memory modules, and for generating a final cumulative number array by accumulating the values of the cumulative number array in the order of the storage position numbers.

14. The method according to claim 13, further comprising:
a data readout step for reading out the values in the value list of the first item based on the occurrence counts in the second occurrence count array so that duplication of identical values is allowed, wherein
the data readout step comprises
a step for generating a second cumulative number array indicating a total number of records having the values of the order storage array not exceeding the values of the order storage array of each of the memory modules by referring to the combinations of the values of the order storage array and corresponding values of the count array of the other memory modules; and
a step for reading out the values in the value list of the first item based on the values of the second cumulative number array, the value of the count array corresponding to the storage position of the second cumulative number, and the value of the final cumulative number array corresponding to the storage position so that duplication of identical values is allowed.

15. The method according to claim 11, wherein
the data sending step comprises a step for sending combinations of the occurrence counts of the first occurrence count array and the first global order storage array to the other memory modules; and
the second occurrence count array generation step comprises
a step for generating a region for a counter array and a cumulative number array having a size identical to the value list and used as the second occurrence count array in the storage; and
a step for referring to the occurrence counts in the first occurrence count array from the other memory module received in the data receiving step, for increasing a value at a corresponding position in the counter array by a certain value when any of the values in the order storage array in the other memory modules is equal to the value in the first global order storage array in each of the memory modules, said certain value being said any one of values in the order storage array in the other memory modules, and also increasing a value at a next storage position number in the cumulative number array by said any of the values in the order storage array in the other memory modules, or increasing the value at the corresponding position in the counter array by "1", when none of the values in the order storage array in the other memory modules is equal to the values in the first global order storage array in each of the memory modules, storing an invalid value as the value, at the position corresponding to the value in the order storage array in the other memory modules, in the cumulative number array, and increasing the value of the storage position number next to the corresponding position by the value of the order storage array in the other memory modules and for generating a final cumulative number array by accumulating the values of the cumulative number array in the order of the storage position numbers.

16. The method according to claim 11, further comprising:
a data readout step for reading out the values in the value list of the first item based on the occurrence counts in the second occurrence count array so that duplication of identical values is allowed.

* * * * *